United States Patent [19]
Yamauchi et al.

[11] Patent Number: 5,661,823
[45] Date of Patent: Aug. 26, 1997

[54] IMAGE DATA PROCESSING APPARATUS THAT AUTOMATICALLY SETS A DATA COMPRESSION RATE

[75] Inventors: Akira Yamauchi; Hideki Mimura; Tomoko Ono; Fumio Izawa; Mikio Kakizaki; Takaaki Suyama, all of Yokohama; Shuichi Hisatomi, Fuchu, all of Japan

[73] Assignee: Kabushiki Kaisha Toshiba, Kawasaki, Japan

[21] Appl. No.: 125,830

[22] Filed: Sep. 24, 1993

Related U.S. Application Data

[62] Division of Ser. No. 20,191, Feb. 19, 1993, abandoned, which is a division of Ser. No. 949,561, Sep. 23, 1992, abandoned, which is a division of Ser. No. 589,494, Sep. 28, 1990, abandoned.

[30]     Foreign Application Priority Data

Sep. 29, 1989  [JP]  Japan ..................... 1-253980

[51] Int. Cl.⁶ .......................... H04N 1/415; G06T 9/00
[52] U.S. Cl. ................... 382/239; 382/250; 382/251; 358/430; 358/433
[58] Field of Search ........................ 348/231, 232, 348/233, 420, 403, 404, 405; 358/441, 404, 444, 426, 261.2, 432, 433, 430; 382/166, 239, 248, 250, 251

[56]            References Cited

U.S. PATENT DOCUMENTS

| | | | |
|---|---|---|---|
| 4,225,885 | 9/1980 | Lux et al. ................... | 382/239 |
| 4,791,492 | 12/1988 | Nagashima et al. . | |
| 5,016,107 | 5/1991 | Sasson et al. ................ | 348/231 |
| 5,018,017 | 5/1991 | Sasaki et al. ................ | 348/232 |
| 5,101,280 | 3/1992 | Moronaga et al. .......... | 358/426 |
| 5,121,216 | 6/1992 | Chen et al. .................. | 358/261.3 |
| 5,138,702 | 8/1992 | Tada . | |
| 5,231,514 | 7/1993 | Nakamura .................. | 358/444 |
| 5,265,180 | 11/1993 | Golin .......................... | 382/239 |
| 5,337,049 | 8/1994 | Shimoda ..................... | 348/420 |
| 5,410,352 | 4/1995 | Watanabe ................... | 348/405 |
| 5,432,556 | 7/1995 | Hatano et al. .............. | 348/415 |

FOREIGN PATENT DOCUMENTS

| | | |
|---|---|---|
| 0 204 626 | 10/1986 | European Pat. Off. . |
| 0 280 253 | 2/1988 | European Pat. Off. . |
| 0 323 194 | 7/1989 | European Pat. Off. . |
| 0 380 081 | 1/1990 | European Pat. Off. . |
| 0 390 421 | 10/1990 | European Pat. Off. . |
| 63-260356 | 10/1988 | Japan . |
| 01 185 080 | 7/1989 | Japan . |
| 2172767 | 9/1986 | United Kingdom . |

OTHER PUBLICATIONS

IBM Technical Disclosure Bulletin, *Enable/Disable and Card ID Port for Memory Card;* May 31, 1986; vol. 28, No. 12; pp. 5553–5555.

*Primary Examiner*—Scott A. Rogers
*Attorney, Agent, or Firm*—Oblon, Spivak, McClelland, Maier & Neustadt, P.C.

[57]            ABSTRACT

The invention is based on an electronic still camera for converting a taken optical image of the subject into digital image data, and recording into a memory card incorporating semiconductor memories, in which the digital image data obtained from this electronic still camera is stored in a large-capacity recording medium through an exclusive recording device, or displayed in plural monitors, or stored in a disk or magnetic tape by existing recording devices or even compressed, expanded, edited or processed, so that it may satisfy versatile requests of users sufficiently.

4 Claims, 101 Drawing Sheets

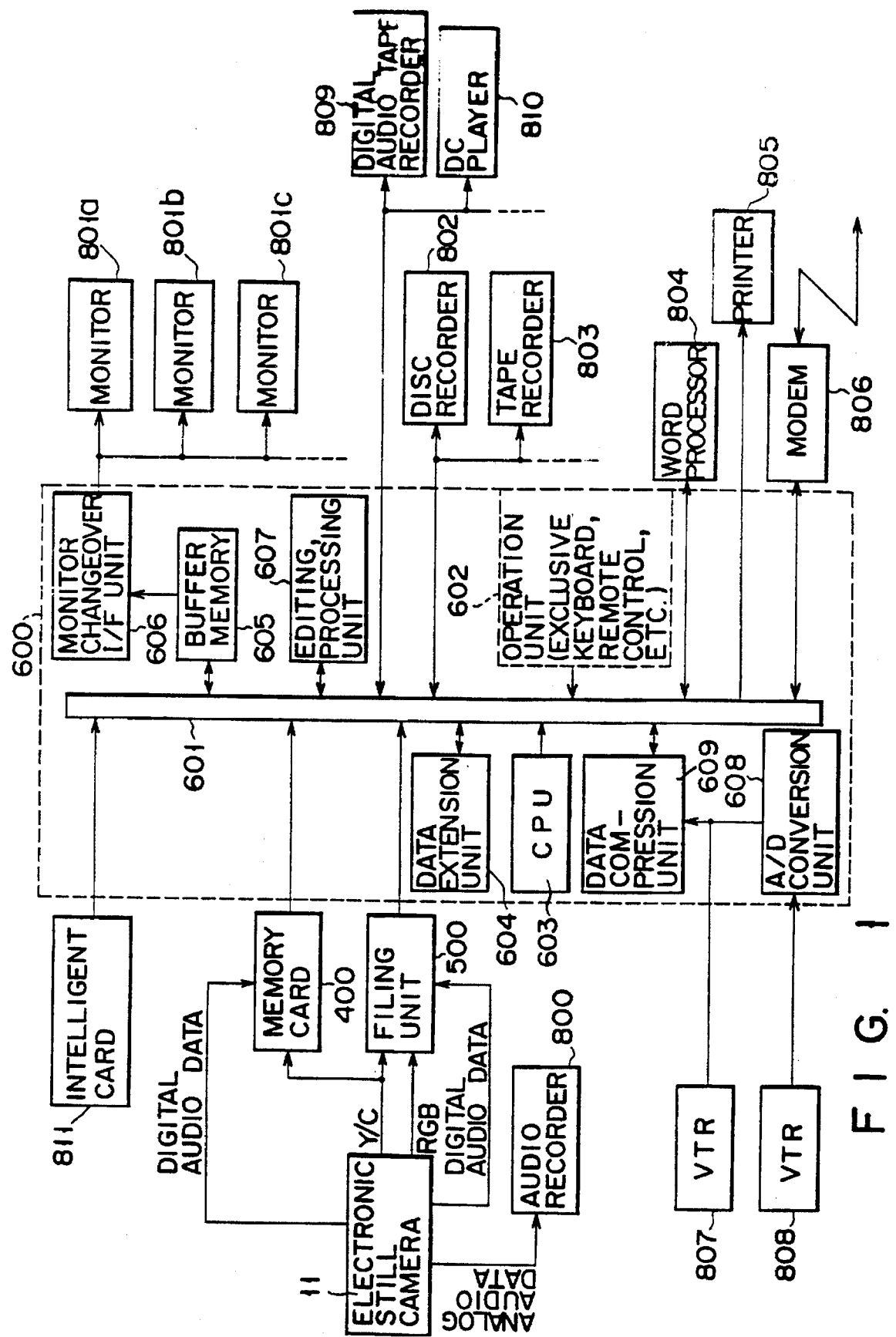
F I G. 1

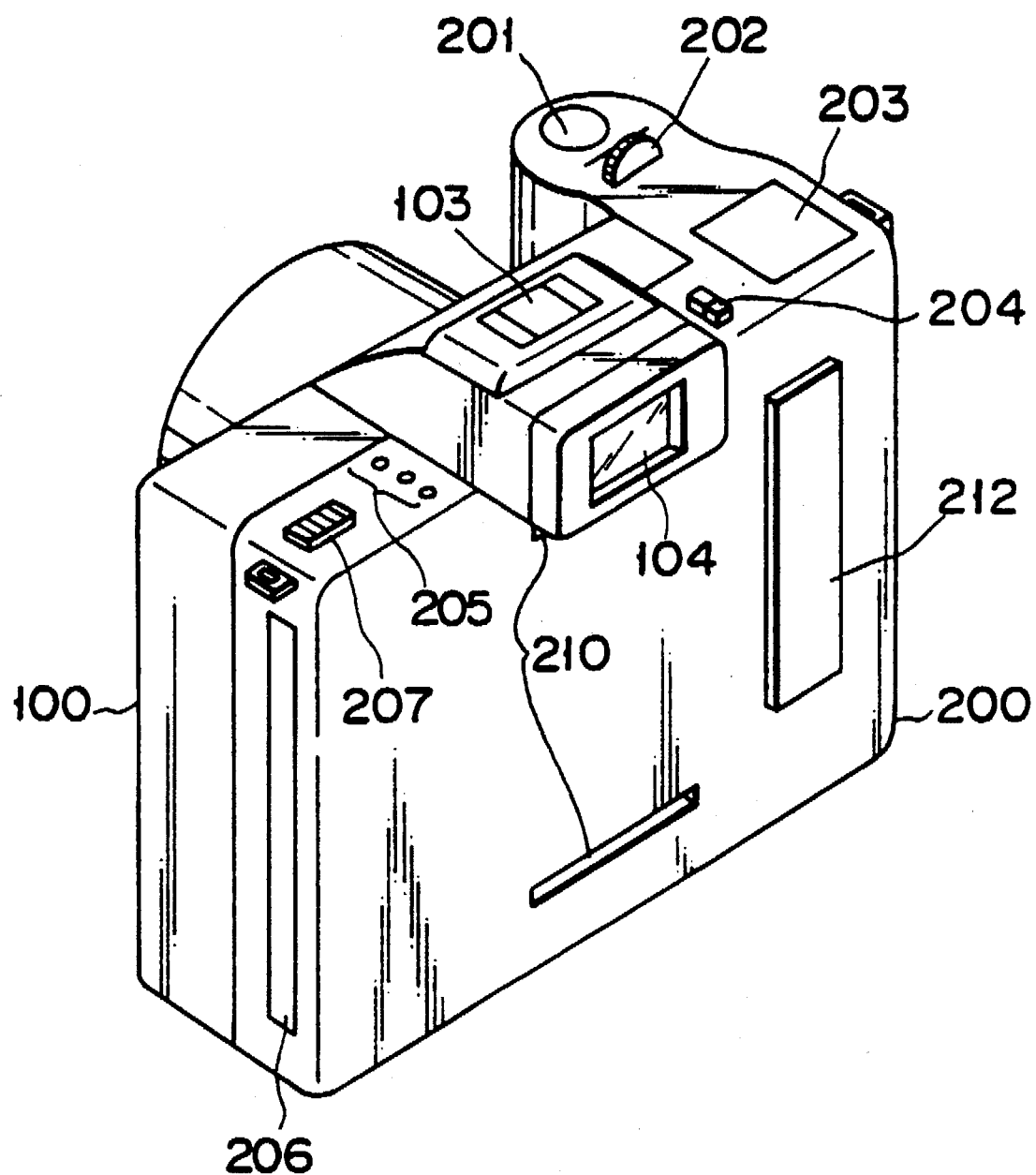
F I G. 6

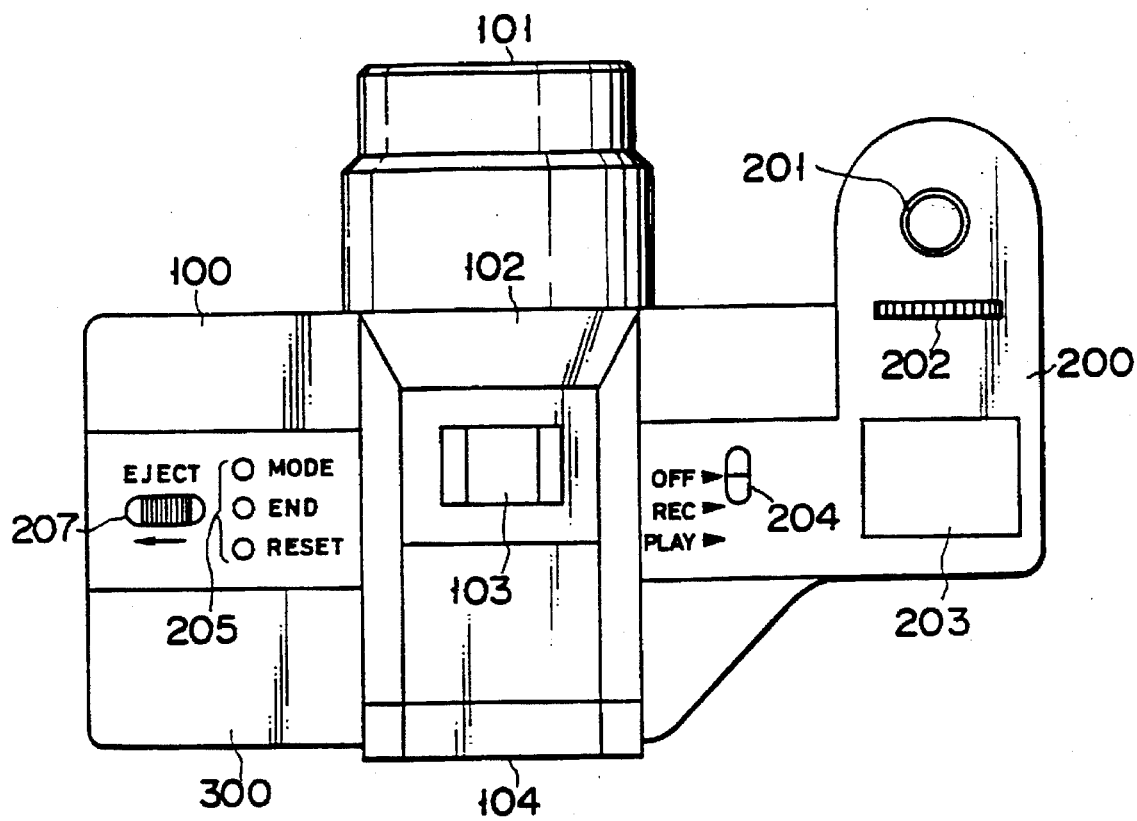
F I G. 15
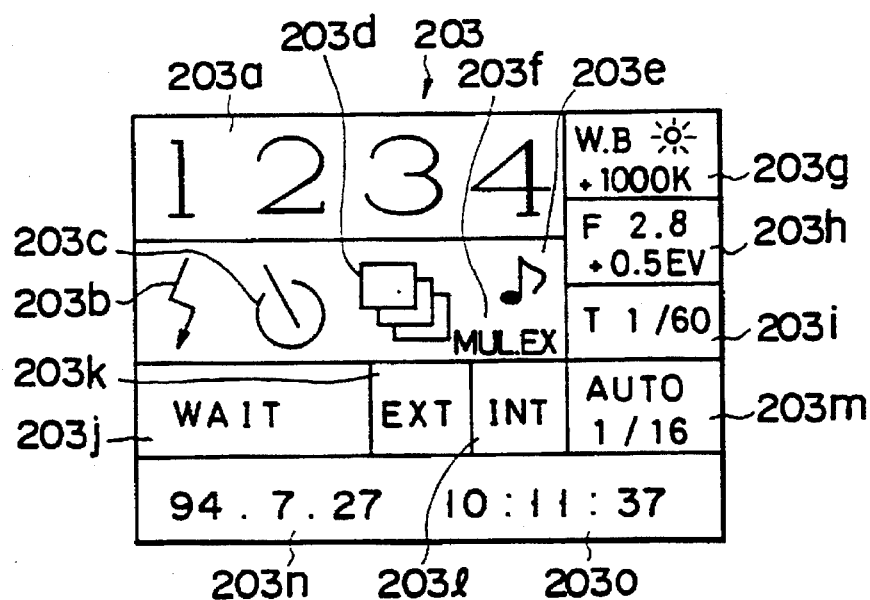
F I G. 16

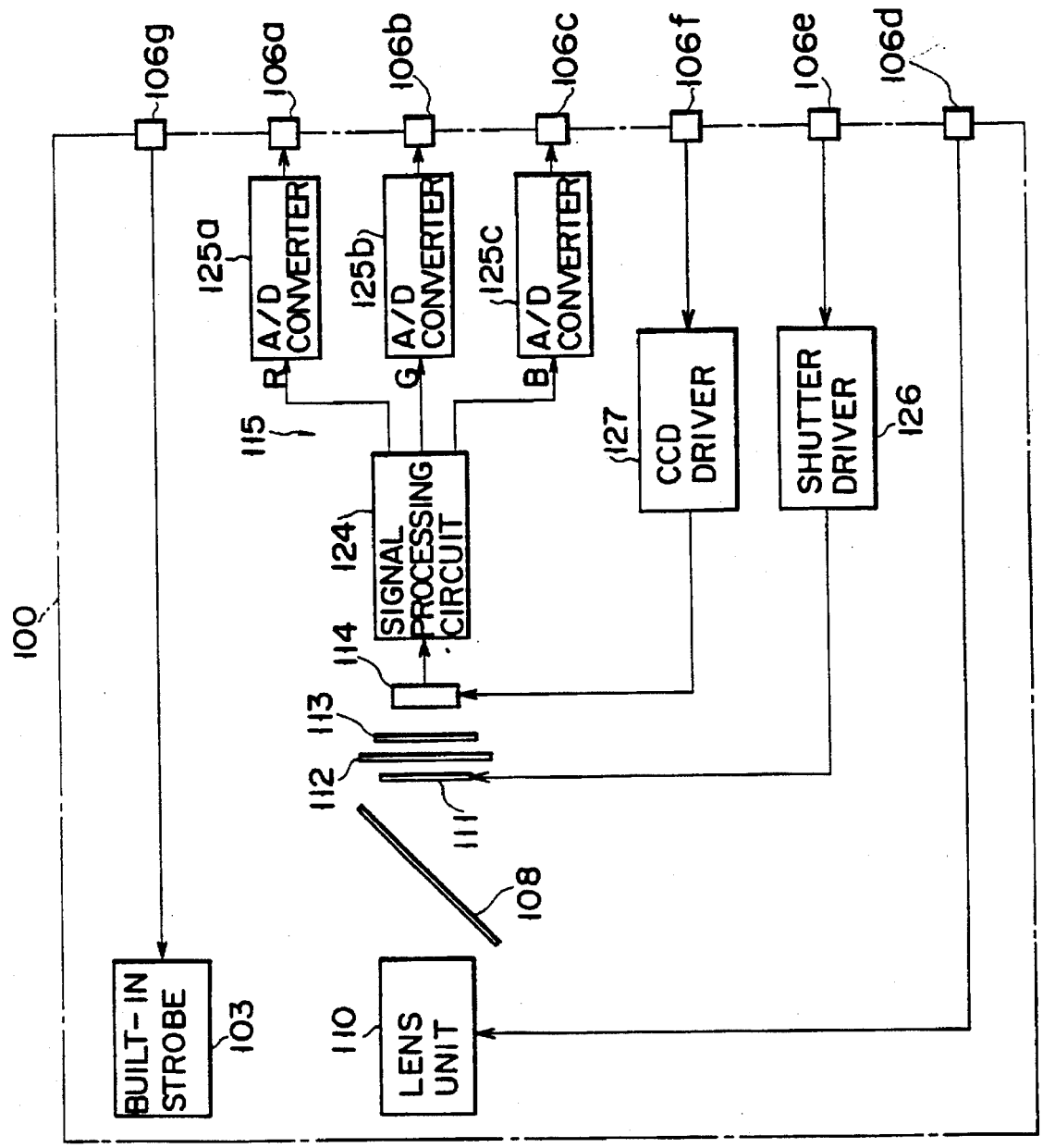
F I G. 17

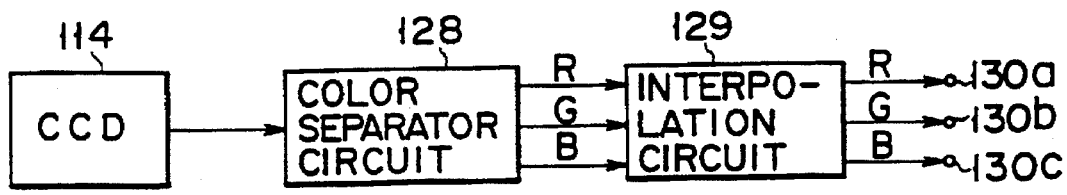
F I G. 18
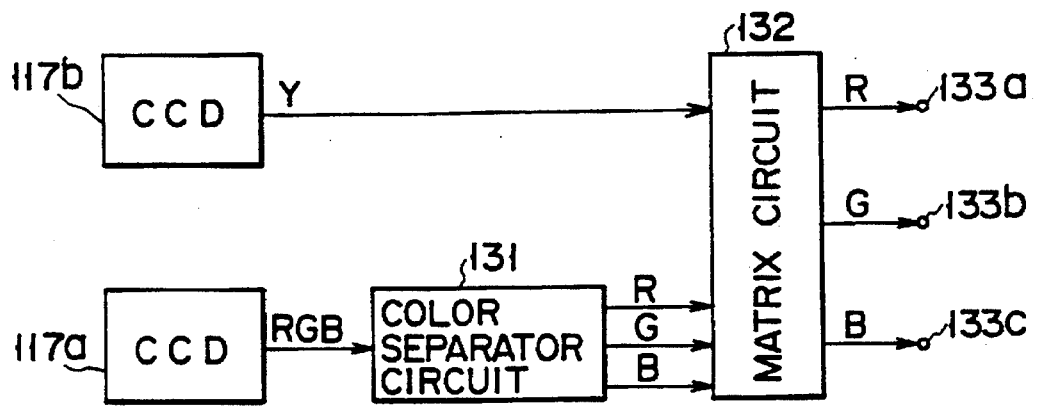
F I G. 19
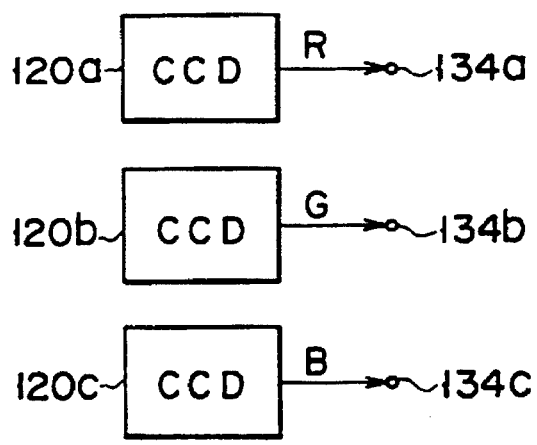
F I G. 20

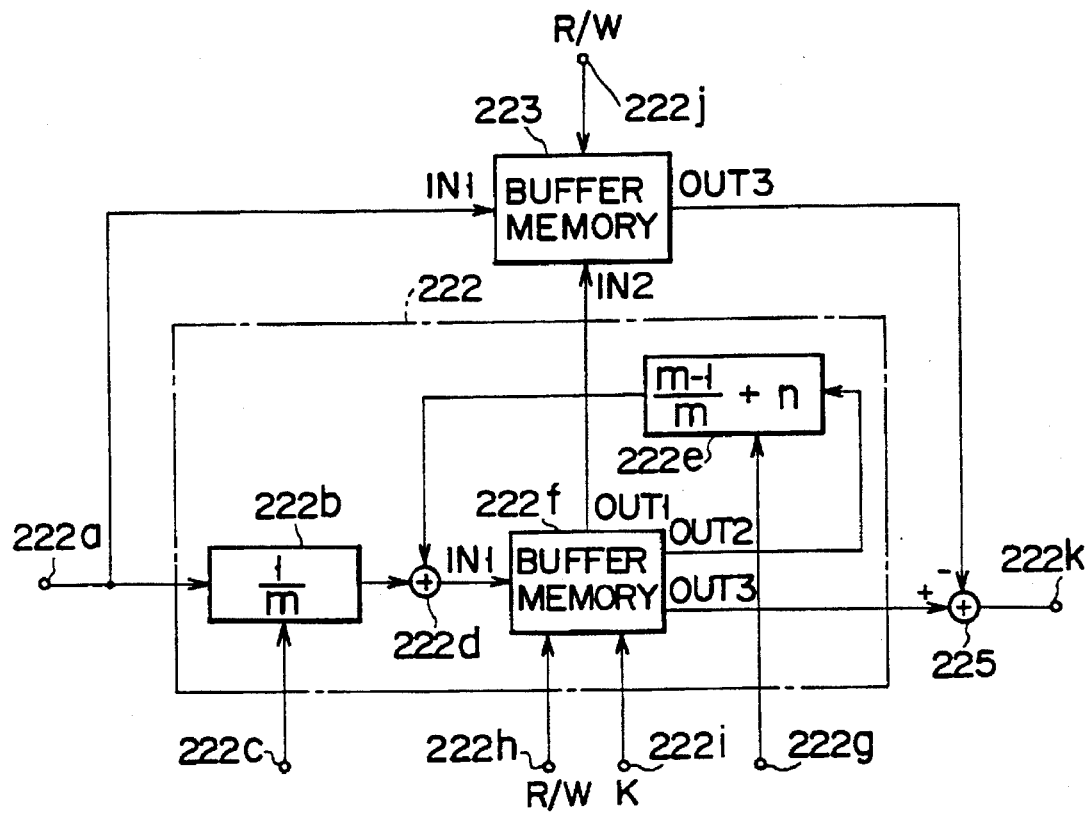
F I G. 27
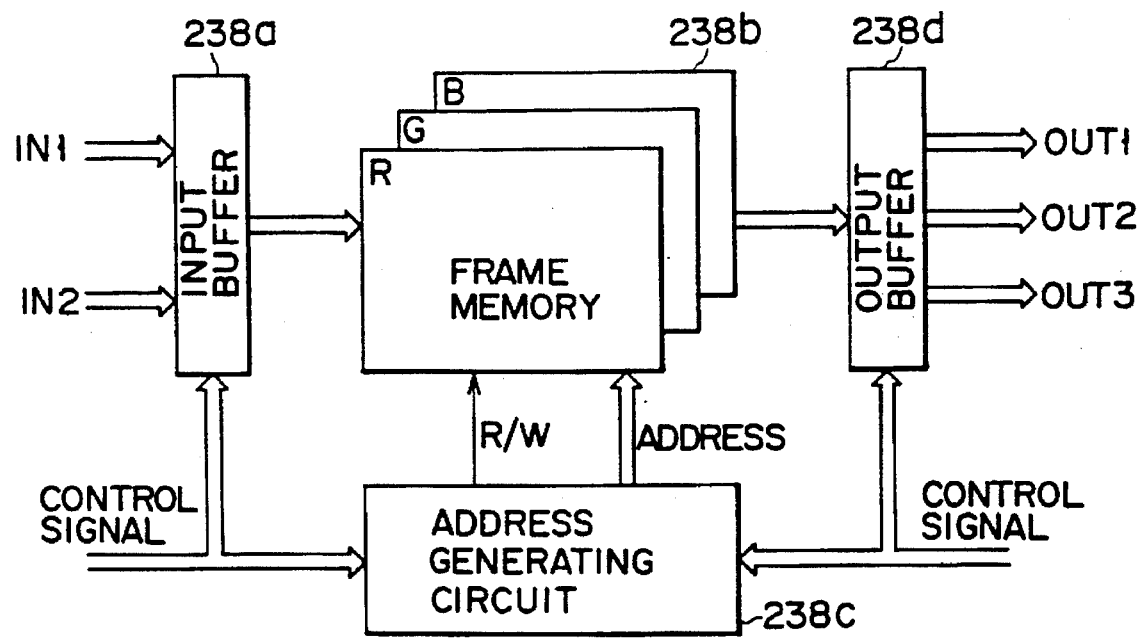
F I G. 28

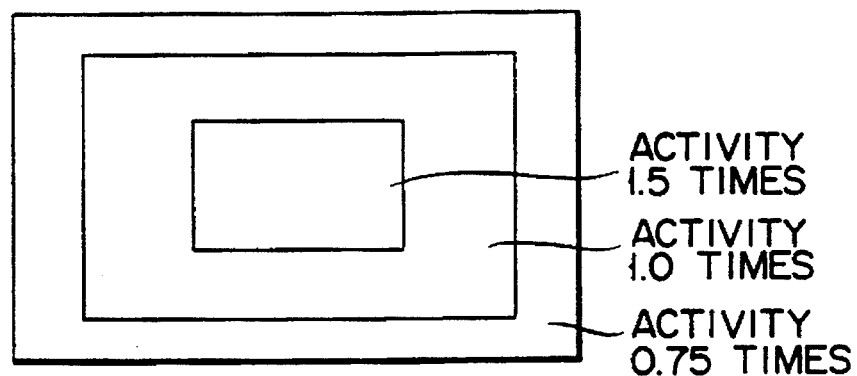
F I G. 32
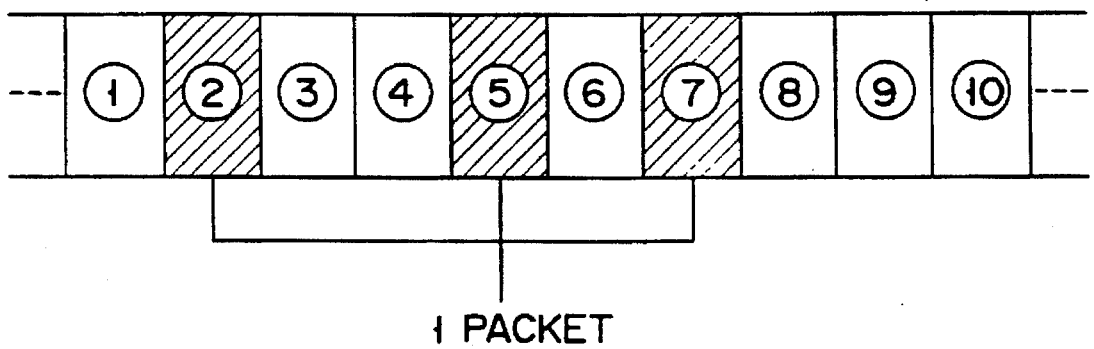
F I G. 34

| AREA | ADDRESS (HEXADECIMAL) | BYTE | DESCRIPTION |
|---|---|---|---|
| HEADER AREA | 000000 | 1 | FORMAT NO. |
| | 000001 | 1 | CARD NO. |
| | 000002~00000F | 14 | CARD LABEL, ALPHANUMERIC 14 CHARACTERS, KANJI 7 CHARACTERS |
| | 000002~000011 | 2 | NO. OF PACKETS USED |
| | 000012~000013 | 2 | NO. OF RESIDUAL CLUSTERS |
| | 000014~000015 | 2 | NO. OF CLUSTERS USED |
| | 000016 | 1 | PARITY CHECK |
| | 000017~0003FF | 1001 | OPTION AREA (USER COMMAND AREA) |
| PACKET INFORMATION AREA | 000400~000404 | 4 | TYPE/ATTRIBUTE/CONNECTION INFORMATION OF PACKET 1 |
| | ~ | | ~ |
| | 0012FC~0012FF | 4 | TYPE/ATTRIBUTE/CONNECTION INFORMATION OF PACKET 1024 |
| DIRECTORY AREA | 001300~001301 | 2 | PACKET 1 START CLUSTER |
| | | | |
| | 001AEF~001AFF | 2 | PACKET 1024 START CLUSTER |
| MAT AREA | 001B00~001B01 | 2 | MAT OF CLUSTER 1 |
| | | | |
| | | | |
| | 002AEF~002AFF | 2 | MAT OF CLUSTER 2048 |
| PACKET DATA AREA | 002B00~FFFFFD | | PACKET DATA HEADER OF EACH PACKET INCLUDED HERE |
| CARD DATA | FFFFFE | 1 | EEPROM BYTE/PAGE |
| | FFFFFF | 1 | MEMORY TYPE/CAPACITY |

F I G. 35

| RELATIVE ADDRESS | BYTE | DESCRIPTION |
|---|---|---|
| 00H ~ 06H | 7 | PACKET INFORMATION AREA |
| 07H ~ 0FH | 9 | OPTION AREA |
| 10H | 1 | YEAR, BCD CODE |
| 11H | 1 | MONTH, BCD CODE |
| 12H | 1 | DAY, BCD CODE |
| 13H | 1 | HOUR, BCD CODE |
| 14H | 1 | MINUTE, BCD CODE |
| 15H | 1 | SECOND, BCD CODE |
| 16H ~ 76H | 96 | TITLE, 96 ALPHANUMERIC CHARACTERS (ASCII CODE) 48 KANJI CHARACTERS (SHIFT JIS CODE) |
| 77H ~ | | PACKET DATA |

F I G. 36

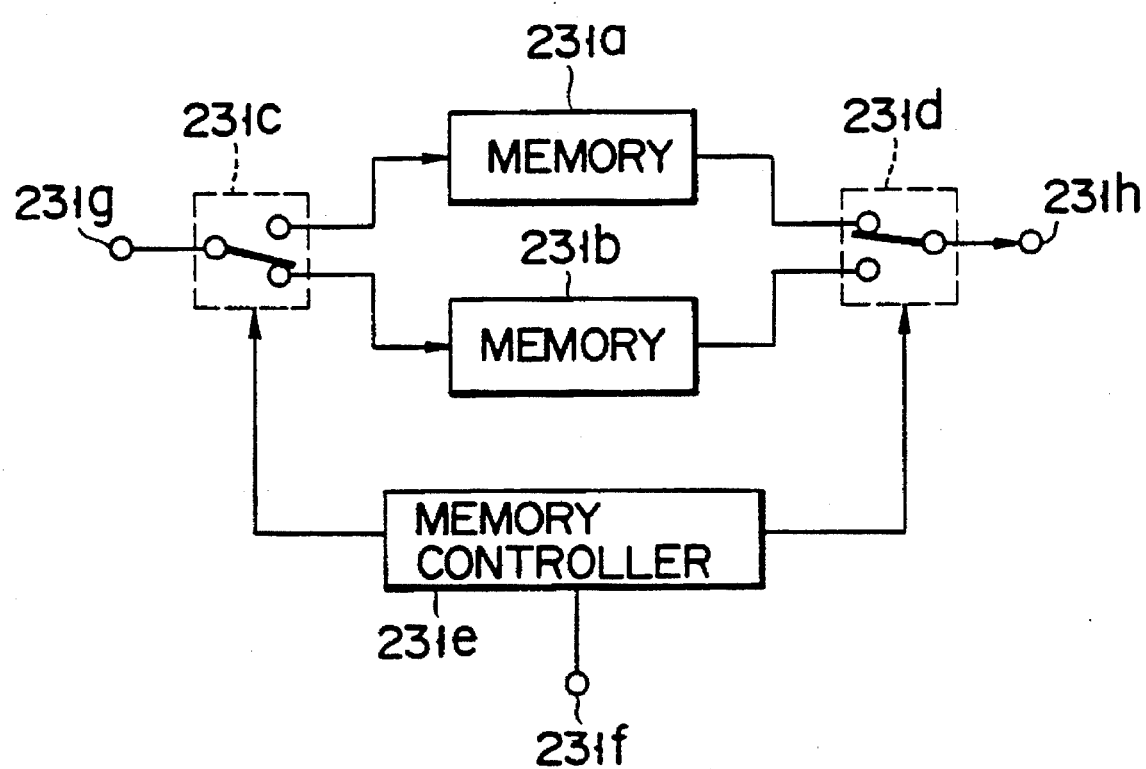
F I G. 37

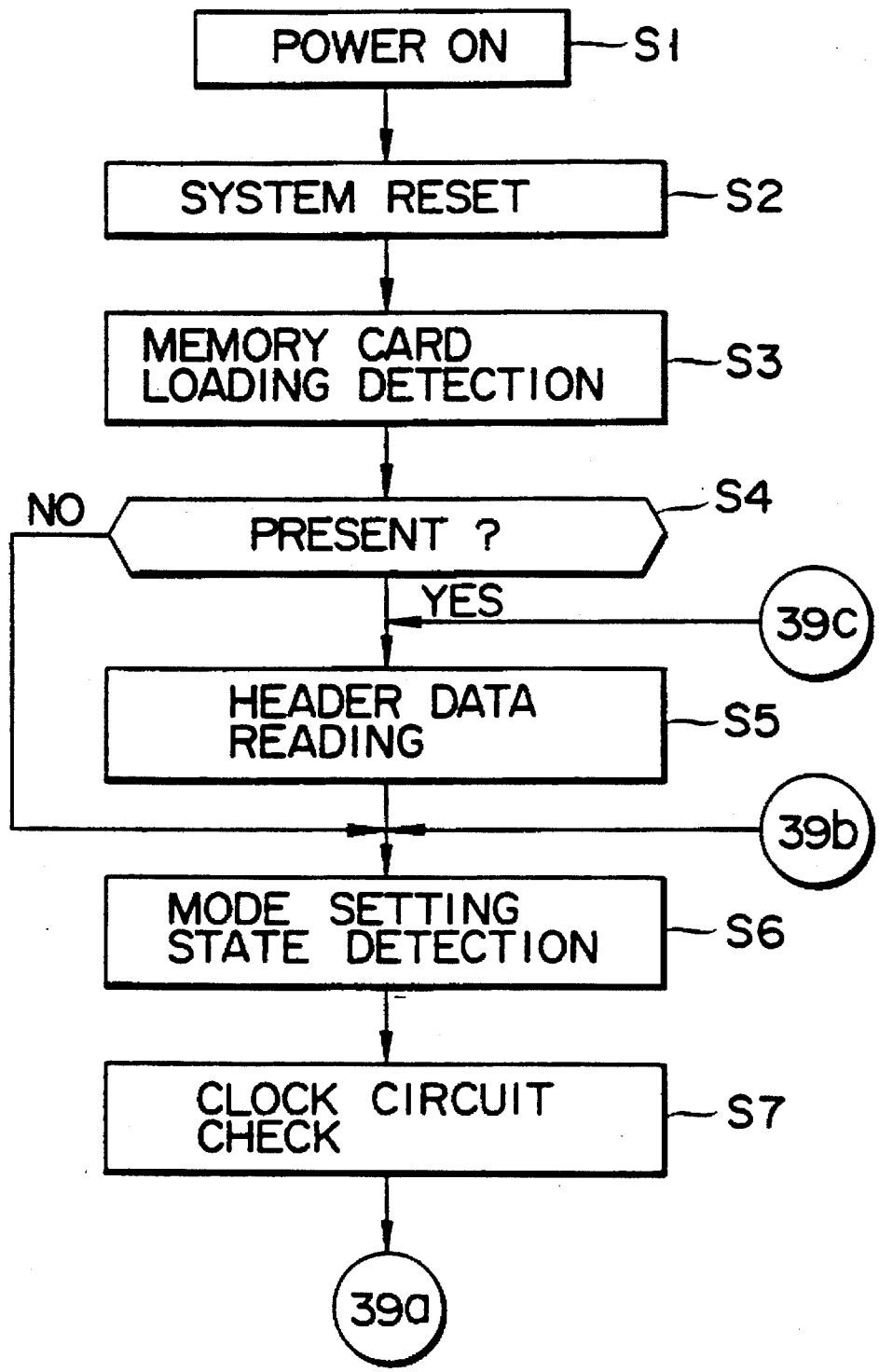
F I G. 39A

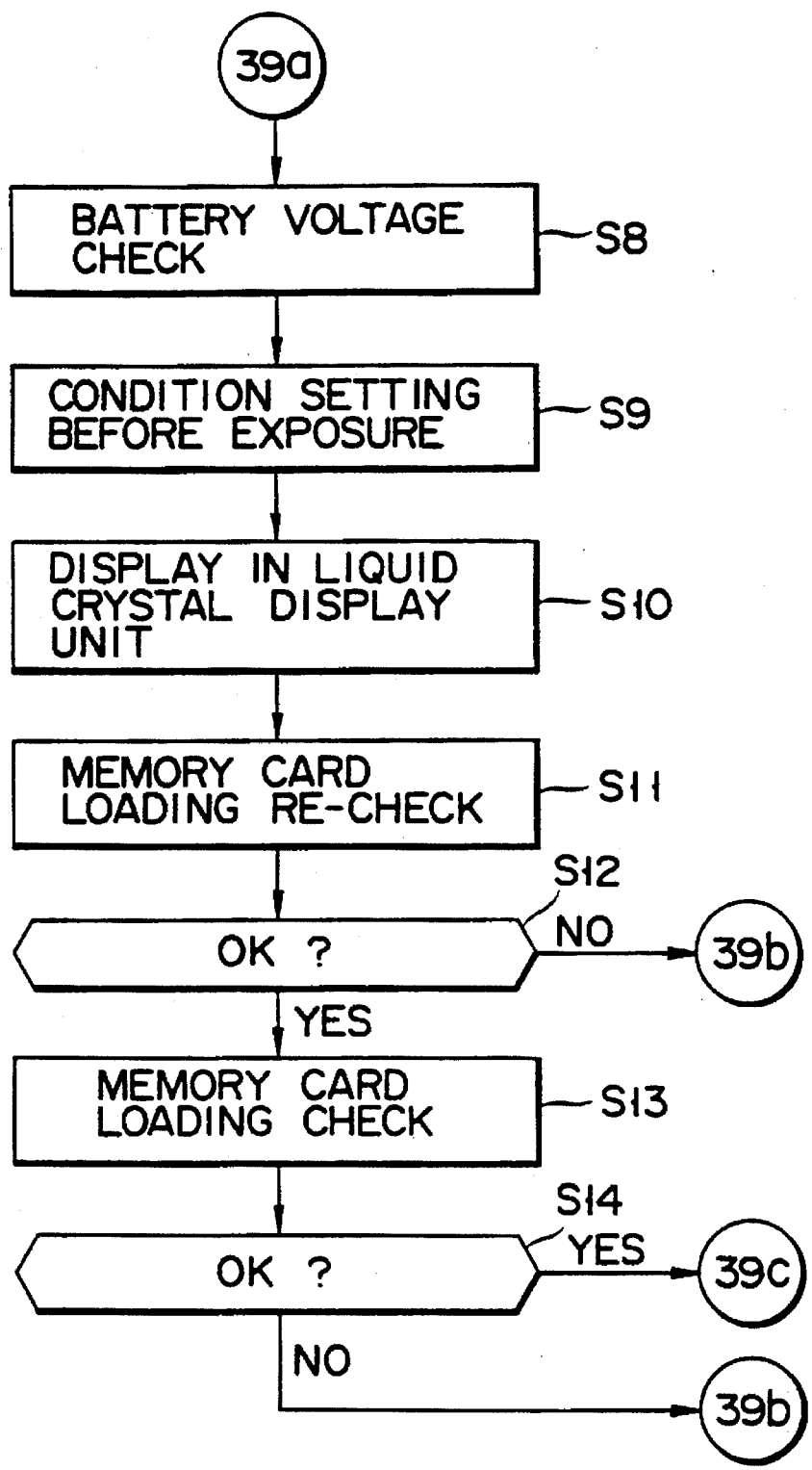
F I G. 39B

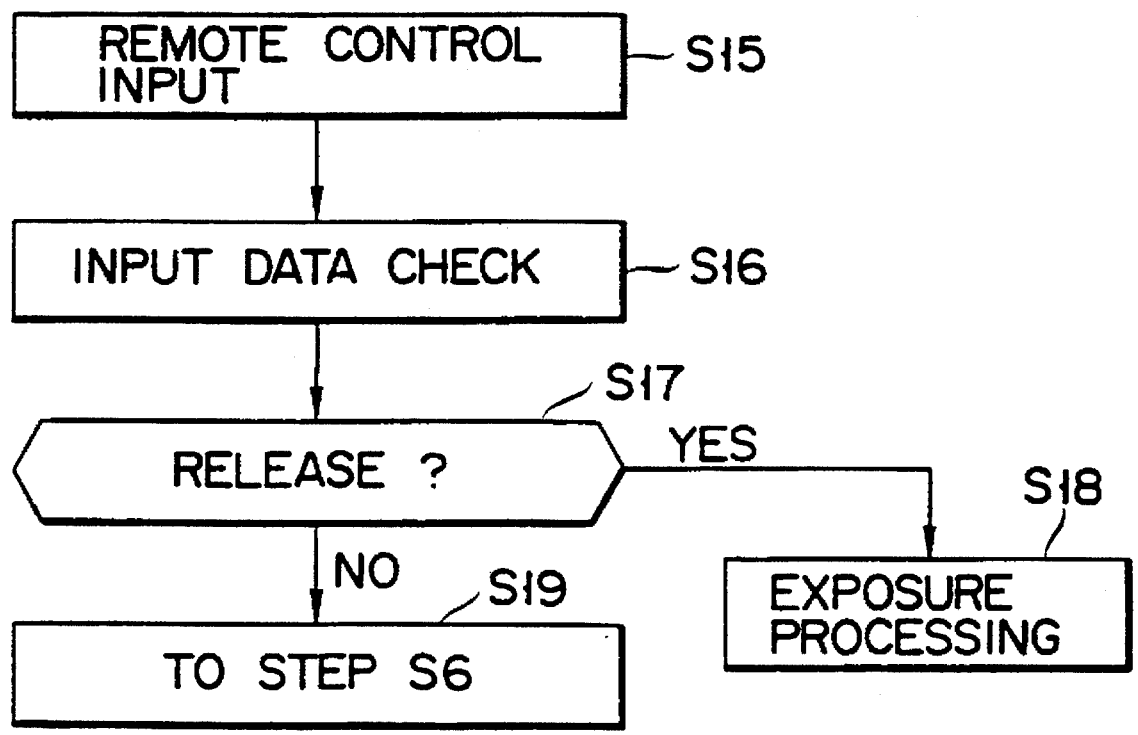
F I G. 40

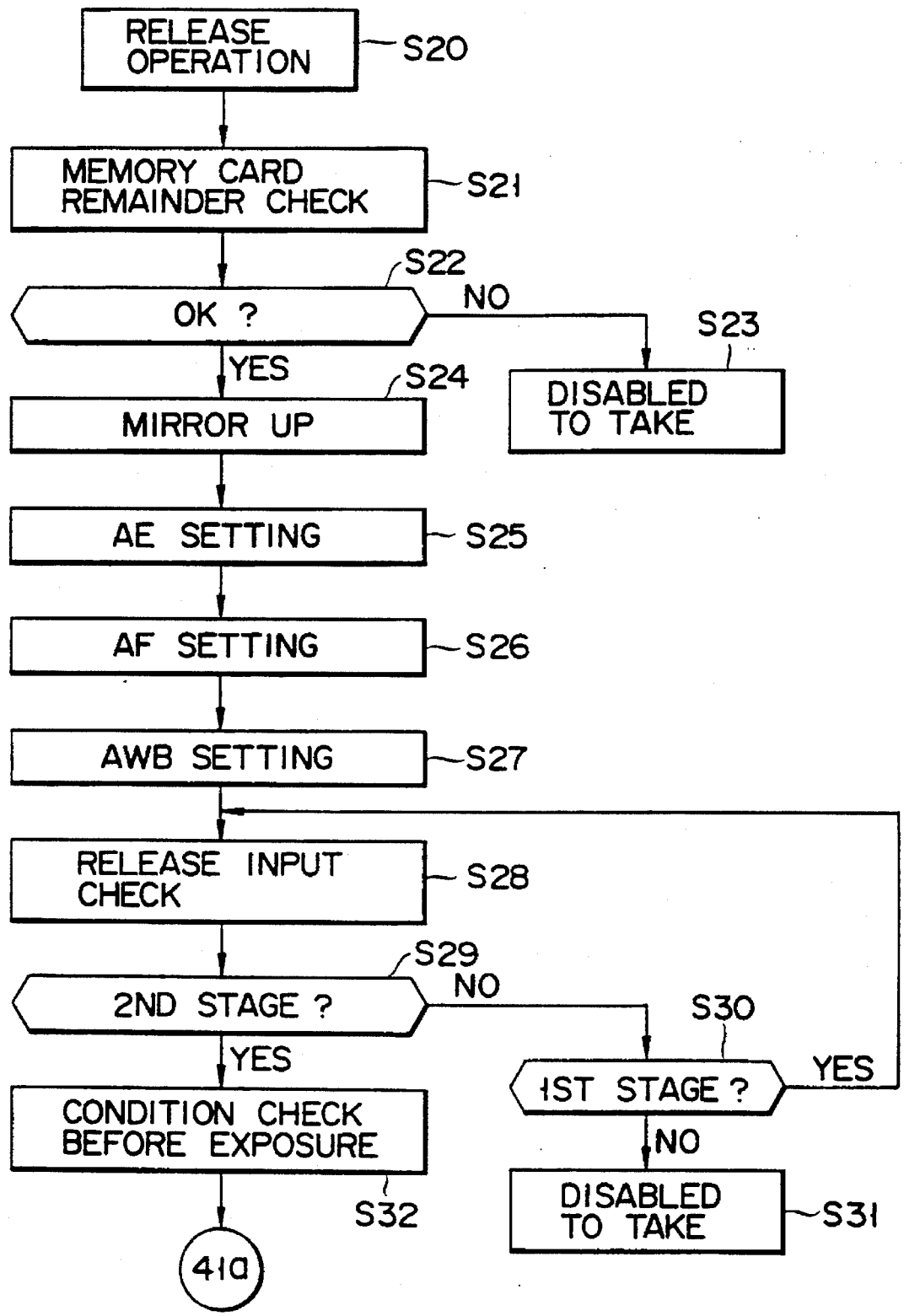
F I G. 41A

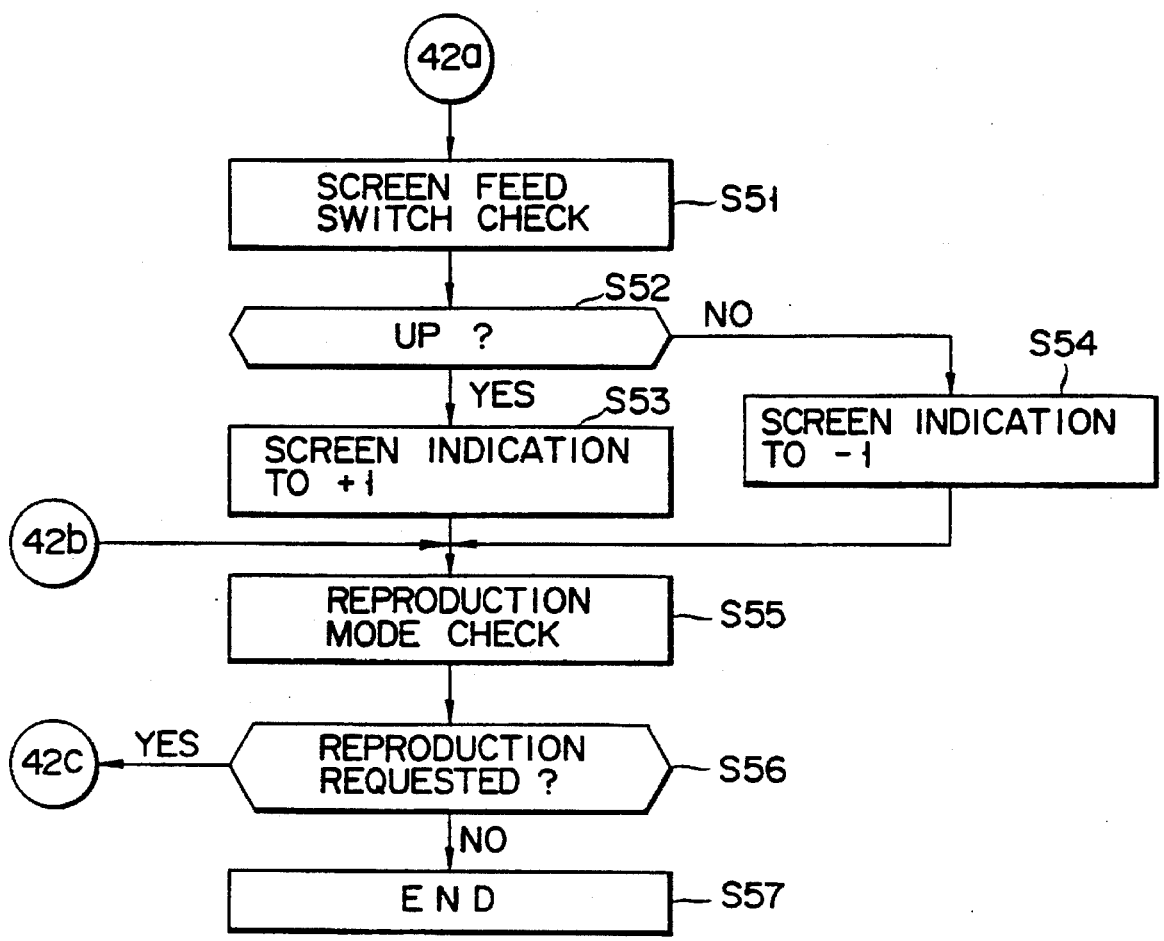
F I G. 42B

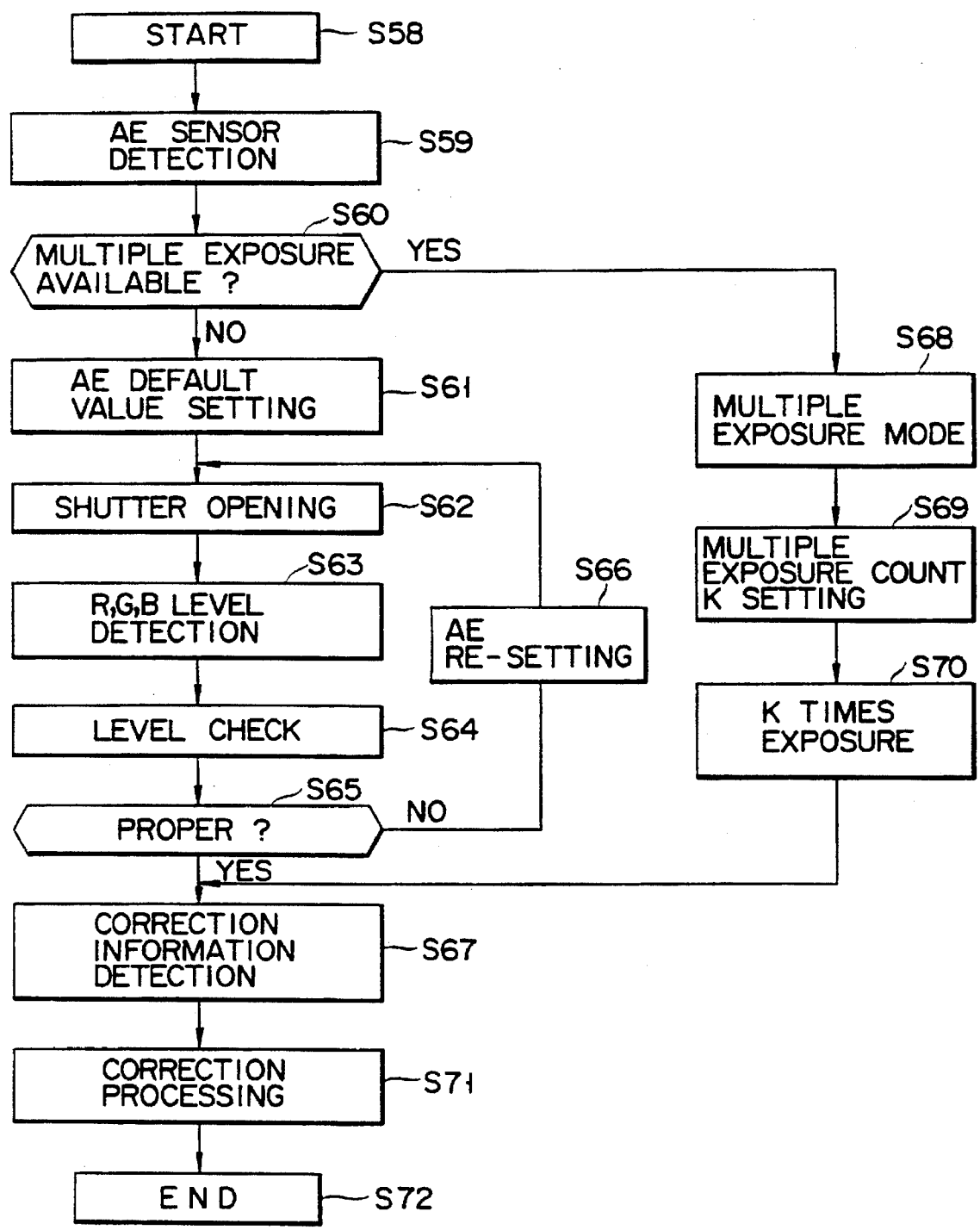
F I G. 43

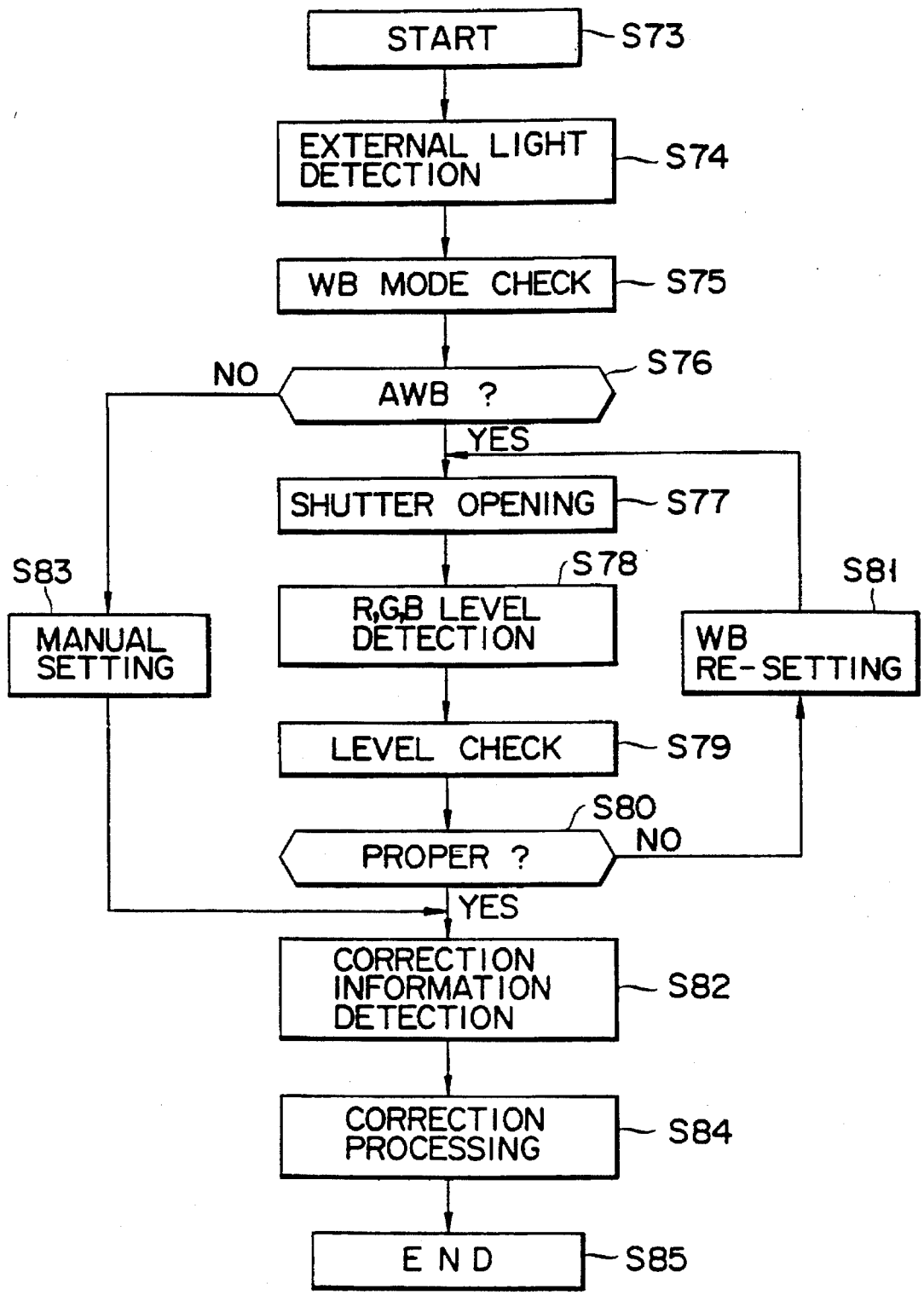
F I G. 44

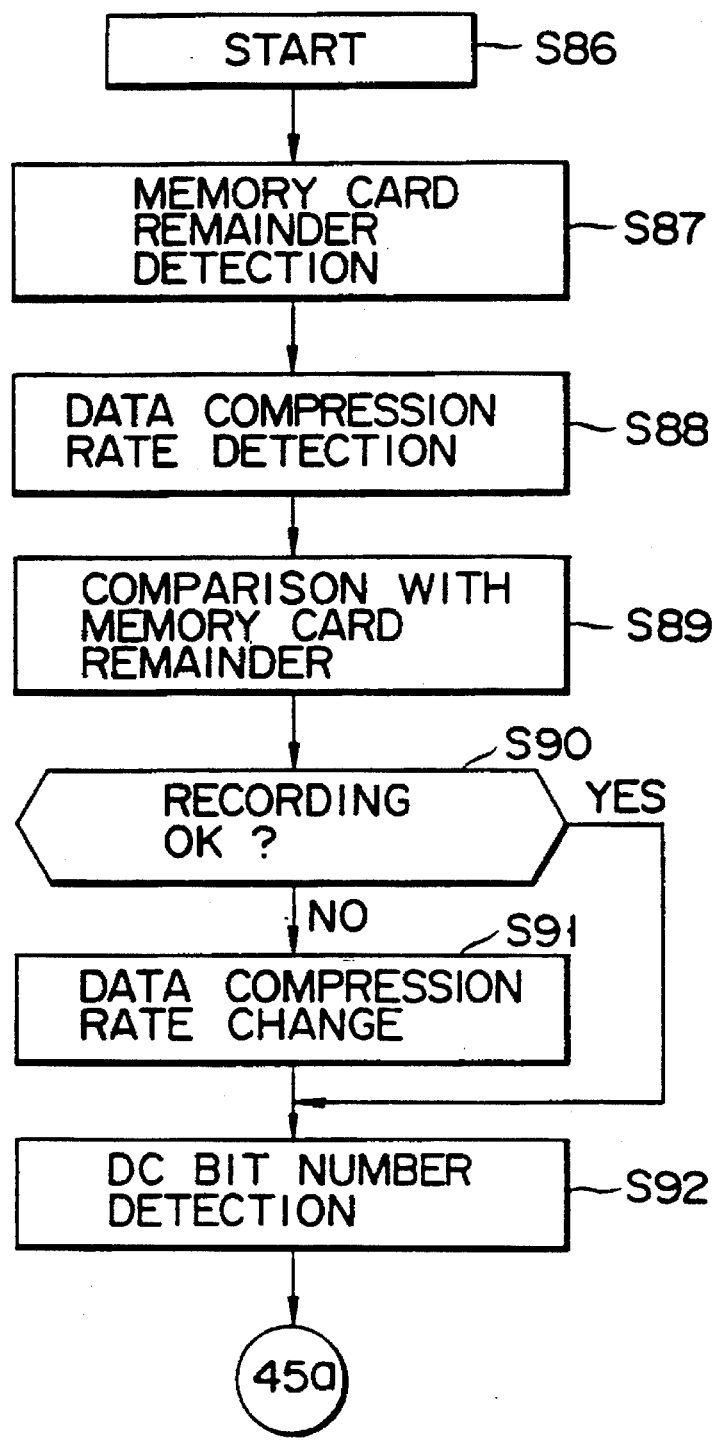
F I G. 45A

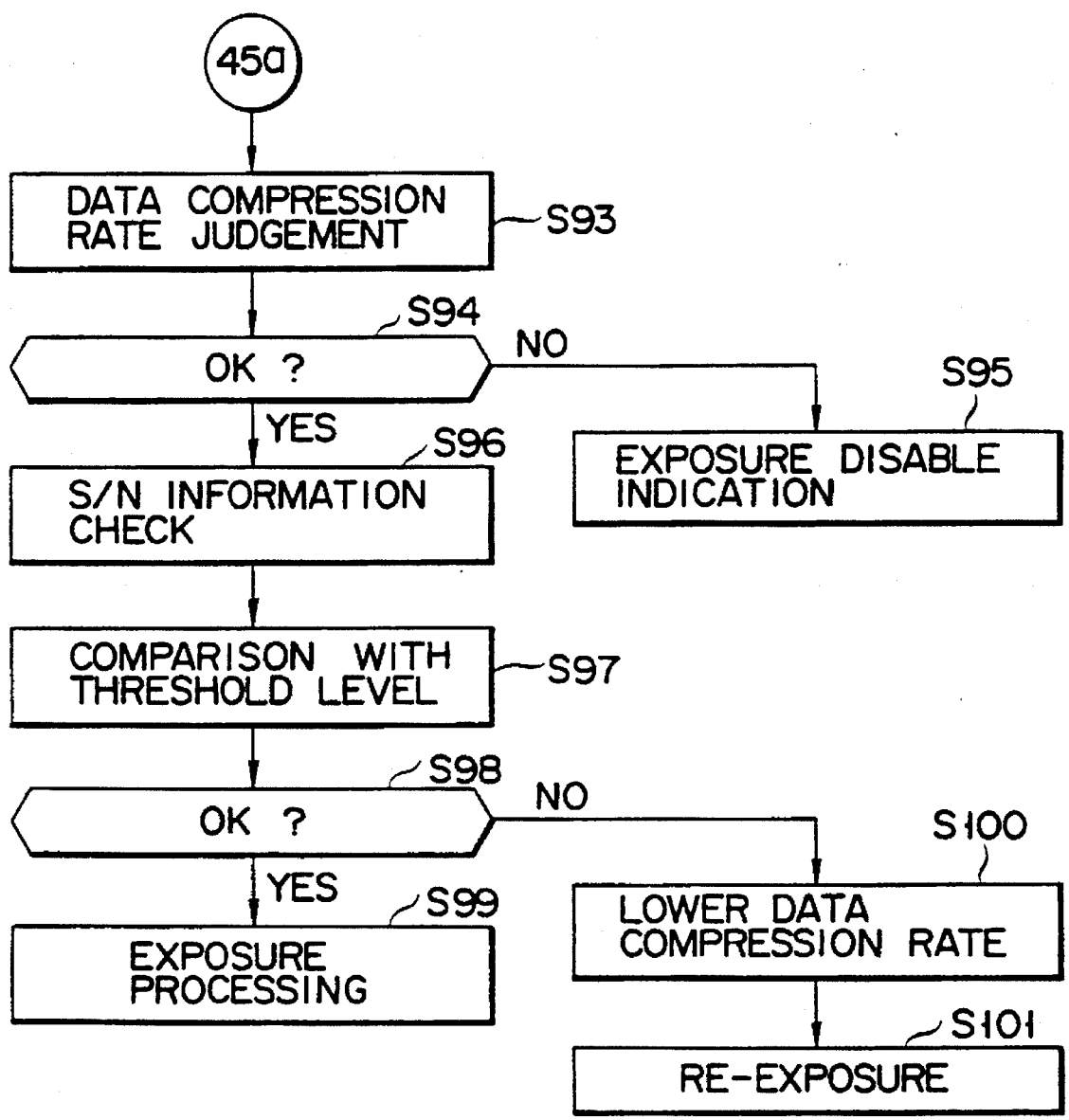
F I G. 45B

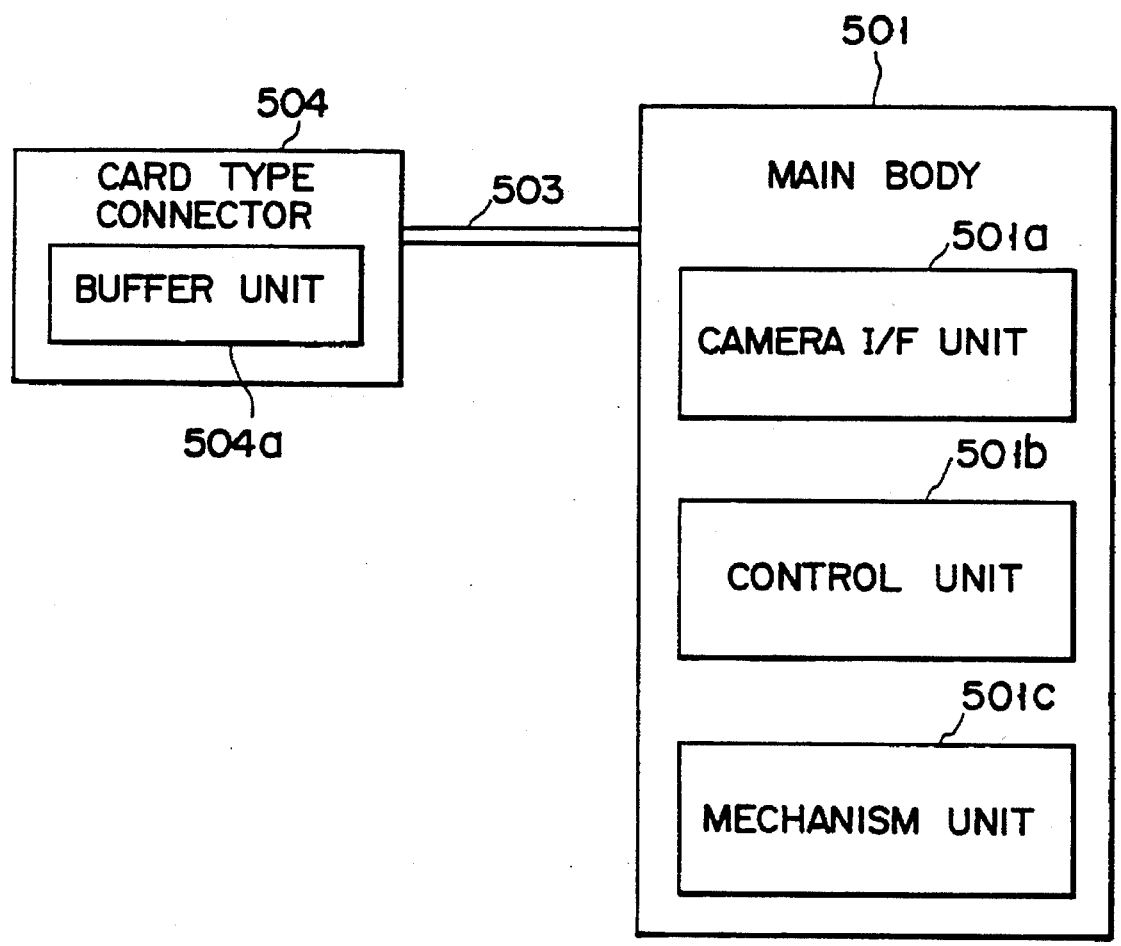
F I G. 53

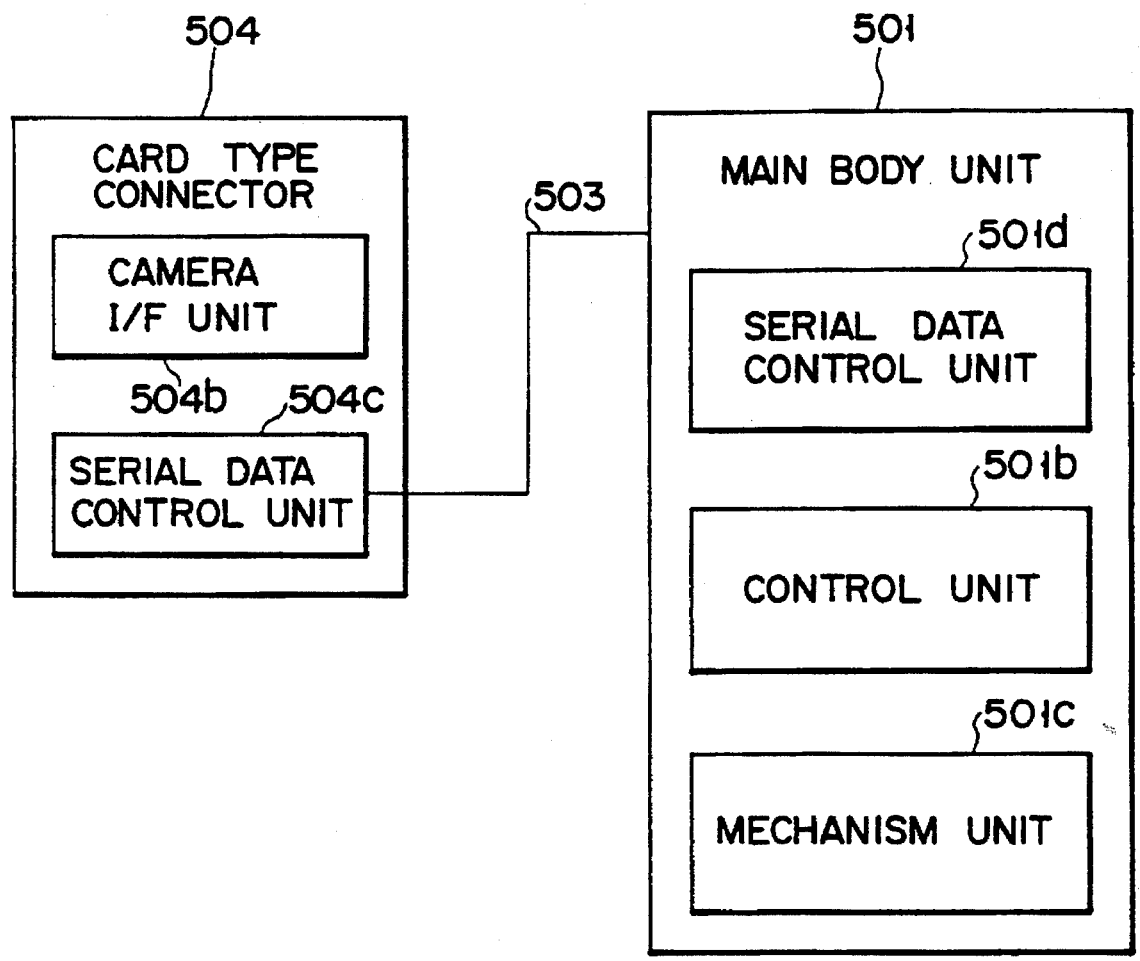
F I G. 54

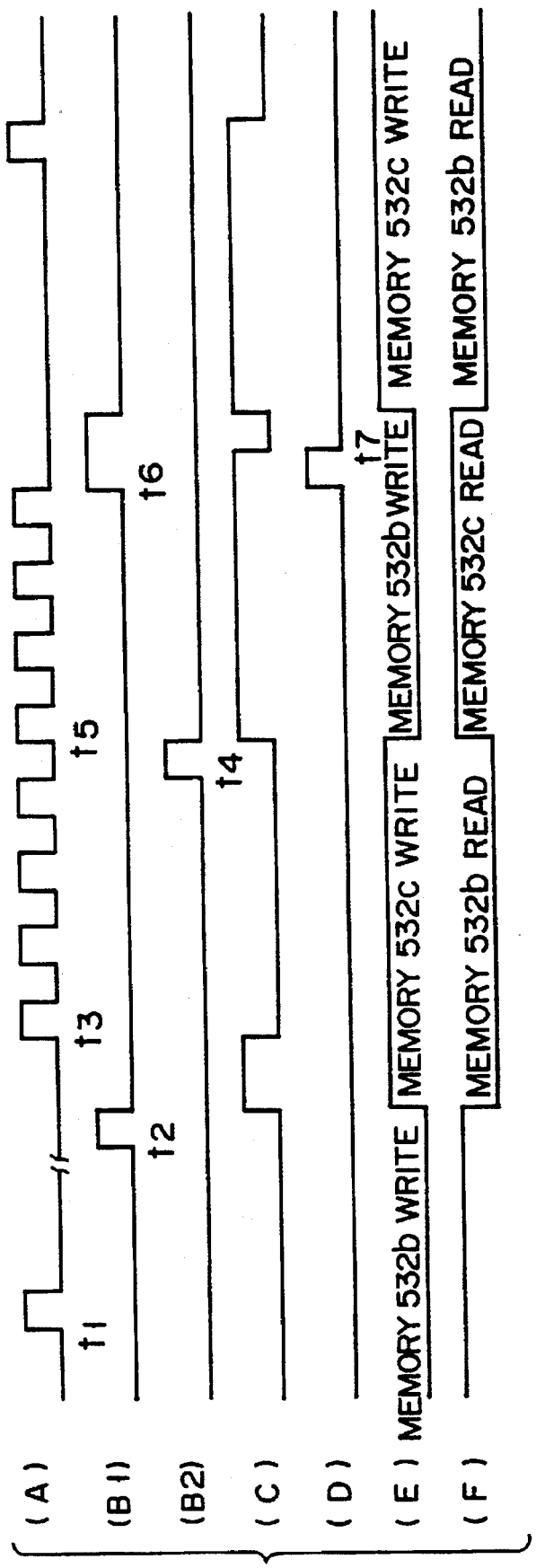
F I G. 57

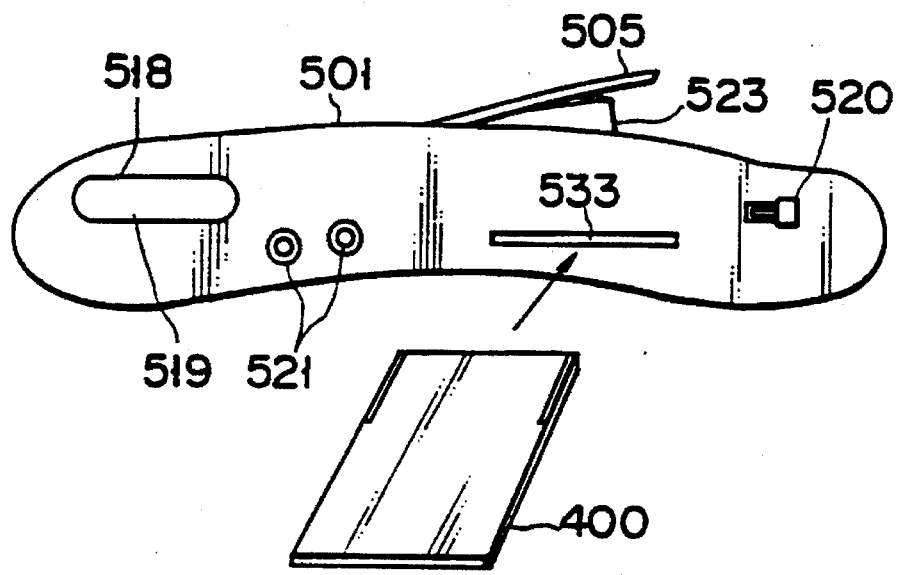
F I G. 60
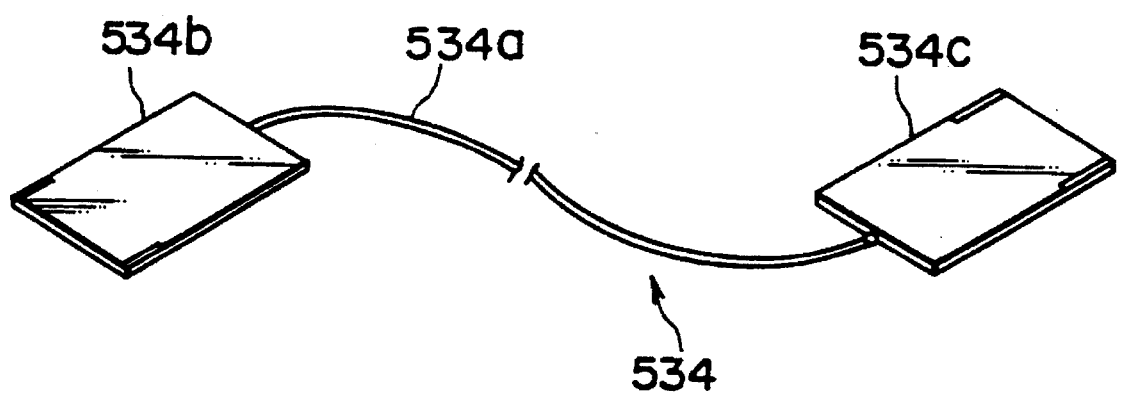
F I G. 61

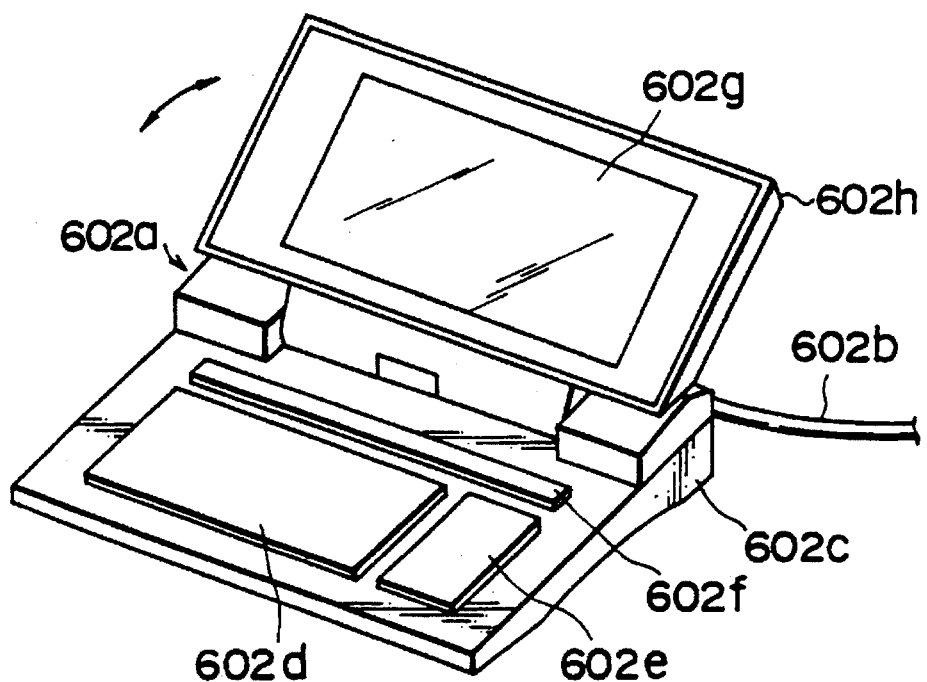
F I G. 63
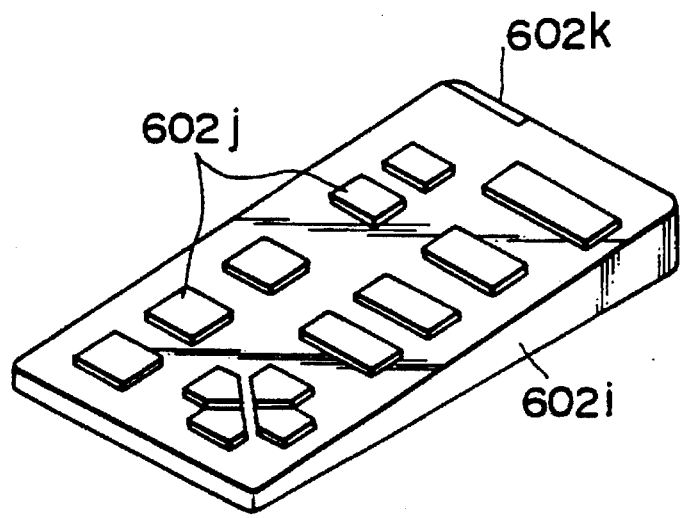
F I G. 64

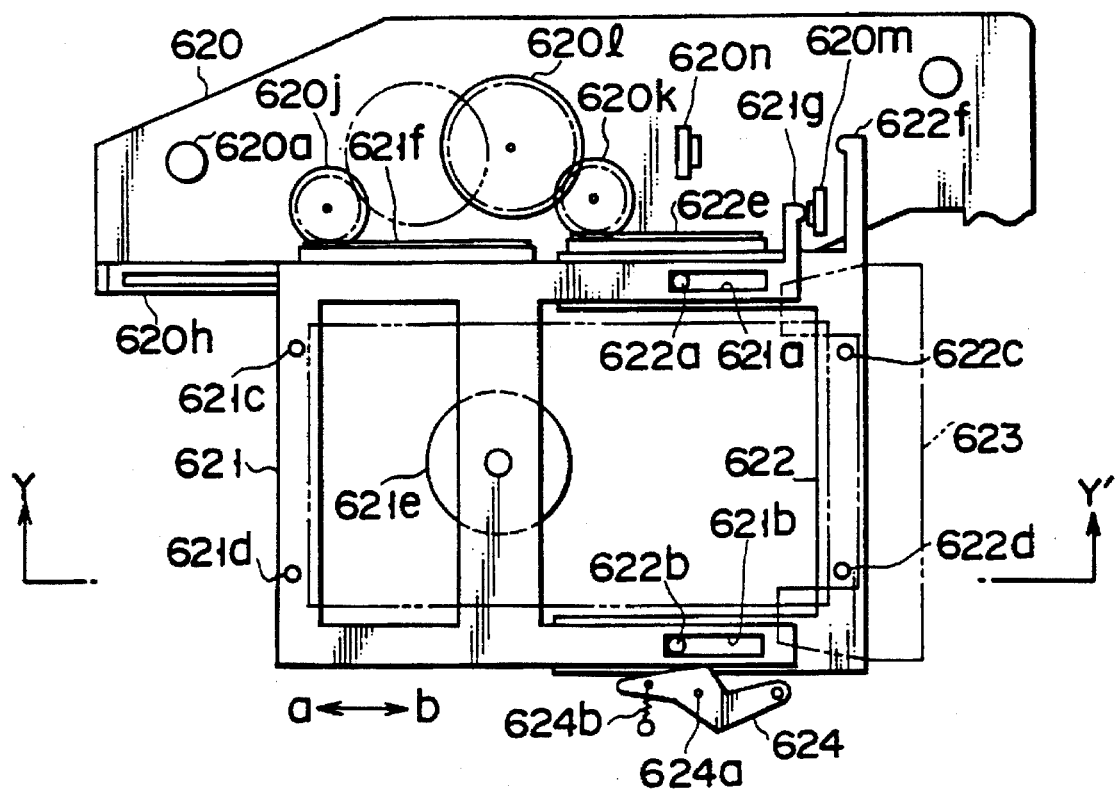
F I G. 69
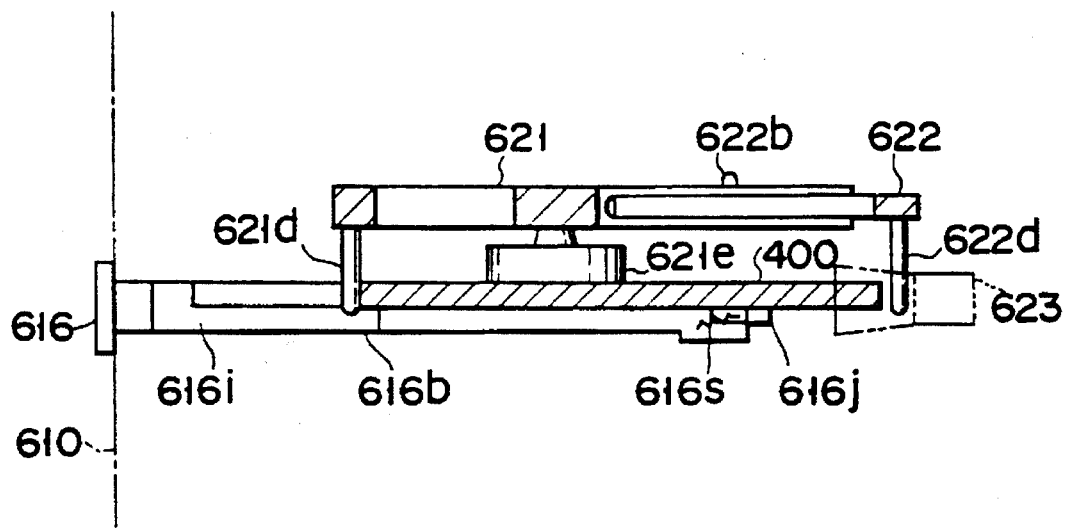
F I G. 70

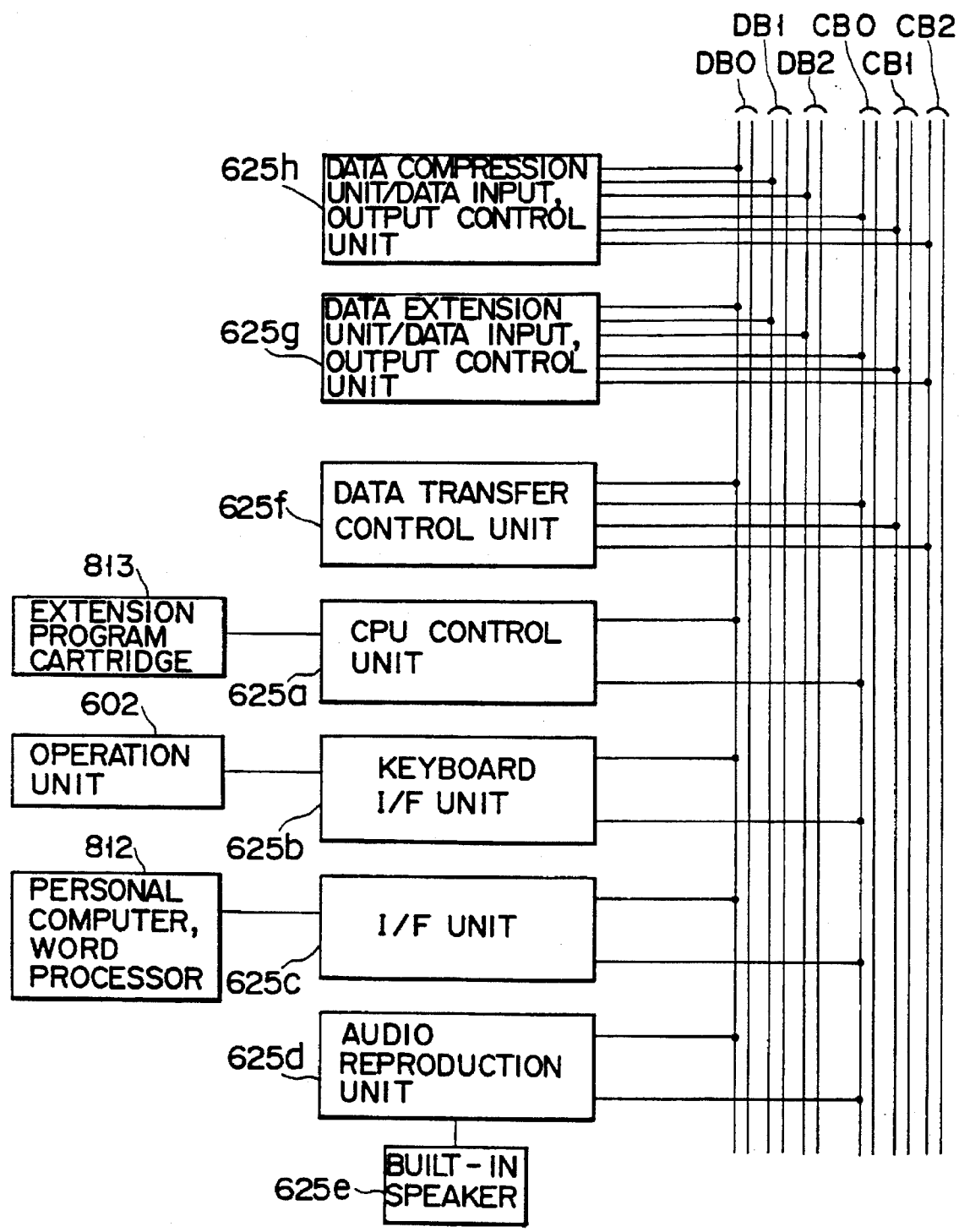
F I G. 75

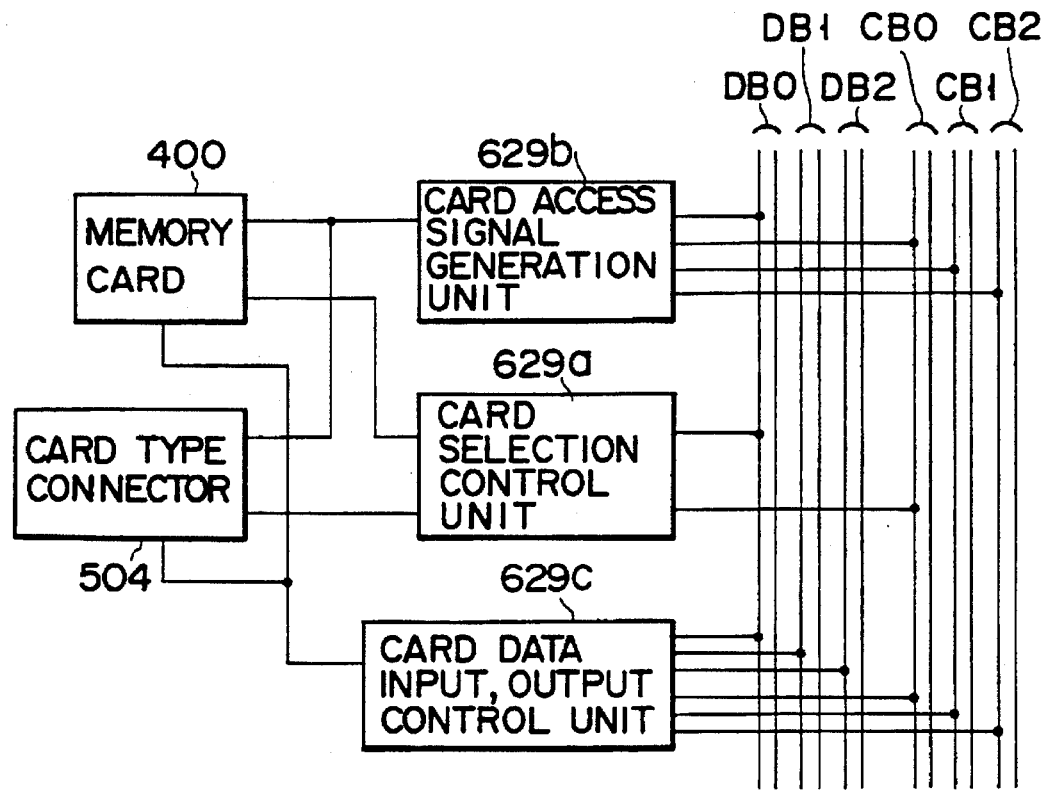
F I G. 76
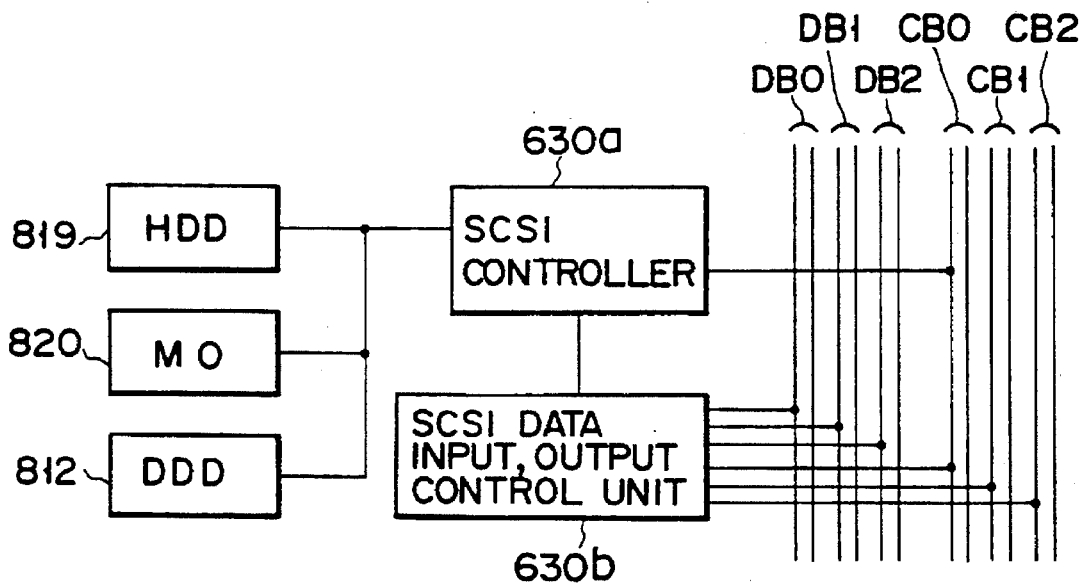
F I G. 77

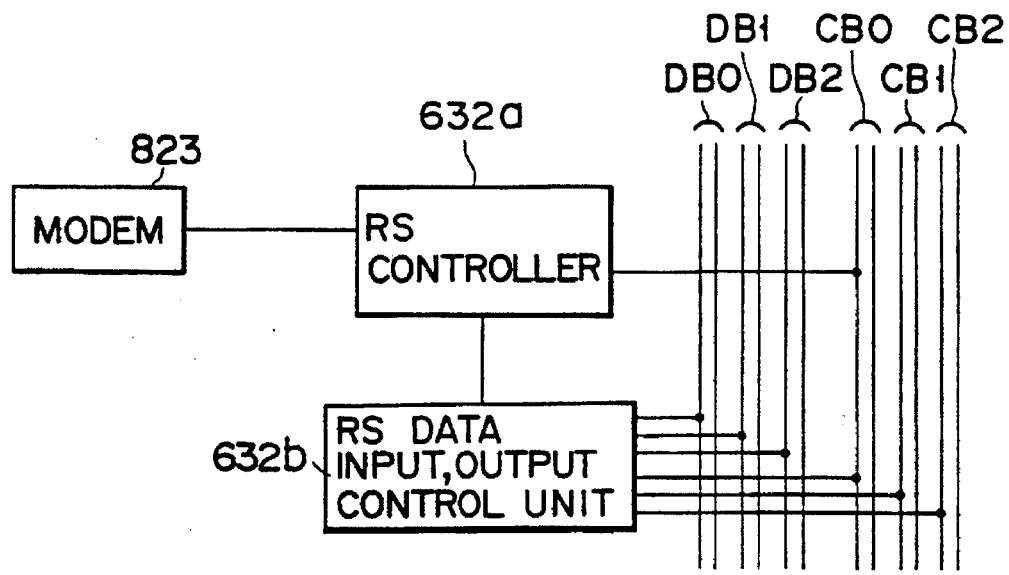
F I G. 78
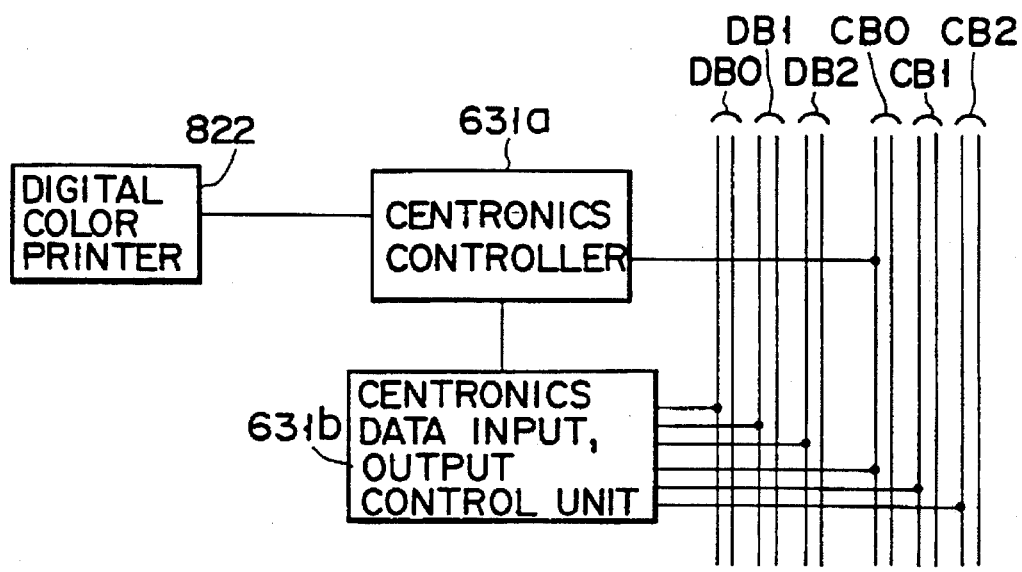
F I G. 79
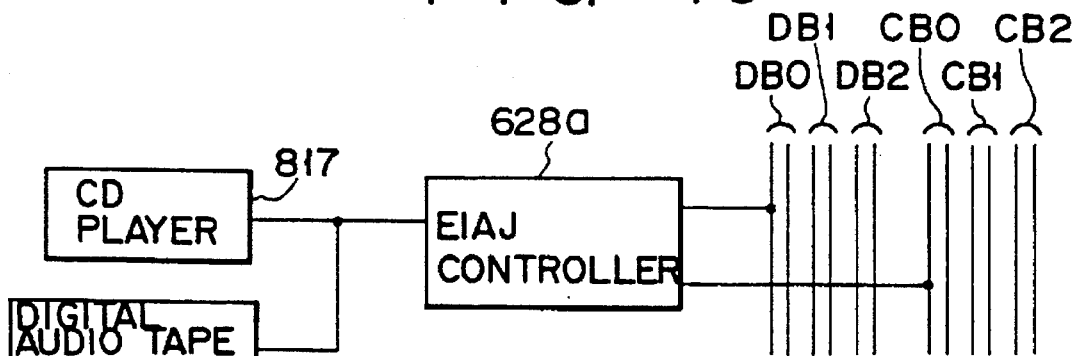
F I G. 80

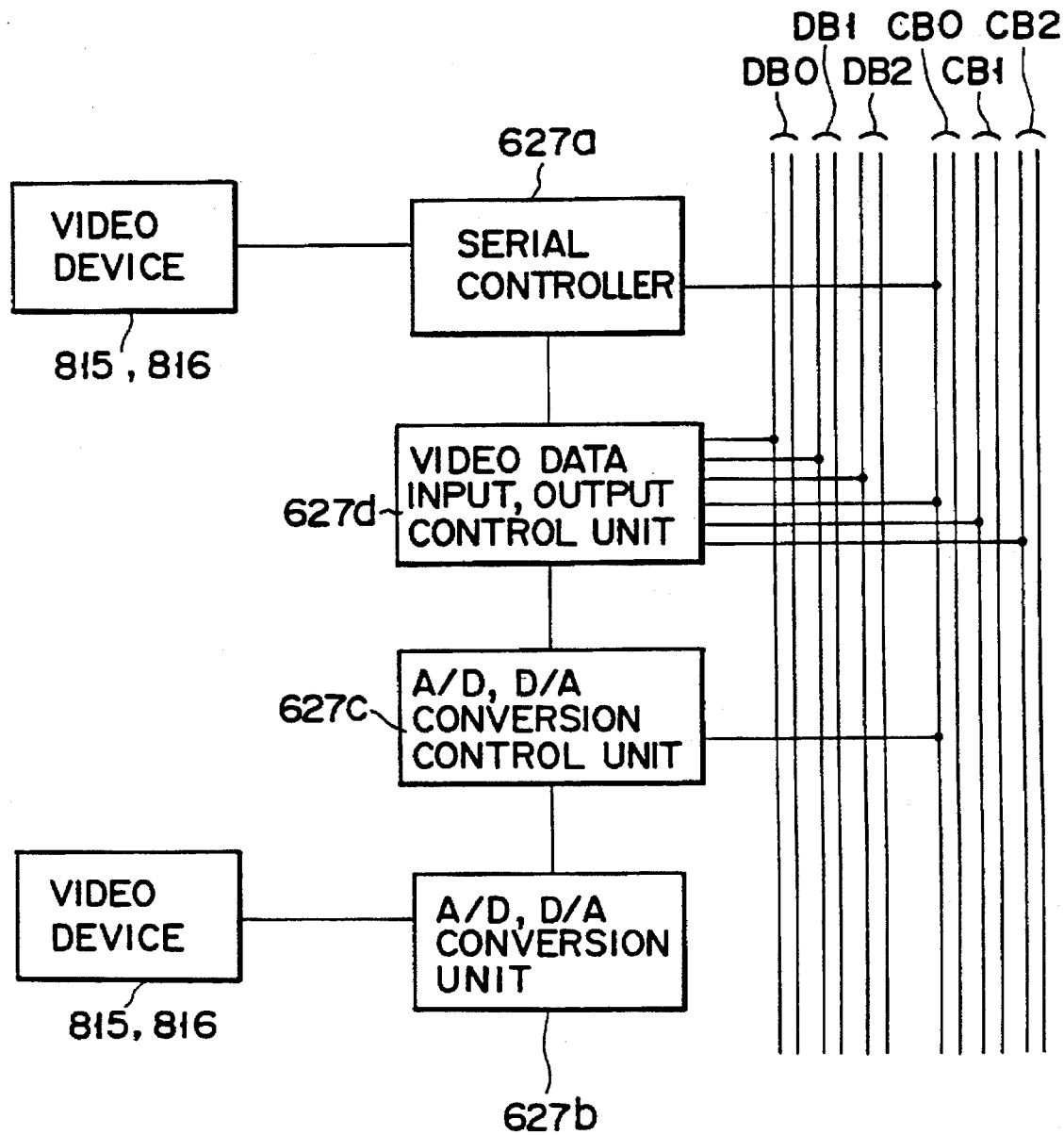
F I G. 81

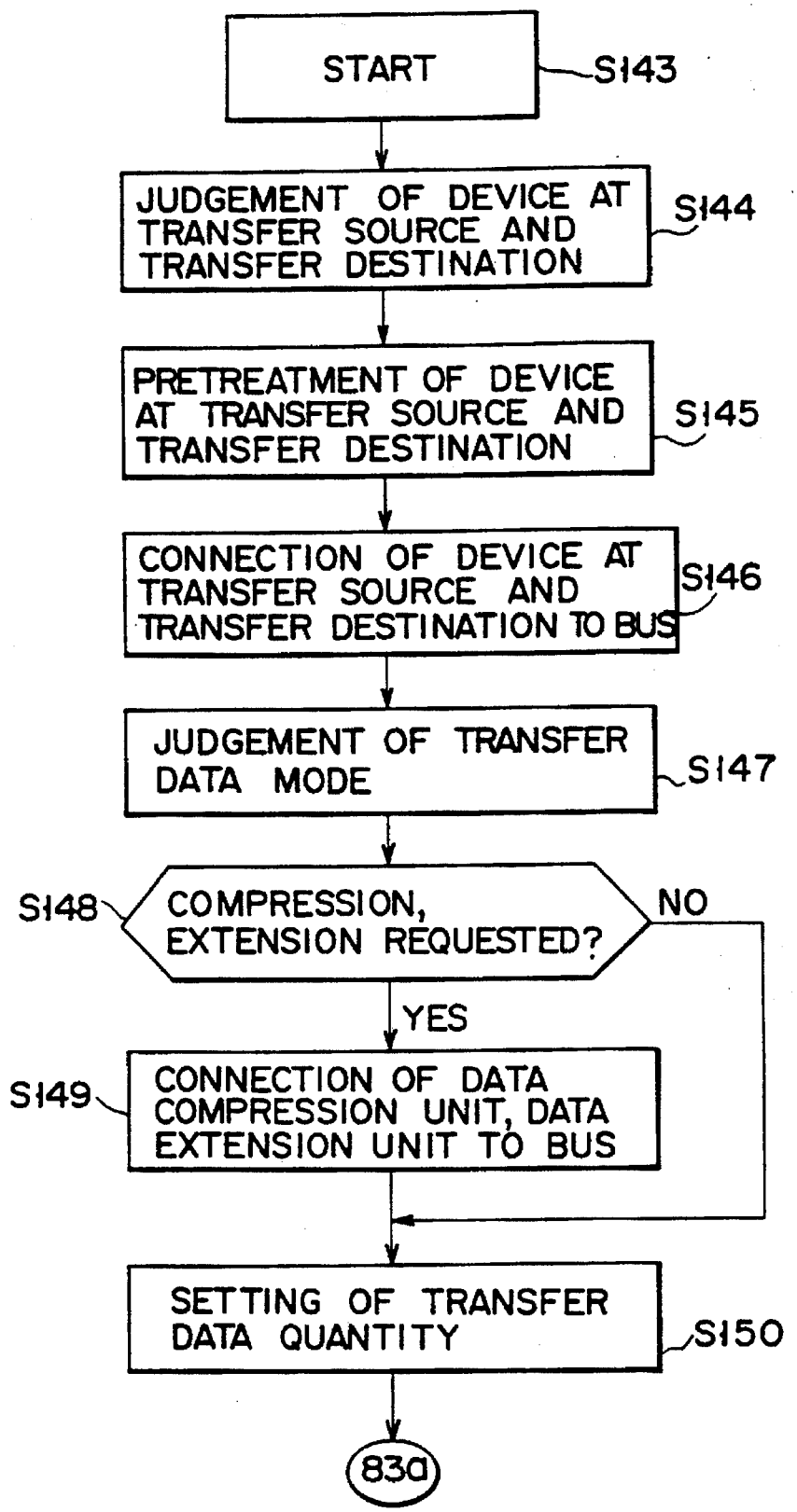
F I G. 83A

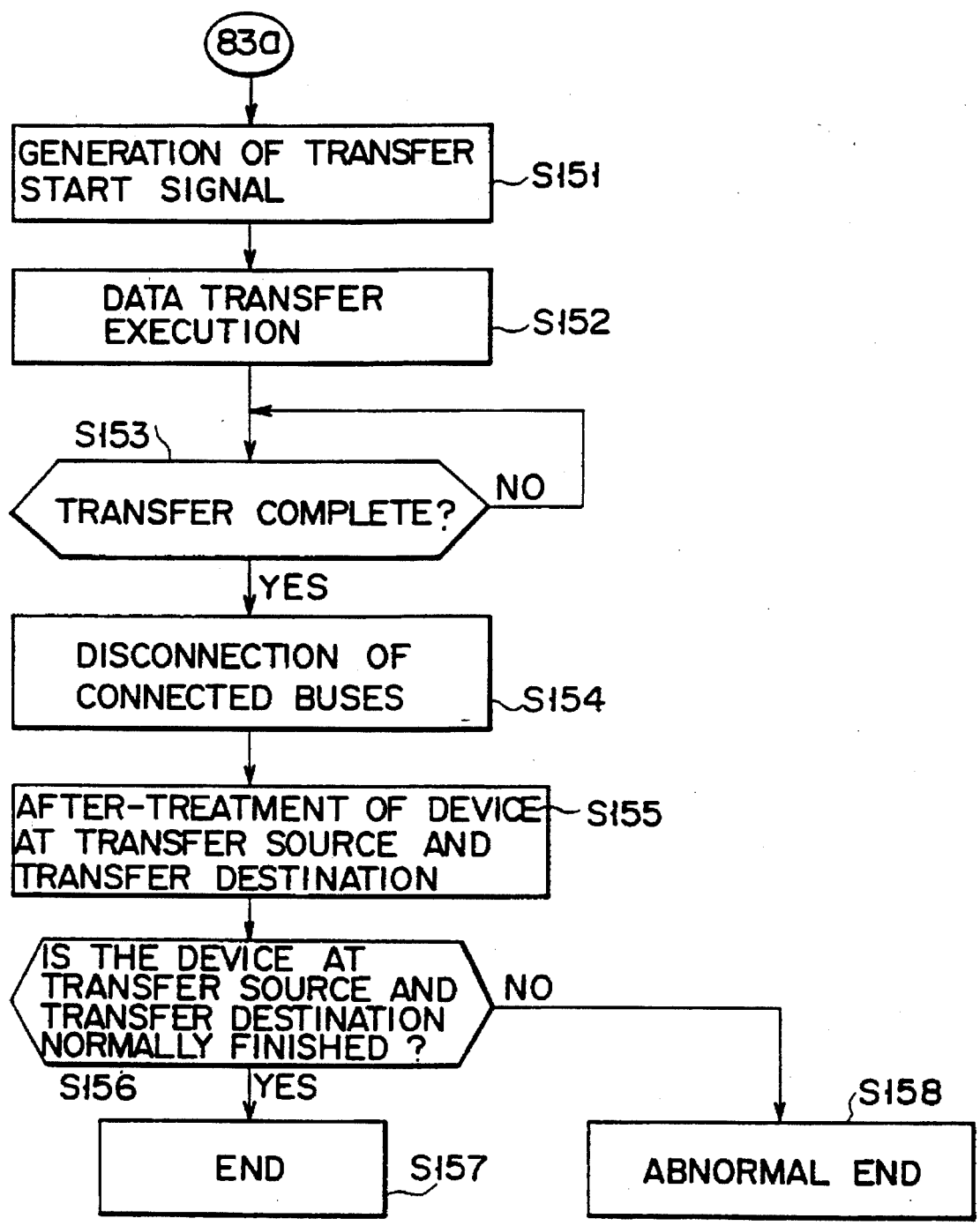
F I G. 83B

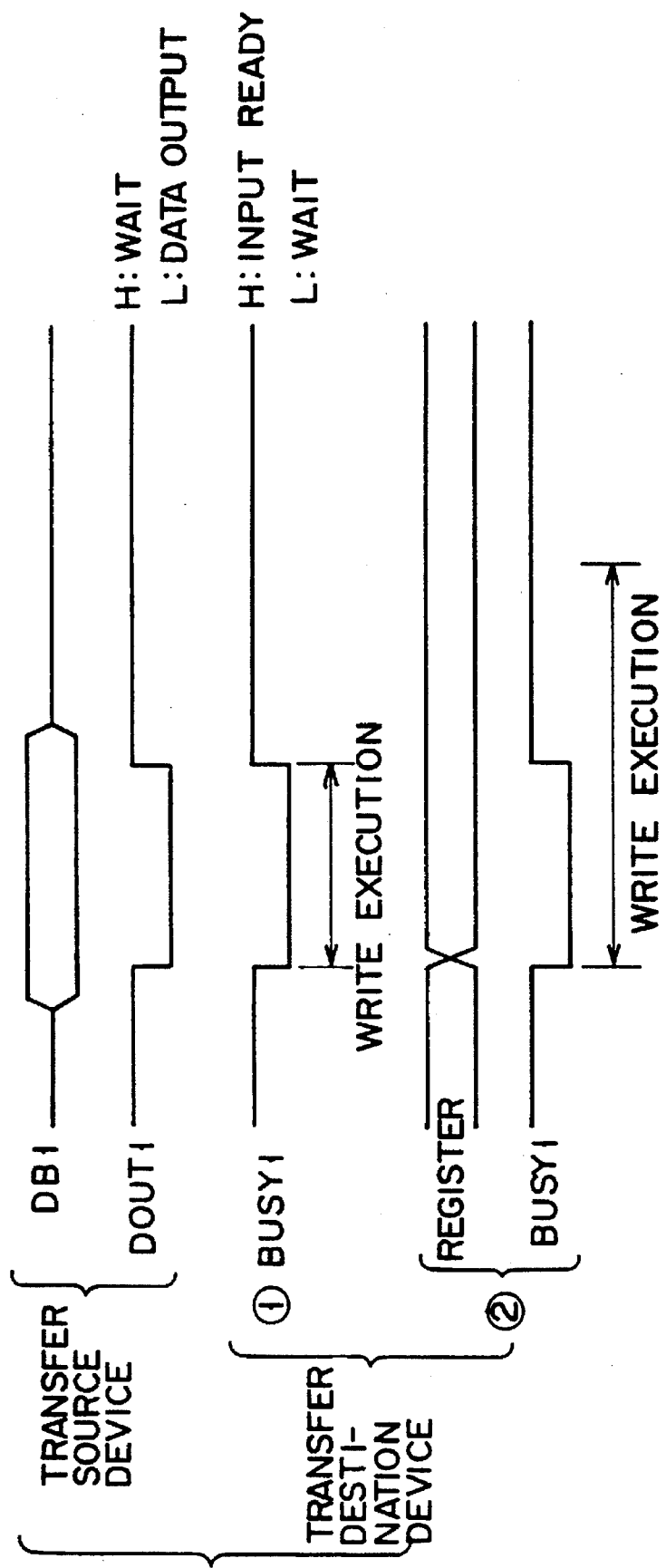
F I G. 84

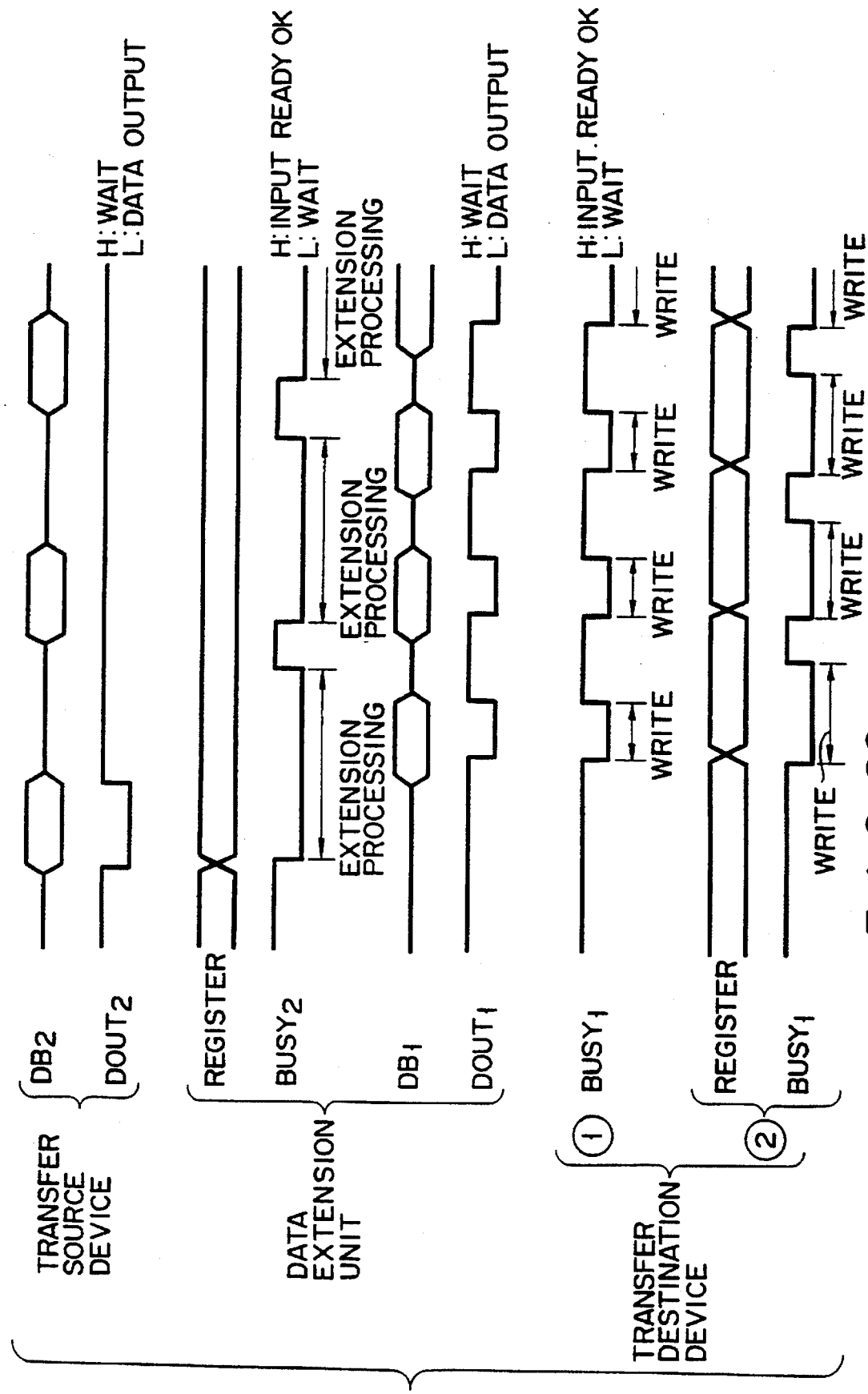
F I G. 86

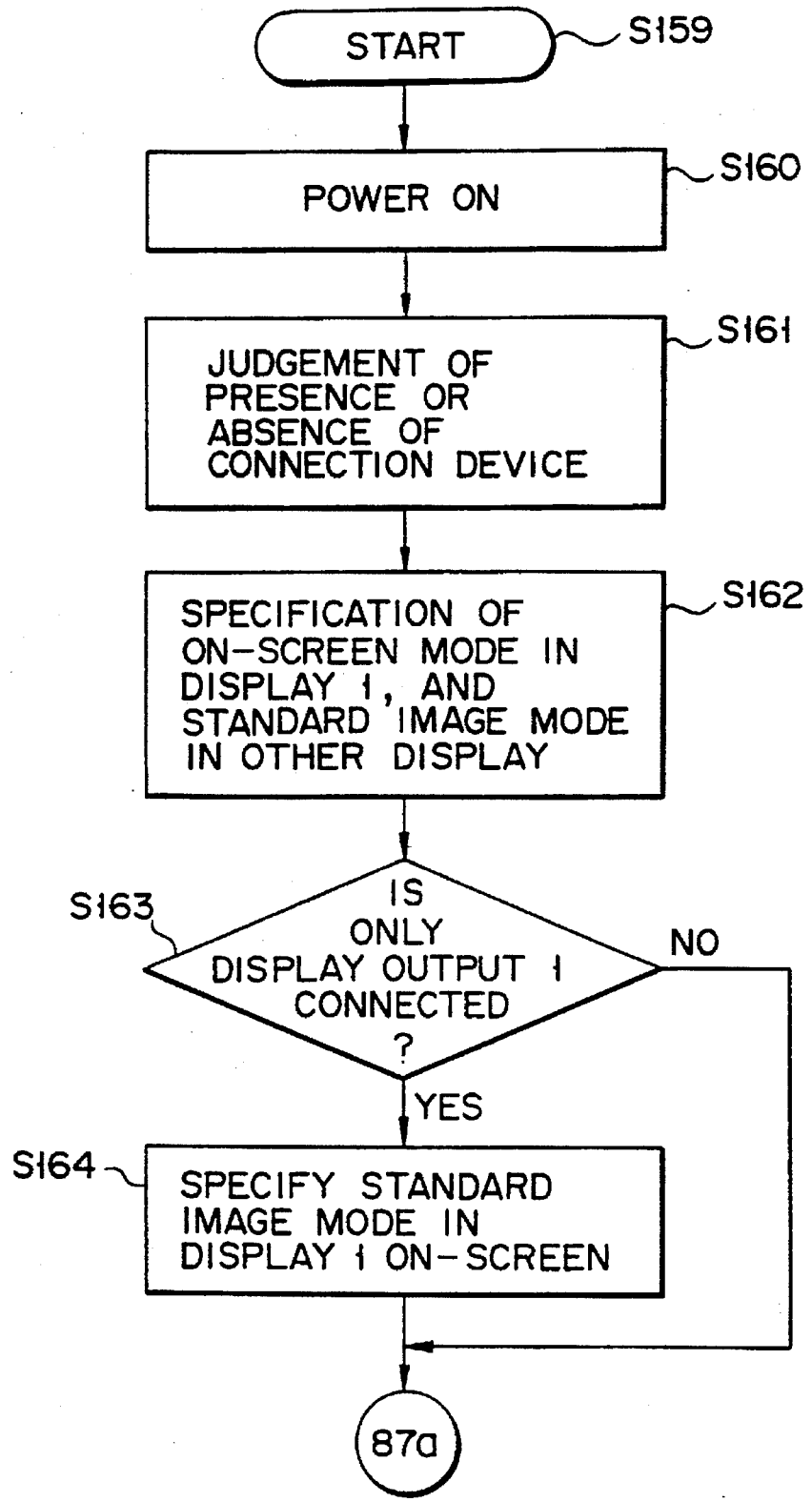
F I G. 87A

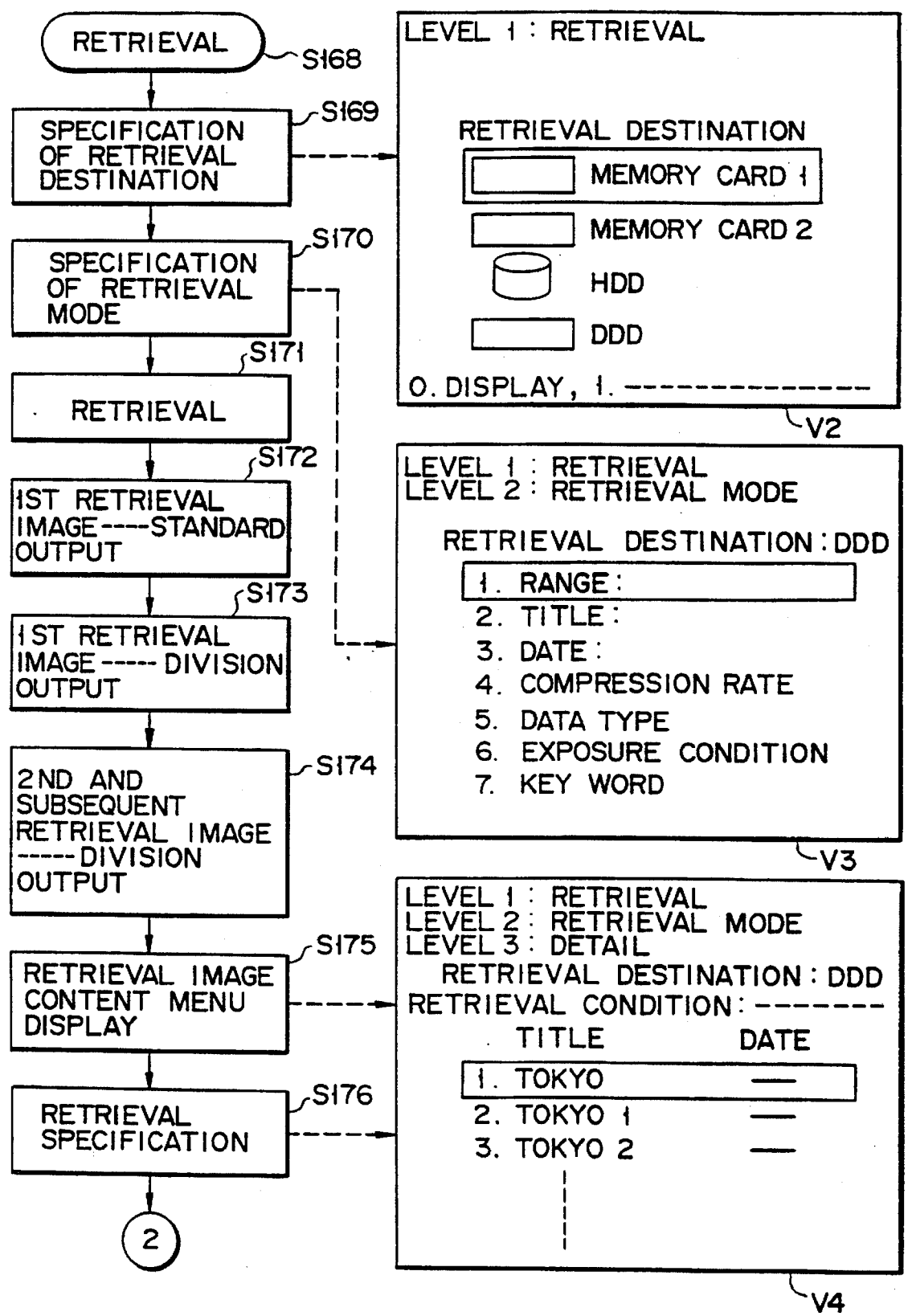
F I G. 90

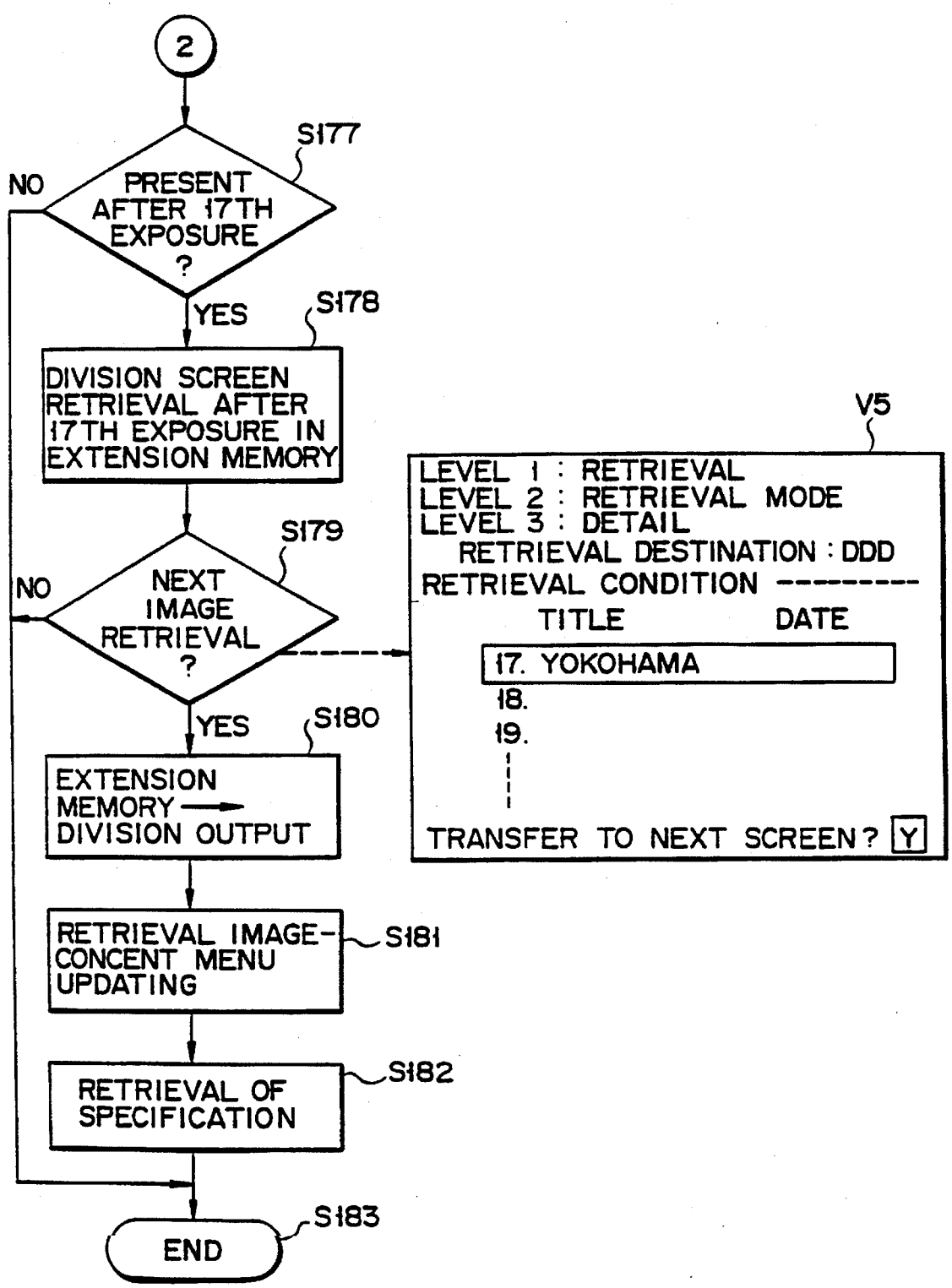
F I G. 92

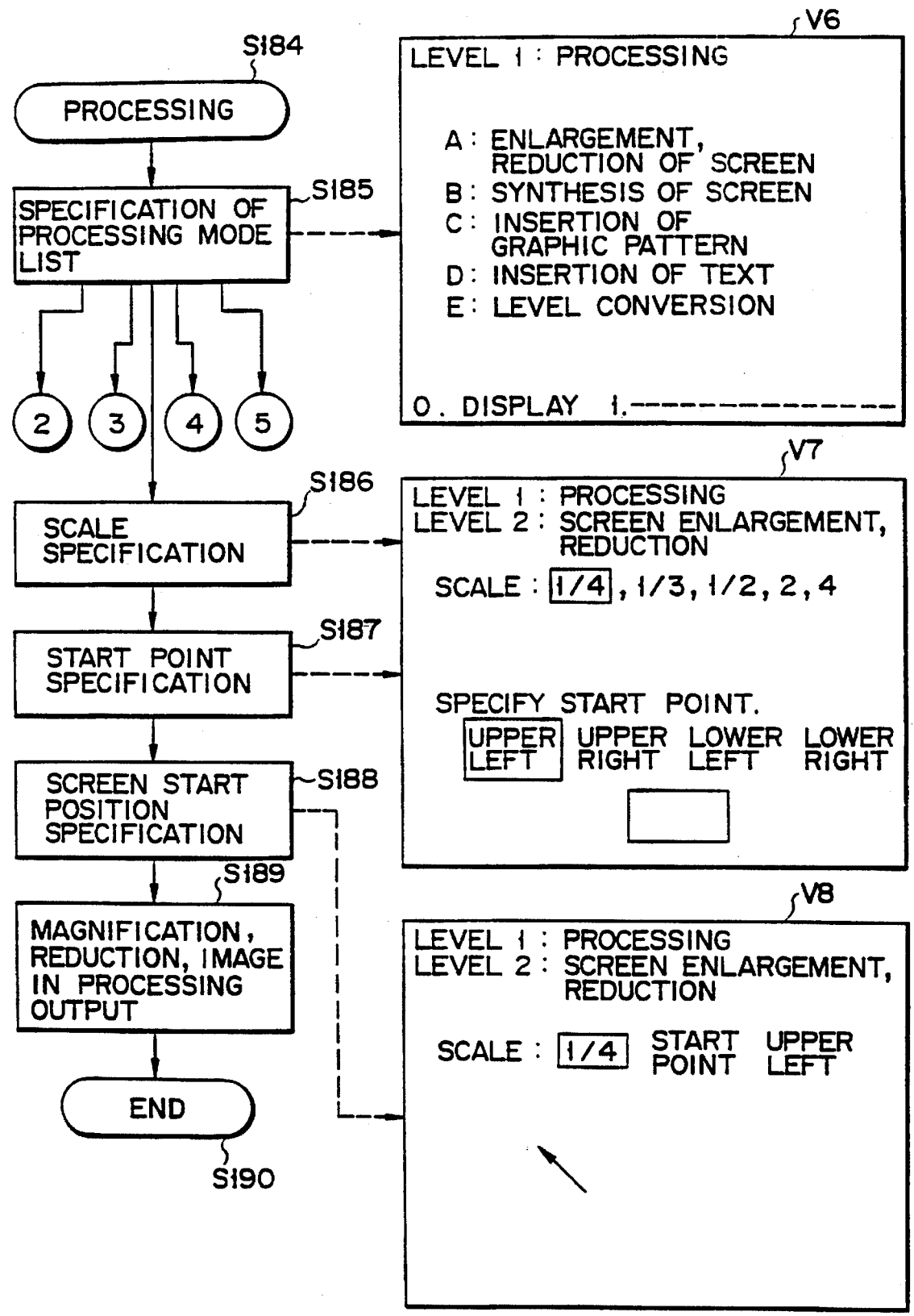
F I G. 94

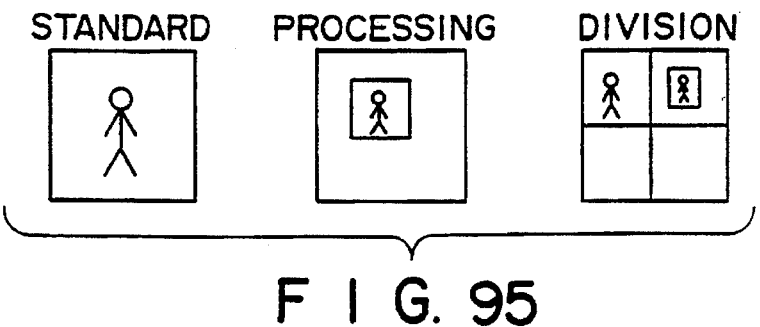
F I G. 95
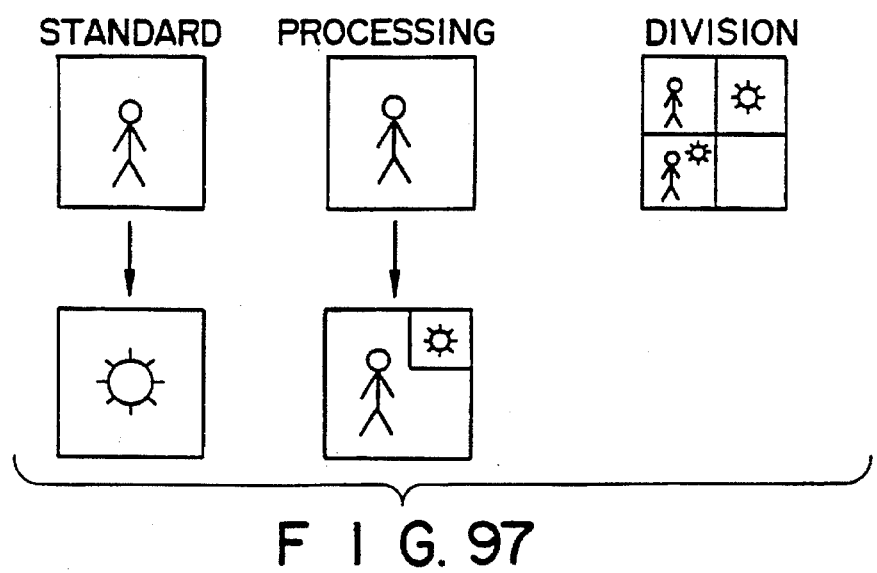
F I G. 97
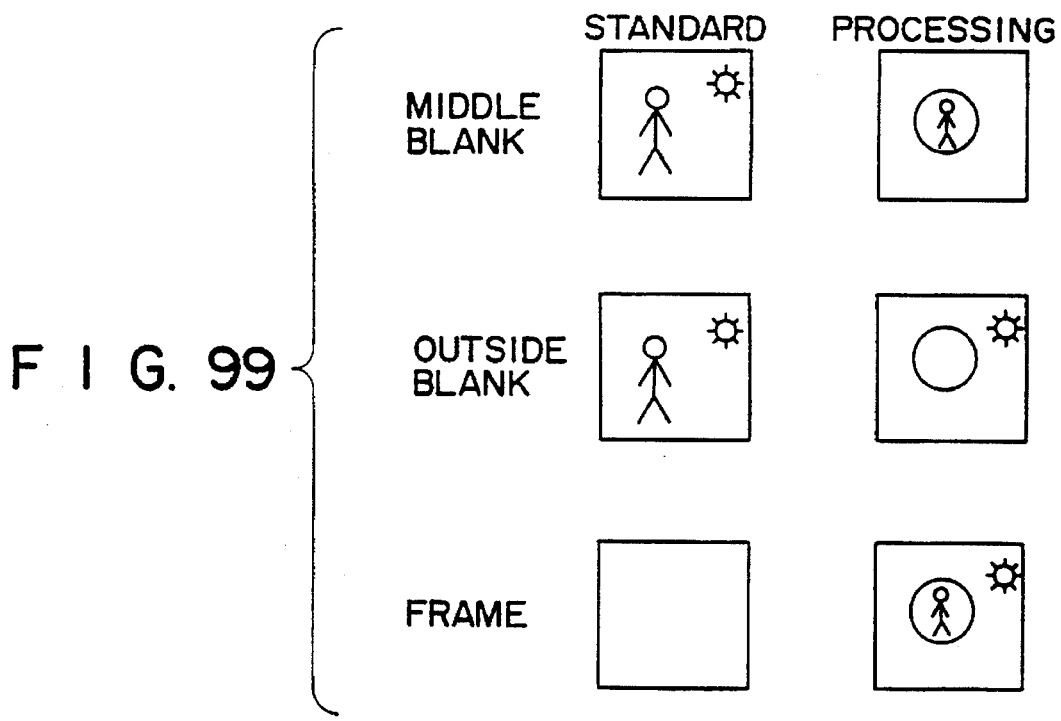
F I G. 99

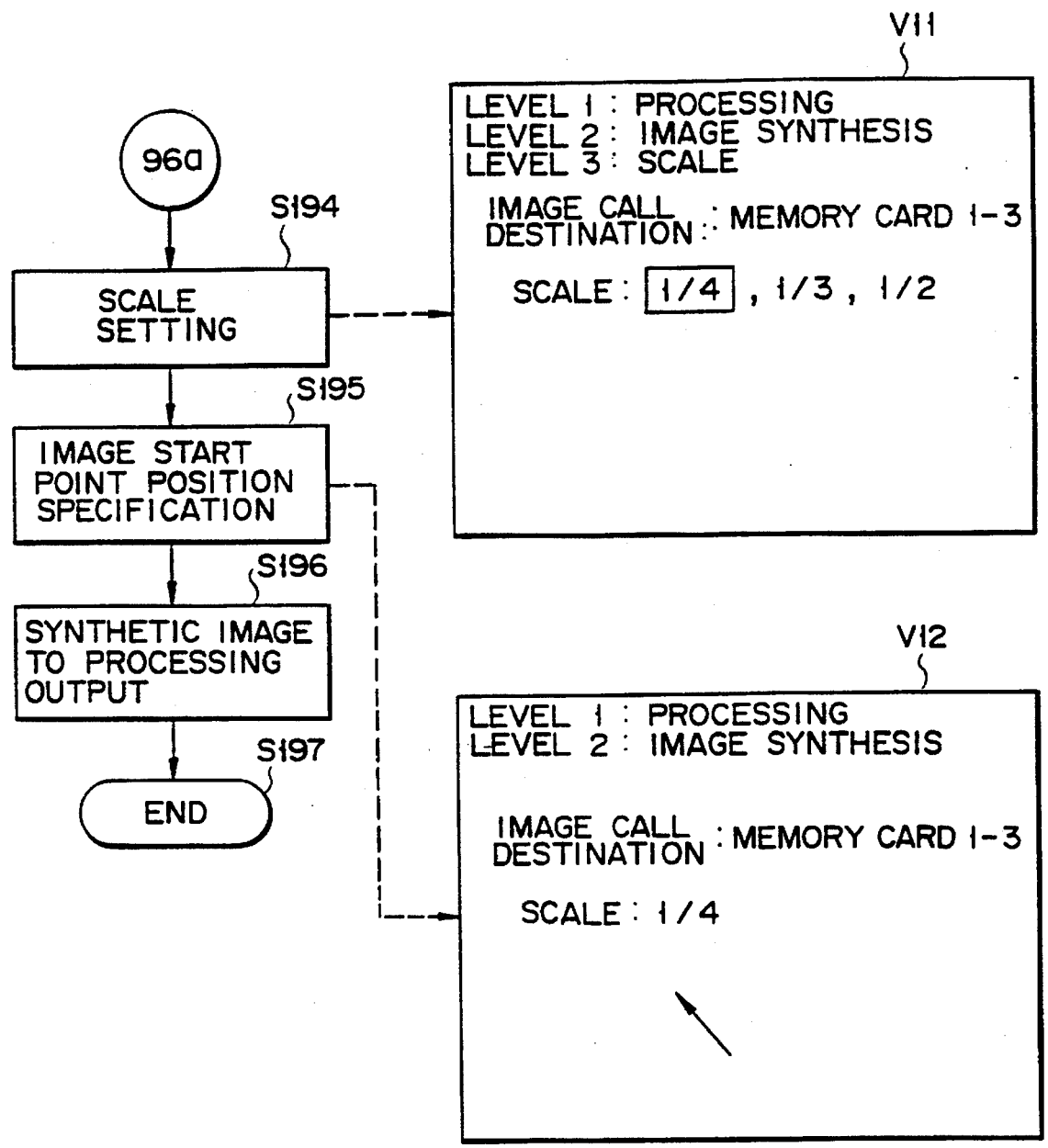
F I G. 96B

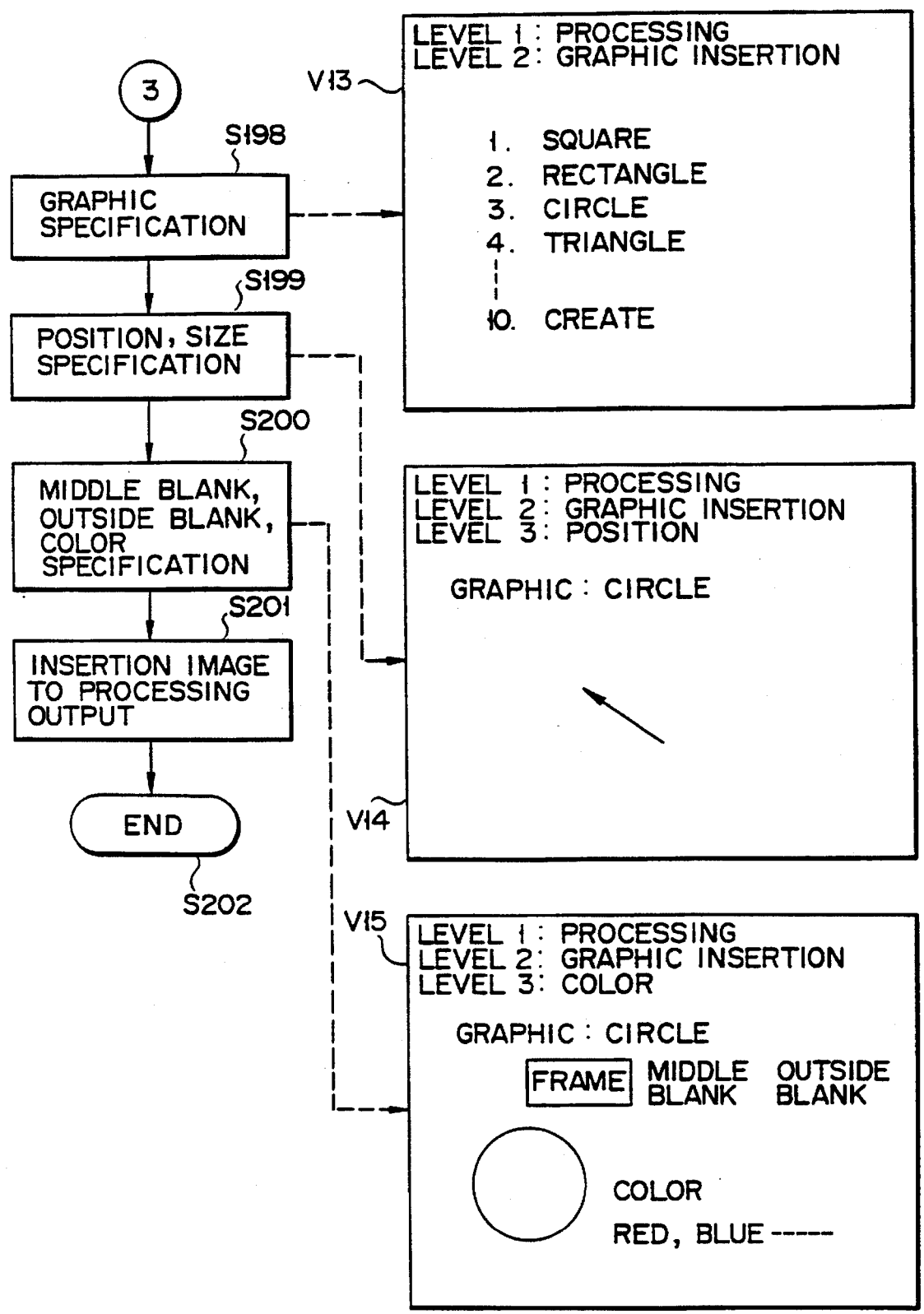
F I G. 98

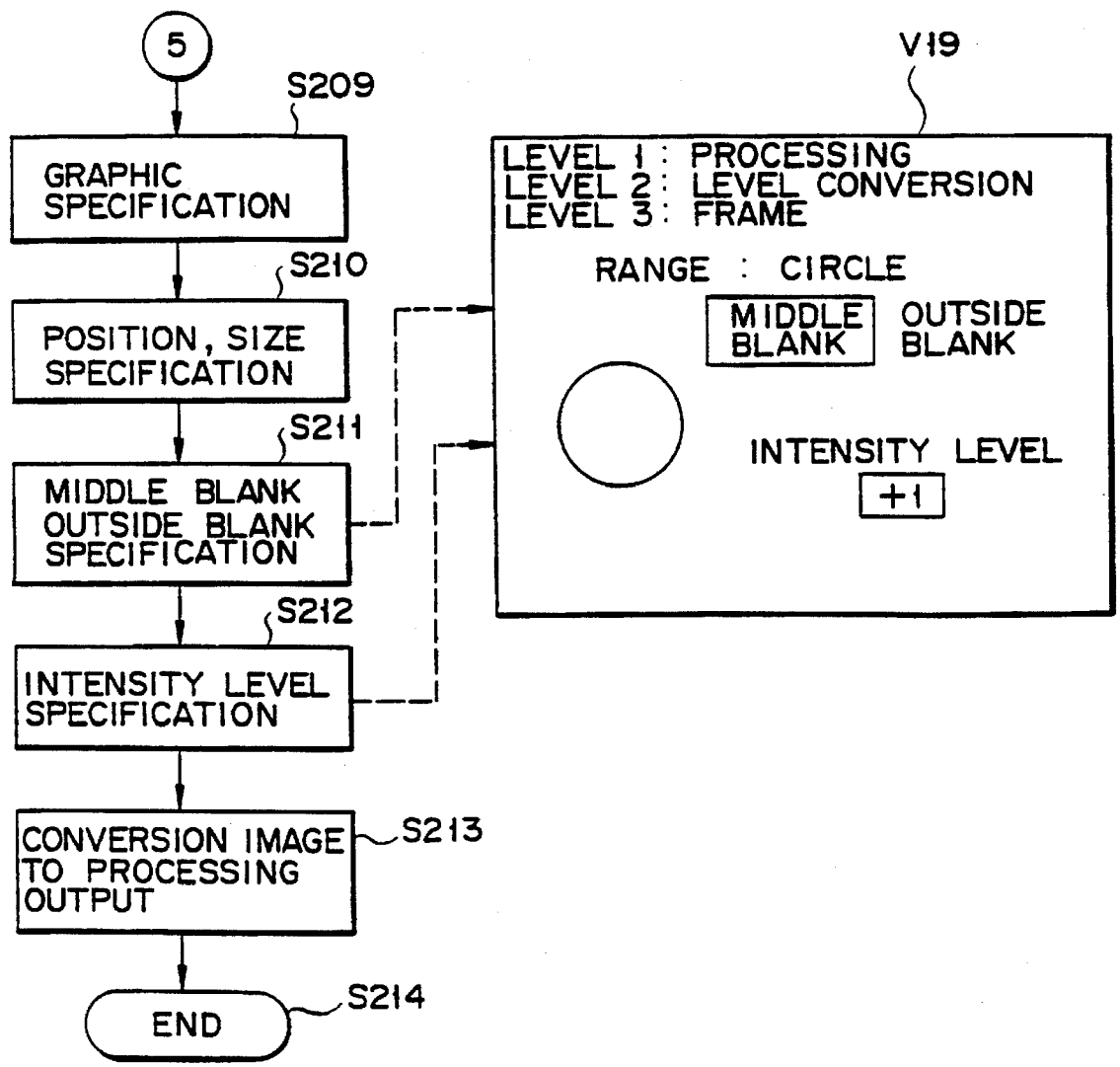
F I G. 102

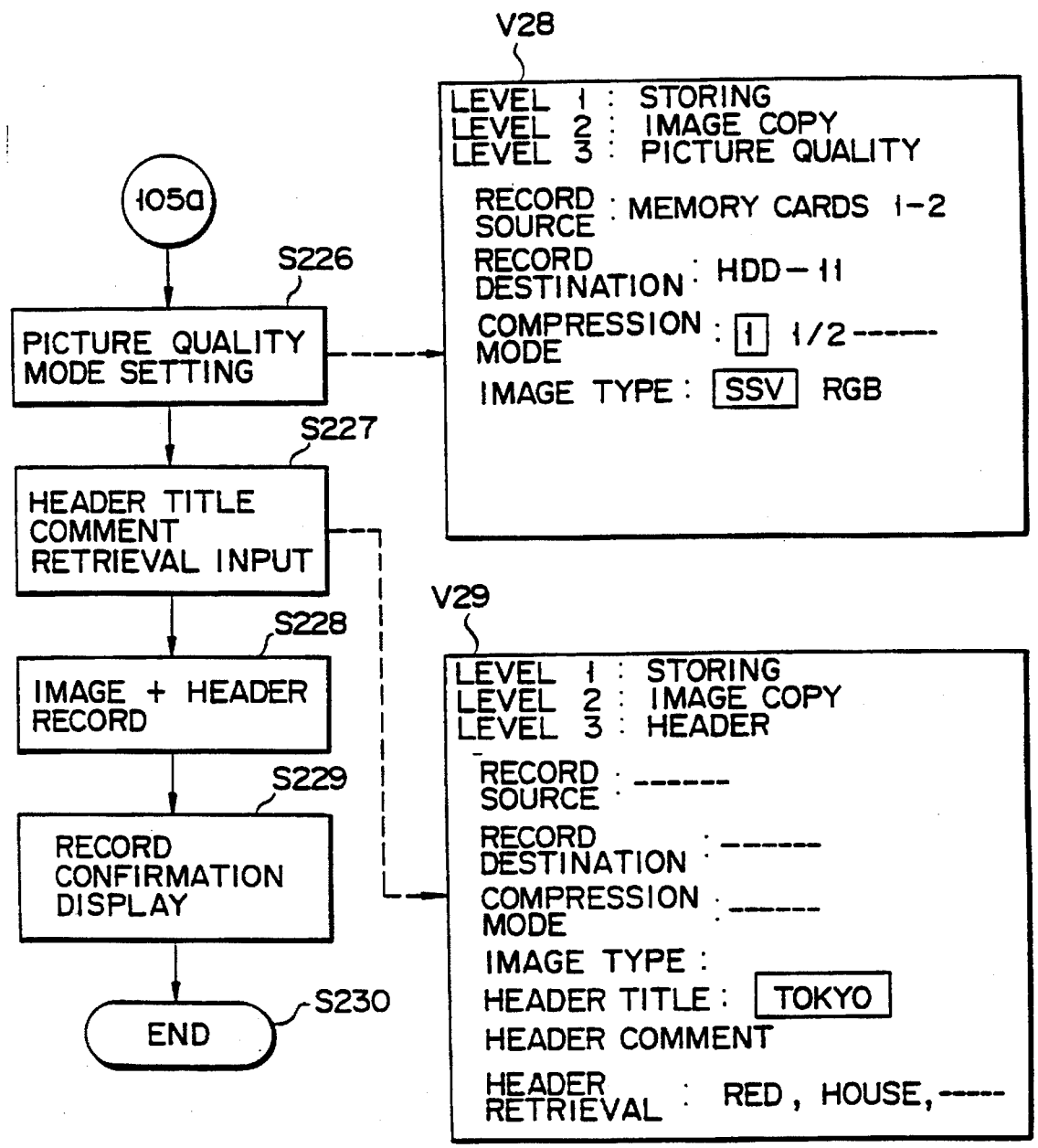
F I G. 105B

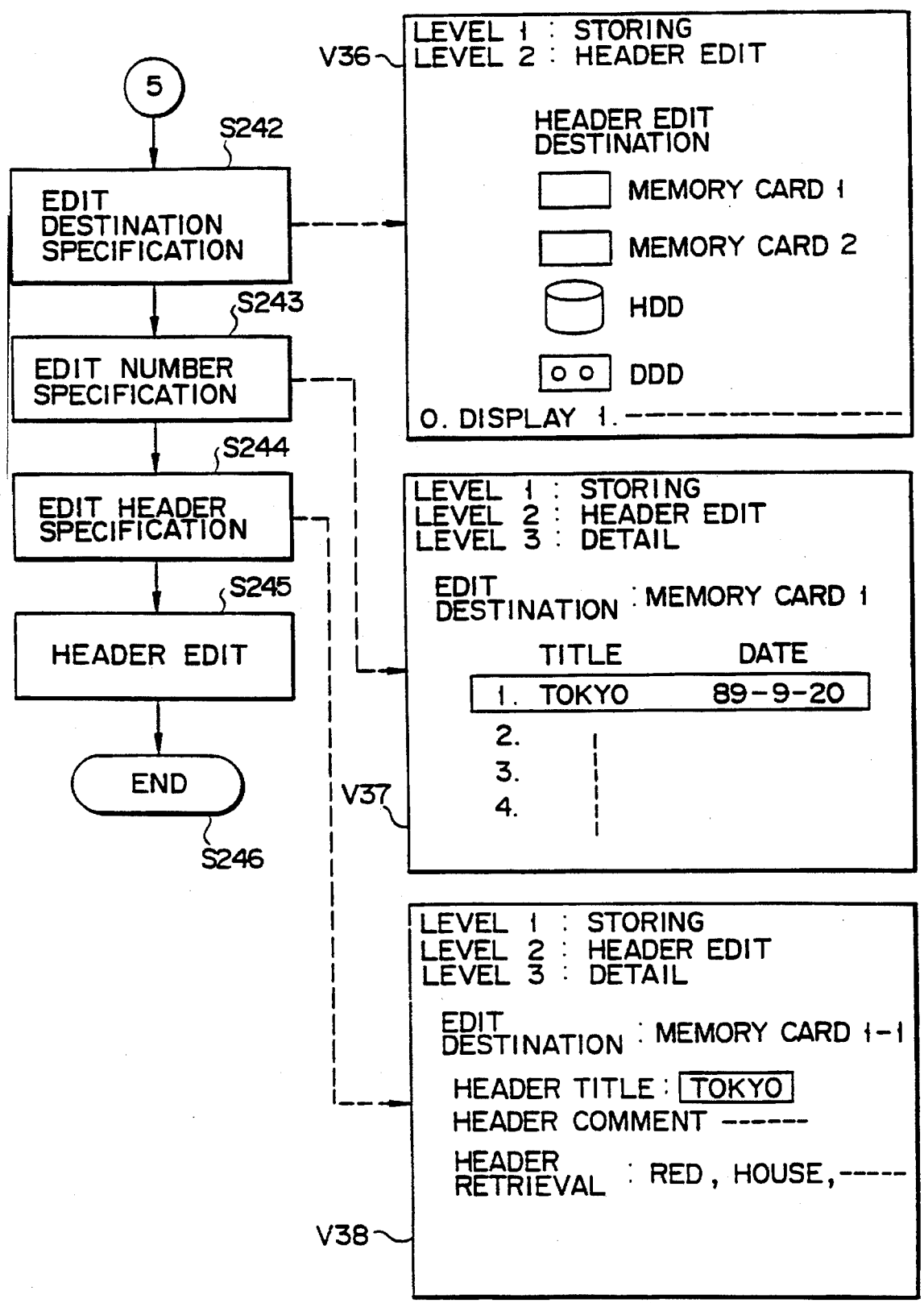
F I G. 108

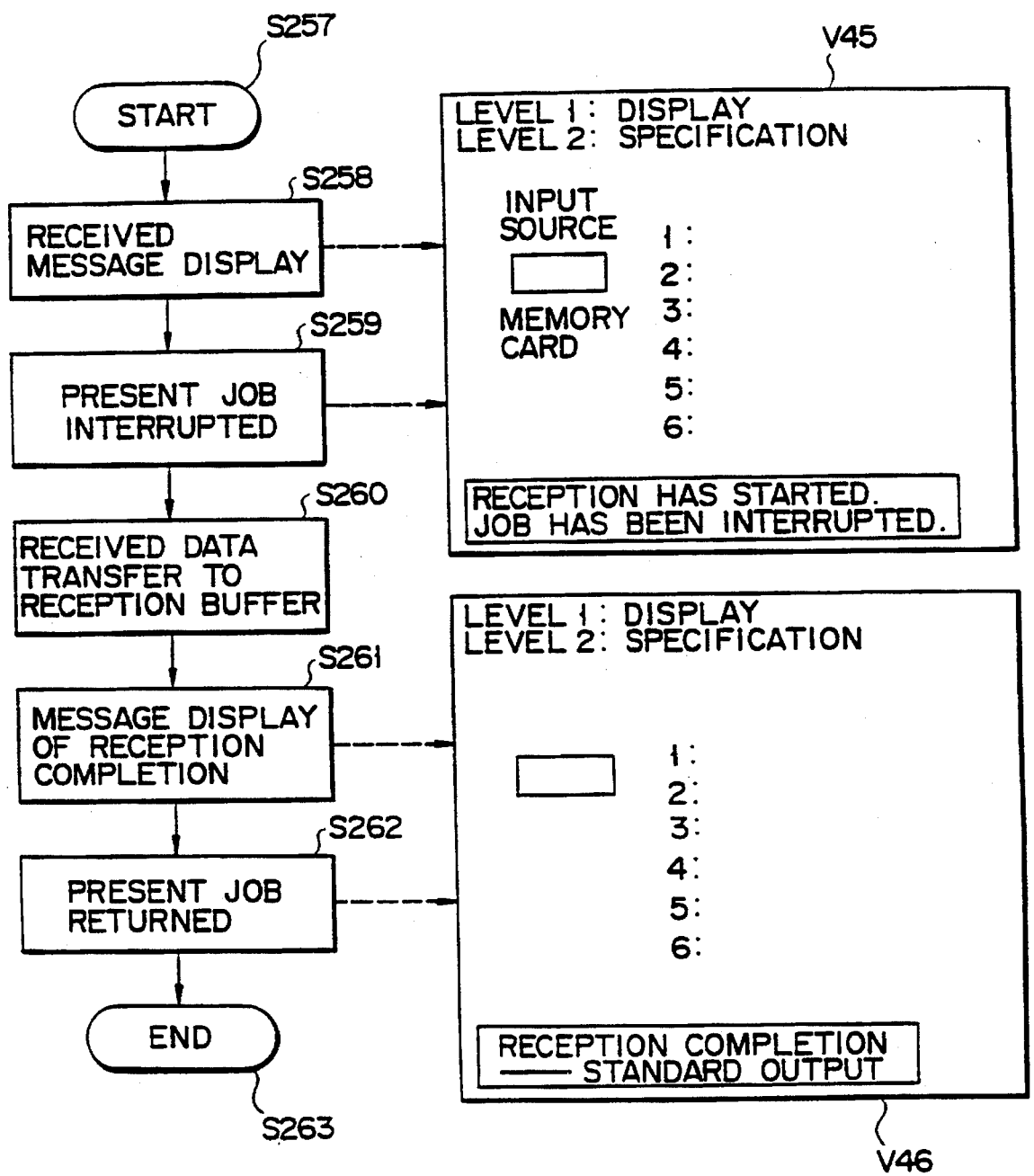
F I G. 111

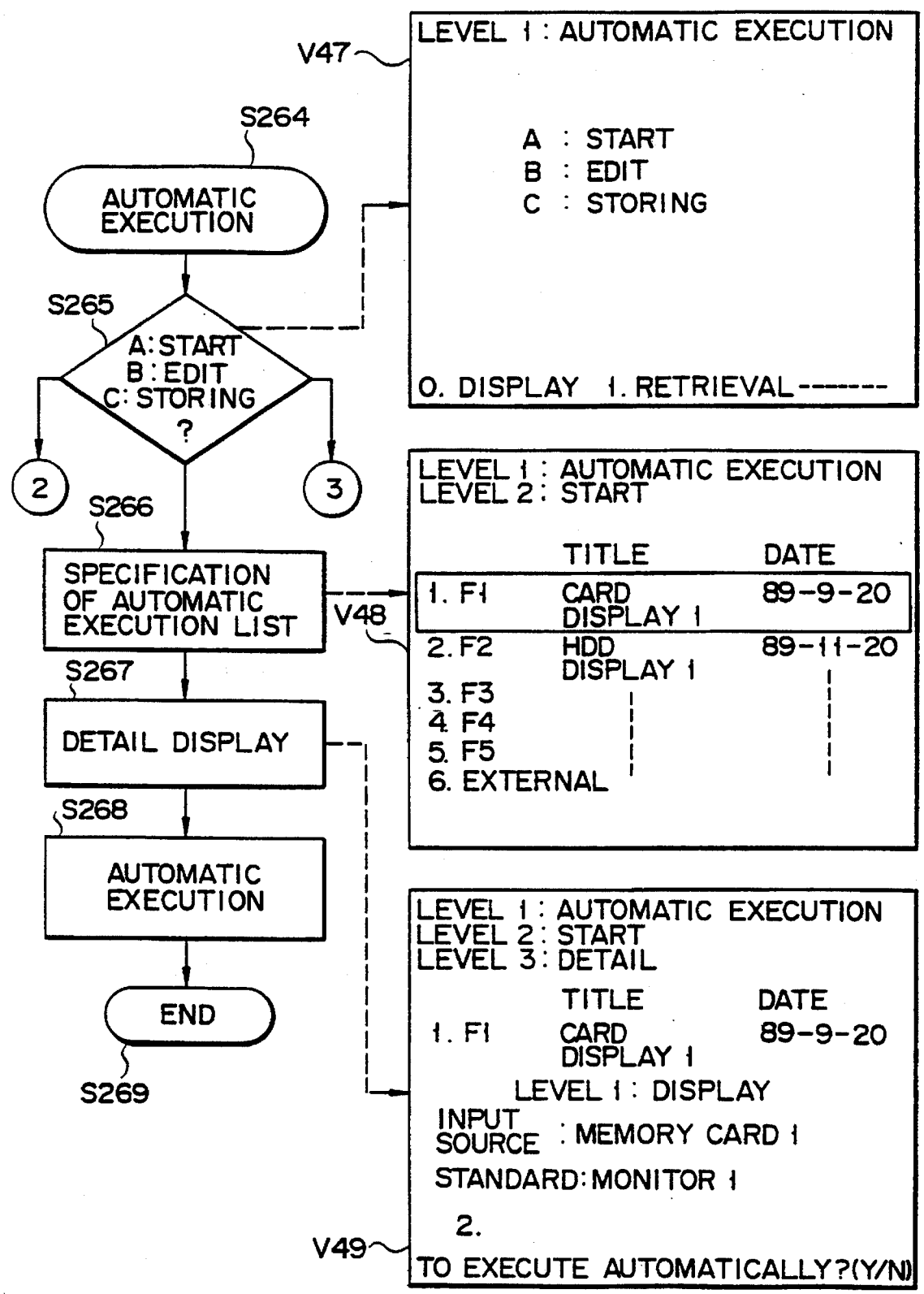
F I G. 113

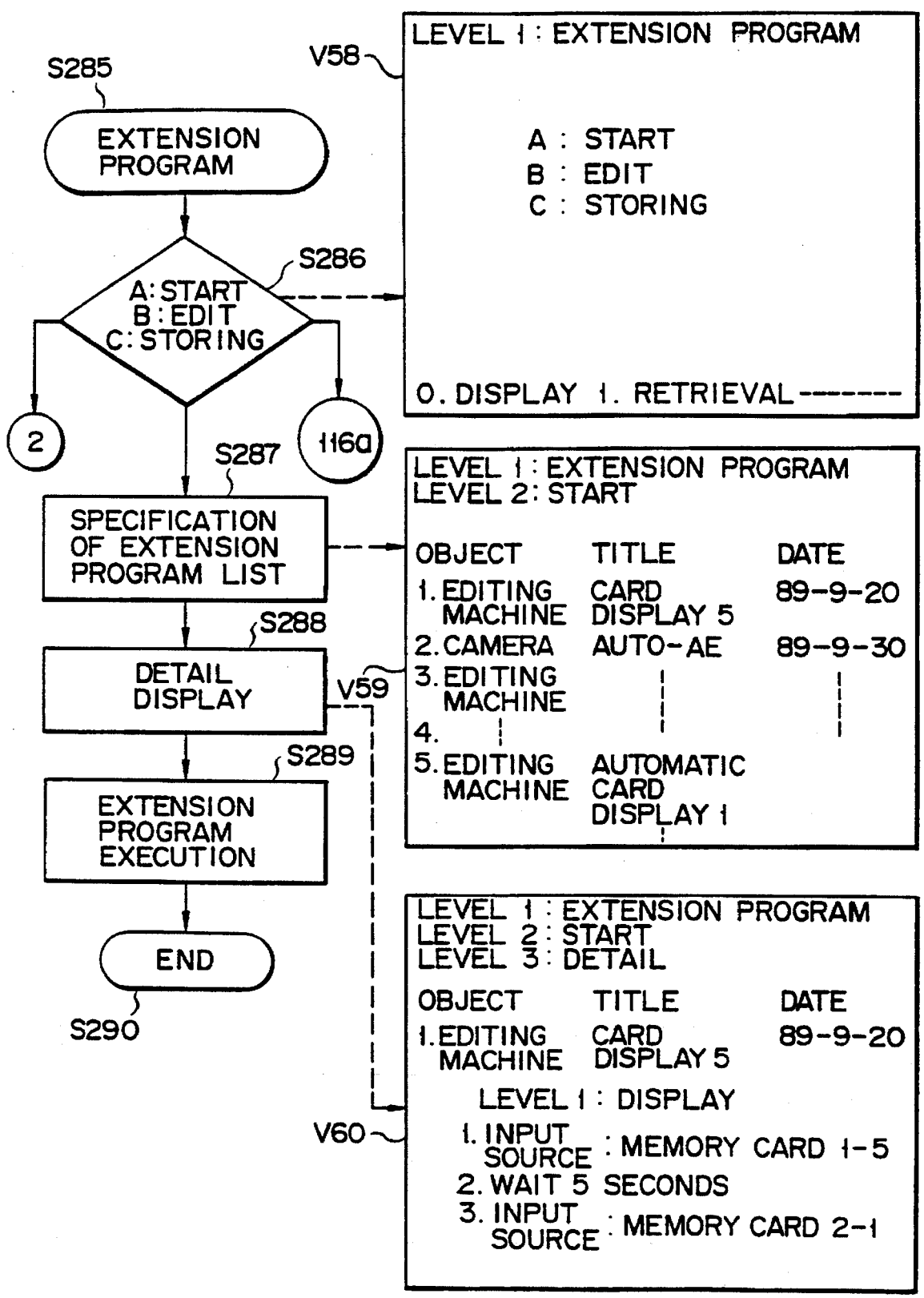
F I G. 116A

IMAGE DATA PROCESSING APPARATUS THAT AUTOMATICALLY SETS A DATA COMPRESSION RATE

This is a division of application Ser. No. 08/020,191, filed on Feb. 19, 1993, (now abandoned), which is a Division, of application Ser. No. 07/949,561, filed on Sep. 23, 1992, (now abandoned), which is a Division of application Ser. No. 07/589,494, filed on Sep. 28, 1990, (now abandoned).

BACKGROUND OF THE INVENTION

1. Field of the Invention

The present invention relates to an image data processing apparatus for converting an optical image taken by a camera into digital image data, and recording and reproducing on a recording medium, and more particularly to an apparatus easy to expand and easy to achieve the multiple functions so as to sufficiently satisfy wide requirements of users.

2. Description of the Related Art

As known well, in an ordinary camera, the taken optical image is focused on a silver salt film, and therefore the taken image cannot be observed unless the film is developed by chemical processing.

Recently, by contrast, an electrophotographic system was developed and widely spread on the market, which does not require bothersome chemical processing because the taken optical image is converted into an electrical image data, and the image according to this image data is displayed by a television receiver.

As an example of such electrophotographic system, a still picture recording and reproducing system is known. In this still picture recording and reproducing system, tape, disc and drum composed of magnetic material are installed in a camera main body as recording medium in a form of cassette or cartridge, and image data is recorded. Afterwards, the recording medium is taken out of the camera body, and installed in a reproducing unit, and the still picture is displayed in a television receiver connected to the reproducing unit.

In the still picture recording and reproducing system of this sort, for example, by using a memory card incorporating a semiconductor memory as the recording medium, it is attempted to record at higher density and reduce the weight and size, but actually it is in the process of development at the present, and there are many points to be improved.

That is, the image data processing apparatus for converting an optical image taken by a camera into digital image data, and recording and reproducing on a recording medium is not a technically completed system yet, and therefore it is keenly demanded to promote the multiple-purpose advantages more effectively, by making the system easy to expand and easy to achieve multiple functions so as to sufficiently satisfy the versatile requests of users.

SUMMARY OF THE INVENTION

The invention is devised in the light of the above background, and its primary object is hence to present an image data processing apparatus of an extreme excellence so as to sufficiently cope with wide requests of users, making it easy to expand the system and easy to achieve multiple functions, thereby effectively promoting the multi-purpose principle.

According to one aspect of the present invention, there is provided an image data processing apparatus comprising a pickup unit for converting a taken optical image into electric data by using solid pickup element, and a signal processing unit for processing the data delivered from this pickup unit to record into a memory, both being composed independently, wherein the pickup unit is detachable from the signal processing unit, and plural types of pickup units are prepared, differing in the number of solid pickup elements contained therein, so that a desired pickup unit is selectively attached to the signal processing unit to take photographs. In such constitution, the user has only to exchange the pickup unit as required, which is advantageous, economically.

According to other aspect of the present invention, there is provided an image data processing apparatus comprising a pickup unit for converting a taken optical image electric data by using a solid pickup element, and a signal processing unit for processing the data delivered from this pickup unit and recording into a memory, both being composed independently, wherein the pickup unit is detachable from the signal processing unit, and a finder is disposed in the pickup unit. In such constitution, the construction of the optical path in the pickup unit is simplified, and down sizing is promoted.

According to the image data processing apparatus of the invention for converting a taken optical image into digital image data and compressing the data to record in a memory, there is provided means for calculating the activity of the entire screen portion of the digital image data and automatically setting the data compression rate. In such constitution, the compression rate is automatically determined in a range not to cause an extremely deteriorated picture, and the recording capacity of the memory can be effectively utilized.

In a different aspect of the invention, there is provided an image data processing apparatus for converting a taken optical image into digital image data through a solid pickup element and compressing the data to record in a memory comprising first means for adding the fixed noise components contained in the digital image data for the portion of k exposures, second means for summing up the digital image data obtained from k exposures, and third means for subtracting the output data of the first means from the output data of the second means so as to obtain the multiple exposure images for k exposures eliminating the fixed noise. In such constitution, the sensitivity may be raised when taking a dark image, without elongating the exposure time, so that it is not necessary to alter the driving method of the solid pickup element.

Furthermore, according to the image data processing apparatus of the invention for converting a taken optical image into digital image data to record in a memory, comprising a continuous filming function, wherein in the photographic state by continuous filming function, the digital image data corresponding to the optical image of the first exposure is stored in the memory, and the differential portion between the digital image data corresponding to the optical image taken after the second exposure and the digital image data of the first exposure stored in the memory is recorded in the memory by first mean, and every time a specified number of exposures is taken in the photographic state by the first means, the digital image recorded in the memory is updated by second means. In this construction, the recording capacity of the memory may be saved in continuous filming mode, and deterioration of picture quality may be prevented.

According to a further different aspect of the image data processing apparatus of the invention, the taken optical image is converted into digital image data, and is recorded in the recording medium in predetermined units, and the collected sound is converted into digital sound data and is recorded in the recording medium in the predetermined units, which moreover comprises means for converting the transmission speed of the digital sound data to a rate higher than the standard speed, and recording on the time axis in the predetermined units intermittently in the recording medium. In such constitution, when photographed while recording sound, the image data can be recorded among the sound data, and the sound and image can be synchronized when reproducing.

According to the image data processing apparatus of the invention, still more, for converting a taken optical image into digital image data and recording in a memory, an option area for writing by external operation is provided in the recording area of digital image data the memory, and code data for automatically controlling the photographic operation is recorded in this option area. In such constitution, the user can freely set the desired photographic action individually.

A different aspect to the invention relates to an image data processing apparatus comprising a main body for converting a taken optical image into digital image data, and a memory for recording the digital image data obtained from the main body, wherein a built-in strobe is disposed in the main body and a connection part for extending an external strobe is provided, and control means for controlling both of built-in strobe and external strobe depending on the photographic condition is installed. In such constitution, the user may freely combine the built-in strobe and external strobe depending on the photographic condition.

According to another aspect of the image data processing apparatus of the invention for converting a taken optical image into digital image data and recording in a recording medium, the data generated corresponding to on/off state of the key switch is recorded, together with digital image data upon every exposure, in an recording area of digital image data of the recording medium. In such constitution, it is very convenient for the user to provide the taken image with an original meaning freely.

According to a further different aspect of the invention, there is provided an image data processing apparatus comprising a main body for converting a taken optical image into digital image data, and a card-shaped memory for recording the digital image data obtained from the main body, being inserted in the main body, wherein the card-shaped memory inserting part of the main body possesses a card-shaped connector which can be inserted instead of the card-shaped memory, and a recording device capable of transferring data to the main body through this card-shaped connector. According to this constitution, it is not necessary to install another connector for connecting with the recording device than the card-shaped memory insertion part and the structure may be simplified.

According to a still different aspect of the invention, there is provided an image data processing apparatus comprising a camera for converting a taken optical image into digital image data, means for writing the digital image data delivered from this camera into first and second memories, means for reading out the other in the writing state of one of the first and second memories by this writing means, and a recording device for recording the digital image data being read out by this reading means. In this structure, as far as the data quantity is not excessive, it is not necessary to define the camera side data output if the recording speed of the recording device is slow when transferring to the recording device, and the data transfer of high efficiency is realized.

Another image data processing means of the invention for converting a taken optical image into digital image data and recording in a card-shaped memory comprises a mounting part for mounting a card-shaped memory, plural connecting parts for connecting plural external devices, and an editing machine having data processing means for compressing and expanding the digital image data supplied from the card-shaped memory and external devices connected to the mounting part and plural connecting parts. In such constitution, the digital image data supplied from the card-shaped memory and external devices are directly compressed and expanded, and supplied into the card-shaped memory and external devices, so that the image data processing may be done efficiently.

The invention also relates to an image digital processing apparatus for reproducing the digital image data obtained by taking with a digital still camera and displaying on a screen, which comprises a recording medium in which plural digital image data are recorded, retrieval means for retrieving desired digital image data on the basis of the header information attached to the digital image data recorded in the recording medium, display means for displaying the plural digital image data retrieved by the retrieval means by distributing into display regions of the divided screens, an extension memory for recording the digital image data being retrieved which cannot be fully displayed by the display means, and control means for displaying the digital image data recorded in this extension memory by distributing into display regions of the display means by external operation. In such constitution, the plural retrieved images can be observed easily, which is very convenient in retrieval of a huge quantity of images.

The image data processing apparatus of the invention is intended to reproduce the digital image data obtained by taking with a digital still camera and display on the screen, wherein a first sub-menu is displayed with respect to the mode operated and specified from the main menu, and a second sub-menu is displayed according to the mode operated and specified from the first sub-menu, and the image data is processed in this system, which further comprises recording means for recording the data having programmed the operation specification of the series of processing procedure with respect to a specific processing procedure, and execution means for automatically executing the specific processing operation on the basis of the data recorded in this recording means. In such constitution, it is very convenient because the user can perform specific processings to be executed frequently by a simple operation.

According to a different aspect of the image data processing apparatus of the invention, it is to reproduce the digital image data obtained by taking with a digital still camera and display on a screen, processing means for editing and processing digital image data, which further comprises recording means for recording the image data displayed in the editing and processing step, and display means for displaying the image data recorded in this recording means by dividing into display regions of the divided screens in the sequence of display in the editing and processing step. In such constitution, the step of editing and processing the image data may be known at a glance, and editing and processing may be revised or modified easily.

It is another aspect of the invention to present an image data processing apparatus for reproducing the digital image obtained by taking with a digital still camera and displaying on a screen, which comprises a recording medium in which plural digital image data are recorded, retrieval means for retrieving the desired image data on the basis of the header information attached to the digital image data recorded in the recording medium by setting a key word, first display means for displaying the plural digital image data retrieved by the retrieval means by dividing into display regions in divided screens, and second means for displaying a list of key words determined by the retrieval means. In such constitution, the list of plural key words and plural retrieval images can be monitored at the same time, and a desired image will be obtained promptly.

BRIEF DESCRIPTION OF THE DRAWINGS

FIG. 1 is a block diagram showing an entire system construction, as one of the embodiments of the image data processing apparatus of the invention;

FIG. 6 is a perspective view showing the state of detaching the reproduction unit from the same electronic still camera;

FIG. 15 is a top view of an electronic still camera;

FIG. 16 is a plan view showing the details of a liquid crystal display part;

FIG. 17 is a block diagram showing a signal system of a pickup unit;

FIG. 18 is a block diagram showing a signal processing circuit of a single disc pickup unit;

FIG. 19 is a block diagram showing a signal processing circuit of a twin disc pickup unit;

FIG. 20 is a block diagram showing a signal processing circuit of a triple disc pickup unit;

FIG. 27 is a block diagram showing details of a buffer memory part;

FIG. 28 is a block diagram showing details of a buffer memory;

FIG. 32 is a diagram for explaining the relation between activity and image;

FIG. 34 is a diagram for explaining a data recording method;

FIG. 35 is a diagram for explaining a data format of memory card;

FIG. 36 is a diagram for explaining the packet data area of the same data format;

FIG. 37 is a block diagram showing details of a voice processing circuit;

FIG. 39A, FIG. 39B, FIG. 40, FIG. 41A and FIG. 41B are flow charts for explaining the operation of photography by electronic still camera;

FIG. 42A and FIG. 42B are flow charts for explaining the operation in reproduction of electronic still camera;

FIG. 43 is a flow chart for explaining the operation of an AE function of an electronic still camera;

FIG. 44 is a flow chart for explaining the operation of an AWB function of an electronic still camera;

FIG. 45A and FIG. 45B are flow charts for explaining the operation of compression rate automatic setting function of an electronic still camera;

FIG. 53 is a block diagram showing a connecting method of a card type connector and filing device;

FIG. 54 is a block diagram showing other example of connecting method of a card type connector and filing device;

FIG. 57A to FIG. 57F are timing charts showing the operation of the same camera I/F part;

FIG. 60 is a side view showing another example of filing device;

FIG. 61 is a perspective view showing an exclusive cable used in the same filing device;

FIG. 63 is a perspective view showing the appearance of an exclusive keyboard;

FIG. 64 is a perspective view showing a remote control operation part;

FIG. 69 and FIG. 70 are a top view and a side view for explaining the connection state of the card tray to the connector;

FIG. 75 is a block diagram showing details of a CPU part;

FIG. 76 is a block diagram showing details of a memory card data input, output part;

FIG. 77 is a block diagram showing details of parallel data input, output part;

FIG. 78 is a block diagram showing details of serial data input, output part;

FIG. 79 is a block diagram showing details of other parallel data input, output part;

FIG. 80 is a block diagram showing details of an audio appliance control part;

FIG. 81 is a block diagram showing details of image data input, output part;

FIG. 83A and FIG. 83B are flow charts for explaining the data transfer between devices;

FIG. 84 is a timing chart showing the data transfer in through-mode between devices;

FIG. 86 is a timing chart showing the data transfer in expansion mode between devices;

FIG. 87A and FIG. 87B are flow charts for explaining the operation of turning on the power source of the editing machine;

FIG. 90 to FIG. 93 are drawings showing examples of a display screen in the operating state of retrieval function, together with flow charts for explaining the operation of the retrieval function;

FIG. 94 is a flow chart for explaining the operation of processing function;

FIG. 95 is a drawing showing an example of a display screen by processing function;

FIG. 96A and FIG. 96B are flow charts for explaining the operation of montage function;

FIG. 97 is a drawing showing an example of a display screen by montage function;

FIG. 98 is a flow chart for explaining the operation of graphic insertion function;

FIG. 99 is a drawing showing an example of a display screen by graphic insertion function;

FIG. 102 is a flow chart for explaining the operation of level conversion function;

FIG. 104A, FIG. 104B, FIG. 105A, FIG. 105B, FIG. 106 to FIG. 108 are flow charts for explaining the operation of storage function;

FIG. 109A, FIG. 109B, FIG. 110 and FIG. 111 are flow charts for explaining the operation of communication function;

FIG. 113, FIG. 114A, FIG. 114B and FIG. 115 are flow charts for explaining the operation of automatic execution function; and FIG. 116A, FIG. 116B and FIG. 117 are flow charts for explaining the operation of extension program function.

DETAILED DESCRIPTION OF THE PREFERRED EMBODIMENTS

Figure 2:
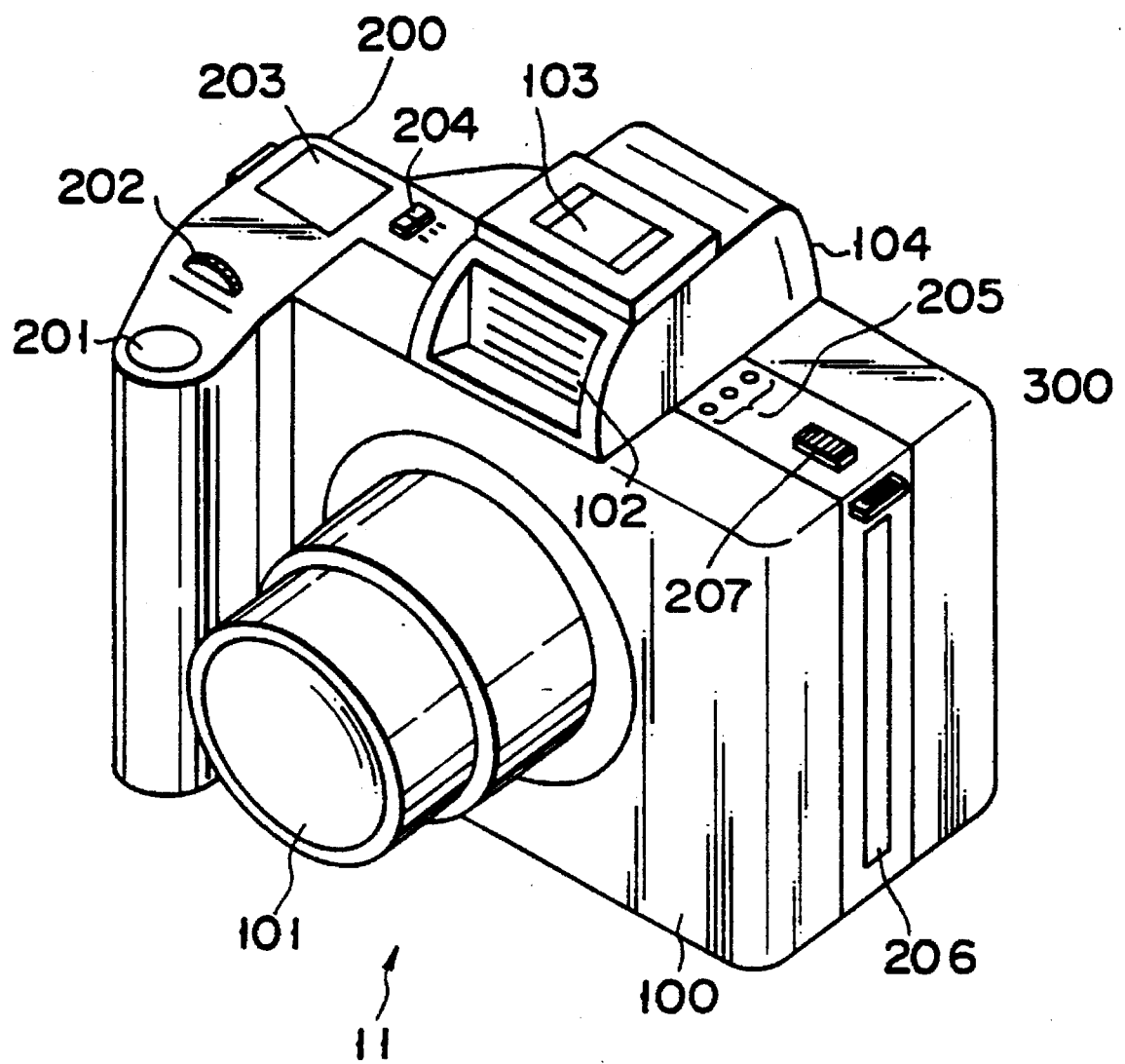
FIG. 2 and FIG. 3 are perspective views showing the appearance of an electronic still camera mounting a single disc pickup unit, individually.

Referring now to the drawings, one of the embodiments is described in detail below. FIG. 1 shows an entire structure of the system explained in this embodiment, and its outline is briefly described below. That is, in the drawing, numeral 11 denotes an electronic still camera. This electronic still camera 11 converts a taken optical image into a video signal by using a solid pickup element such as CCD (charge coupled device), and further converts this video signal into digital image data of each form of R (red), G (green), B (blue) and Y/C (luminance/color), and compresses the digital image data of Y/C, and delivers. This electronic still camera 11 also incorporates a microphone, and delivers the collected voice as the voice data in various digital and analog forms.

Among them, the Y/C digital image data and digital voice data are recorded in a memory card 400 incorporating a semiconductor memory, which is freely detachable from the electronic still camera 11. Besides, digital image data of R, G, B and Y/C and digital voice data are recorded in a filing device 500. The filing device 500, in this embodiment, employs a digital audio tape recorder as one of the reloadable recording devices, and possesses a recording capacity far greater than that of the memory card 400. Between the memory card 400 and the filing device 500, the digital image data and digital voice data can be exchanged, and the digital image data and digital voice data recorded in the memory card 400 can be transferred and stored in the filing device 500.

The analog voice data collected by the electronic still camera 11 can be recorded in an exclusive voice recording device 800 such as audio tape recorder. The digital image data and digital voice data recorded in the memory card 400 and filing device 500 are read out in the electronic still camera 11, and can be reproduced by a small-sized liquid crystal monitor or speaker incorporated in the electronic still camera 11.

The digital image data and digital voice data recorded in the memory card 400 and filing device 500 are supplied in a bus line 601 of an editing machine 600. This editing machine 600 is intended to transmit the digital image data and digital voice data to various peripheral devices, or process and edit the data by the control of a CPU (central processing unit) 603 by manipulating the operation part 602 composed of the connected exclusive keyboard, remote control operation part and the like, and therefore it is made easy to extend the system and easy to achieve multiple functions, thereby promoting the multiple-object principle effectively and satisfying wide needs of users sufficiently.

For example, the digital image data delivered from the memory card 400 or filing device 500 is expanded in a data expanding part 604, and the image may be selectively displayed in externally connected plural monitors 801a, 801b, 801c, ..., through buffer memory 605 and monitor changeover I/F (interface) part 606. It is also possible to edit or process the digital image data as desired in an editing and processing part 607, or record the digital image data or digital voice data in various recording devices, such as reloadable disc recording device 802 and tape recording device 803 connected externally.

Using a word processor 804, furthermore, character data may be overlaid on digital image data, or the images may be printed out by using a printer 805. It is moreover possible to communicate the digital image data and digital voice data by using a modem 806. Yet, the digital image data recorded in the frame memory of externally connected VTR (video tape recorder) 807, or the analog image data delivered from externally connected VTR 808 once converted into digital image data by A/D (analog/digital) conversion part 608 may be compressed in a data compression part 609, and recorded in desired recording medium or displayed in desired monitor.

In addition, depending on the images displayed in the monitors 801a, 801b, 801c, ..., the tune to be reproduced may be changed according to the display image by controlling an externally connected digital audio tape recorder 809 or CD (compact disc) player 810. Or by using an intelligent card 811 in which a program is recorded preliminarily, the above functions may be executed automatically in time sequence. The outline of the system of this embodiment is described briefly herein, and details of parts are described below. The parts are explained in the following sequence.

1. FIG. 2 to FIG. 16: Explanation about the structure of the electronic still camera 11.
2. FIG. 17 to FIG. 33: Explanation about the signal system of electronic still camera 11.
3. FIG. 34 to FIG. 38C: Explanation about recording format of digital image data and digital voice data.
4. FIG. 39A to FIG. 49: Explanation about operation of various functions of electronic still camera 11.
5. FIG. 51 to FIG. 61: Explanation about construction and operation of filing device 500.
6. FIG. 62 to FIG. 73: Explanation about construction of editing machine 600.
7. FIG. 74 to FIG. 82: Explanation about the signal system of editing machine 600.
8. FIG. 83A to FIG. 86: Explanation about data transfer of editing machine 600.
9. FIG. 87A to FIG. 117: Explanation about operation of various functions of editing machine.

Structure of electronic still camera

Figure 3:
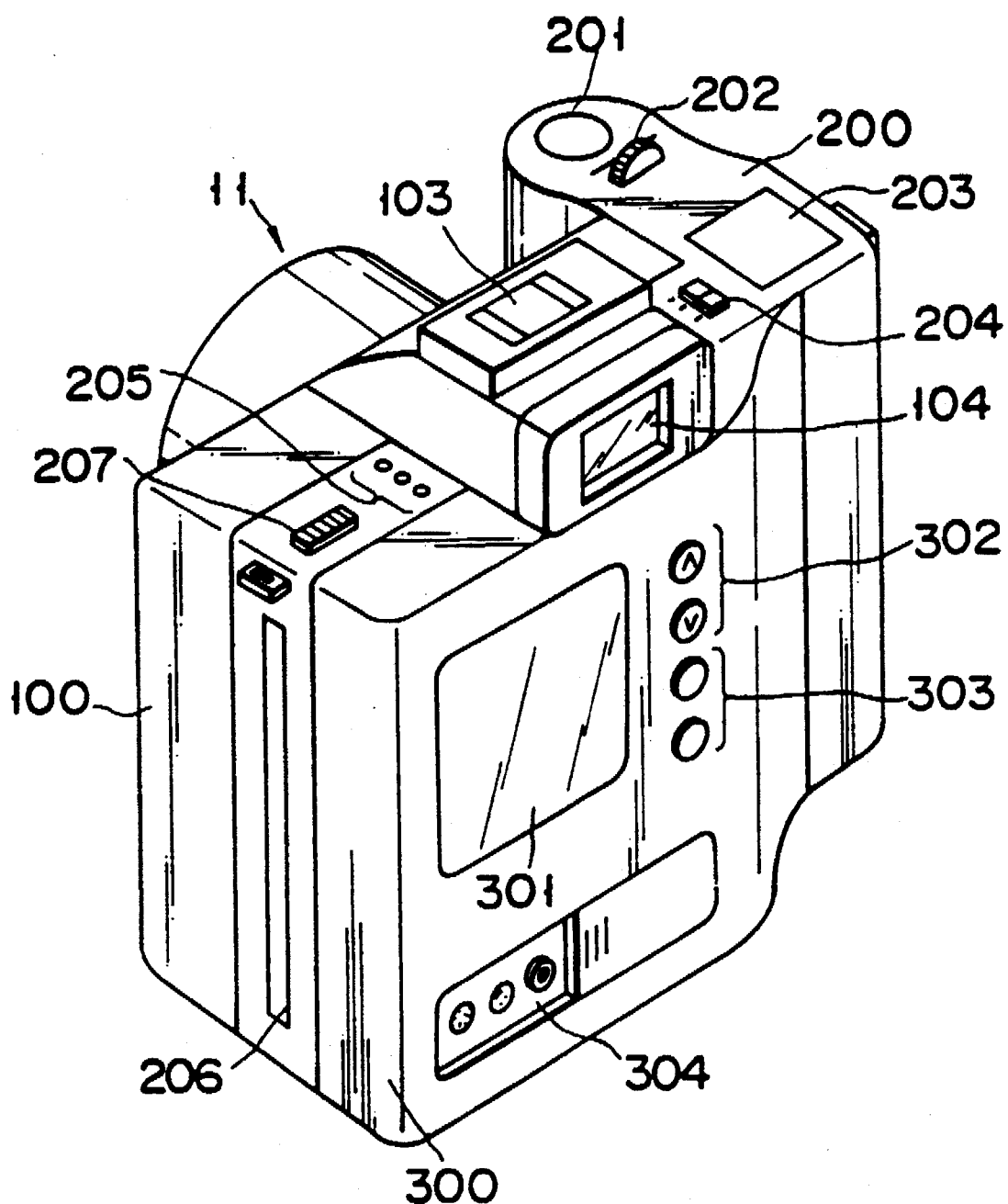

In the first place, the electronic still camera 11 is explained. This electronic still camera 11 comprises, as shown in FIG. 2 and FIG. 3, a pickup unit 100, a signal processing unit 200, and a reproduction unit 300.

The pickup unit 100 includes a lens 101, a built-in strobe 102, an external strobe 103 and a finder 104, as well as others. The signal processing unit 200 contains, among others, a release 201, a mode dial 202, a liquid crystal display part 203, a power and record/reproduction changeover switch 204, a mode setting switch 204, an insertion part 206 of memory card 400, and an eject switch 207 for taking out the memory card 400, as well as a built-in microphone provided in the lower side which is not shown in the drawing. The reproduction unit 300 comprises a small liquid crystal monitor 301, a screen feed switch 302, a screen adjusting switch 303, a connector part 304 for connection to an external monitor or speaker, and others, and a built-in speaker in the lower side which is not shown in the drawing.

Figure 4:
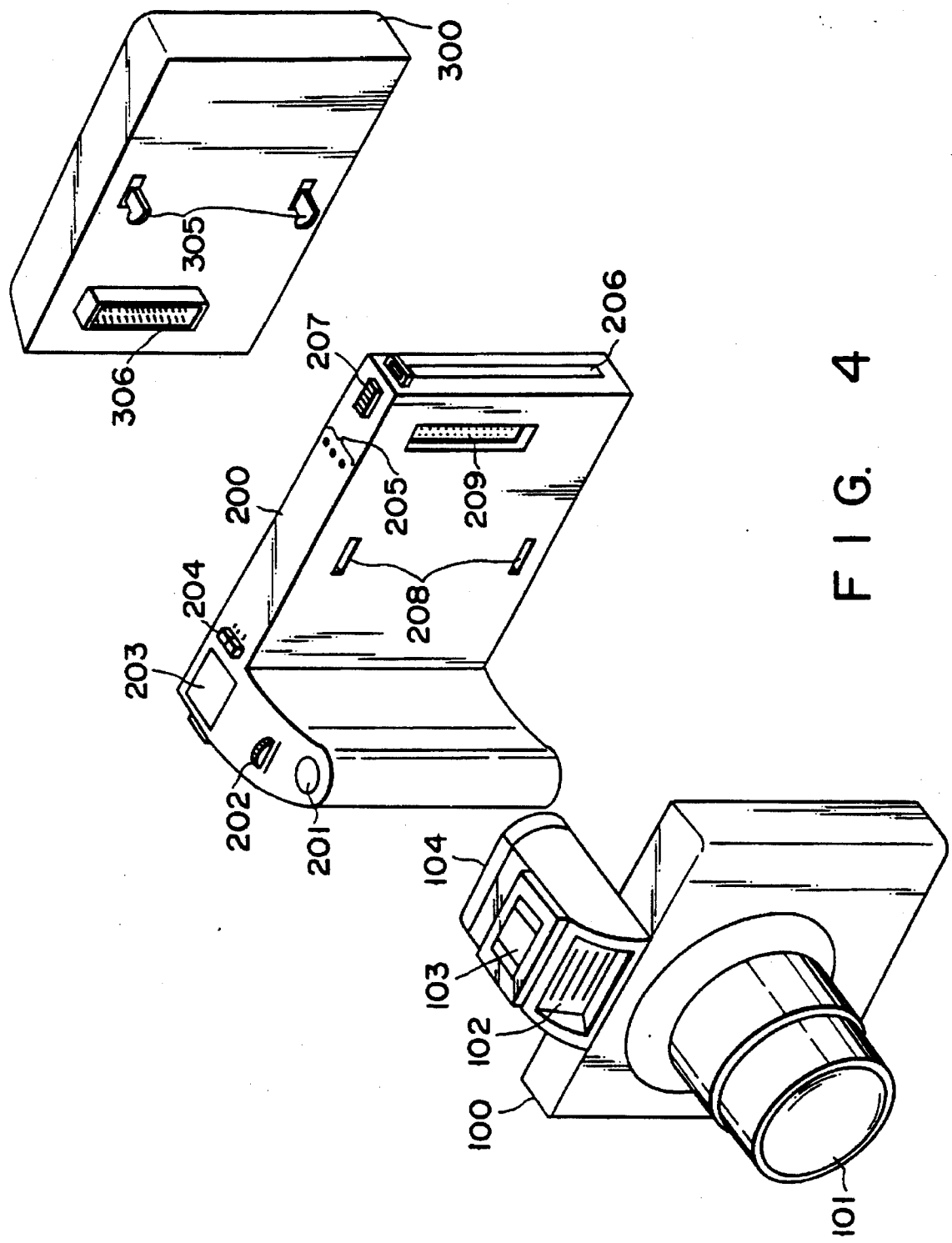
FIG. 4 and FIG. 5 are perspective views showing the same electronic still camera divided into a single disc pickup unit, signal processing unit, and reproduction unit.
Figure 5:
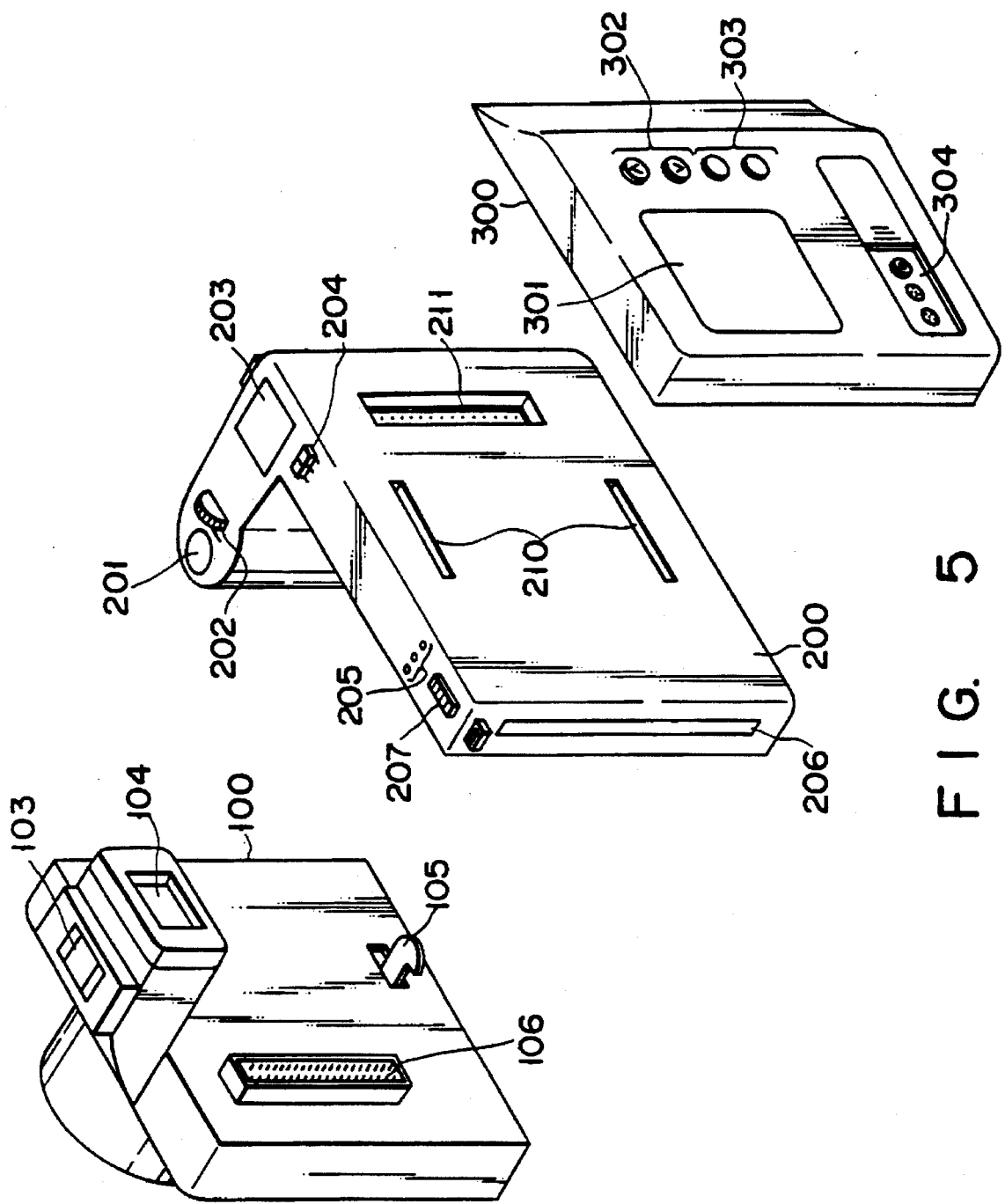

Meanwhile, as shown in FIG. 4 and FIG. 5, the pickup unit 100, signal processing unit 200 and reproduction unit 300 are designed to be separated from each other. The pickup unit 100 and the signal processing unit 200 are mechanically coupled together by fitting a pair of hook parts 105, 105 (only one is seen in FIG. 5) disposed in the pickup unit 100 to a pair of receiving parts 208, 208 disposed in the signal processing unit, and by matching the connector part 106 disposed in the pickup unit 100 with the connector part 209 disposed in the signal processing unit 200, they are electrically connected. Besides, the signal processing unit 200 and reproduction unit 300 are mechanically coupled together by fitting a pair of hook parts 305, 305 disposed in the reproduction unit 300 to a pair of receiving parts 210, 210 disposed in the signal processing unit 200, and are electrically connected by fitting the connector part 306 disposed in the reproduction unit 300 with the connector part 211 disposed in the signal processing unit 200.

The pickup unit 100 and reproduction unit 300 are designed so that the hook parts 104, 305 are detached from the receiving parts 208, 210 so as to be released from the signal processing unit 200, by manipulating the release switch disposed in the lower side which is not shown in the drawing. Accordingly, when performing photography only, as shown in FIG. 6, it is small in size, light in weight and convenient in carrying by detaching the reproduction unit 300. In this case, meanwhile, the connector part 211 is protected by fitting a protective lid 212 on the connect or part 211 of the signal processing unit 200 connected with the connector part 306 of the reproduction unit 300.

Figure 7:
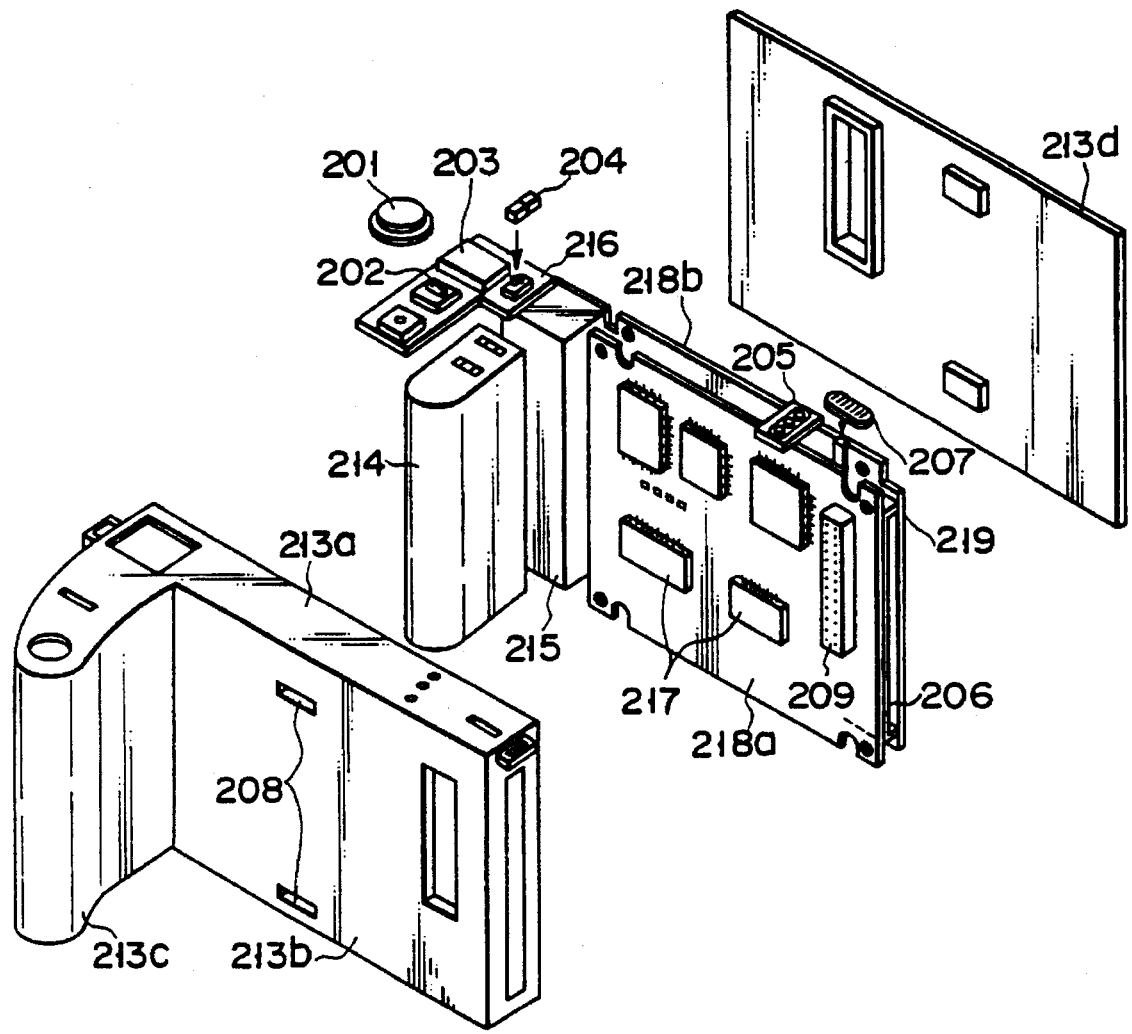
FIG. 7 is an exploded perspective view showing an internal structure of a signal processing unit.

FIG. 7 shows the structure of the signal processing unit 200. In the drawing, the reference code 213a denotes a main cabinet, in which a main body part 213b approximately in a box shape enclosed by the pickup unit 100 and reproduction unit 300, and a grip part 213c to be gripped by the right hand of the user are formed integrally in one body. The grip part 213c contains a battery holder 214 for accommodating batteries, a DC-DC converter 215 for raising the battery voltage, and a printed wiring board 216 on which the release 201, mode dial 202, liquid crystal display part 204 and power and recording/reproduction changeover switch 204 are mounted.

In the main body part 213b, various circuit devices 217, 217 ..., and two printed wiring boards 218a, 218b mounting the mode setting switch 204 and connector parts 209, 211 are disposed parallel and accommodated. Between the two printed wiring boards 218a, 218b, a card holder 219 having an eject switch 207 is disposed. Thus, in the structure having the card holder 219 sandwiched by the two printed wiring boards 218a, 218b, the rigidity of the card mounting portion may be enhanced without increasing the thickness of the card holder 219, which contributes to saving of space and reduction of size, and also the cooling effect for the circuit devices 217 is achieved. The signal processing unit 200 is completed as the opening of the connected side of the reproduction unit 300 of the main cabinet 213 is closed by the sub-cabinet 213d which is a lid.

Figure 8:
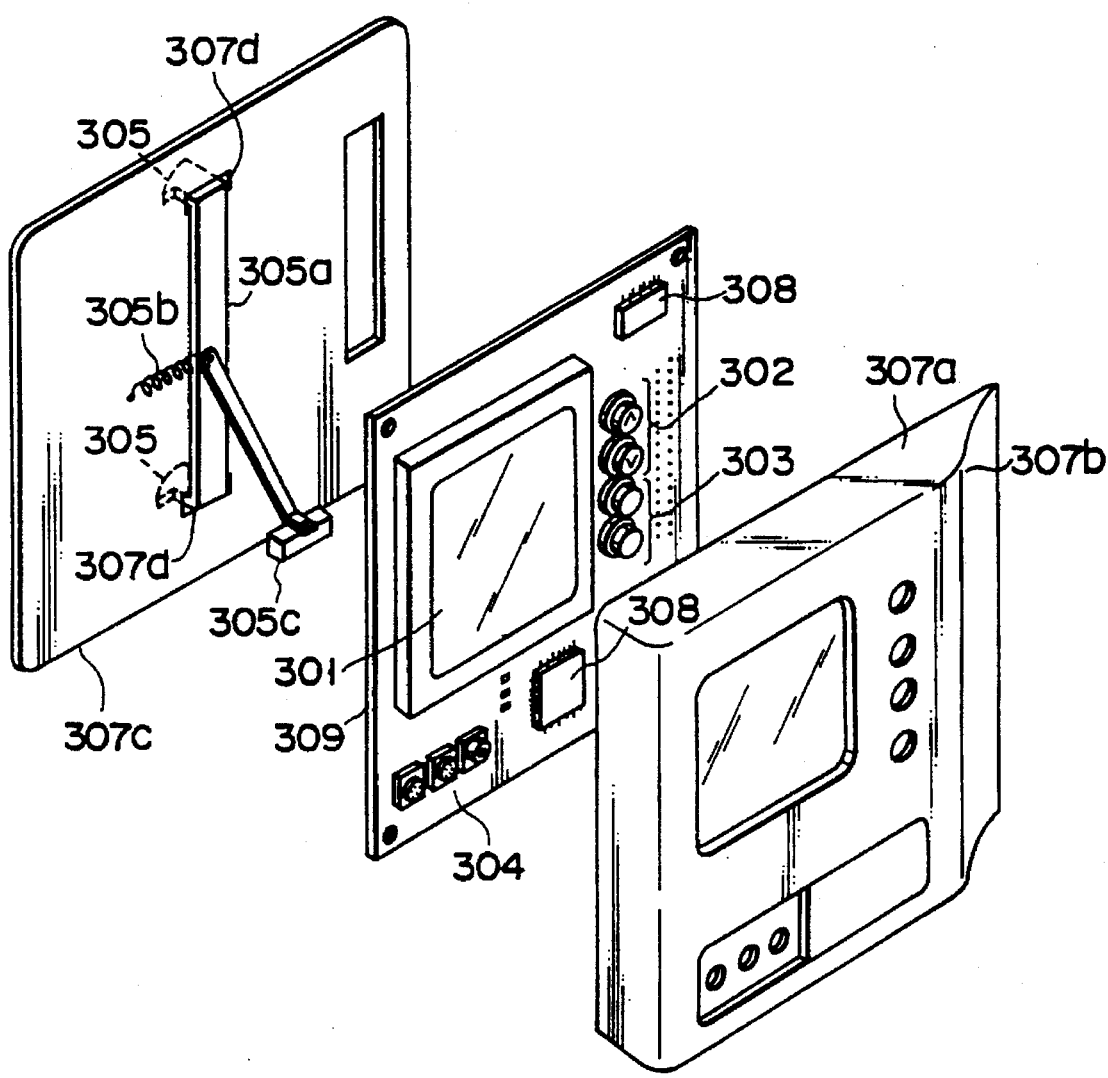
FIG. 8 is an exploded perspective view showing an internal structure of a reproduction unit.

FIG. 8 shows the structure of the reproduction unit 300. That is, 307a is a main cabinet formed approximately in a box shape, which accommodates various circuit devices 308, 308, ..., and a printed wiring board 309 mounting small liquid crystal monitor 301, screen feed switch 302, screen adjusting switch 303, connectors 304, 306, etc. Of the main cabinet 307a, the end part of the grip 213c side of the signal processing unit 200, that is, the end part at the right side in FIG. 8 is provided with a slope part 307b which is sequentially lowered in height toward the signal processing unit 200 side. Accordingly, even in the state of coupling of the reproduction unit 300 in the signal processing unit 200, the thickness of the grip part 213c is not increased as a whole for the electronic still camera 11, so that it may not be difficult for the user to hold. Besides, as the opening of the coupling side of the signal processing unit 200 of the main cabinet 307a by the sub-cabinet 307c which is a lid body, the reproduction unit 300 is completed.

Meanwhile, the sub-cabinet 307c is provided with hook parts 305, 305. The hook parts 305, 305 are formed in a hook shape at both ends of the hook member 305a being approximately in a pi-shape, and the both end parts of the hook member 304a are projected outward through a pair of penetration holes 307d, 307d formed in the sub-cabinet 307c. The hook member 305a is thrust in the leftward direction in the drawing by a coil-shaped spring 305b, so that the hook parts 305, 305 are stopped at receiving parts 510, 210 of the signal processing unit 200, and by manipulating a release switch 305c linked to the hook member 305a in the rightward direction in the drawing by resisting the thrust force of the spring 305b, stopping of the hook parts 305, 305 on the receiving parts 210, 210 is cleared. Besides, the composition of the hook member 305a, spring 305b, and release switch 305c applies same to the hook parts 105, 105 of the pickup unit 100.

Figure 9:
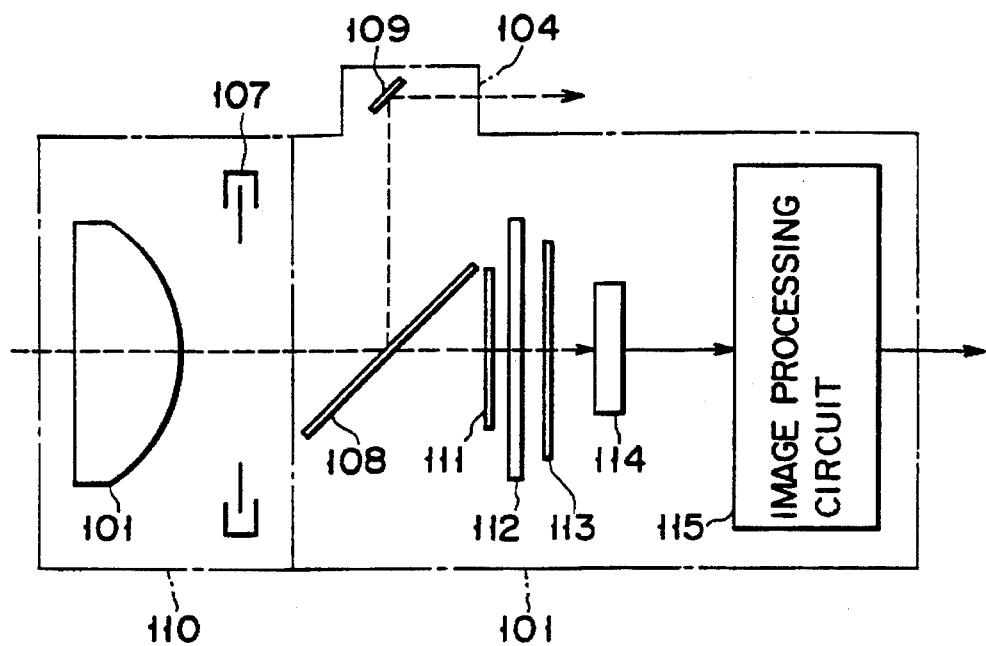
FIG. 9 is a block diagram showing an internal structure of a single disc pickup unit.

FIG. 9 shows an internal structure of the pickup unit 100. That is, the optical image of the subject entering through the lens 101 is adjusted of the quantity of light by a diaphragm 107 and is led into the finder 104 through mirrors 108, 109, and is visually observed by the photographer. Meanwhile, the lens 101 and diaphragm 107 are integrally combined as a lens unit 110, together with motors (not shown) for driving the lens 101 and diaphragm 107 owing to the automatic focusing adjustment (AF: auto-focus) function and automatic diaphragm adjustment (AE: auto-iris) function. To realize the AE function, the pickup unit 100 is also provided with an AE sensor (not shown) for sensing the quantity of light of the subject.

When the release 201 disposed in the signal processing unit 200 is pressed, the mirror 108 jumps up in FIG. 9 by the mechanical mechanism. As a result, the optical image of the subject is once adjusted of the quantity of light by the shutter 111, and is passed through infrared cut filter 112 and optical low pass filter 113, and is focused on the CCD 114. The image signal obtained by photoelectric conversion in the CCD 114 is sent into an image processing circuit 115 for color separation and A/D conversion processing, and is supplied into the signal processing unit 200. The shutter 111 of mechanical type is used as an aid for the electronic shutter function by the CCD 114.

The foregoing pickup unit 100 is of so-called single disc type having one CCD 114 inside, and, moreover, there are prepared twin disc pickup unit having two CCDs inside or triple disc pickup unit having three CCDs inside, so as to obtain pickup images of higher picture quality. By selectively attaching three types of pickup units 100 to the same signal processing unit 200, the entire electronic still camera 11 may be used in three types, that is, single disc type, twin disc type and triple disc type. By setting up such constitution, only by replacing the pickup unit 100 only depending on the resolution of the image to be obtained or the quantity of data, the request of the user may be sufficed, so that an inexpensive electronic still camera 11 may be presented on the whole.

Figure 10:
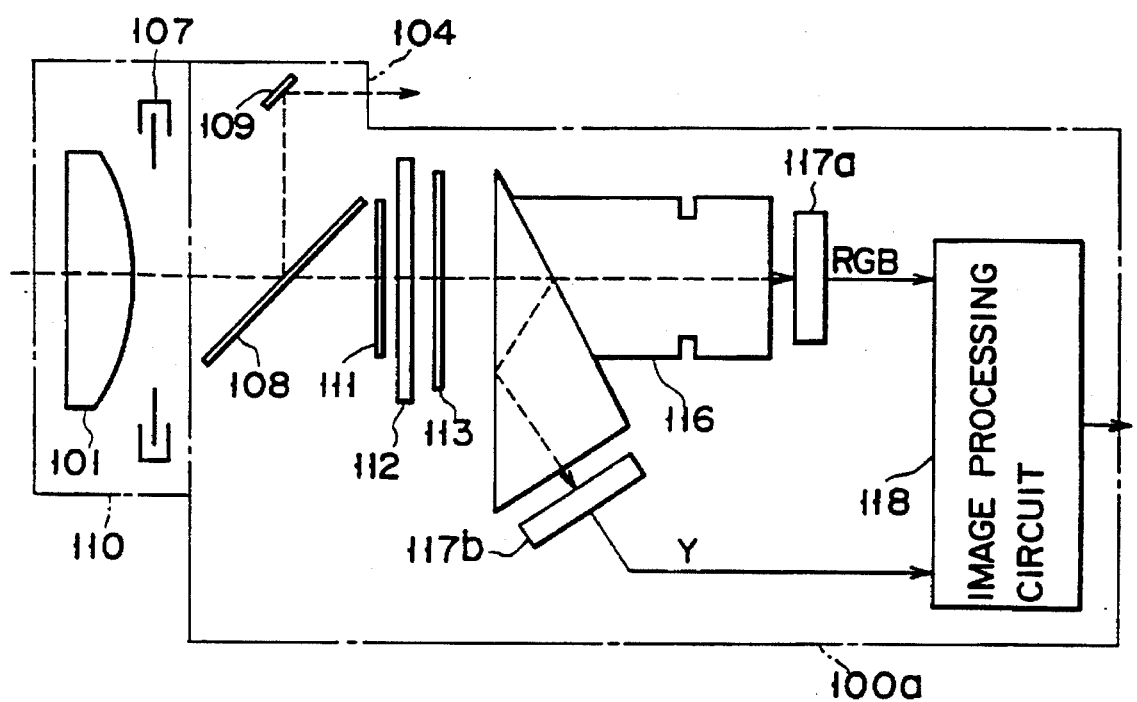
FIG. 10 is a block diagram showing an internal structure of a twin disc pickup unit.
Figure 11:
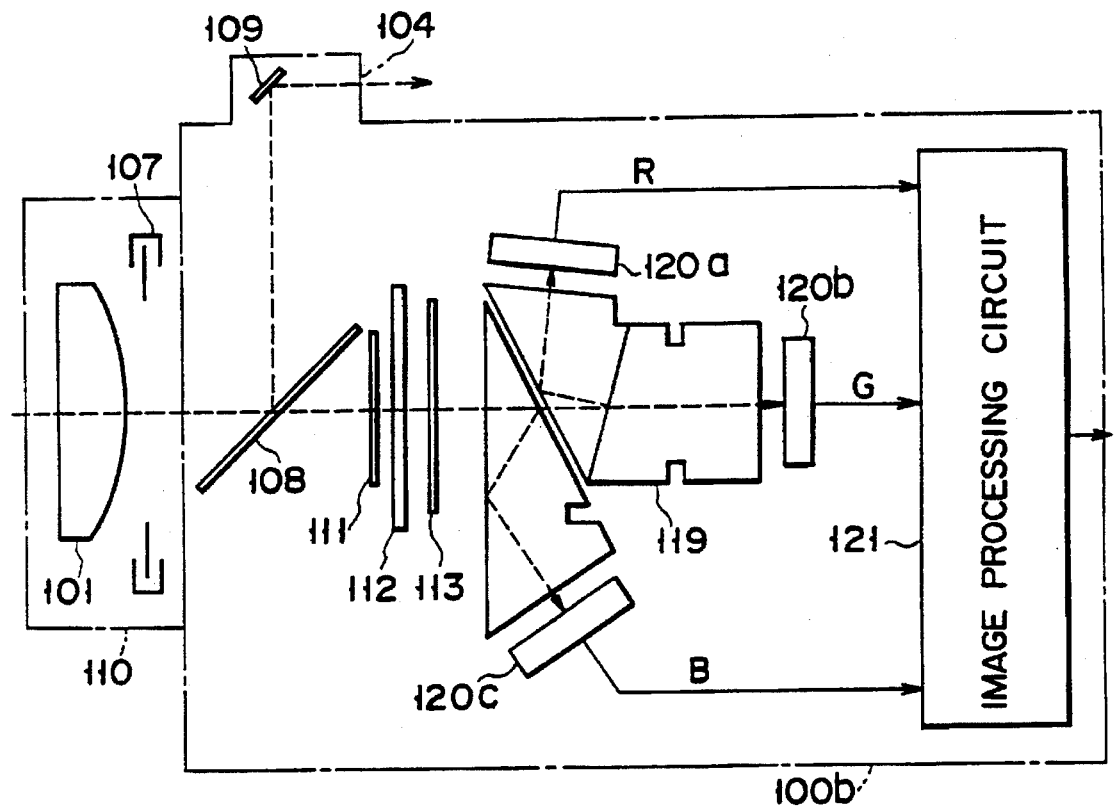
FIG. 11 is a block diagram showing an internal structure of a triple disc pickup unit.

FIG. 10 and FIG. 11 show the internal structure of the twin disc and triple disc pickup units 100a, 100b, by using the same reference codes for the same parts. First in the twin disc pickup unit 100a, as shown in FIG. 10, the optical image passing through the optical low pass filter 113 is separated into RGB component and Y component by a prism 116, and the light of each component is individually photoelectrically converted by two CCDs 117a, 117b. The obtained image signals of RGB component and Y component are sent into an image processing circuit 118 for color separation processing and A/D conversion processing, and supplied into the signal processing unit 200.

In the triple disc pickup unit 100b, as shown in FIG. 11, the optical image passing through the optical low pass filter 113 is separated into components of R, G, B by a prism 119, and lights of the components are photoelectrically converted in three CCDs 120a, 120b, 120c. The obtained image signals of components R, G, B are sent into image processing circuit 121 for A/D conversion processing, and supplied into the signal processing unit 200.

Between the single disc pickup unit 100 and the twin disc and triple disc pickup units 100a, 100b, as clear from FIGS. 9, 10 and 11, the thickness of the lens 101 is different. This is because, the optical path length from the lens 101 to the CCDs 114, 117a, 117b, 120a to 120c is longer in the twin and triple disc pickup units 100a, 100b, as compared with the single disc pickup unit 100, for the portion of the prisms 116, 119, and therefore it is necessary to correct the focal length due to difference in the optical path length.

Figure 12:
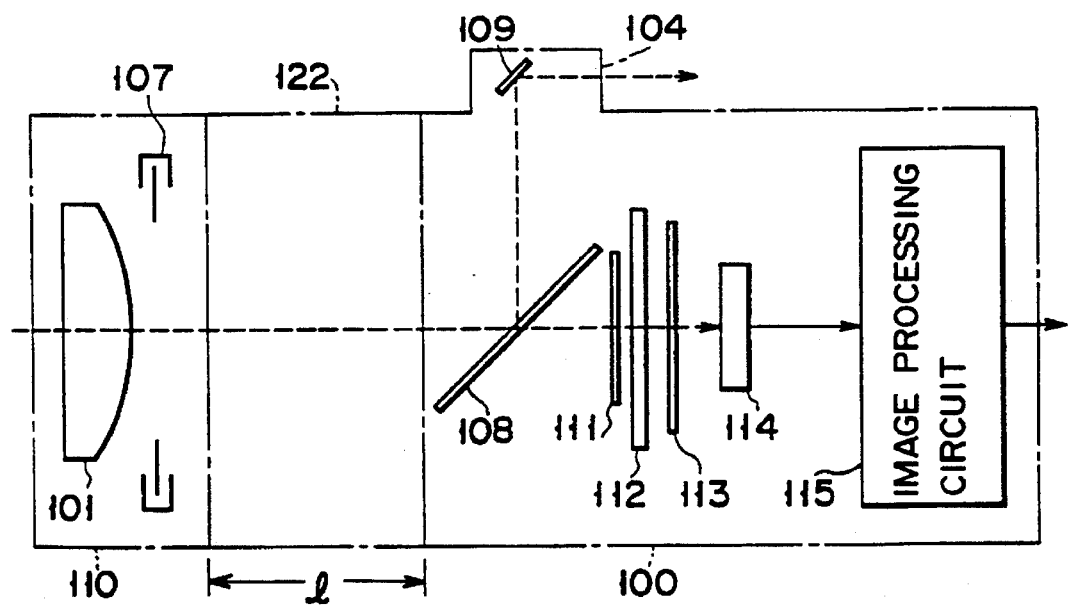
FIG. 12 is a block diagram showing other example of an internal structure of a single disc pickup unit.

Accordingly, if it is disadvantageous in manufacture or economy to use lens 101 of different thickness between the single disc pickup unit 100 and twin disc and triple disc pickup units 100a, 100b, the thickness of the lens 101 used in the single disc pickup unit 100 may be made same as the thickness of the lens 101 used in the twin disc and triple disc pickup units 100a, 100b, that is, the same lens 101 may be used for the single disc pickup unit 100, and the twin disc and triple disc pickup units 100a, 100b. In this case, as shown in FIG. 12, an adapter 122 with a distance "l" may be placed between the lens unit 110 and mirror 108 in order to compensate for the focal length due to differential portion of the optical path length. Or, without using adapter 122, the optical path length may be obtained by installing an optical part such as mirror in order to fold the optical path inside the pickup unit 100. Meanwhile, as the lens unit 110 for the pickup units 100, 100a, 100b, various types such as telephoto lens and wide angle lens can be selectively mounted.

Figure 13:
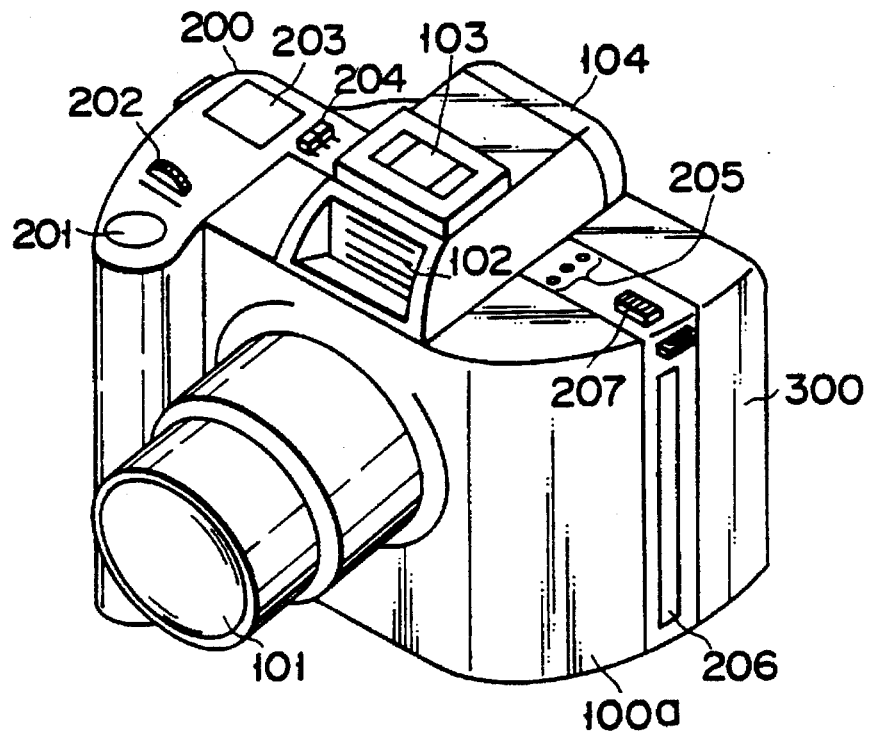
FIG. 13 is a perspective view showing the appearance of an electronic still camera mounting a twin disc pickup unit.
Figure 14:
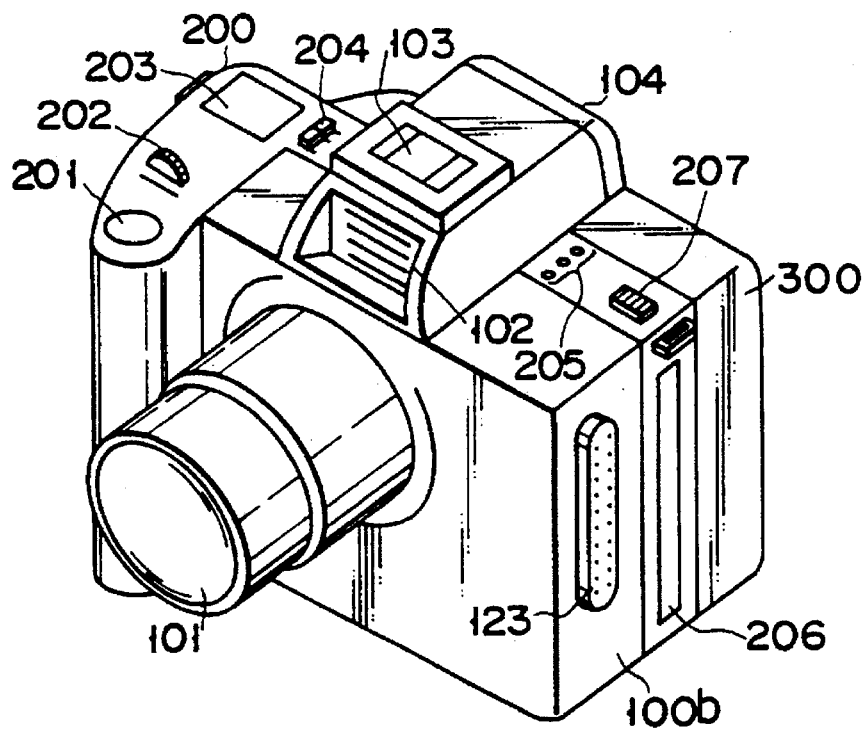
FIG. 14 is a perspective view showing the appearance of an electronic still camera mounting a triple disc pickup unit.

The state of mounting the twin disc and triple disc pickup units 100a, 100b on the signal processing unit 200 is shown in FIG. 13 and FIG. 14. In both pickup units 100a, 100b, it is known that the thickness is increased for the portion of the prisms 116, 119. Besides, in the triple disc pickup unit 100b, since the pickup image is of an extremely high picture quality, a connector part 123 (protected by a lid body not shown in the drawing when not in use) is disposed at one side in order to take out the digital image data of uncompressed components R, G, B to outside, and display the image of high picture quality on, for example, an external monitor. The reason of disposing the connector part 123 for output of R, G, B in the triple disc pickup unit 100b, instead of the signal processing unit 200, is (1) as known from FIG. 11 in the case of triple disc type, uncompressed outputs of R, B, G can be obtained easily, (2) it is a special case to request uncompressed data in spite of massive use of data recording region, and (3) it is disadvantageous for the space to install the connector part 123 in the signal processing unit 200 which has a narrow surface area.

FIG. 15 shows a top view of the electronic still camera 11, particularly indicating the details of operation parts disposed in the signal processing unit 200. That is, the release 201 is a switch to be pressed mechanically, and by a first step operation to press with a small pressure, it establishes a state of taking in light necessary for AE function, AF function and automatic color temperature adjustment (AWB: automatic white balance) function, and by a second step operation to press with a greater pressure, actual photography is taken.

The mode dial 202 has part of the peripheral edge of the disk exposed to outside to be rotated in handling, and when it is manipulated together with a mode setting switch 205, various conditions necessary for photography are established. As the power and record/reproduction changeover switch 204 is dislocated from the "OFF" position, the power is turned on, and it is ready to execute all actions of the electronic still camera 11. At "REC" position, it is the record mode and the electronic still camera 11 is ready to write image and voice data into the memory card 400 and filing device 500, and at "PLAY" position, it is the reproduction mode and the electronic still camera 11 reproduces the image and voice data recorded in the memory card 400 and filing device 500 by means of small liquid crystal monitor 301 or built-in speaker of the reproduction unit 300.

The liquid crystal display part 203 displays the information as shown in FIG. 16 in dot matrix type. That is, in the drawing, 203a denotes the remaining exposure counter showing how more exposures can be taken, in the memory card 400 or filing device 500 connected to the electronic still camera 11 at the present, 203b is a strobe mode display part telling that the built-in strobe 102 is being used, 203c is a self-timer mode display part telling that the self-timer is being used, 203d is the continuous filming mode display part telling that the photographs are taken continuously, 203e is a voice mode display part showing the recording and reproduction of voice data, and 203f is the multiple exposure mode display part indicating the so-called multiple exposure, that is, the same picture is continuously taken.

Furthermore, in FIG. 16, 203g is the WB display part showing the automatic setting state of white balance by AWG function and the correction state by its manual operation, 203h is the AE display part showing the automatic setting state of the diaphragm by AE function and the correction state by its manual operation, and 203i is the shutter speed display part showing the automatic setting state of the shutter speed by AE function. Still more, 203j is a warning display part telling that the photography is stopped to prevent overflow of the buffer memory, while, for example, writing image and voice data in the filing device 500, 203k is an external device connection display part telling that an external device is connected to the electronic still camera 11, 203l is an intelligent card display part telling that the intelligent card 811 is being used, 203m is a compression rate display part showing the automatic setting state of data compression rate and the setting state by its manual operation, 203n is a date display part indicating the present date, and 203o is a time display part indicating the present time.

Here is described the mode setting operation by the mode dial 202 and mode setting switch 205. First, while pressing the "MODE" switch of the mode setting dial 205, the mode dial 202 is rotated. In consequence, the display parts 203b to 203h, 203m to 203o of the liquid crystal display part 203 change over while flickering sequentially. For example, herein, if it is desired to vary the data compression rate, the mode dial 202 is rotated until the compression rate display part 203m flickers. Then, without pressing the "MODE" switch, by rotating the mode dial 202, the display content of the compression rate display part 203m cyclically changes in the sequence of (noncompression), (1/32), (1/16), (1/8), (1/4), (1/2), and (AUTO), and when the "END switch of the mode setting switch 205 is pressed at the desired display position, the data compression rate is set. To clear the set point, after setting in the flickering state of the desired display part 203b to 203h, 203m to 203o, the "RESET" switch of the mode setting switch 205 is pressed.

Incidentally, this electronic still camera 11 is provided with remote control function. That is, a remote control operation part not shown in the drawing is connected to the signal processing unit 200, and by manipulating this remote control operation part, the operation of the release 201 and mode setting as stated above can be effected by remote control.

Signal system of electronic still camera

The signal system of the electronic still camera 11 is described below. FIG. 17 shows the signal system of the single disc type pickup unit 100. That is, the image signal delivered from the CCD 114 is supplied into the signal processing circuit 124 which composes the image processing circuit 115, and undergoes color separation processing and interpolation processing, and image signals of components R, G, B are generated. In succession, these image signals of components R, G, B are converted into digital image data by A/D converters 125a, 125b, 125c, and supplied to terminals 106a, 106b, 106c composing the connector part 106. Motors for driving the lens 101 and diaphragm 107 disposed in the lens unit 110 are driven by the control signals supplied from the signal processing unit 200 through terminal 106d.

Furthermore, the shutter 111 is opened and closed as the shutter driver 126 is driven on the basis of the control signal supplied from the signal processing unit 200 detecting the operation of the release 201 through a terminal 106e. The CCD 114 is controlled in the sweep-out of undesired electric charge and transfer of signal electric charge in the vertical and horizontal direction as the CCD driver 127 is driven on the basis of the control signal supplied from the signal processing unit 200 through a terminal 106f. The built-in strobe 103 is driven to emit light on the basis of the drive signal supplied from the signal processing unit 200 through a terminal 106g.

The signal processing circuit 124 is intended, as shown in FIG. 18, to separate the image signal delivered from the CCD 114 into image signals of components R, G, B in the color separation circuit 128, interpolate the image signals of components R, G, B in the interpolation circuit 129, and deliver them to A/D converters 125a, 125b, 125c through terminals 130a, 130b, 130c, respectively.

In the case of twin disc pickup unit 100a, as shown in FIG. 19, the image signals of components R, G, B delivered from the CCD 117a are separated into image signals of components R, G, B in the color separation circuit 131, and these image signals of components R, G, B and the image signal of component Y delivered from the CCD 117b are combined in the matrix circuit 132, thereby generating image signals of components R, G, B, and delivering to the A/D converters 125a, 125b, 125c through terminals 133a, 133b, 133c, respectively. Furthermore, in the case of triple disc pickup unit 100c, as shown in FIG. 20, image signals of components R, G, B delivered from the CCD 120a, 120b, 120c are delivered to the A/D converters 125a, 125b, 125c through terminals 134a, 134b, 134c, directly.

Figure 21:
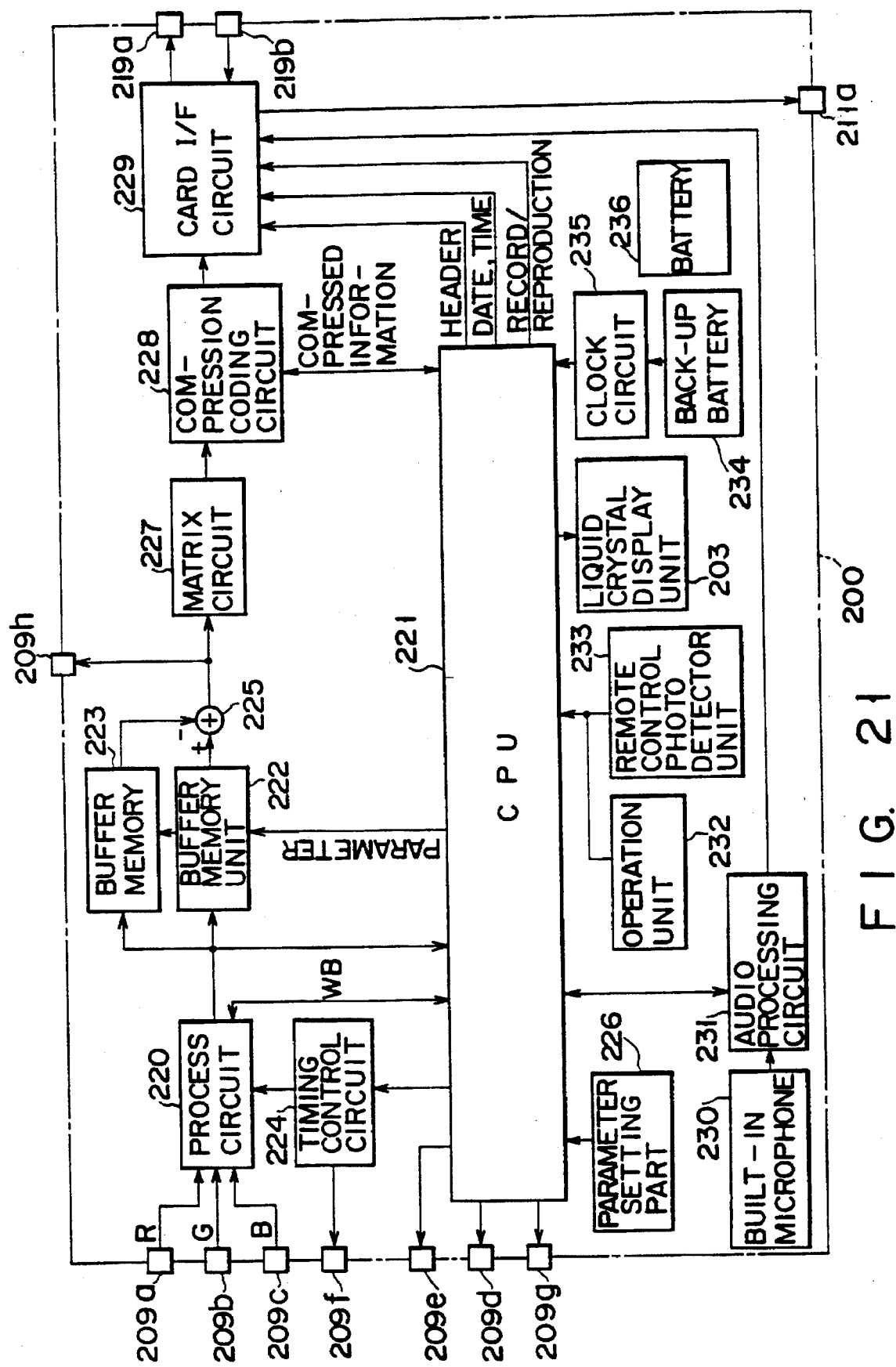
FIG. 21 is a block diagram showing a signal system of a signal processing unit.
Figure 22:
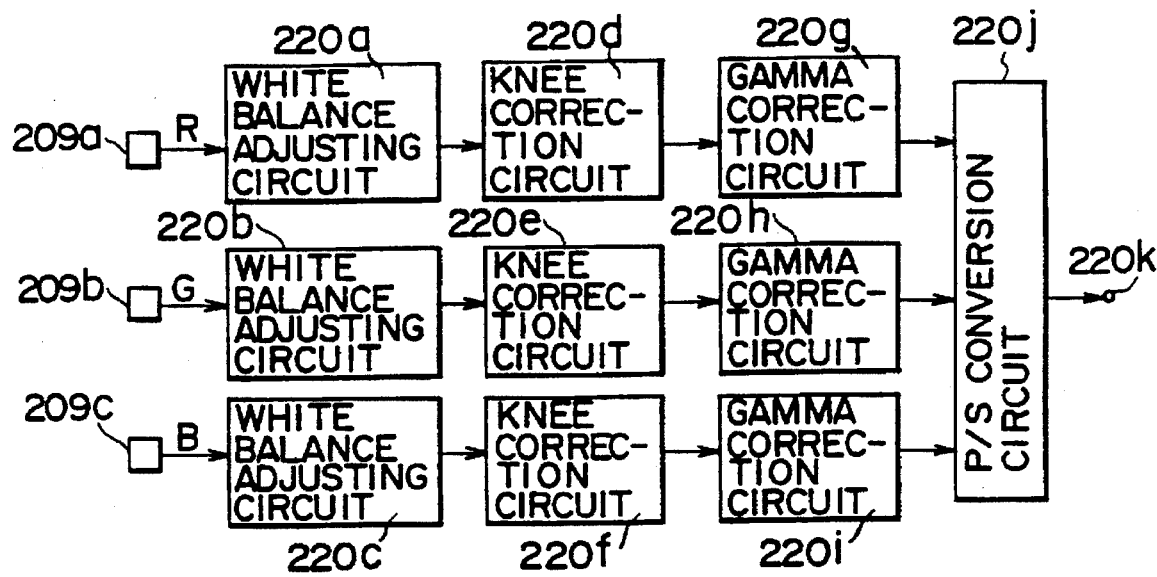
FIG. 22 is a block diagram showing details of a process circuit.

FIG. 21 shows the signal system of the signal processing unit 200. That is, terminals 209a to 209g composing the connector part 209 connected to the connector part 106 of the pickup unit 100 are correspondingly connected to the terminals 106a to 106g of the pickup unit 100. Of them, the digital image data of components R, G, B supplied to the terminals 209a, 209b, 209c are supplied to the process circuit 220. This process circuit 220 is, as shown in FIG. 22, intended to adjust the white balance of the digital image data of components R, G, B supplied to the terminals 209a, 209b, 209c in the white balance adjusting circuits 220a, 220b, 220c, correct the knee by knee correction circuits 220d, 220e, 220f, correct the gamma by gamma correction circuits 220g, 220h, 220i, convert three digital image data into serial digital image data by P/S (parallel/serial) conversion circuit 220j, and deliver from terminal 220k.

The digital image data thus delivered from the process circuit 220 are fed into the CPU 221, buffer memory part 222, and buffer memory 223. In the CPU 221, on the basis of the input digital image data and output of AE sensor, the quantity of light and focusing of the optical image focused on the CCD 114 are detected, and control signals for AE function and AF function are generated, and delivered to the terminals 209d, 209e, and a control signal for the AWB function is generated and issued to the white balance adjusting circuits 220a to 220c of the process circuit 220. The CPU 221 generates a driving signal of the built-in strobe 103 to the terminal 209g. The CPU 221 generates a control signal to be supplied to the CCD driver 127 through the timing control circuit 224, and delivers to the terminal 209f, and also issues a timing control signal to the process circuit 220.

The buffer memory part 222 and buffer memory 223 possess the function for recording the digital image data delivered from the process circuit 220 for the portion of one frame, and is indispensable for the continuous filming function and multiple-exposure function, together with the adder circuit 225, and its detailed constitution and operation are described later. The CPU 221 takes out various parameters necessary for continuous filming and multiple exposure from the parameter setting part 226 according to the input digital image data, and supplies to the buffer memory part 222.

The digital image data of components R, G, B delivered from the adder circuit 225 are supplied to the matrix circuit 227, and matrix-converted to digital image data of components Y, R-Y, B-Y, and are supplied to the terminal 209h. This terminal 209h is connected to the connector part 106 which is connected to the signal processing unit 200 when the triple disc pickup unit 100b is installed, and is intended to supply the digital image data of uncompressed components R, G, B treated by the process circuit 220 to the connector part 124 of the triple disc pickup unit 100b. Meanwhile, this terminal 209h may be disposed in the signal processing unit 200 separately from the connector part 209, so that the digital image data of uncompressed components R, G, B may be taken out to the outside, whether the pickup unit 100, 100a or 100b may be installed.

Afterwards, the digital image data delivered from the matrix circuit 227 is supplied into the compression coding circuit 228, and the data is compressed at the compression rate determined by manual operation or by the CPU 221. The compressed digital image data is supplied into the terminal 219a disposed in the card holder 219 through the card I/F circuit 229. This card I/F circuit 229 is intended to take in the digital image and voice data supplied from the memory card 400 into the terminal 219b disposed in the card holder 219, and supply into the terminal 211a composing the connector part 211.

The voice signal collected by the built-in microphone 230 is converted into digital voice data by the voice processing circuit 231 controlled by the CPU 221, and is led into the terminal 219a through the card I/F circuit 229. Furthermore, the CPU 221 is provided with signals corresponding to the operating states of operation parts 232 such as release 201, mode dial 202, power and record reproduction changeover switch 204 and mode setting switch 205, and signals from the remote control photo sensor 233 which receives the operation signal sent out from the remote control operation part, so that the operating state may be detected. Furthermore, the CPU 221 is provided with the signal corresponding to the operating state of the screen feed switch 302 of the reproduction unit 330, through connector parts 306, 211. The CPU 221 generates a judging signal for record mode or reproduction mode to the card I/F circuit 229, on the basis of the signal from the operation part 232 or remote control photo sensor 233, and also generates the data of date and time to supplement to the digital image data.

Furthermore, the CPU 221 reads and detects the header data described below which is recorded in the memory card 400 through the card I/F circuit 229 and terminal 219b, and controls the operation of each part on the basis of the intelligent data in the header program as if according to a program. The CPU 221 controls the display of the liquid crystal display part 203, and obtains the information of date and time from the clock circuit 235 driven by the backup battery 234. The signal processing unit 200 is supplied with electric power by the battery 236 contained in the battery holder 214. This battery 236 also supplies electric power to the pickup unit 100, reproduction unit 300 and memory card 400.

Figure 23:
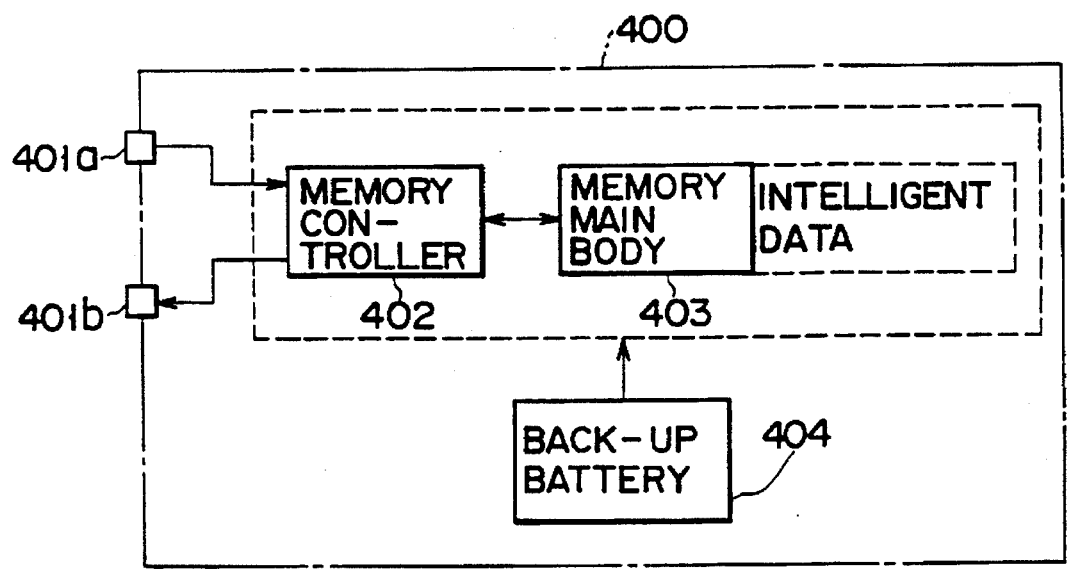
FIG. 23 is a block diagram showing a signal system of a memory card.

FIG. 23 illustrates the signal system of the memory card 400. The memory card 400 is provided with terminals 401a, 401b which are connected to the terminals 219a, 219b when installed in the card holder 219. These terminals 401a, 401b are connected to the memory main body 403 containing the intelligent data through the memory controller 402. The digital image and voice data supplied from the signal processing unit 200 to the terminal 401a are recorded in the memory main body 403, or the digital image and voice data recorded in the memory main body 403 are read out into the terminal 401b according to the request from the signal processing unit 200. This memory card 400, in the state of being connected to the signal processing unit 200, operates by receiving power supply from the battery 236 in the signal processing unit 200, but when taken out of the signal processing unit 200, it protects the recording content of the memory main body 403 by the built-in backup battery 404.

Figure 24:
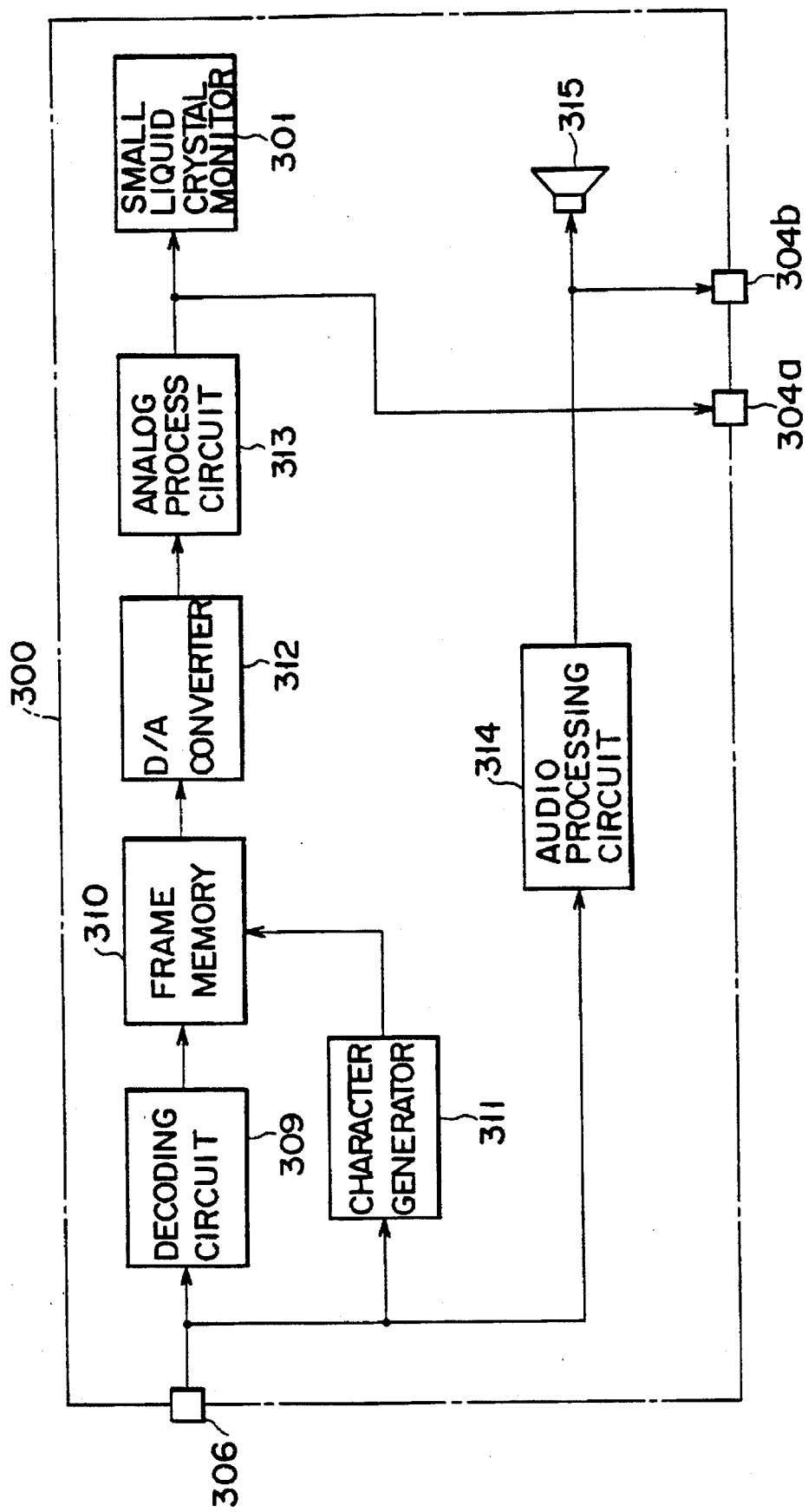
FIG. 24 is a block diagram showing a signal system of a reproduction unit.

FIG. 24 shows the signal system of the reproduction unit 300. The terminal 306a composing the connector part 306 of the reproduction unit 300 is connected to the terminal 211a of the signal processing unit 200. Of the digital image and voice data supplied to the terminal 306a. the image components are decoded in the decoding circuit 309, and written into the frame memory 310. The character data components such as date and time are combined with the image components in the frame memory 310 through the character generator 311. The digital image data read out from the frame memory 310 is converted into analog image signals in the D/A (digital/analog) converter 312, and reproduced in the small liquid crystal monitor 301 through analog process circuit 313, and led into the terminal 304a composing the connector part 304. The voice components are D/A converted in the voice processing circuit 314, and supplied in the built-in speaker 315, and is led out into the terminal 304b composing the connector part 304.

Figure 25:
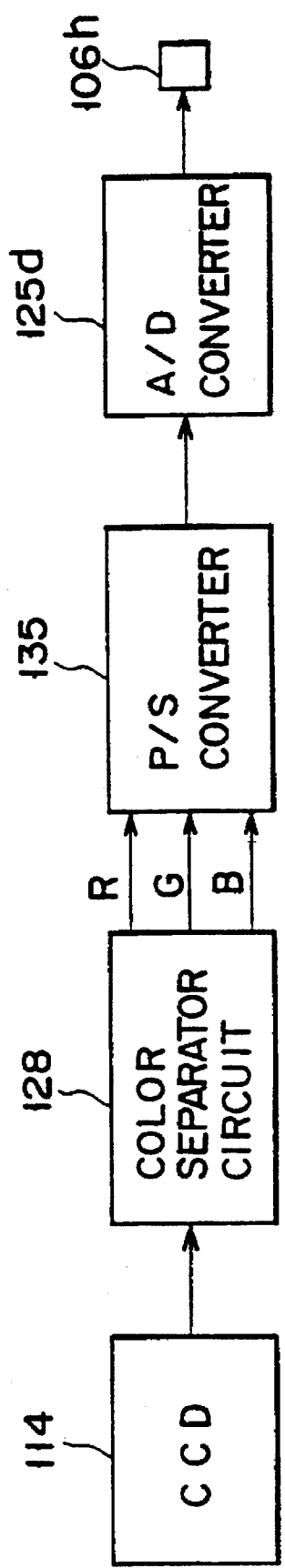
FIG. 25 is a block diagram showing a different example of a signal processing circuit of a single disc pickup unit.

Here, in the single disc pickup unit 100, as shown in FIG. 25, the image signals of components R, G, B delivered from the color separation circuit 128 are converted into serial data in the P/S converter 135, so that the digital image data may be created only by one A/D converter 125d and led into the terminal 106h of the connector part 106, thereby simplifying the constitution of the single disc pickup unit 100.

Figure 26:
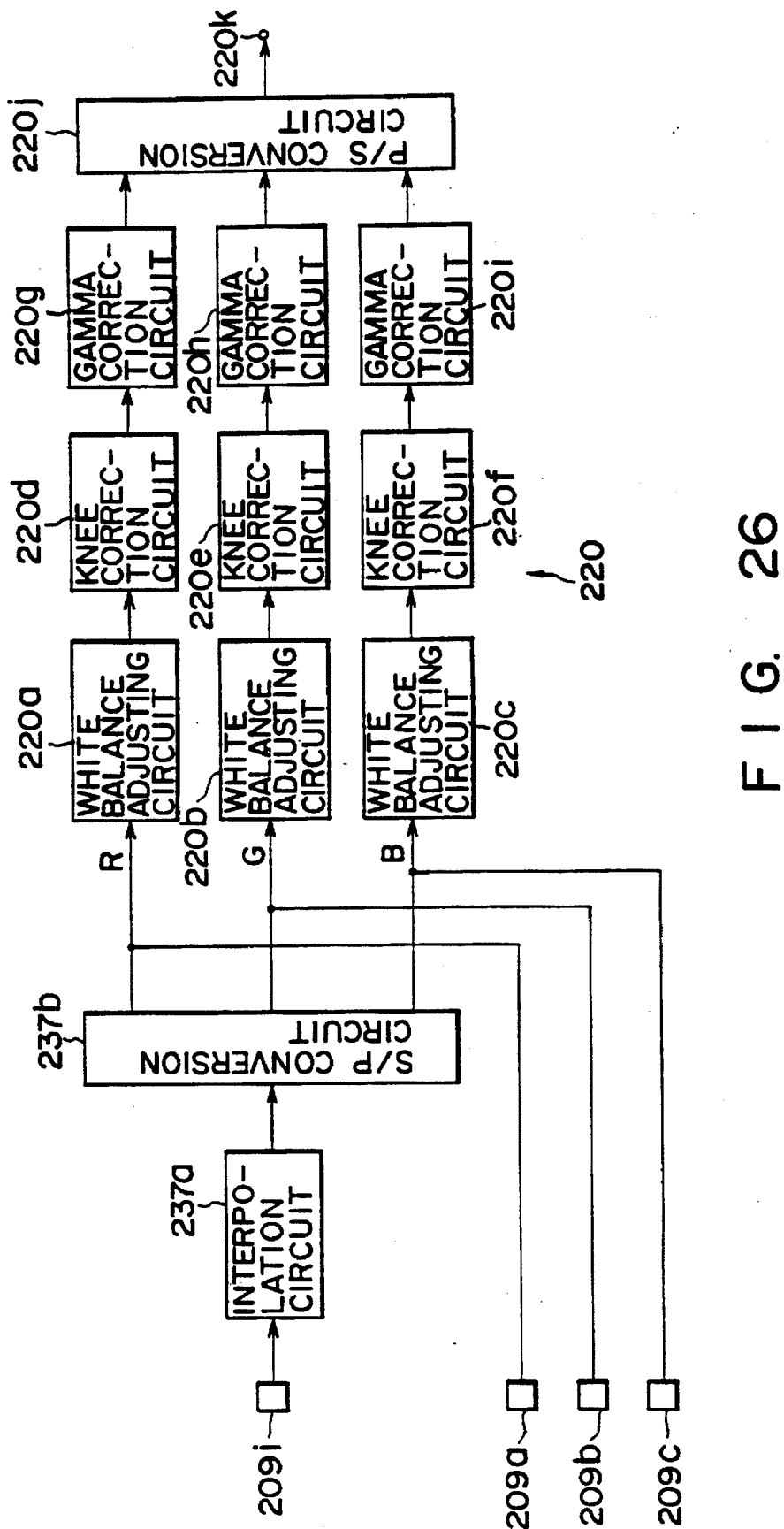
FIG. 26 is a block diagram showing other example of a process circuit.

In this case, as the signal processing unit 200, as shown in FIG. 26, a new terminal 209i connected only to the terminal 106h of the single disc pickup unit 100 is disposed in the connector part 209. When the single disc pickup unit 100 is installed, the terminals 106h and 209i are connected, while the other terminals 209a to 209c are released, and the serial digital image data supplied to this terminal 209i is interpolated in the interpolation circuit 237a, and converted into digital image data of components R, G, B in the S/P (serial/parallel) conversion circuit 237b, and supplied into the process circuit 220. When installing the twin disc and triple disc pickup units 100a, 100b, the terminal 209i is released, and the digital image data of components R, G, B supplied to the terminals 209a to 209c are supplied into the process circuit 220.

Next are explained the buffer memory part 222 and buffer memory 223. The digital image data delivered from the process circuit 220 is supplied into the multiplication circuit 222b composing the buffer memory part 222 and input end IN1 of the buffer memory 223 through the terminal 222a as shown in FIG. 27. This multiplication circuit 222b is intended to multiply the input digital image data by (1/m), and the value of m is supplied as the parameter from the CPU 221 through the terminal 222c. The output of this multiplication circuit 222b is added with the output of the other multiplication circuit 222e by the adder circuit 222d, and supplied to the input end IN1 of the buffer memory 222f.

The outputs obtained from output ends OUT1, OUT2, OUT3 of the buffer memory 222f are supplied to the input end IN2 of the buffer memory 223, the input end of the multiplication circuit 222e, and positive side input end of the adder circuit 225. This multiplication circuit 222e is intended to multiply the input digital image data by $$\{(m-1)/m\}+n$$

where m, n are supplied from the CPU 221 as parameters through the terminal 22g. The buffer memory 222f is provided with the R/W (read/write) signal through the terminal 222h, and multiple exposure count information k is supplied through the terminal 222i. The buffer memory 223 is further provided with the R/W signal through the terminal 222j from the CPU 221, and the output obtained from its output end OUT3 is supplied to the negative side input end of the adder circuit 225. The output of the adder circuit 225 is supplied to the matrix circuit 227 through the terminal 222k.

Herein, the buffer memories 222f, 223 are composed as shown in FIG. 28. In the drawing, numeral 238a denotes an input buffer having two input ends IN1, IN2, and the control signal from the CPU 221 determines the input digital image data should be delivered to whether the input end IN1 or IN2. The digital image data delivered from the input buffer 238a is written into the frame memory 238b. In this case, the frame memory 238b writes the digital image data in accordance with the R/W signal and address signal delivered from the address generation circuit 238c controlled by the control signal from the CPU 221. The digital image data written into the frame memory 238b is read out under the control of the address generation circuit 238c, and supplied to the output buffer 238d possessing three output ends OUT1, OUT2, OUT3. This output buffer 238d is to determine from which one of the output ends OUT1, OUT2, OUT3 the input digital image data is delivered, by the control signal from the CPU 221. Therefore, in the buffer memory 222f, the input end IN2 is open, while the output ends OUT1, OUT2 are open in the buffer memory 223.

In thus composed buffer memory part 222 and buffer memory 223, the operation in continuous filming mode is explained. That is, when set in the continuous filming mode by manipulating the mode dial 202 and mode setting switch 205, the CPU 221 delivers parameter m=1 to the multiplication circuit 222b of the buffer memory 222, and delivers the multiple exposure count information k=1 to the buffer memory 222f.

Figure 29A:
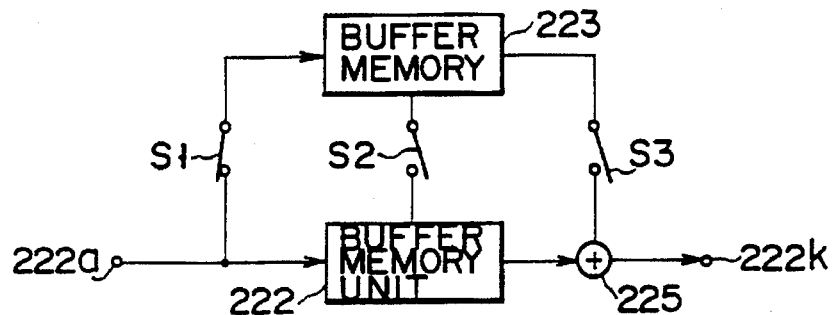
FIG. 29A and FIG. 29B are block diagrams for explaining the operation of multiple exposure mode.

Afterwards, when the release 201 is pressed, the first digital image data is supplied to the terminal 222a. At this time, for the ease of understanding of writing and reading of data to the buffer memories 222f, 223, as shown in FIG. 29A, the flow of data by on/off operation of the switches S1 to S3 is described. To begin with, when the digital image data of the first exposure is supplied to the terminal 222a, the CPU 221 turns on the switch S1, and turns off the switches S2, S3. Consequently, the digital image data of the first exposure supplied in the terminal 222a is multiplied by "1" by the multiplication circuit 222b, and written into the buffer memory 222f, and is also written into the buffer memory 223. The digital image data of the first exposure written into the buffer memory 222f is directly read out from the output end OUT3, and is passed through the adder circuit 225 and supplied into the matrix circuit 227 through the terminal 222k.

Figure 29B:
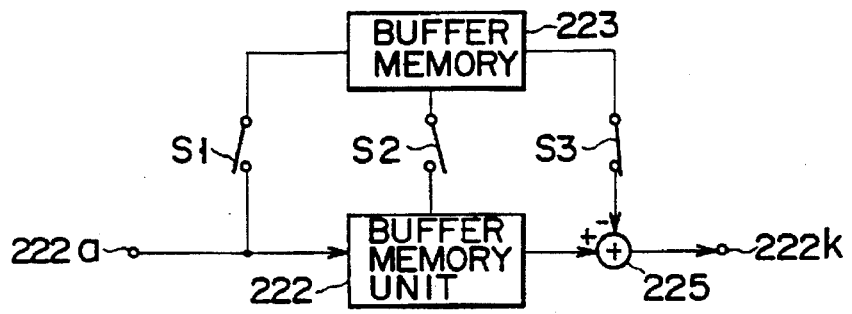

Next, when the digital image data of the second exposure is supplied to the terminal 222a, the CPU 221 turns on the switch S3, and turns off the switches S1, S2 as shown in FIG. 29B. Accordingly, the digital image data of the second exposure supplied to the terminal 222a is written only into the buffer memory 222f, and is directly read out into the adder circuit 225. At this time, the digital image data of the first exposure priorly written in the buffer memory 223 is read out to the negative input side of the adder circuit 225. Therefore, the differential data of the first digital image data and second digital image data is generated by the adder circuit 225, and is supplied to the matrix circuit 227 through the terminal 222k.

Thereafter, as for the digital image data of third and subsequent exposures, similarly, only the differential data from the digital image data of the first exposure is delivered from the adder circuit 225, and is supplied to the matrix circuit 227 through the terminal 222k. That is, in the case of continuous filming, of the taken images, moving parts are only very slight, and the quantity of movement is often very slight, and therefore all of the taken digital image data are not recorded in the memory card 400, but after recording the first digital image data, only the data of moving parts is recorded, so that the recording capacity is saved.

As the number of exposures of continuous filming increases, meanwhile, the difference from the first digital image data becomes wider, and after every specified number of exposures (for example, every five exposures), as shown in FIG. 29A, the same processing as in the first digital image data is executed, and the digital image data recorded in the buffer memory 223 is periodically refreshed. This refreshing period is preliminarily determined by the CPU 221.

The operation in multiple exposure mode is explained below. The multiple exposure mode includes two types, that is, the sensitivity increase mode for raising the sensitivity when taking images in a dark place, and the prolonged exposure mode for overlaying the images. The sensitivity increase mode is executed automatically when the CPU 221 detects the digital image data delivered from the process circuit 220 or the output of the AE sensor and judges it is necessary to increase the sensitivity. In this case, the CPU 221 first delivers the parameter m=n=1 to the multiplication circuits 222b, 222e of the buffer memory part 222, and also set the multiple exposure count k on the basis of the digital image data and the output of AE sensor, and delivers to the buffer memory 222f. In this sensitivity increase mode, the sensitivity is raised by summing up the digital image data for the portion of k exposures, but when the digital image data of k exposures are merely added up, the fixed noise component is also increased k times. Therefore, in the first place, only the noise components are added up for the portion of k exposures, and then the image components are added for the portion of k exposures, and the added noise Component is subtracted from the added image components, thereby raising the sensitivity.

Figure 30A:
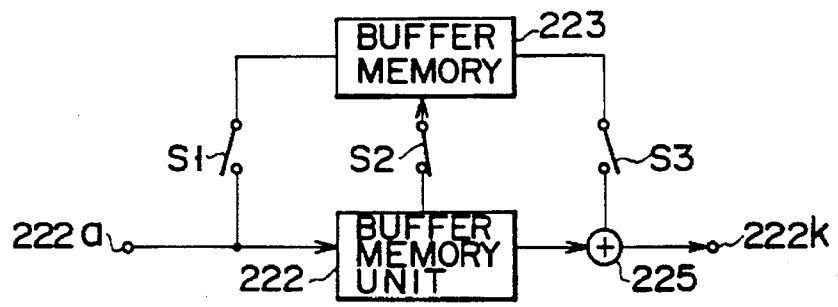
FIG. 30A and FIG. 30B are block diagrams for explaining the operation of continuous filming mode.

In other words, the CPU 221, in the sensitivity increase mode, sets the parameter m=n=1 and the multiple exposure count k closes the shutter 111 of the pickup unit 100, and adds the noise data obtained at terminal 222a in this state for the portion of k exposures in the buffer memory part 222. In this addition of noise data, the first noise data obtained at terminal 222a is multiplied by "1" in the multiplication circuit 222b, and written into the buffer memory 222f through the adder circuit 222d. This first noise data is delivered from the output end OUT2 of the buffer memory 222f, and is multiplied by "1" in the multiplication circuit 222e, and added with the second noise data delivered from the multiplication circuit 222b in the adder circuit 222d, and written again into the buffer memory 222f, and this operation is repeated k–1 times. Afterwards, the CPU 221 turns on the switch S2 and turns off the switches S1, S3 as shown in FIG. 30A, and the noise data added for the portion of k exposures is written into the buffer memory 223.

Figure 30B:
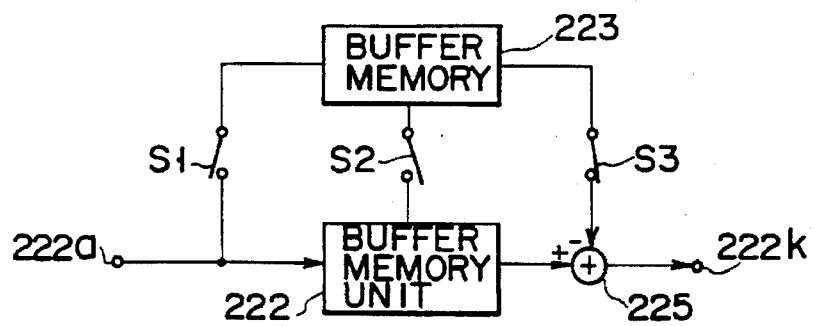

In consequence, the CPU 221 opens the shutter 111, and adds the digital image data obtained at terminal 22a to the buffer memory 222f for the portion of k exposures in the same manner as in addition of noise data. The CPU 221, as shown in FIG. 30B, turns on the switch S3, and turns off the switches S1, S2, and reads out the digital image data and noise data added up for the portion of k exposures from the buffer memories 222f, 223, and delivers to the adder circuit 225. Accordingly, the noise data is subtracted from the digital image data by the adder circuit 225, and the digital image data increased in sensitivity is obtained, and supplied to the matrix circuit 227 through the terminal 222k. Meanwhile, the automatic processing for raising the sensitivity by the CPU 221 mentioned above is designed to be stopped by manual operation.

On the other hand, in the prolonged exposure mode, the prolonged exposure mode is displayed in the multiple exposure mode display part 203f by manual operation by the operator, and the multiple exposure count information k is set. After this setting, the CPU 221 delivers parameters n=0, m=2, 3, . . . , k to the multiplication circuits 222b, 222e of the buffer memory part 222, and adds the digital image data for the portion of k exposures by the loop of the buffer memory 222f, multiplication circuit 222e and adder circuit 222d in the buffer memory part 222. As a result, the digital image data overeating k exposures is generated, and the digital image data is supplied to the matrix circuit 227 through the adder circuit 225 and terminal 222k.

Figure 31:
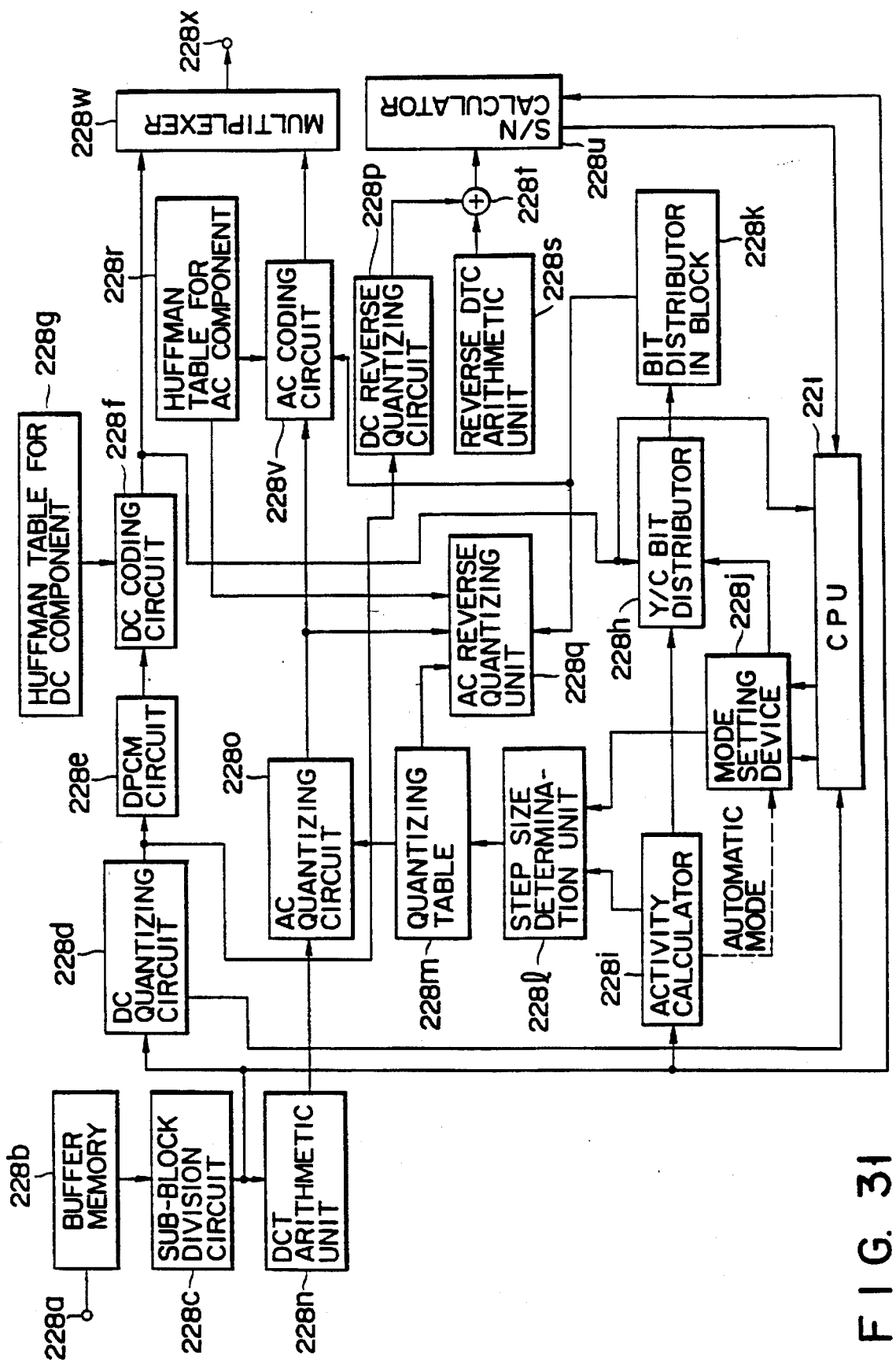
FIG. 31 is a block diagram showing details of a compression coding circuit.

FIG. 31 shows the details of the compression coding circuit 228. In this compression coding circuit 228, there are automatic mode for automatically determining the data compression rate under the control of the CPU 221, and manual mode for setting the data compression rate by manual operation by the operator. The digital image data delivered from the matrix circuit 227 is supplied to the buffer memory 228b in the sequence of Y, R–Y, B–Y components through the terminal 228a, and divided into sub-blocks of 8×8 in the sub-block dividing circuit 228c. The output of this sub-block dividing circuit 228c is quantized of DC components of each sub-block by the DC quantizing circuit 228d, and undergoes DPCM (differential pulse code modulation) processing among sub-blocks in the DPCM circuit 228e, and the DC components are coded while referring to the Huffman table for DC components 228g in the DC coding circuit 228f. At this time, in the DC coding circuit 228f, the total number of bits necessary for DC components is calculated, and the result of calculation is sent out into the Y/C bit distributor 228h.

On the other hand, the output of the sub-block dividing circuit 228c is supplied in an activity calculator 228i, and the activity (statistic quantity) in the sub-block is calculated. In the case of automatic mode, from the total screen sum of the activity in the sub-block, a proper data compression rate is set in the mode setting device 228j. when the data compression rate determined by the mode setting device 228j is sent to the CPU 221, the data compression rate and the recording residue in the memory card 400 are compared with each other in the CPU 221. If the record residue is not enough, the CPU 221 automatically raises the data compression rate, and sets again to the minimum data compression rate that can be coded within the recording residue.

The CPU 221 compares the total number of bits of DC component delivered from the DC coding circuit 228f with the data compression rate. That is, if the data compression rate is high, the total number of DC bits of the image may exceed the total number of bits corresponding to the data compression rate, and coding is disabled in such case, and therefore the CPU 221 issues an alarm through a warning display part 203j. When coding is possible, the data compression rate is sent out to the Y/C bit distributor 228h.

In the case of manual mode, the CPU 221 compares the data compression rate specified by the manual operation with the recording remainder in the memory card 400. If the recording reminder is insufficient, the CPU 221 automatically raises the data compression rate, same as in the case of automatic mode. Next, the CPU 221 compares the number of bits to be used by the DC component sent out from the DC coding circuit 228f with the data compression rate, and if coding is impossible, it is warned by the warning display part 203j, together with the data compression rate. Or when coding is possible, the CPU 221 displays the data compression rate on the compression rate display part 203m, and the data compression rate is specified in the Y/C bit distributor 228h.

When the data compression rate is set in this way, the total number of bits of the AC component is determined in the Y/C bit distributor 228h, and the bits are distributed to each sub-block by the bit distributor 228k in the block so as to be proportional to the activity in the sub-block. However, the activity calculated by the activity calculator 228i is weighted depending on the position on each sub-block screen before bit distribution. In other words, if the edge portion of the screen deteriorates somewhat, it is better for the picture quality visually to suppress the deterioration in the central area, and therefore the weighting degree is increased in the activity in the sub-block in the central part of the screen as shown in FIG. 32.

Consequently, from the sum of the determined compression rate and the activity in the sub-block before weighting on the entire screen, the normalizing coefficient of the quantizing table 228m is determined by the step size determining device 228l, and a normalized quantizing table is created. Afterwards, the data delivered from the sub-block dividing circuit 228c in the 8×8 sub-block unit is subjected to two-dimensional discrete cosine transform (DCT) process in a DCT calculator 228n, and the AC component is quantized in an AC quantizing circuit 228o by using the quantizing table 228m.

Prior to coding of AC component, it is once reproduced, and its S/N is compared with that of the input image. That is, the DC component quantized by the DC quantizing circuit 228d is reversely quantized in a DC reverse quantizing device 228p. The AC component quantized in the AC quantizing circuit 228o is sent into an AC reverse quantizing device 228q, and only the AC component that can be coded is reversely quantized by Using the quantizing table 228m, while referring to the number of distribution bits from the bit distributor 228K in the block and the Huffman table for AC component 228r, while the other AC component is regarded as 0. Thus, the AC component reversely quantized in the AC reverse quantizing device 228q is subjected to two-dimensional reverse DCT process in the reverse DCT calculator 228s, and is summed up with the DC component reversely quantized in the DC reverse quantizing device 228p in the adder circuit 228t, so that the reproduction data is obtained.

Later, the input image data is read out in every sub-block from the sub-block dividing circuit 228c, and the noise is calculated in relation to the reproduction data in the S/N calculator 228u, and the S/N for the portion of one screen is determined. The calculated S/N is sent to the CPU 221, and if the S/N does not satisfy the specified threshold level, the CPU 221 issues an alarm through the warning display part 203j. Afterwards, by readjusting the data compression rate, the bit distribution or other operation can be done once again.

Incidentally, the DC component of each sub-block is sent out from the DC quantizing circuit 228d to the CPU 221, and if the CPU 221 judges that the image is not favorable due to white-out or the like from the dynamic range of the DC component, it instructs the warning display part 203j to taken in again.

When the CPU 221 determines the coding of the AC component, coding is executed sequentially from the low range components within the number of bits distributed in each sub-block, while referring to the Huffman table for AC components 228r, by the AC coding circuit 228v, and an EOB (end of block) code is attached. In consequence, the outputs of the DC and AC coding circuits 228f, 228v are led into the multiplexer 228w and supplied to the card I/F circuit 229 through terminal 228x. To the card I/F circuit 229, moreover, the coded image data is sent after sending out the normalized quantizing table as the header data.

Figure 33:
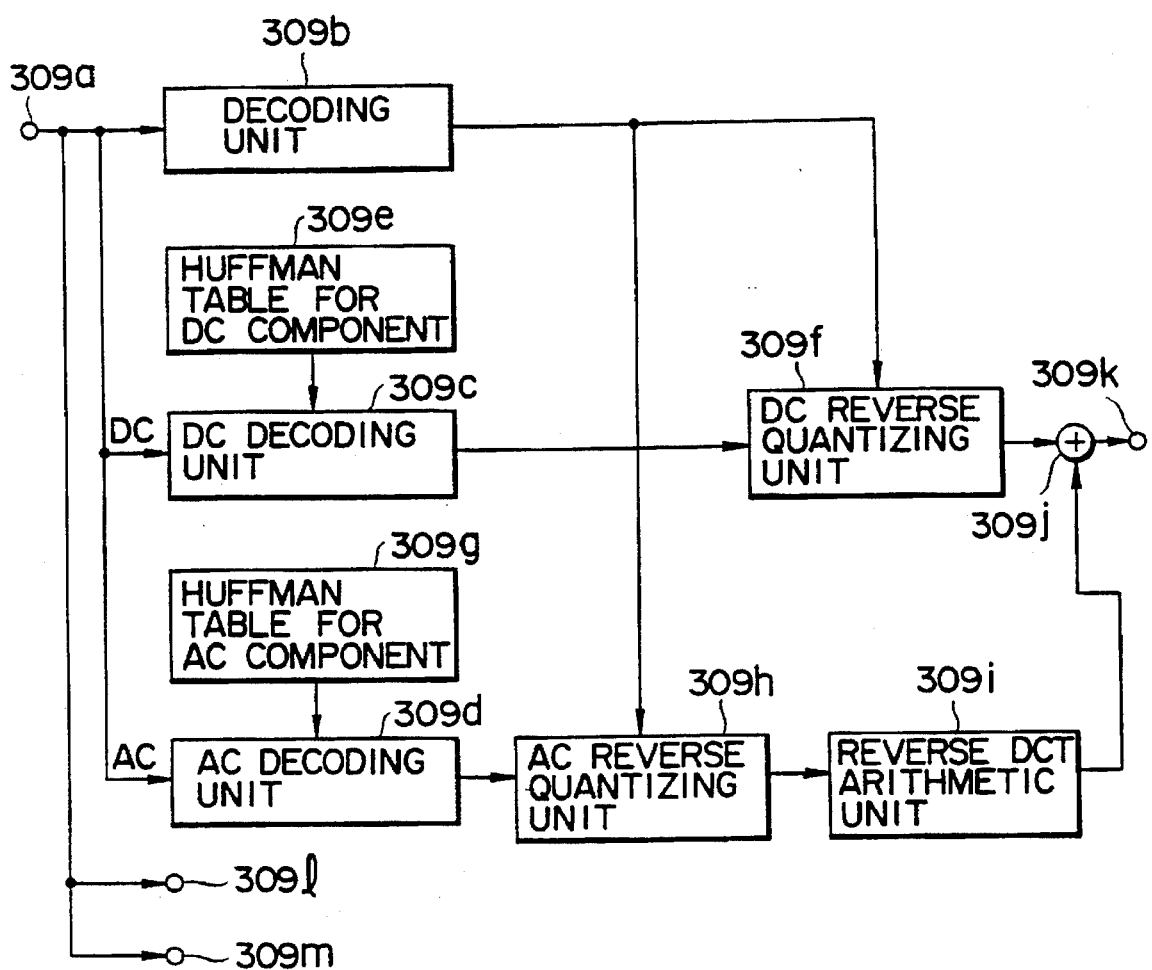
FIG. 33 is a block diagram showing details of a decoding circuit.

FIG. 33 shows the details of a decoding circuit 309 of a reproduction unit 300. That is, the data read out from a memory card 400 is supplied to a decoding part 309b, DC decoding part 309c, and AC decoding part 309d through terminal 309a. Of them the decoding part 309b decodes the header data and reproduces the normalized quantizing table. The DC decoding part 309c reproduces the DC component of digital image data on the basis of the Huffman table 309e for DC component. The reproduced DC component is reversely quantized on the basis of the DC quantizing step reproduced by the decoding part 309b, by the DC reverse decoding device 309f. The AC decoding part 309d reproduces the AC components of digital image data on the basis of the Huffman table for AC component 309g. The reproduced AC component is reversely quantized according to the normalized quantizing table reproduced by the decoding part 309b, by the AC reverse quantizing device 309h, and is subjected to reverse DCT process in the reverse DCT calculator 309i. Succeedingly, the outputs of the DC reverse quantizing device 309f and reverse DCT calculator 309i are summed up in the adder circuit 309j, and digital image data is reproduced, and is supplied to the frame memory 310 through terminal 309k.

Of the data supplied to the terminal 309a, the voice component is supplied to the voice processing circuit 314 through terminal 309l and the character data components such as date and time are supplied to the character generator 311 through terminal 309m.

Record format of memory card

Next is explained the recording method of the digital image and voice data generated by this electronic still camera 11 and delivered through the connector part 219, into the memory main body 403 of the memory card 400. The data quantity of the digital image data for one screen is not constant because it varies with the compression rate and image size. The digital voice data quantity is not constant and is variable with the recording time. Thus, although the data quantity is not constant, the recording region of the memory main body 403 in which the digital image data for composing one screen and digital voice data for composing one continuous voice are recorded is expressed in the unit of packet.

Accordingly, the data recording region in the memory main body 403 is divided into the units of plural cluster possessing a specific recording capacity which is set set smaller than the recording capacity of one packet and the data of one packet is recorded by dividing into several clusters. For example, as shown in FIG. 34, data of one packet is recorded by using three discontinuous clusters 2, 5, 7, out of plural clusters 1, 2 and so forth. The reason of such recording method is that, when, for instance, erasing data of a certain packet and recording data of a packet having a greater data quantity, data can be written into each cluster composing the erased packet, and the overflow portion of the data can be recorded by searching empty clusters, so that the recording region of the memory main body 403 can be used without loss when erasing and editing. However, the maximum number of clusters composing one packet is limited, and the data exceeding the maximum data is recorded in plural packets. Therefore, even a single continuous set of voice data may be recorded by dividing into plural packets if the recording time is long.

In the memory main body 403, one byte is composed of eight bits, and an absolute address is specified in three bytes, and the maximum capacity is $2^{24}$=16 Mbytes (125 Mbits).

The compressed digital image data for one screen is 48 kbytes (384 kbits) in standard, and by dividing by an integer, 8 kbytes (64 kbits) are specified as one cluster. The clusters are numbered in the sequence of physical arrangement of the memory main body 403, and there are 2048 clusters in 128 Mbits. Of them, for the header data, a slightly larger portion than one cluster is used. The packets are numbered in the input sequence, and the number is sequentially forwarded when erased.

The data format of the memory main body 403 is explained while referring to FIG. 35. The absolute addresses (hexadecimal) from "000000" to "0003FF" compose the header area in which the header data is recorded. The header area comprises a format No. recording area of one byte in which "00000001" is recorded in binary notation presently and numbers are given in consideration of the extension of function in the future, a card No. recording area of one byte which can be written by using the editing machine 600 or the like so that the user can control multiple memory cards 400, a card label recording area of 14 bytes in which the user writes the title and others of the memory card 400 by using the editing machine 600 or the like, a used packet number recording area of two bytes which indicates the number of packets already recorded in the memory main body 403, a remaining cluster number recording area of two bytes which indicates the number of clusters not used in the memory main body 403, a used cluster number recording area of two bytes which indicates the number of clusters already recorded in the memory main body 403, a parity check data recording area of one byte which detects a bit error by comparing the results of addition of all data from the format No. recording area to the used cluster number recording area in reproduction so as to record the lower digit 8 bits of the result of addition of all data recorded from the format No. recording area till the used cluster number recording area, and an option data recording area of 1001 bytes for recording intelligent data which is an area in which the user can set freely.

The intelligent data is the operation command to the CPU 221 in the signal processing unit 200, and the CPU 221 reads this operation command, and controls the action of each part as if by program according to to its instruction. This operation command is defined by a code of one byte, and the numerical value indicated by the operation command is expressed by the subsequent two bytes, which includes, for example, specification of shutter speed, specification of stop value, specification of white balance, specification of data compression rate, specification of exposure interval (continuous filming interval), specification of screen number for printout, specification of screen number for reproduction, and specification of time interval of reproduction. Accordingly, for instance, when the operation command for specifying the shutter speed is recorded as the intelligent data, thereafter, when photographing by using the memory card 400, it is possible to take at the specified shutter speed automatically. In the first byte of the option data recording area, meanwhile, a code showing whether the operation command is written or not is written. This code shows there is no operation command 00000000" in hexadecimal notation, and there is operation command if "00000001" in hexadecimal notation.

The absolute addresses (hexadecimal) from "000400" to "0012FF" make up the packet information area for recording the type, attribute and connection information in four bytes. The type of packet is expressed in one byte, and the hexadecimal "00" indicates image information, "01" voice information, and "02" computer data. The packet attribute is indicated in one byte, and the most significant bit (MSB) "1" indicates the write protection to the packet, the second bit from the MSB "1" means the read protection from the packet, the third bit from the MSB "1" indicates the copy protection of the packet data, and the fourth bit from the MSB "1" tells that the packet data has been already filed, for example, in the filing device 500. The lower four bits are not used at the present, but may be used for marking the packet. For example, the data corresponding to the photographer may be recorded, and by searching the data in reproduction, only the pictures taken by the same photographer can be reproduced continuously, or the marking data may be recorded in the packet which may be erased data while photographing, and many other applications may be possible.

The packet connection information is expressed in two bytes, and when the most significant bit (MSB) of the first byte is "1" it means there is a packet to be connected (related) to this packet, and when it is "0" it means there is no packet to be connected (related) to this packet. Besides, in a total of 11 bits comprising lower 3 bits of the first byte and all 8 bits of the second byte, the packet numbers 1 to 1024 to be connected (related) to this packet are expressed. For example, when "10000111, 11111111" are recorded, it means there is a packet to be connected (related) to that packet, and its packet number is 1023.

The connection information of this packet tells the CPU 221 that there are continuous packets when the voice data is recorded in plural packets as mentioned above, so that a continuous sound may be obtained when reproducing, or it is also used to display the packet number in which the image related to the packet recording the voice data is recorded, or to the contrary to display the packet number in which the voice related to the packet recording the image data is recorded.

The absolute addresses (hexadecimal) from "001300" to "001AFF" compose the directory area in which the cluster numbers to start each packet from 1 to 1024 are recorded in two bytes. As mentioned above, one cluster is composed of 8-kbyte data, and the maximum number of clusters is 2048. In this directory area, therefore, 2046 cluster numbers are specified by a total of 12 bits comprising lower 4 bits of the first byte of the two bytes and total 8 bits of the second byte.

The absolute addresses (hexadecimal) from "001B00" to "002AFF" compose a memory allocation table (MAT) area in which cluster numbers succeeding to each cluster are recorded in 2 bytes. In this MAT area, too, 2048 cluster numbers are specified by a total of 12 bits comprising lower 4 bits of the first byte of the two bytes and all 8 bits of the second byte. In the final cluster composing one packet, "1" is recorded in all bits of both bytes.

The absolute address (hexadecimal) from "002B00" to "FFFFFD" composed the packet data area in which actual digital image and voice data are recorded in packet units. Each packet is provided with packet header data. The packet header data, from "00" to "06" of the relative address (hexadecimal) as shown in FIG. 36, compose seven-byte packet information area for expressing the coding method, data compression rate, image mode, number of H (horizontal) pixels and number of v (vertical) pixels.

Of them, the coding method is expressed in one byte of "00" of the relative address (hexadecimal), and it expresses, for the image, the mode without compression by "00000000", the ADPCM system by "00000001", and the ADCT system by "00000010", and, for the voice, the monaural by "00" of upper two bits and the stereo by "01", and the hi-fi system by "000000" of lower six bits, the ADPCM system by "000010", and the ADM system by "001000". The data compression rate is expressed in one byte of "01" by the relative address (hexadecimal), and it expresses, for the image, 4 bit/pel by "00000010", 2 bits/pel by "00000100: and 1 bit/pel by "00001000", and for the voice, 256 kbps by "00000010", 128 kbps by "00000100", 64 kbps by "00001000" and 32 kbps by "00010000".

Furthermore, the image mode is expressed in one byte of "02" of the relative address (hexadecimal), and the upper 2 bits express black and white by "00" and color by "01", while the lower 6 bits express the NTSC by "000001", PAL by "000010" and HD by "000100". The number of H pixels are expressed in two bytes of "03" and "04" of the relative address (hexadecimal), and, for example, 768 pixels are expressed by "00000011, 00000000". The number of V pixels is expressed in two bytes of "05" and "06" of the relative address (hexadecimal).

The packet header data composes 9-byte option area for the user, from "07" to "0F" of the relative address (hexadecimal), and each byte from "10" to "15" is used as the area for recording the year, month, day, hour, minute and second in the BCD code. The relative addresses (hexadecimal) from "16" to "76" is the area for recording the title of the screen set by the user, and the title occupies one byte in ASCII code by one alphanumeric character, or occupies four bytes of shift JIS code by one Chinese character, including an unused state including the meaning of end mark by all "0" in one byte. Besides, after "77" of the relative address (hexadecimal), the actual digital image and voice data are recorded.

The two bytes of "FFFFFE" and "FFFFFF" of the absolute address (hexadecimal) make up the card data recording area in which specific information is recorded in the memory main body 403, and the number of bytes for writing page is recorded in the first byte when the memory main body 403 is EEPROM, and the type of the memory main body 304 and the recording capacity are recorded in the second byte. The content of the card data recording area is preliminarily recorded as fixed data.

In the sound processing circuit 231 of the signal processing unit 200, as shown in FIG. 37, two memories 231a, 231b, switches 231c, 231d for selecting the input and output of these two memories 231a, 231b, and a memory controller 231e for changing over these switches 231c, 231d are disposed. The memory controller 231e is intended to change over the switches 231c, 231d on the basis of the control signal supplied from the CPU 221 to the terminal 231f. The memories 231a, 231b possess the recording capacity for recording the digital voice data for the portion of one packet each.

When 8-bit digital voice data A/D converted at sampling frequency 32 kHz and compressed to 256 kbps is supplied to the terminal 231g, the memory controller 231e, changes over the switch 231c to, for example, the state shown in the drawing, and records in the memory 231b. When the digital voice data for one packet portion is recorded in the memory 231b, the memory controller 231e charges the switch 231c to the reverse state of the drawing, and records the digital voice data in the memory 231a. At this time, the memory controller 231e changes over the switch 231d to the reverse state of the drawing, and the digital voice data is read out from the memory 231b to the card I/F circuit 229. In this case, the digital voice data is converted to the rate of $1/(2+\alpha)$ times of the recording, and is read out.

When the digital voice data for the portion of one packet is recorded in the memory 231a, the memory controller 231e changes the switch 231c to the state shown in the drawing, and records the digital voice data in the memory 231b. At this time, the memory controller 231e changes the switch 231d to the state shown in the drawing, and the digital voice data is read out from the memory 231a into the card I/F circuit 229 at a speed of $1/(2+\alpha)$ times of the recording. That is, the digital voice data is alternately recorded, by one packet each, into the two memories 231a, 231b, and is read out from the memory 231a or 231b whichever is not being written, into the card I/F circuit 229 at a speed of $1/(2+\alpha)$ times of the recording, and is recorded in the memory card 400.

Figure 38:
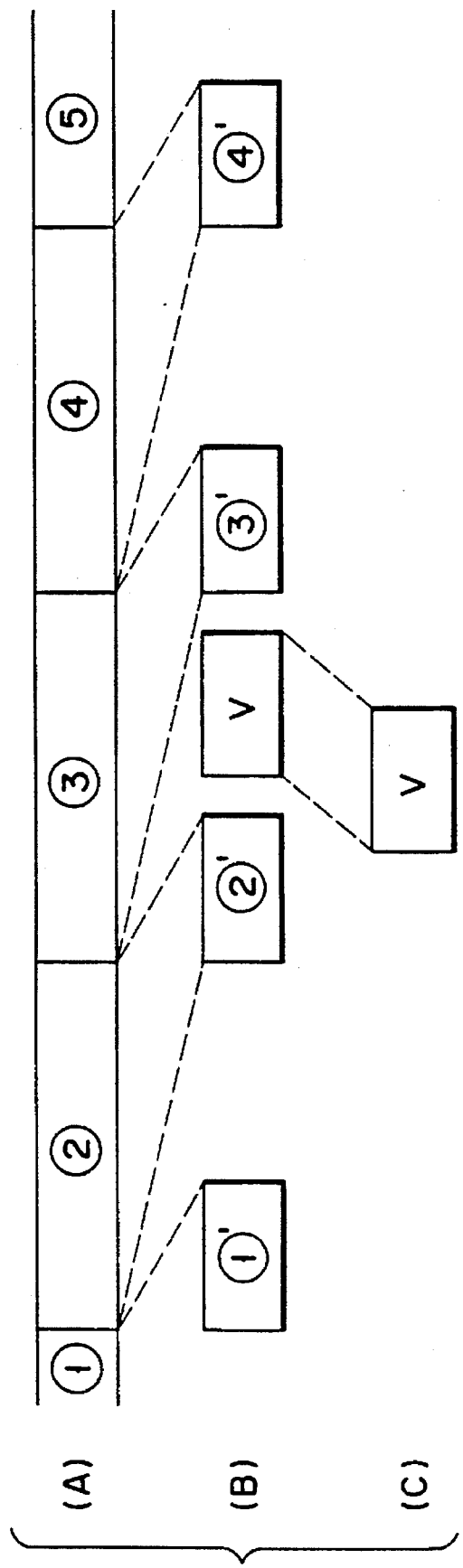
FIG. 38A to FIG. 38C are diagrams for explaining the data recording methods.

In this way, the voice data rows 1, 2, 3, 4, 5 and so forth of the packet unit possessing the time length as shown in FIG. 38A initially are recorded in the memory card 400 as the voice data rows 1', 2', 3', 4' and so forth compressed in the time axis as shown in FIG. 38B. Therefore, if photographed in the midst of continuous recording by dispersing the voice into plural packets, there is enough time to record the digital image data obtained at this time into the voice data rows 1', 2', 3', 4' and so forth into the memory card 400 in the process of recording. For example, when the digital image data is obtained at the timing shown in FIG. 38, the image data can be written between the voice data 2' and 3' as shown in FIG. 38.

Therefore, the digital image data V is not recorded as being deviated in time from the taken moment, for example, recorded after finishing recording of all voice data, and the taken image can be viewed when reaching the voice that had been heard at the time of taking, when reproducing. In this case, The packets recording the voice data 1', 2', 3', 4' ..., and the packets recording the image data v are provided with the connection information for showing mutual connection (relation) as mentioned above, in the individual packet information areas.

In the example shown in FIG. 38, the packet number of voice data 1' is specified in the packet of voice data 2', and the connection information telling that the packet of the voice data 1' is connected is attached, and the packet number of voice data 2' is specified to the packet of the image data v, and the connection information telling that it is not connected is attached to the packet of the voice data 2', and the packet number of voice data 3' is specified to the packet of the voice data 2', and the connection information to be connected is attached to the packet of the voice data 2'. Thus all of voice data 1', 2', 3', 4' ... are reproduced continuously, while the image data v is not connected with other packets, and since the packet number of the voice data 2' is specified, it is read out and reproduced after the voice data 2' is read out.

Structure, operation of electronic still camera

Functions and operations of the electronic still camera 11 are described in detail below together with the handling procedure. In FIG. 39A and FIG. 39B, in step S1, when the power source is turned on by setting the power and record/reproduction selector switch 204 to REC position, the CPU 221 resets the system in step S2, and detects loading of the memory card 400 in step S3. In step S4, when the CPU 221 judges that the memory card 400 is loaded (YES), it reads the header data from the memory card 400 in step S5, and detects, in step S6, the mode setting states determined in the remote control operation part, as well as the mode dial 202 and mode setting switch 204, except for the operation of the release 201, which is part of the pre-exposure conditions.

The CPU 221 gives priority to the condition of the intelligent data, if there is intelligent data in the header data of the memory card 400, in spite of the mode condition priorly set by the switch. In step S4, if the CPU 221 judges that the memory card 400 is not loaded (NO), the operation directly advances to step S6, thereby detecting the mode setting state.

Afterwards, the CPU 221, in step S7, checks the clock circuit 235 to take in the information of date and time, and checks, in step S8, that the voltage of the battery 236 is at the level capable of being presented to photography or reproduction. In step S9, the CPU 221 judges whether the recording mode or reproduction mode, whether single filming or continuous filming, whether multiple exposure or not, whether intelligent data or not, and other pre-exposure conditions, and displays, in step S10, the set content in the liquid crystal display part 203. In step S11, the CPU 221 detects again the loading of the memory card 400. In step S12, if the CPU 22i judges that the memory card 400 is not loaded (NO), the operation returns to step S6, and when judged YES, the loading of the memory card 400 is detected again in step S13.

This duplicated detection of loading of memory card 400 is intended to cope with the case when the memory card 400 once loaded is removed and other memory card 400 is loaded, in order to read the header data of the newly installed memory card 400. That is, when the CPU 221 judges, in step S14, that the memory card 400 is loaded (YES), the operation goes to step S5, and the header data is read, and when Judged NO, the operation goes go step S6. In this way, in the power fed state, the loop from step S4 to step S14 shown in the flow chart of FIG. 39A and FIG. 39B is repeatedly recycled.

When the release 201 is pressed, an interruption is placed in the CPU 221, and the photographic operation begins. Or the release action is also effected by the remote control operation unit, and in this case, too, an interruption is set in the CPU 221, and the photographic operation is put in effect. In this case, as shown in FIG. 40, when the CPU 221 detects the input data by the remote control operation unit in step S15, it checks the input data in step S16, and when the release operation is judged (YES) in step S17, the photographic process is started in step S18. Or when Judged not to be release operation in step S17 (NO), in step S19, the operation goes to step S6, thereby returning to the loop shown in FIG. 39A and FIG. 39B.

Figure 41B:
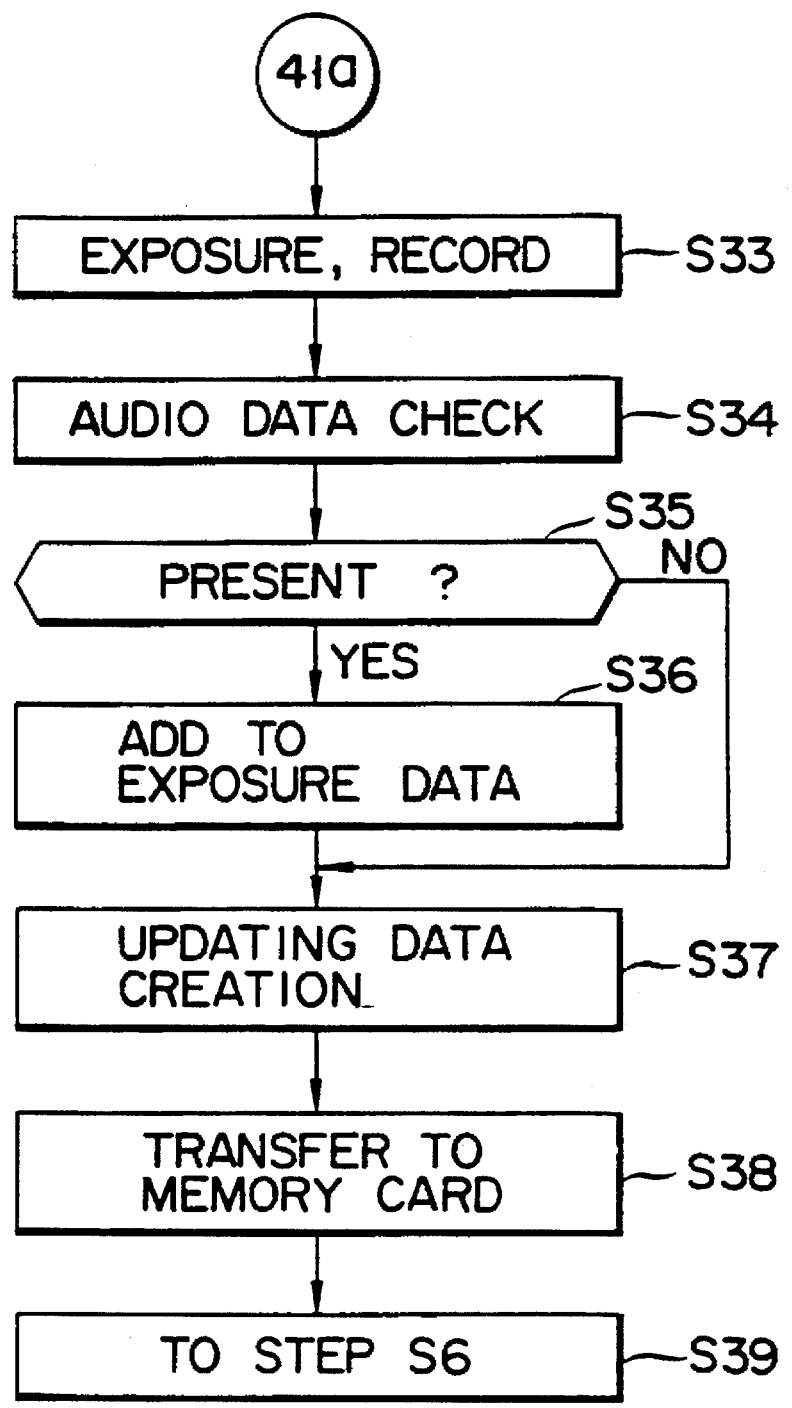

The photographic process is explained below. In FIG. 41A and FIG. 41B, when the release 201 is pressed in step S20, or when the release is effected by the remote control operation unit, in step S21, the CPU 221 checks the remainder of the recording capacity of the memory card 400, and, in step S22, if recording is not OK (NO), the photography is disabled once in step S23. If recording is OK (YES) in step S22, the CPU 221, in the first step of operation of pressing the release button 201 lightly, kicks up the mirror 208 in step S25, and actuates the AE, AF and AWB functions in steps S25, S26, S27, respectively, thereby automatically setting the diaphragm, focus and white balance.

Afterwards, in step S28, the CPU 221 checks the input state of the release 201, and in step S29, it judges whether the operation is in the second step of pressing the release button 201 deeper. If NO, in step S30, the CPU 201 judges if the operation is in the first step of pressing the release button 201 lightly, and if NO, the photography is disabled in step S31, and if it is in the first step operation (YES), the operation returns to step S28. Meanwhile, in step S29, if the release 201 is judged to be in the second step (YES), the CPU 221 judges, in step S32, whether recording mode or reproduction mode, whether single filming or continuous filming, whether multiple exposure or not, whether intelligent data or not, and checks other pre-exposure conditions again, and executes photography in step S33, and records the obtained digital image data by. dispersing, retrieving the empty clusters in the memory card 400.

Next, in step S34, the CPU. 221 checks the presence or absence of voice data, and it judged to present in step S35 (YES), it sends out, in step S36, the digital voice data to the memory card 400, and adds to the digital image card in the memory card 400 and records. Then, in step S37, corresponding to recording of digital image and voice data in the memory card 400, the CPU 221 generates the data to be updated in the header area, packet information area, directory area, and MAT area, and transfer to the memory card 400 and record in step S38, and then the operation returns to step S6 in step S39. If judged to be absent (YES) in step S35, the CPU 221 directly moves to step S37, and generates header data. In this photographic process action, if the diaphragm, focus and white balance have been specified by the intelligent data, the CPU 221 sets the diaphragm, focus and white balance according to the instruction of the intelligent data.

Figure 42A:
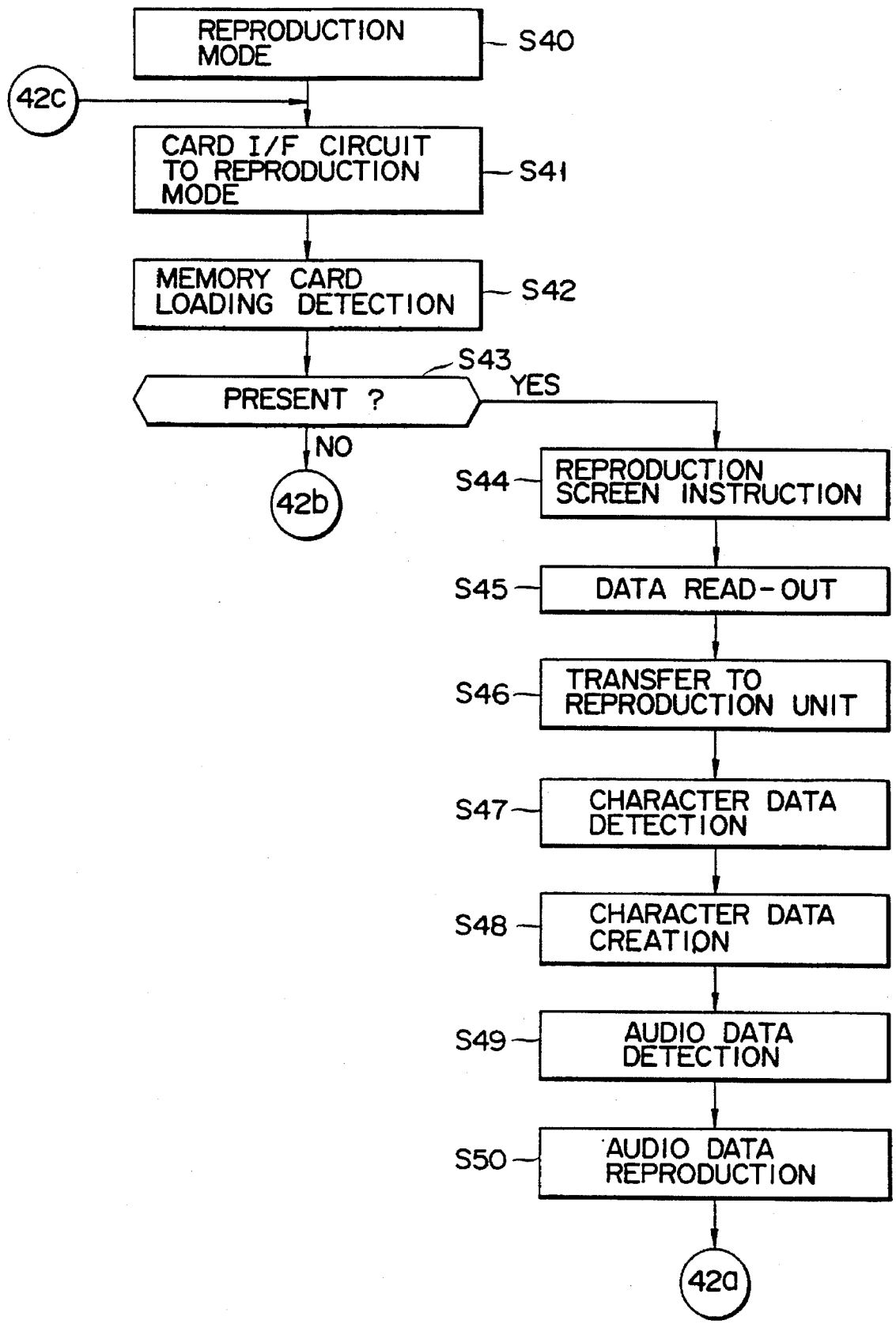

The reproduction action in the reproduction unit 300 is explained by referring to FIG. 42A and FIG. 42B. First, in step S40, when the power and record/reproduction selector 204 is set to PLAY position and the CPU 221 is set in reproduction mode, the CPU 221 sets the card I/F circuit 229 in the reproduction mode in step S41, and detects loading of memory card 400 in step S42. Then, in step S43, when the CPU 221 judges that the memory card 400 is loaded (YES), it accepts in step S44 the indication data (packet number) of the screen to be reproduced, specified by the user by manipulating the screen feed switch 302 of the reproduction unit 300, and reads out in step S45 the digital image data of the screen specified from the memory card 400, and transfers the digital image data in step S46 to the reproduction unit to be reproduced.

At this time, the digital image data read out from the memory card 400 is sent to the character generator 310 in step S47 and the character data portion is detected, and in step S48 the character data is created, and the image is displayed together with the digital image data. Afterwards, in step S49, the voice data is detected by the voice processing circuit 314, and the voice is reproduced in step S50. In consequence, the CPU 221 checks the operation state of the screen feed switch 302 of the reproduction unit 300 in step S51, and when step-up is requested in step S52 (YES), the indicated data on the screen (packet number) is increased (+1) in step S53, and when not requested (NO), the indicated data on the screen (packet number) is decreased (−1) in step S54, and it is checked whether the reproduction mode is continued in step S55. Meanwhile, if the CPU 221 judges that the memory card 400 is not loaded in step S43 (NO), the operation directly goes to step S55. In step S56, when the reproduction is requested (YES), the CPU 221 is returned to step S41, and if not requested (NO), it is terminated (step S57).

The operation of the AE function is described below. In FIG. 43, when started (step S58), the CPU 221 detects the output of the AE sensor in step S59, and judges presence or absence of request of multiple exposure in step S60, and if not requested (NO), an approximate AE default value is set in step S61. Then, in step S62, the CPU 221 once opens the shutter 111 to take in an optical image, and detects the levels of signals of R, G, B in step S63, and checks the signal levels in step S64, and when it Judges that the level is not proper (NO) in step S65, it sets the AE again in step S65, thereby returning to step S62. When the level is judged to be proper (YES) in step S65, the CPU 221 detects the correction information by manual operation in step S67.

Meanwhile, in step S60, if the multiple exposure is requested (YES), the CPU 221 is set in the multiple exposure mode in step S68, and when the multiple exposure count k is set in step S69, exposures are taken k times in step S70, thereby transferring to step S67. When the correction information is detected in step S67, the CPU 221 manually corrects the automatically set AE value in step S71, thereby finishing the AE setting (step S72). In this case, the correction of AE value is possible by ±2 Ev in the ½ step unit, with respect to the automatically set AE value. That is, by turning the mode dial 202, the value changes cyclinically from 0 Ev to +0.5 Ev, +1 Ev, +1.5 Ev, +2 Ev, -2 Ev, -1.5 Ev, -1 Ev and -0.5 Ev, so that a desired correction value can be selected.

Next is explained the operation of the AWB function. In FIG. 44, when started (step S73), the CPU 221 detects the external light in step S74. This external light detection is effected by a WB sensor which is not shown, for example, for WB setting. Afterwards, in step S75, the CPU 221 checks that the WB adjustment mode is requested, and judges if WB or not in step S76. If AWB (YES), the CPU 221 spuriously opens the shutter 111 in step S77 to take in an optical image, and detects the levels of signals of R, G, B in step S78, checks the signal level in step S79, and if it Judges that the level is not proper (NO) in step S80, it sets the WB again in step S81, thereby returning to step S77. If the level is Judged to be proper (YES) in step S80, the CPU 221 detects the correction information by manual operation in step S82.

In step S76, if AWB is not requested (YES), the user sets the WB by manual operation in step S83. The setting of WB by this manual operation is effected by turning the mode dial 202 to change the WB value cyclically from AUTO, fine, cloudy, room light, and fluorescent lamp, so that the desired WB value can be selected. When the manual setting is over, the operation advances to step S82. In step S82, when the correction information is detected, the CPU 221 manually corrects the WB value once set automatically or manually in step S84, and the WB setting is over (step S85). In this case, the WB value can be corrected by ±2000 k in 1000 k unit with respect to the WB value set automatically or manually. That is, by turning the mode dial 202, the value changes cyclically from +1000 k to +2000 k, -2000 k and -1000 k, so that a desired correction value can be selected.

Automatic setting of data compression rate is shown below. In FIG. 45A and FIG. 45B, when started (step S86), the CPU 221 detects the remainder of the memory card 400 in step S87, detects the data compression rate set by the compression coding circuit 228 in step S88, and compares the both detections in step S89. Then the CPU 221 judges whether recording is possible in the memory card 400 or not in step S90, and if impossible (NO), the data compression rate of the compression coding circuit 228 is changed to a data compression rate capable of recording in the remainder of the memory card 400 in step S91, and the number of DC bits of the compression coding circuit 228 is detected in step S92. If Judged to be possible (YES) in step S90, the operation direct goes to step S92.

This step S92 is intended to know the minimum number of bits that can be compressed with respect to the digital image data, and the CPU 221 compares, in step S93, this minimum number of bits with the data compression rate changed in step S91, and judges if the data compression rate is all right or not in step S94. If NO in step S94, the CPU 221 generates an instruction telling impossibility of taking a photograph to the warning display part 203j in step S95, and if OK (YES), it checks the S/N calculated in the compression coding circuit 228 in step S96. Later, the CPU 221 compares the S/N with the threshold level in step S97, and if OK (YES) in step S98, the pre-exposure process is started in step S99, and otherwise (NO), the data compression rate is lowered in step S100, and the photograph is taken again in step S101.

This data compression rate can be also set by manual operation, but its means is explained above and is omitted herein.

Figure 46:
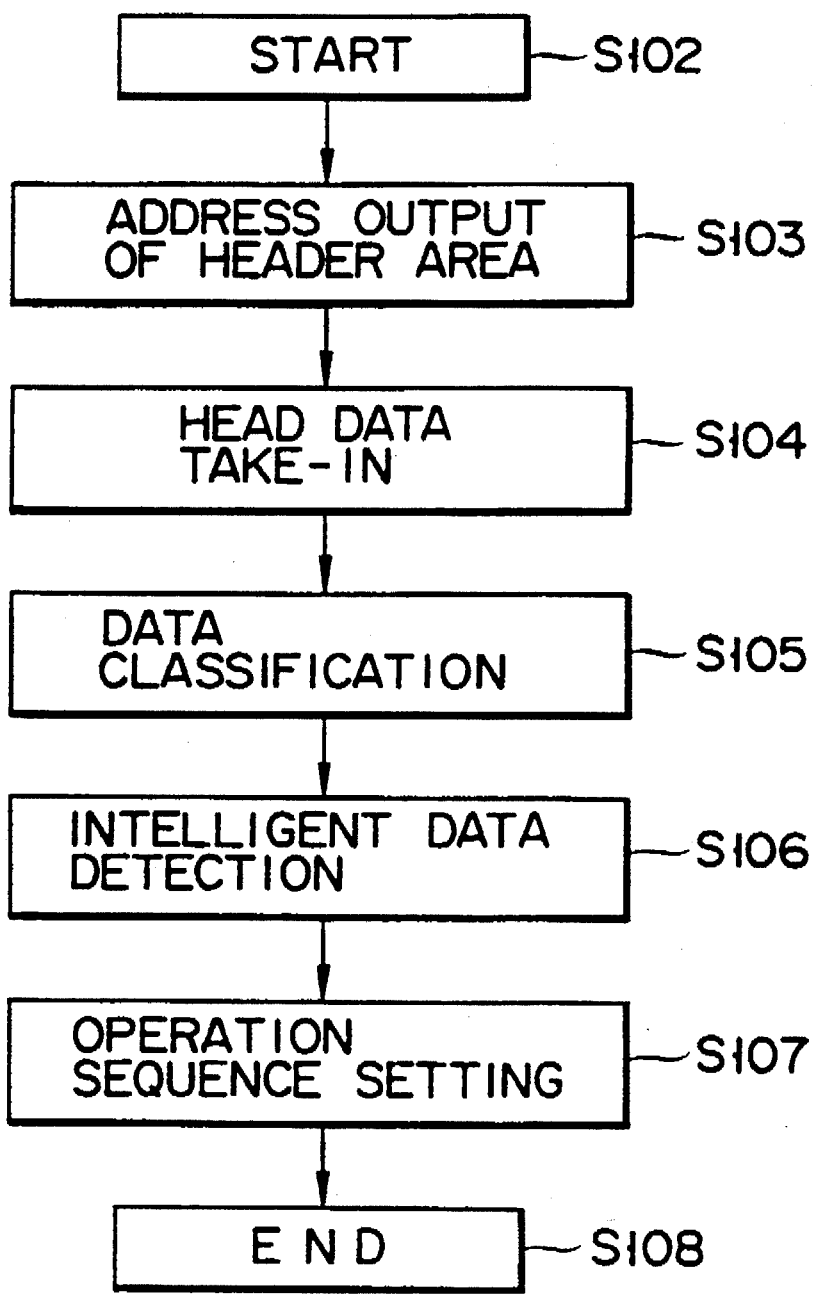
FIG. 46 is a flow chart for explaining the operation of detection of an intelligent data of an electronic still camera.

The take-in process of header data in step S55 is described in detail below. As shown in FIG. 46, when started (step S102), the CPU 221 first reads in the data of the card area, and delivers, in step S103, the addresses (hexadecimal) "000000" to "0000FF" of the header area, and takes in the header data in step S104. Then, in step S105, the CPU 221 classifies the data into format No., card No., etc., and detects the intelligent data by reading the content of the first byte of the option data recording area in step S106, and sets the operation sequence, that is, the pre-exposure condition on the basis of the intelligent data in step S107, thereby terminating (step S108).

Figure 47:
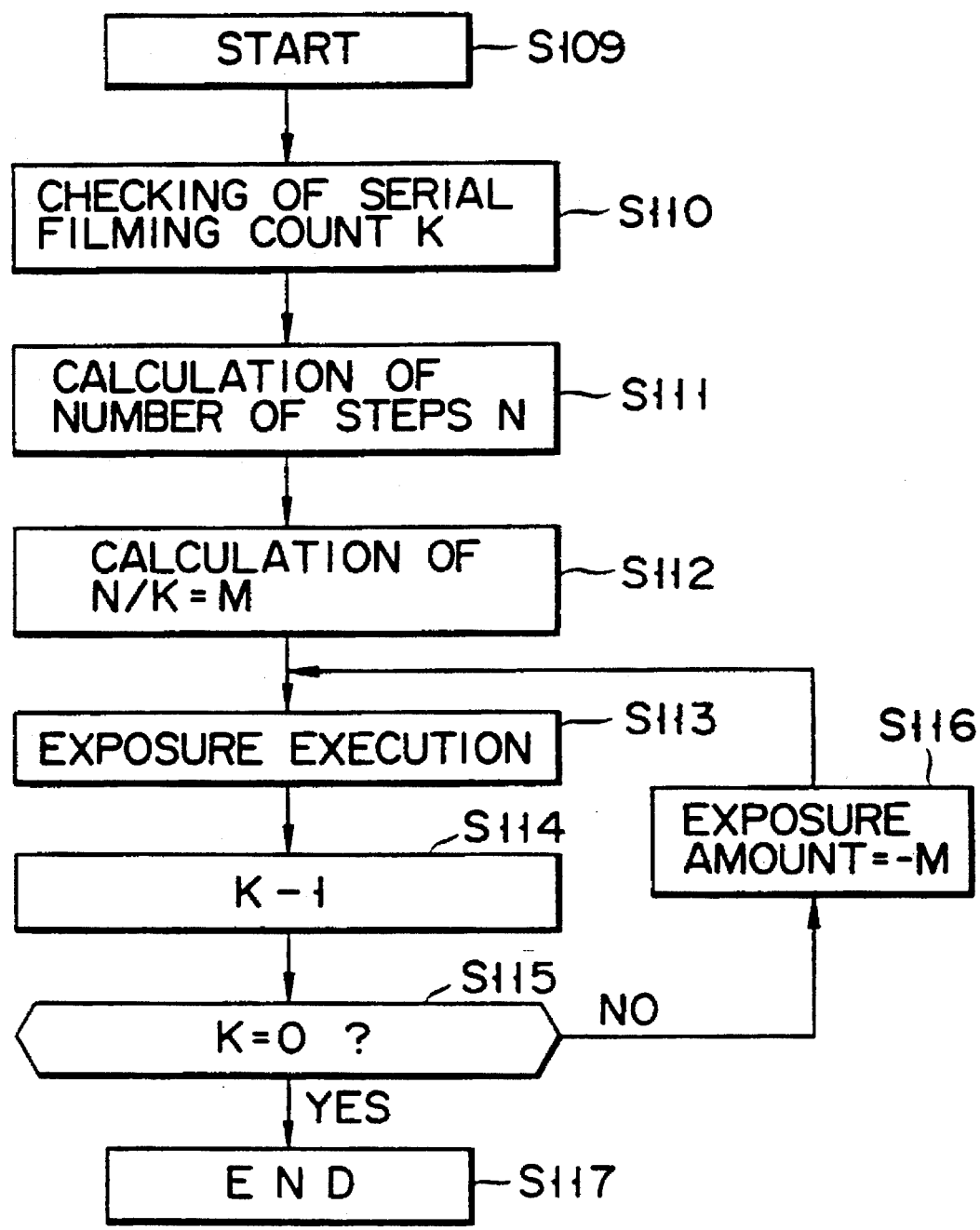
FIG. 47 is a flow chart for explaining an example of an intelligent function of an electronic still camera.

The operation on the basis of intelligent data is described below. An example of 10 continuous exposures with fade-out is shown. As shown in FIG. 47, when started (step S109), the CPU 221 checks the continuous filming count k (10, in this case) in step S110, and calculates the number of steps N from the present AE set value until reaching the final minimum exposure dose in step S111, and calculates N/K, that is, the exposure dose M to be stopped in every exposure in step S112. Then the CPU 221 executes photography in step S113, and decreases (-1) the continuous filming count k in step S114, and Judges if the continuous filming count k becomes 0 or not in step S115. When the continuous filming count k is not 0 (NO), the CPU 221 reduces the exposure dose by -M to return to step S113, and when the continuous filming count k becomes 0 (YES), it is terminated (step S117).

Figure 48:
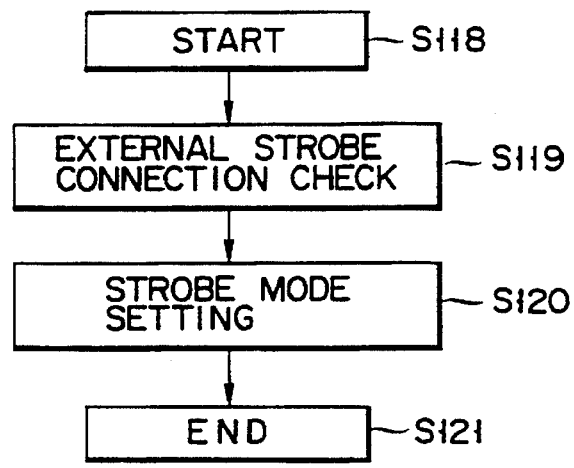
FIG. 48 is a flow chart for explaining a strobe function of an electronic still camera.

When an external strobe is mounted on the photographic unit 100, the operation is explained by referring to FIG. 48. When started up (step S118), the CPU 221 checks that the external strobe is connected in step S119, and requests the setting of the strobe mode to the user in step S120, and ends (step S121). Here, the strobe mode is actually available in four modes, AUTO mode for illuminating the built-in strobe 103 automatically when manipulating the release 201 depending on the surrounding brightness, STOP mode for not illuminating the built-in strobe 103, DOUBLE mode for illuminating the built-in strobe 103 and external strobe simultaneously, and ALT (alternating) mode for illuminating the built-in strobe 103 and external strobe alternately at every strobe exposure, which are selected by the mode dial 202.

Figure 49:
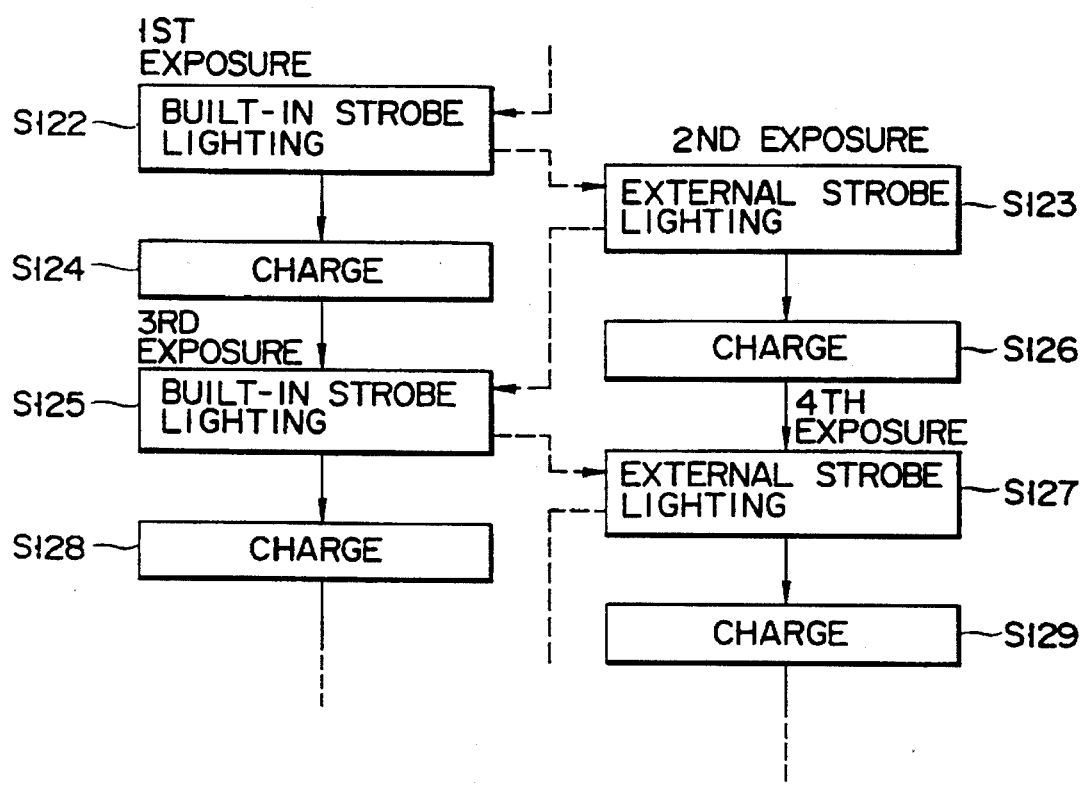
FIG. 49 is a flow chart for explaining an example of the same strobe function.

Specifically, the ALT mode is suited, for example, to continuous filming, and, as shown in FIG. 49, in step S122 for the first exposure, the built-in strobe 103 is illuminated. In step S123 for the second exposure, the external strobe is illuminated, and in this period, in step S124, the built-in strobe 103 is charged. Then, in step S125 for the third exposure, the built-in strobe 103 is illuminated, while the external strobe is charged in step S126. Furthermore, in step S127 for the fourth exposure, the external strobe is illuminated, while the built-in strobe 103 is charged in step S128. In this way, by illuminating the built-in strobe 103 and external strobe alternately at every exposure, the strobe can be used even in high speed continuous filming.

This electronic still camera 11 moreover comprises the re-take function, memory initializing function, self-timer function, mis-erasure restoration function and electronic buzzer function. In the re-take function, for example, when plural pictures are taken by fixing the electronic still camera 11 on a tripod, only the specified picture can be taken once more. The memory initializing function is to erase and initialize all content of the memory card 400. The self-timer function is same as conventional, and when this function is set, the picture is taken 10 seconds later. In this case, using a liquid crystal indicator, it lights in the first 7 seconds after setting, and flickers in the remaining 3 seconds.

The mis-erasure restoration function is to restore the content of the initialized memory card 400, even if the content of the memory card 400 is initialized by the memory initializing function, unless new digital image or voice data is recorded in the same memory card 400 or the memory card 400 is replaced. In other words, when initialized, the header data is read out from the memory card 400, and recorded in the memory in the signal processing unit 200, and only the header data is erased in the memory card 400. In this way, when restoration is requested, by recording the header data in the memory again into the memory card 400, the memory card 400 can be restored. The electronic buzzer function is to sound the built-in electronic buzzer when an alarm is displayed by the warning display part 203j or when the shutter 111 is released by the self-timer.

Figure 50:
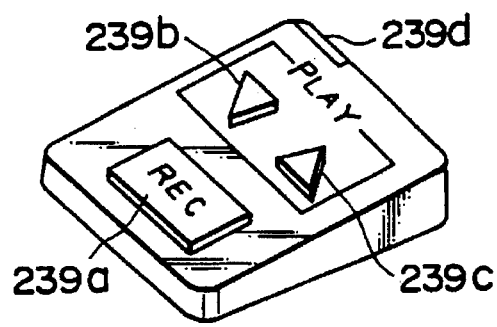
FIG. 50 is a perspective view showing the remote control operation part of an electronic still camera.

In the remote control function mentioned above, it is explained that the release operation and mode setting operation can be done by the remote control operation part, and actually the remote control operation part possesses, as shown in FIG. 50, only REC switch 239a, and two play switches 239b, 239c. That is, when the power and record/reproduction selector 204 of the signal processing unit 200 is at REC position, the picture is taken by manipulating the REC switch 239a. Or when the selector 204 is at PLAY position, the screen is fed in the normal or reverse direction by selectively mainpulating the play switch 239b or 239c. Accordingly, all mode settings are done by the switches at the signal processing unit 200 side. In the drawing, 239d denotes the infrared ray emitting part.

Structure of filing device

Figure 51:
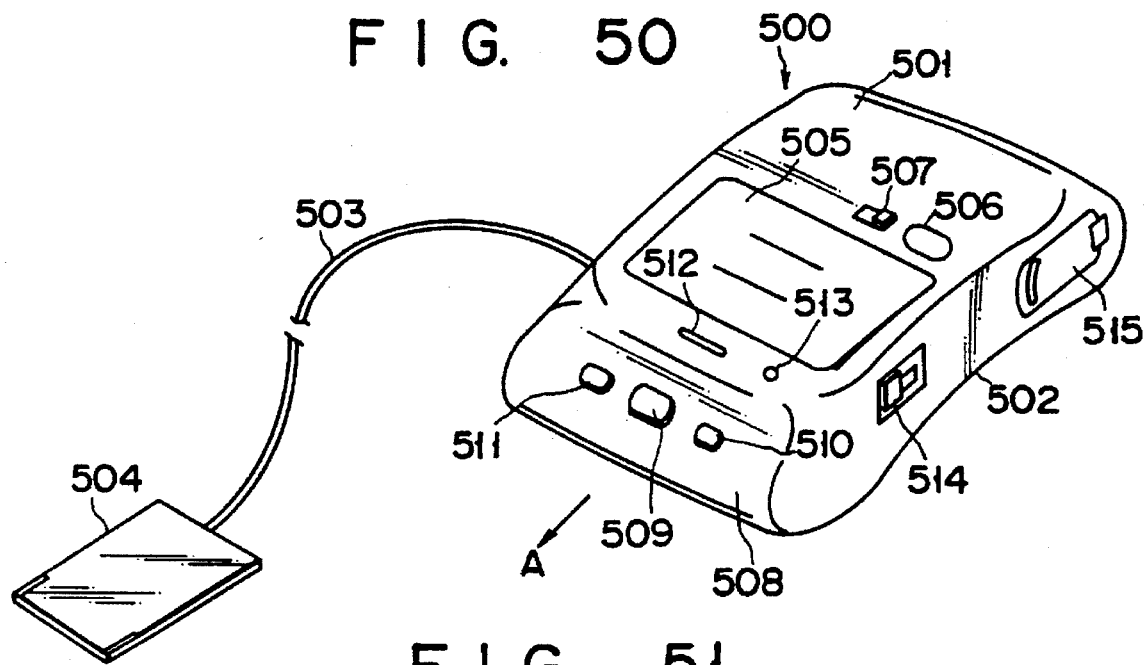
FIG. 51 and FIG. 52 are perspective view and side view showing the appearance of a filing device.

So far, the electronic still camera 11 and memory card 400 have been described in detail, and the filing device 500 is explained below. This filing device 500 is, as mentioned earlier, a digital audio tape recorder, and its main body 501 is reduced in size for portable use as shown in FIG. 51. In portable use, the main body 501 is put in a furnished holder which is not shown in the drawing, and is attached to the belt of the user or the like so that the arrow direction A may be upward. The bottom 502 of the main body 501 is curved in a concave shape so as to fit the user comfortably in portable use.

This filing device 500 is electrically connected to the electronic still camera 11, by fitting the card type connector 504 connected to the front end of the connector cord 503 extended from the main body 501 to the insertion part 206 of the signal processing unit. Accordingly, the filing device 400 can record the digital image and voice data obtained from the electronic still camera 11 into a tape which is not shown, and the digital image and voice data obtained by reproducing the tape can be reproduced in the reproduction unit 300. In the filing device 500, the card type connector 504 can be also installed in the editing machine 600, and data dan be exchanged with various external devices through the editing machine 600. Almost all necessary operations for recording and reproducing of the filing device 500 are designed to be effected at the electronic still camera 11, editing machine 600 and external device side, and the number of operating elements disposed at the main body 501 is extremely small, and reduction of size and weight is promoted.

Approximately in the central part of the main body 501, a cassette lid 505 is openably supported, so that the tape cassette not shown in the drawing can be loaded and unloaded. This cassette lid 505 is integrally provided with a holder (not shown) on its back side for loading the tape by holding the tape cassette. Near the cassette lid 505, there is an eject switch 506 for opening the cassette lid 505 in closed state, and near the eject switch 506 is disposed an eject lock switch 507 for protecting against opening the cassette lid 505 even if the eject switch 506 is manipulated by mistake during recording or reproducing of tape.

At the end part in the direction of arrow A in the drawing of the main body 501, a slope 508 is formed, and record switch 509, flag key 510 and division mark key 511 are disposed in this slope 508. Since the record switch 509, flag key 510 and division mark key 511 are disposed on the slope 508, they are easy to operate in portable use. The record switch 509 is to start recording action on the tape by setting the CPU which is not shown in the main body 501 in the record mode, but while the card type connector 504 is connected to the electronic still camera 11, the data can be automatically recorded in the tape when the release switch 201 is operated unless the record switch 509 is manipulated.

The flag key 510 is to add specified flag data to the digital image data obtained by photographing, by manipulating on the photographing point. The flag data is to be recorded in the header area of the memory card 400 (for example, lower 4 bits of the byte showing the attribute of the packet in the packet information area) or the sub-code area of the digital audio tape recorder, and it can be used in free application by the user because only the digital image data with or without flag data can be detected when reproducing or when editing. The flag data may be designed to indicate on the screen as a shape mark, such as o and x, when reproducing the digital image data.

The division mark key 511 is used when the object of photograph or date is changed, so that division data can be added to the final section of a series of digital image data obtained so far by photographing. The division data is to be recorded nearly in the same position as the flag data, and a desired image can be easily taken out, for example, by researching the image with the division data when reproducing.

The main body 501 also possesses a wait display part 512 and a power display part 513 between the cassette lid 505 and the slope 508. The wait display part 512 is to display the waiting state by lighting or flickering when the operation of the filing device 500 is not in time and recording is disabled due to the relation of the data transfer rate, while recording the digital image and voice data obtained from the electronic still camera 11. The power display part 513 lights up when the power switch 514 disposed at one side of the main body 501 is turned on, and flickers to indicate when the electric power of the battery not shown in the drawing in the battery compartment 515 disposed at the same side of the main body 501 is consumed.

Figure 52:
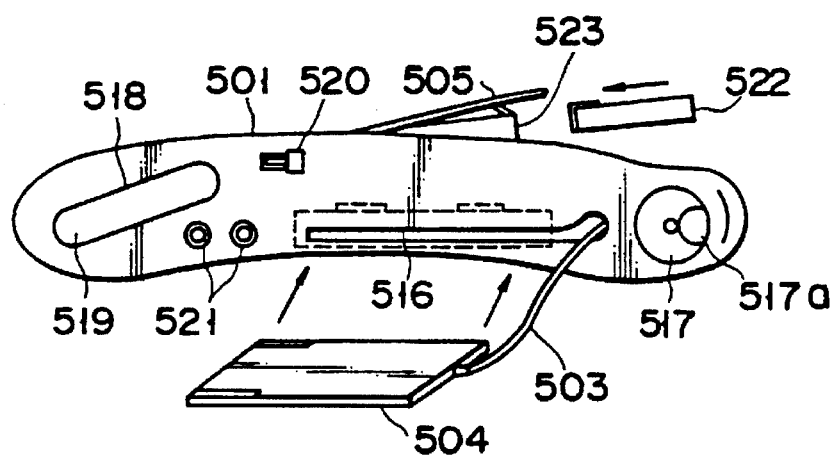

At the other side of the main body 501, as shown in FIG. 52, there is a housing inlet for accommodating the connector cord 503 and card type connector 504 in the main body 501. To store the card type connector 504 in the main body 501, the longer side of the card type connector 504 is inserted into the housing inlet 516, so that the space in the main body 501 is utilized efficiently, while the card type connector 504 is easily put in and taken out. The connector cord 503 is wound up as the user inserts a finger into the hole 517a of the take-up operation unit 517 and turns in the direction of the arrow, and is put into the main body 501. Therefore, the extending portion of the connector cord 503 may be adjusted to a convenient length.

At the same side of the main body 501, there is a connector part 518 which is connected through a cord which is not shown to the connector part 123 for delivering the digital image data of uncompressed components R, G, B disposed in the triple disc pickup unit 100b, so as to take in the digital image data of uncompressed components R, G, B delivered from the connector part 123 of the triple disc pickup unit 100b through this connector part 518. When the connector part 518 is not used, it is closed by a lid 519.

Near this connector part 518, an input changeover switch 520 is disposed. The input changeover switch 520 is to select to record the data supplied through whether the card type connector 504 or the connector part 518, when the card type connector 504 is connected to the insertion part 206 of the signal processing unit 200, and the connector part 518 is connected to the connector part 123 of the triple disc pickup unit 100b. At the same side of the main body 501, there is a connector 521 for leading out the digital image and voice data obtained by reproducing the tape to outside. In FIG. 52, numeral 522 is a tape cassette, and 523 is a holder of the tape cassette 522.

Signal system of filing device

The signal system of the filing device 500 is described below. The signal system of this filing device 500 relates to the mutual signal transmission means between the main body 501 and the card type connector 504, and two methods are considered as shown in FIG. 53 and FIG. 54. What is shown in FIG. 53 is a method in which the data delivered from the electronic still camera 11 and supplied into the card type connector 504 is delivered through the buffer part 504a in the card type connector 504, and is directly sent out into the camera I/F part 501a built in the main body 501 parallel through the connector cord 503 in parallel composition, and is recorded in the tape by the control part 501b for digital audio tape recorder and the mechanism part 501c disposed in the main body 501. When reproducing, the data obtained by reproducing the tape by the control part 501b and the mechanism part 501c is delivered parallel to the buffer part 504a through the camera I/F part 501a and connector cord 503, and is reproduced in the reproduction unit 300.

In this method, many signal wires are needed for composing the connector cord 503 for connecting between the main body 501 and the card type connector 504, but the advantage is that the same CPU can be shared by the camera I/F part 501a and the control part 501b.

What is shown in FIG. 54 is the intelligent type of the card type connector 504 composed of camera I/F part 504b and serial data control part 504c, in which the data delivered from the electronic still camera 11 and supplied into the card type connector 504 is converted into serial data and delivered in the serial data control part 504c through the camera I/F part 504b, and is sent out into the serial data control part 501d built in the main body 501 serially through the connector cord 503 in serial composition, and is recorded in the tape by the control part 501b and mechanism part 501c. When reproducing, the data obtained by reproducing the tape by the control part 501b and mechanism part 501c is delivered to the serial data control part 504c serially through the serial data control part 501d and connector cord 503, and is reproduced in the reproduction unit 300. In this case, the data transfer between the card type connector 504 and the main body 501 is completely different from the data transfer between the electronic still camera 11 and the memory card 400, and is executed in the predetermined serial transfer protocol and command data protocol.

In this method, the number of circuits increases and it is disadvantageous economically, but the number of signal wires is small for composing the connector cord 503. Meanwhile by the radio system utilizing the infrared rays, data transfer between the card type connector 504 and the main body 501 is, needless to say, realized easily by installing the transmission and reception parts individually in the card type connector 504 and the main body 501.

Figure 55:
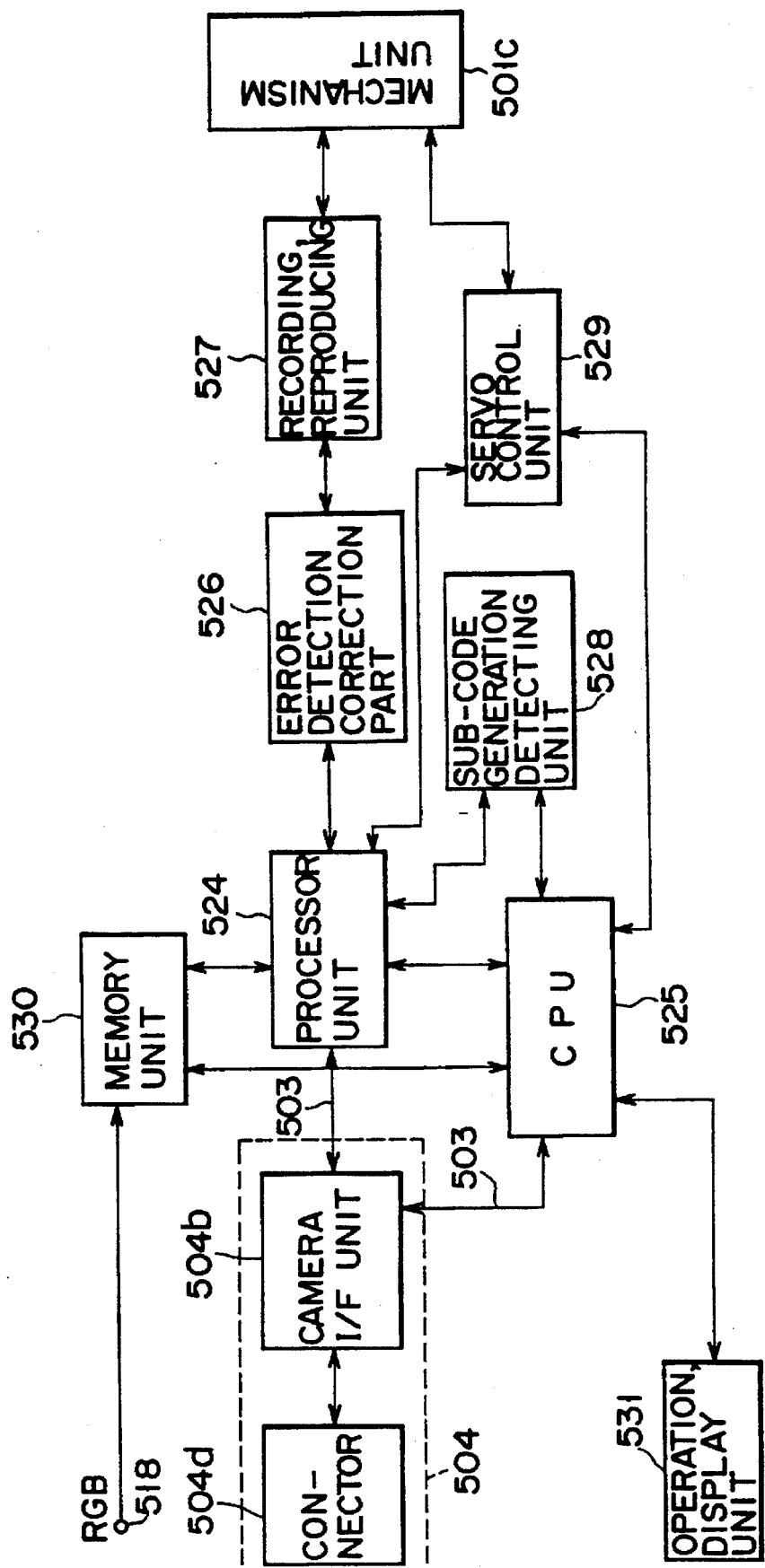
FIG. 55 is a block diagram showing a signal system of a filing device.

FIG. 55 shows the details of the signal system of the filing device 500 according to the method shown in FIG. 54. That is, the card type connector 504 is provided with the connector 504d which is connected with a terminal not shown disposed in the card holder 219 of the signal processing unit 200, and this connector 504d is connected to the camera I/F part 504b. In FIG. 55, incidentally, the serial data control part 504c is omitted for the sake of simplicity.

First, when recording, the digital image and voice data delivered from the electronic still camera 11 is supplied to the connector 504d in a form accompanied by various control data. The data supplied to this connector 504d is delivered from the card type connector 504 through the camera I/F part 504b, and is sent out to the main body 501 serially through the camera I/F part 504b. The image and voice data components are supplied to the processor part 524, while the control data components are supplied to the CPU 525. As a result, the CPU 525 controls the processor part 524 on the basis of the control data, and the digital image and voice data are supplied into the mechanism part 501c through the processor part 524, error detection/correction part 526 and recording/reproduction part 527, and recorded in the tape.

At this time, the CPU 525 generates sub-code data corresponding to the digital image and voice data being recorded, through the sub-code generation/detection part 528, and records in the tape together with the digital image and voice data, through the processor part 524, error detection/correction part 526, recording/reproduction part 527, and mechanism part 501c. At this time, by the action of the servo-control part 529, the mechanism part 501c executes the drum rotating speed servo and tracking servo control.

On the other hand, when reproducing, the digital image and voice data obtained by reproducing the tape in the mechanism part 501c are serially delivered to the connector cord 503 through the recording/reproduction part 527, error detection/correction part 526, and processor part 524. At this time, the sub-code data reproduced together with the digital image and voice data is detected in the sub-code generation/detection part 528, and is delivered serially to the connector cord 503 through the CPU 525. The data sent out to the connector cord 503 is led into the signal processing unit 200 by way of the camera I/F part 504b and connector 504d of the card type connector 5, and is supplied into the reproduction unit 300 to be reproduced. At this time, too, the mechanism part 501c provides various servo controls by the action of the servo-control part 529.

The digital image data of R, G, B supplied to the connector part 518 of the main body 501 are supplied to the processor part 524 through the memory part 530, and are thereafter similarly recorded in the tape by the mechanism part 501c. The CPU 525 displays and controls while detecting the operating state of various operation and display parts 531 provided in the main body 501.

Figure 56:
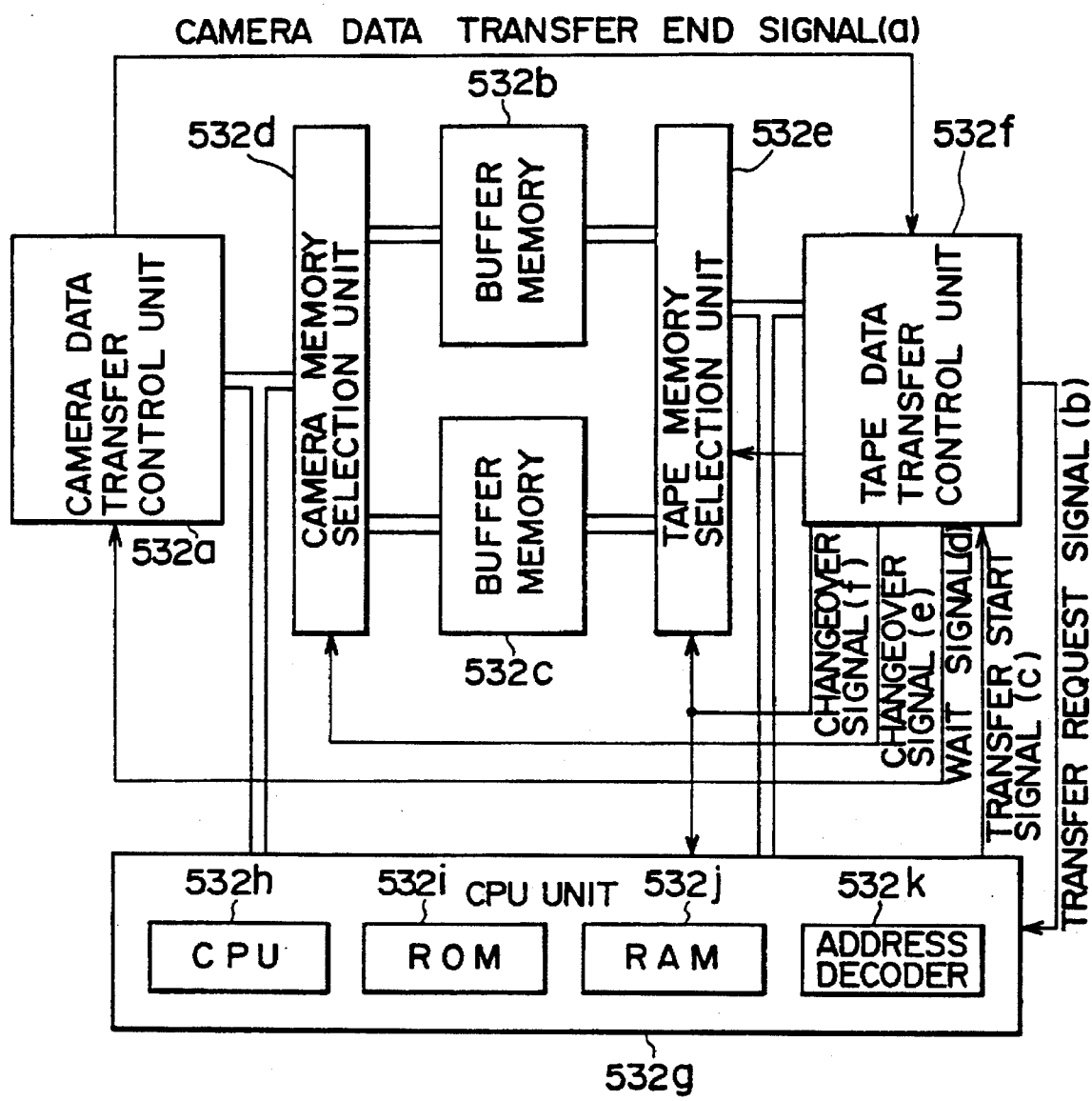
FIG. 56 is a block diagram showing details of a camera I/F part.

FIG. 56 shows the detail of the camera I/F part 504b. A camera data transfer control part 532a is to generate a control signal for writing in and reading out the data exchanged with the electronic still camera 11, in the buffer memories 532b, 532c, and it also possesses the function for generating a camera data transfer end signal for telling that data writing is executed and terminated. A camera memory selection part 532d is for selecting the buffer memories 532b, 532c for writing and reading the data. Incidentally, the buffer memories 532b, 532c are random access memories (RAMs) for temporarily storing the data in order to adjust the data transfer speed when executing data transfer between the electronic still camera 11 and filing device 500.

A tape memory selection part 532e is for selecting the buffer memories 532b, 532c for writing and reading the data. A tape data transfer control part 532f is to generate a control signal for writing and reading the data exchanged with the filing device 500, in the buffer memories 532b, 532c, and it generates a transfer request signal to the CPU part 532g, a wait signal to the camera data transfer control part 532a, and a changeover signal to the camera memory selection part 532d and tape memory selection part 532f. The CPU part 532g is composed of CPU 532h, ROM (read only memory) 532i in which the program is stored, RAM 532j used as system work, and address decoder 532k, and it is intended to issue a transfer start signal to the tape data transfer control part 532f.

Supposing now to record by transferring data from the electronic still camera 11 to the filing device 500, for example, the camera memory selection part 532d selects the buffer memory 532c, and records the data delivered from the electronic still camera 11. In this case, the buffer memory 532c is supposed to be capable of recording data for the portion of four packets at maximum. When four-packet data is completely recorded in the buffer memory 532c, the camera memory selection part 532d selects the buffer memory 532b, and the data delivered from the electronic still camera 11 is recorded continuously. The buffer memory 532b is also supposed to be capable of recording data for the portion of four packets at maximum.

While data is being recorded in the buffer memory 532b, the tape memory selection part 532e selects the buffer memory 532c, reads out the data, and delivers to the filing device 500. When four-packet data is completely recorded in the buffer memory 532b, the camera memory selection part 532d select the buffer memory 532c again, and the data delivered from the electronic still camera 11 is recorded continuously, and, at this time, the tape memory selection part 532e selects the buffer memory 532b, and delivers to the filing device 500.

This operation is repeated, and the data is recorded from the electronic still camera 11 into the filing device 500, and therefore even if the speed of recording the data by the filing device 500 is slower than the speed of output of data from the electronic still camera 11, it is possible to photograph without problem, to a certain extent, for example, in the continuous filming mode. However, if the recording operation of the filing device 500 cannot catch up and four-packet data is completely recorded in both buffer memories 532b, 532c, the tape data transfer control part 532f generates a wait signal to the camera data transfer control part 532a, and writing of data into the buffer memories 532b, 532c is stopped, that is, photography is disabled, until the content of either buffer memory 532b or 532c is completely recorded in the filing device 500. At this time, the wait signal is supplied to the CPU 221 of the electronic still camera 11 through the camera data transfer control part 532a, and is indicated on the warning display part 203j, while it is also indicated on the wait display part 512 of the filing device 500 through the CPU part 532g.

FIG. 57A to FIG. 57F are timing charts practically showing the above operation, respectively representing the signals at points (a) to (f) in FIG. 56. However, FIG. 57B1 and FIG. 57B2 indicate transfer request signals generating when writing the buffer memories 532b, 532c, respectively. First, from the camera data transfer control part 532a, at time t1, the camera data transfer end signal for the portion of one packet is generated, and, for example, the camera memory selection part 532d selects writing into the buffer memory 532b, and the tape memory selection part 532e selects reading from the buffer memory 532c.

In this state, if camera data transfer end signal is not generated within a specific time from time t1, the tape data transfer control part 532f issues a transfer request signal to the buffer memory 532b at time t2. In consequence, the CPU part 532g generates a transfer start signal to the tape data transfer control part 532f, and the tape data transfer control part 532f causes the camera memory selection part 532d to select writing into the buffer memory 532c, and the tape memory selection part 532e to select reading from the buffer memory 532b. Accordingly, data for one packet is read out from the buffer memory, and is sent out to the filing device 500.

From the camera data transfer control part 532a, at time t3, the camera data transfer end signal for four packets is generated continuously with the same specific time, and, for example, the camera memory selection part 532d selects writing into the buffer memory 532c, and the tape memory selection part 532e selects reading out from the buffer memory 532b. At this time, the tape data transfer control part 532f generates, at time t4, a transfer request signal to the buffer memory 532c. As a result, the CPU part 532g generates a transfer start signal to the tape data transfer control part 532f, and the tape data transfer control part 532f causes the camera memory selection part 532d to select writing into the buffer memory 532b, and the tape memory selection part 532e to select reading out from the buffer memory 53wc. Consequently, data for four packets is read out from the buffer memory, and sent out to the filing device 500.

Before the four-packet data is completely recorded in the filing device 500, when the four-packet camera data transfer end signal is continuously issued within the specific time, at time t5 from the camera data transfer control part 532a, the tape data transfer control part 532f issues a transfer request signal to the buffer memory 532b at time t6, thereby generating a wait signal simultaneously. During generation period of this wait signal, the transfer request signal generated at time t6 is ignored, and successively the camera memory selection part 532d selects writing into the buffer memory 532b, and the tape memory selection part 532e keeps the state of selection of reading out from the buffer memory 532c.

At time t7, when the wait signal is cleared, the CPU part 532g issues a transfer start signal to the tape data transfer control part 532f on the basis of the transfer request signal previously generated at time t6, and the tape data transfer control part 532f causes the camera memory selection part 532d to select writing into the buffer memory 532c, and the tape memory selection part 532e to select reading from the buffer memory 532b. Accordingly, four-packet data is read out from the buffer memory 532b and sent out to the filing device 500.

Figure 58:
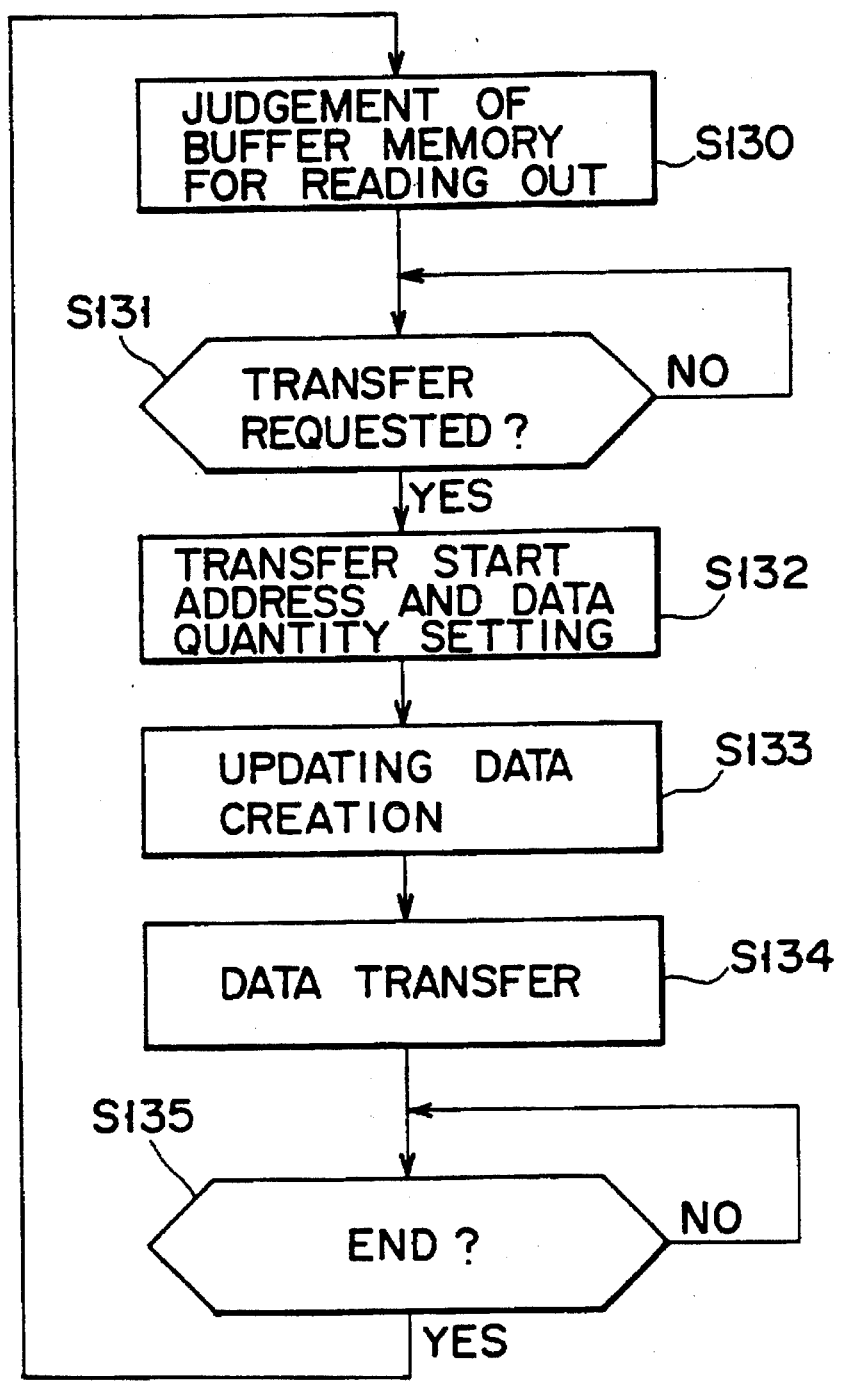
FIG. 58 is a flow chart for explaining the data transfer from a electronic still camera to a filing device.

FIG. 58 shows the processing action of the CPU part 532g in the case of the above operation. In the first place, the CPU part 532g judges from which one of the buffer memories 532b, 532c the data is read out in step S130, and judges if the transfer request signal has been issued or not in step S131. If generated (YES), in step S132, the transfer start address of the buffer memory 532b or 532c, and the number of transfer data are set, and the data to be updated such as header data is generated in step S133. Afterwards, in step S134, the CPU part 532g reads out data from the buffer memory 532b or 532c, and transfers to the filing device 500, and judges if the data transfer is finished or not in step S135, and if terminated (YES), the operation returns to step S130.

Figure 59:
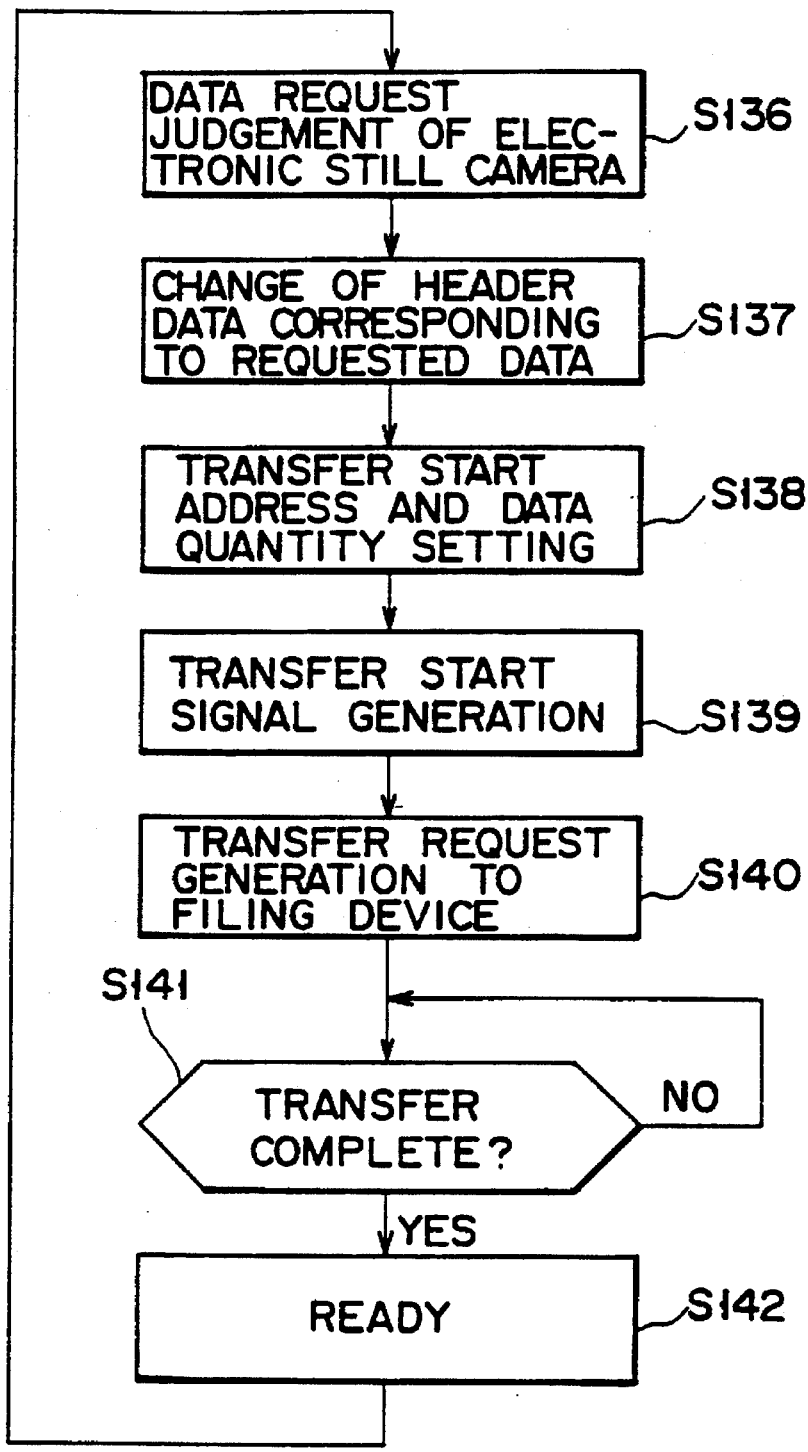
FIG. 59 is a flow chart for explaining the data transfer from a filing device to a electronic still camera.

FIG. 59 shows the processing action of the CPU part 532g when transferring data from the filing device 500 to the electronic still camera 11. In this case, the CPU part 532g receives a data take-in request from the electronic still camera 11 side, and delivers the data telling that the data is being prepared, to the CPU 532h. Then, in step S136, the CPU part 532g judges the content of data take-in request from the electronic still camera 11, and changes the header data of the buffer memories 532b, 532c on the basis of the content of the data take-in request in step S137, and sets the transfer start address and the number of transfer data in step S138. The CPU part 532g, in step S139, generates a transfer start signal to the tape data transfer control part 532f, and issues a data transfer request to the filing device 500 in step S140, and judges if the data transfer from the filing device 500 to the buffer memories 532b, 532c is finished or not in step S141. When the data transfer has been completed (YES), in step S142, the data telling that the preparation is complete is issued to the electronic still camera 11, thereby returning to step S136, and the data is transferred in the similar method as above thereafter to the electronic still camera 11 from the buffer memories 532b, 532c.

As the filing device 500, as shown in FIG. 60, an insertion part 533 for directly loading the memory card 400 may be installed in the main body 501. In this way, the data recorded in the memory card 400 can be directly transferred to the tape. Or, as shown in FIG. 61, at both ends of the cord 534a, exclusive cables 534 to which the card type connectors 534b, 534c are connected are prepared, and one card type connector 534b is attached to the insertion part 206 of the signal processing unit 200, and the other card type connector 534c is attached to the insertion part 533 of the main body 501, so that the digital image and voice data obtained from the electronic still camera 11 can be directly recorded in the tape, or that the digital image and voice data obtained by playing back the tape may be reproduced in the reproduction unit 300.

Structure of editing machine

Figure 62:
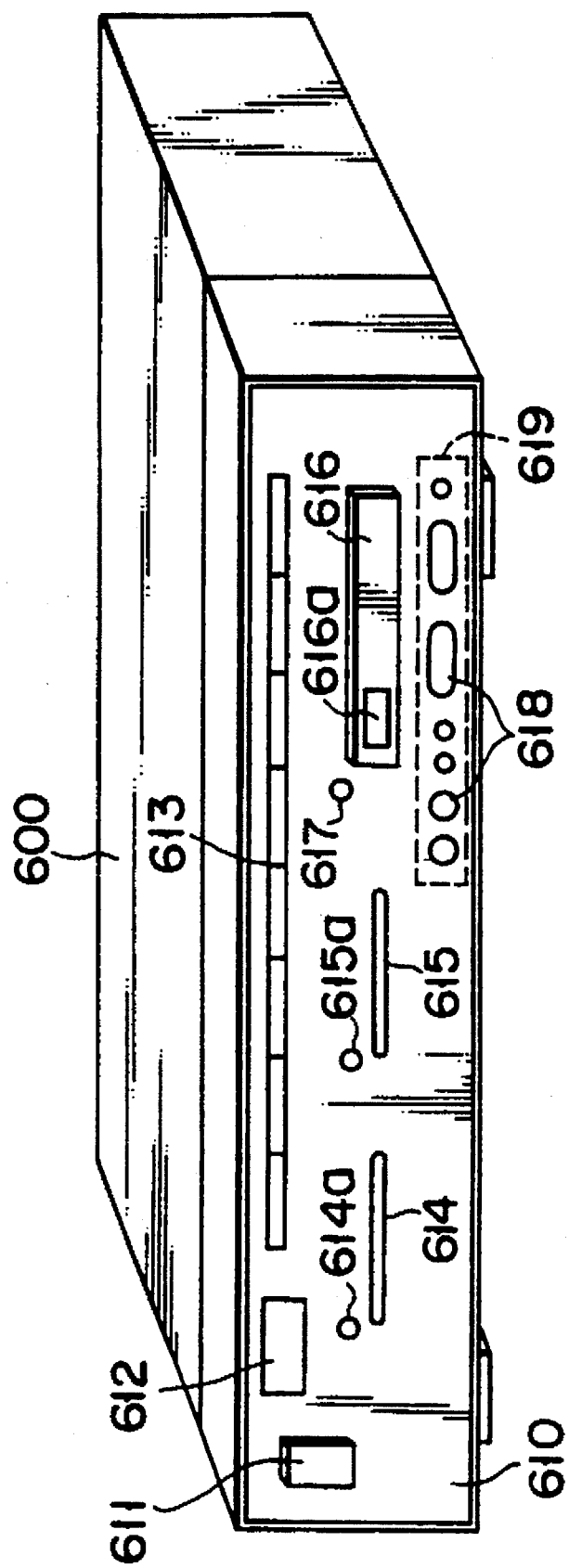
FIG. 62 is a perspective view showing the appearance of an editing machine.

The editing machine 600 is explained now. This editing machine 600 is of stationary type as shown in FIG. 62, and at its rear side which is not shown in the drawing, there are disposed multiple connectors for connecting external devices, such as monitors 801a, 801b, 801c, . . . , disc recording unit 802, tape recording unit 803, word processor 804, printer 805, modem 806, VTR 807, 808, digital audio tape recorder 809, and CD player 810. This editing machine 600 has almost no operation switch or key, and as the means of operation, an operation unit 602 comprising exclusive keyboard and remote control operation parts is installed separately as mentioned later.

The front panel 610 of the editing machine 600 comprises, on its upper surface, power switch 611, remote control photo detector 612, connection state display part 613, and others. The connection state display part 613 has eight display regions corresponding to the external devices, and when external devices are connected to the connectors disposed at the rear side of the editing machine 600, they are detected automatically, and the display region corresponding to the connected external device is lit up. In the middle of the front panel 610, two card insertion parts 614, 615 are provided. These card insertion parts 614, 615 are for loading and unloading the memory card 400 and card type connectors 504, 534b, 534c, etc., and near the card insertion parts 614, 615, there are disposed loading display parts 614a, 615a which light up when the memory card 400 and card type connectors 504, 534b, 534c are loaded.

The front panel 610 also comprises a card tray 616 positioned beside the card insertion parts 614, 615. This card tray 616 is free to go in and out the front panel 610, and in the "out" state, when the memory card 400 is loaded to set in the "in" state, the memory card 400 is connected to the internal connector. This in/out action of the card tray 616 is effected by pressing the switch 616a disposed in the card tray 616. In this case, in the first place, if the card tray 616 is in the "in" state, the card tray 616 is out by the first pressing operation on the switch 616a, and by the second pressing operation, the card tray 616 is in, and by the third pressing operation, the memory card 400 on the card tray 616 is connected to the connector, by the fourth pressing operation, the memory card 400 is separated from the connector, and by the fifth pressing operation, the card tray 616 is out, same as in the first pressing operation, and thus the same operation is cyclically repeated. Near the card tray 616 is disposed a card display part 617 which lights up when the memory card 400 on the card tray 616 is connected to the connector, in the "in" state of the card tray 616, and flickers when the memory card 400 is detaching from the connector.

Thus, since the editing machine 600 has three card loading parts, it is possible to display and edit data recorded in plural memory cards (or filing devices) simultaneously, copy from the memory card to other memory card by the editing machine 600 alone, or perform these processings by using the extension program cartridge (card type). Moreover, since one of the card loading parts if of tray type, the memory card can be attached or detached easily, and breakage of device by unexpected force when detaching or attaching is prevented.

In the lower surface of the front panel 610 in the drawing, a connector part 618 is disposed. This connector part 618 is to connect various external devices, as mentioned above, same as the connector disposed at the rear side of the editing machine 600, and it is convenient, for example, when connecting a device which is detached or attached from and to the editing machine 600 very often. This connector part 618 is covered with a lid 619 indicated by dotted line in the drawing while it is not in use.

FIG. 63 shows an exclusive keyboard 602a which is one of the operation parts 602. This exclusive keyboard 602a is connected to the editing machine 600 through a cord 602b, and its main body comprises key groups 602d, 602e, 602f which are composed of plural keys, respectively. In the main body 602c of the exclusive keyboard 602a, at its one end, a display part 602h having a liquid crystal display 602g is rotatably supported. Furthermore, FIG. 64 shows the remote control operation part 602i which is one of the operation parts 602. This remote control operation part 602i also comprises plural keys 602j enough for executing the principal actions of the editing machine 600, although smaller in quantity than the key groves 602d, 602e, 602f of the exclusive keyboard 602a, and operation signals corresponding to the operated key 602j are sent out from the infrared emission part 602k.

Figure 65:
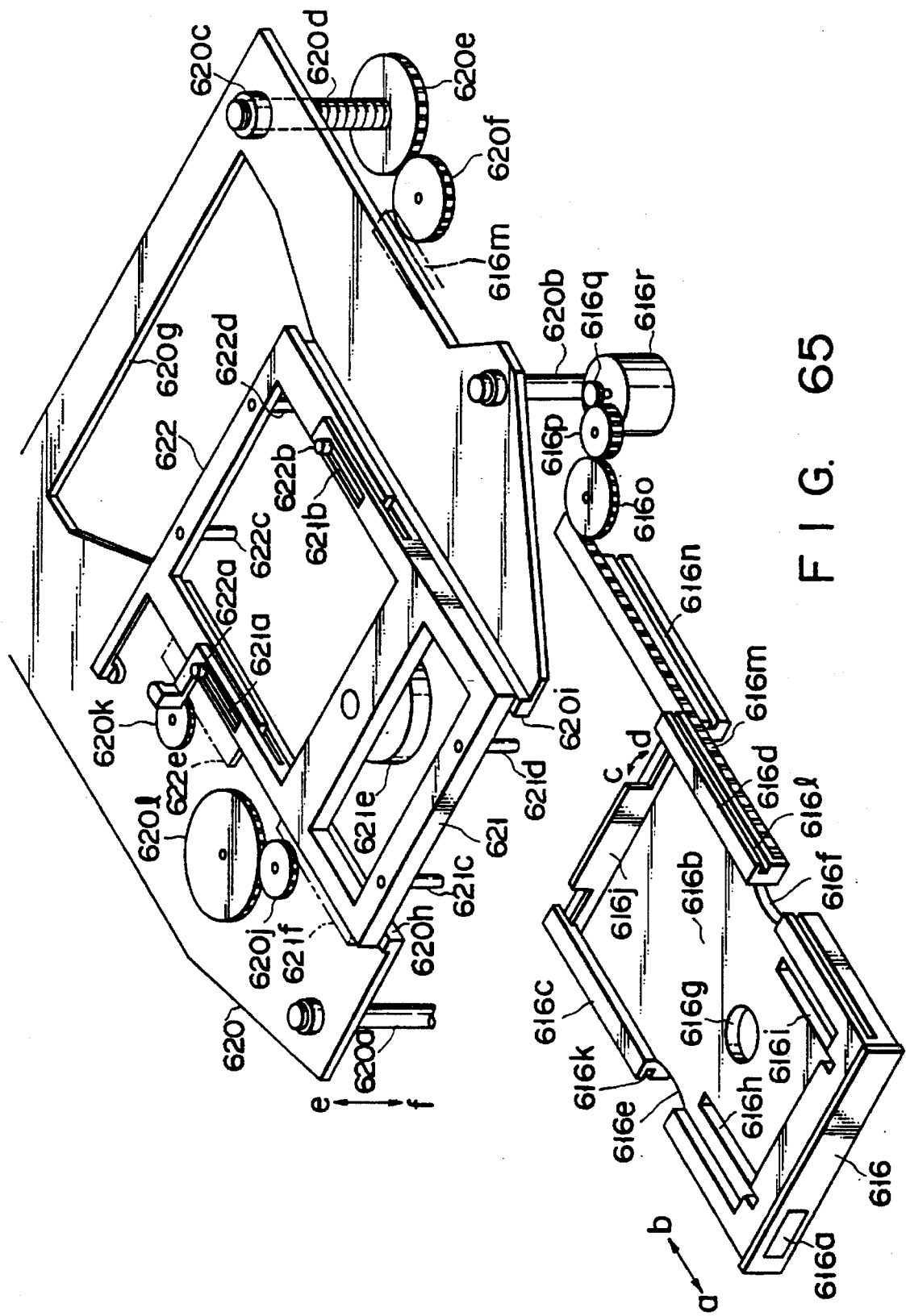
FIG. 65 is an exploded perspective view showing details of a card tray part.
Figure 66:
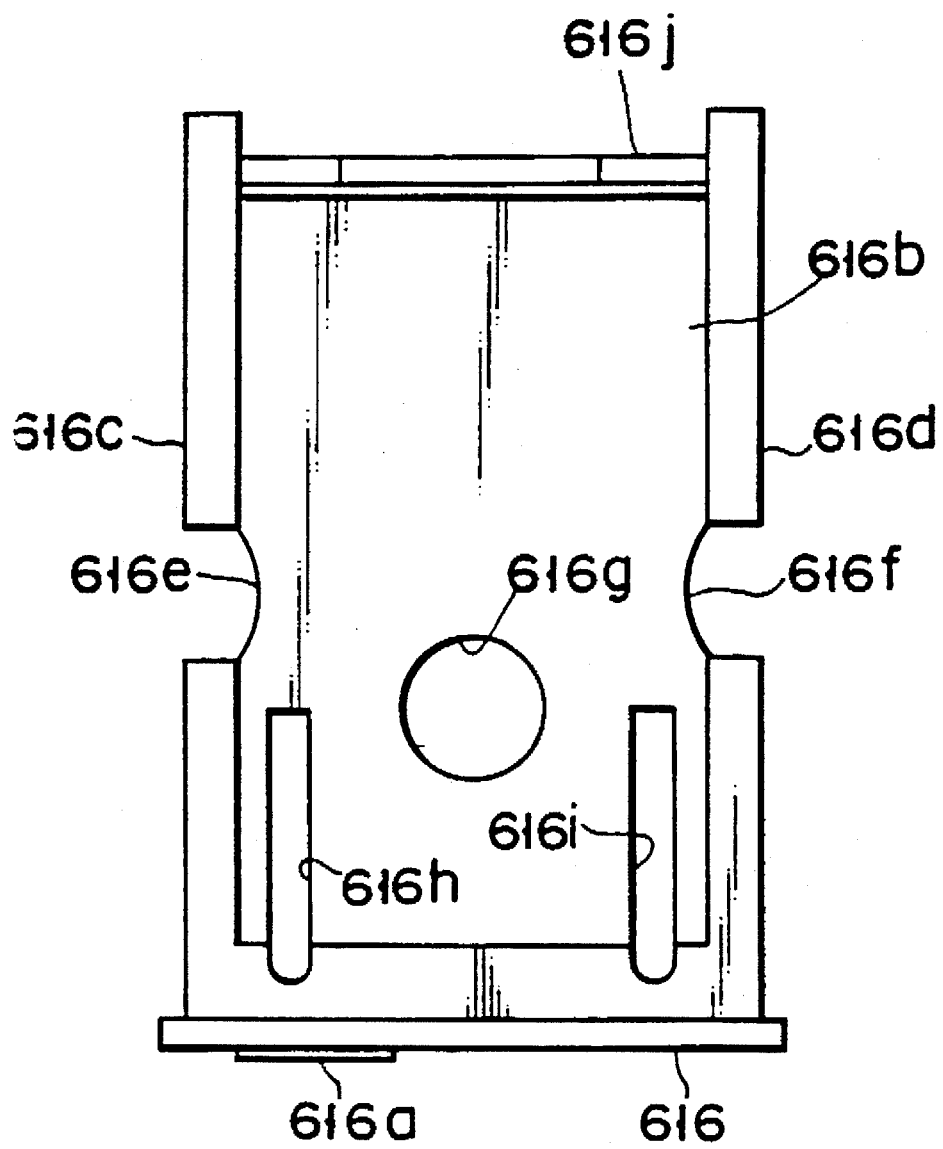
FIG. 66 is a top view of the card tray.

FIG. 65 shows the loading mechanism for moving in and out the card tray 616 of the editing machine 600. The card tray 616 is formed, as shown in FIG. 66, in a shape of slim box with an open top, and the memory card 400 is placed in the bottom 616b. At both sides 616c, 616d in the longitudinal direction of this card tray 616, notches 616e, 616f curved in a concave shape are formed approximately in the middle part, individually, so that the memory card 400 placed in the bottom 616b may be easily pinched and taken out by fingers by the user. Nearly in the center of the bottom 616b, a penetration hole 616g is formed, so that the user can insert a finger from the lower side to push up the memory card 400. Also in the bottom 616b of the card tray 616, a pair of slots 616h, 616i extending in the directions of arrows a, b are formed parallel in the forward part. At the rear end of the card tray 616, a partition plate 616j formed approximately in a convex shape in the front is rotatably supported in the directions of arrows c, d in FIG. 65. This partition plate 616j is thrust so as to stand upright usually by the action of the spring which is not shown.

The card tray 616 is supported slidably in the directions of arrows a, b in FIG. 65 as the pins not shown which are fixed in the editing machine 600 are fitted in the guide grooves 616k, 616l formed at its both sides 616c, 616d. At one side 616d of the card tray 616, a rack 616m is formed. This rack 616m is stretched in the direction of arrow b further from the rear end of the card tray 616, and a guide groove 616n is formed also in the stretched portion of the rack 616m, parallel to the rack 616m, and the pin not shown which is fixed in the editing machine 600 is fitted. It is designed so that the rotating driving force of the motor 616r may be transmitted to the rack 616m through gears 616o, 616p, 616q. Accordingly, by driving the motor 616r in the normal and reverse directions, the card tray 616 slides in the direction of arrow a or arrow b.

Inside the editing machine 600, a sub-chassis 620 is placed above the card tray 616. This sub-chassis 620 is supported movably in the directions of arrows e, f in FIG. 65 in the main chassis not shown in the editing machine 600, by way of posts 620a, 620b. At one corner of the sub-chassis 620, a female threaded part 620c is disposed, and a columnar male threaded part 620d is engaged with this female threaded part 620c. In this male threaded part 620d, a gear 620e is formed integrally, and a gear 620f is engaged with this gear 620e. This gear 620f is to move the sub-chassis 620 in the direction of arrow e or f as the male threaded part 620d is rotated as the rack 616m of the card tray 616 is engaged and put in rotation. In this case, with the rack 616m moved in the direction of arrow a, b, the sub-chassis 620 is designed to move in the direction of arrow e, f.

In the sub-chassis 620, a notch 620g having the portion confronting the card tray 616 cut out widely is formed. In this notch 620g, a pair of end parts 620h, 620i mutually confronting at an interval corresponding to the both sides 616c, 616d of the card tray 616 are formed. A loading member 621 and an unloading member 622 are disposed so as to bridge between the end parts 620h and 620i. The loading member 620h and the unloading member 622 are supported movably in the directions of arrows a, b in the state of bridging between the end parts 620h, and 620i of the notch 620g. At both ends of the loading member 621, there are freely inserted pins 622a, 622b which are formed at both ends of the unloading member 622, in the slots 621a, 621b formed along the directions of arrows a, b.

In the loading member 621, pins 621c, 621d freely inserted in slots 616h, 616i formed in the bottom 616b of the card tray 616 are planted, and a card clamper 621e for suppressing the memory card 400 is placed. In the unloading member 622, a pair of pins 622c, 622d are planted at positions approximately confronting the pins 721c, 721d of the loading member 621. In the loading member 621 and unloading member 622, racks 621f, 622e along the directions of arrows a, b are formed at each side surface, and the racks 621f, 622e are engaged with the gears 620j, 620k supported rotatably on the sub-chasis 620. These gears 620j, 620k are rotated and driven as the gear 620l to which the rotating force of the motor not shown is transmitted, being supported on the sub-chassis 620 is selectively engaged, thereby moving the loading member 621 and unloading member 622 in the directions of arrows a, b.

Figure 67:
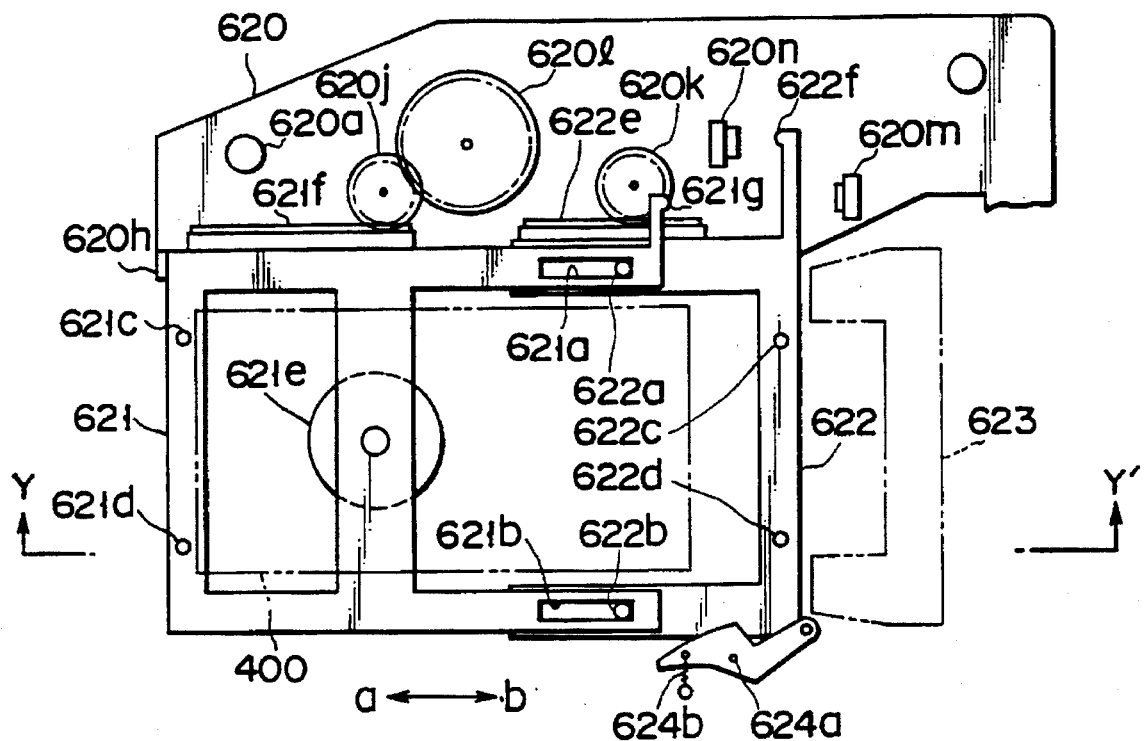
FIG. 67 and FIG. 68 are a top view and a side view for explaining the loading operation of card tray.
Figure 68:
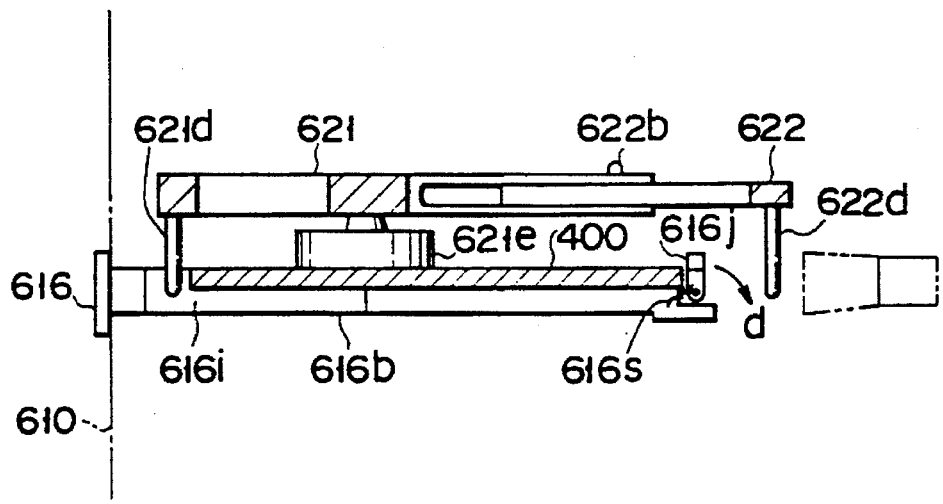

In such constitution, let us suppose, as shown in FIG. 65, that the switch 616a is manipulated by placing the memory card 400 on the card tray 616 which is out of the front panel 610 of the editing machine 600. Then, in the first place, the motor 616r is driven, and the card tray 616 is moved into the editing machine 600, that is, in the direction of arrow b. When the card tray 616 is placed into the editing machine 600 by the specified amount, the rack 616m is engaged with the gear 620f, and the sub-chassis 620 is moved in the direction of the arrow f. In this way, when the card tray 616 is completely stored in the editing machine 600, as shown in FIG. 67 and FIG. 68, the pins 621c, 621d of the loading member 621 are freely inserted into the slots 616h, 616i formed in the bottom 616b of the card tray 616, being opposite to end end in the lateral direction of the memory card 400, while the pins 622c, 622d of the unloading member 622 are opposite to the other end in the lateral direction of the memory card 400. At this time, the card clamper 621e presses the memory card 400 to the bottom 616b of the card tray 616 to stabilize the memory card 400. FIG. 68 shows the Y—Y' sectional view of FIG. 67.

Next, when the switch 616a of the card tray 616 is manipulated again, the gear 620l engaged with the gear 620j is rotated and driven, and the loading member 621 is moved in the direction of arrow b in FIG. 67. Accordingly, the pins 621c, 621d of the loading member 621 contact with one end in the lateral direction of the memory card 400, thereby moving the memory card 400 in the same direction. At this time, since the other end in the lateral direction of the memory card 400 pushes the partition plate 616j, the partition plate 616j is turned in the direction of the arrow d in the drawing, overcoming the thrusting force of the spring 616s shown in FIG. 68, so that the movement of the memory card 400 will not be impeded. That is, the memory card 400 is allowed to slide on the bottom 616b of the card tray 616, while being pressed by the card clamper 621e.

In consequence, when the arrow a side end in FIG. 67 of the slots 621a, 621b formed in the loading member 621 contacts with the pins 622a, 622b of the unloading member 622, as shown in FIG. 69 and FIG. 70, both unloading member 622 and loading member 621 are moved in the same direction. At this time, when the unloading member 622 moves, it is so set that the movement of the unloading member 622 may be started, so that the pins 622c, 622d may not contact with the other end part in the lateral direction of the memory card 400, in other words, before the other end in the lateral direction of the memory card 400 moved as being pushed by the pins 621c, 621d of the loading member 621 contacts with the pins 622c, 622d of the unloading member 622, the arrow a side end of the slots 621a, 621b of the loading member 621 contacts with the pins 622a, 622b of the unloading member 622, only then allowing the unloading member 622 to start to move.

Figure 71:
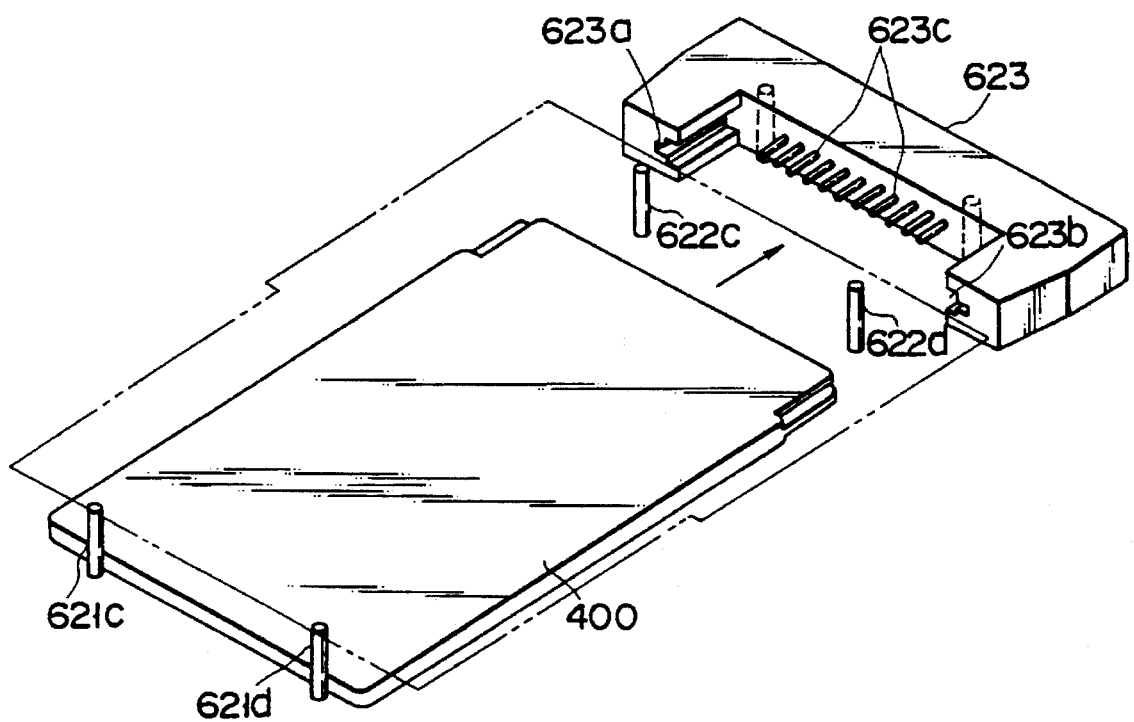
FIG. 71 is a perspective view showing details of card tray and connector.

In this way, when the loading member 621, unloading member 622 and memory card 400 move in the direction of arrow b in assembly, the other end of the memory card 400 in the lateral direction is connected to the connector 623 disposed on this moving route. This connector 623 is formed approximately in a pi-shape as shown in FIG. 71, and its both sides are support parts 623a, 623b which support the both sides of the other end of the memory card 400 in the lateral direction by pinching in the thicknesswise direction, and there are, in the middle, plural pins for connection 623c so as to be connected to the other end of the memory card 400 in the lateral direction.

With the memory card 400 connected to the connector 623, when the engaging part 621g formed at one end of the loading member 621 pushes the switch 620m disposed in the sub-chassis 620, the rotation of the motor not shown for supplying torque to the gear 620$^i$ is stopped, and the loading action of the memory card 500 is terminated. At this time, the holding member 624 which is rotatably supported on the sub-chassis 620 about the shaft 624a and thrust in the counterclockwise direction in FIG. 69 by the spring 624b is engaged with the loading member 621 side, so that the loading member 621 and unloading member 622 are held stably.

When the switch 616a of the card tray 616 is manipulated, the gear 620l is engaged with the gear 620k, and is driven in rotation, and the unloading member 622 is moved in the direction of arrow a in FIG. 69. Accordingly, pins 622c, 622d of the unloading member 622 are caused to contact with the other end of the memory card 400 in the lateral direction, and the memory card 400 is moved in the same direction, so that the memory card 400 is separated from the the connector 623. At this time, since the pins 622a, 622b of the unloading member 622 are contacting with the arrow a side end of the slots 621a, 621b of the loading member 621, the loading member 621 also moves in the direction of arrow a together.

Figure 72:
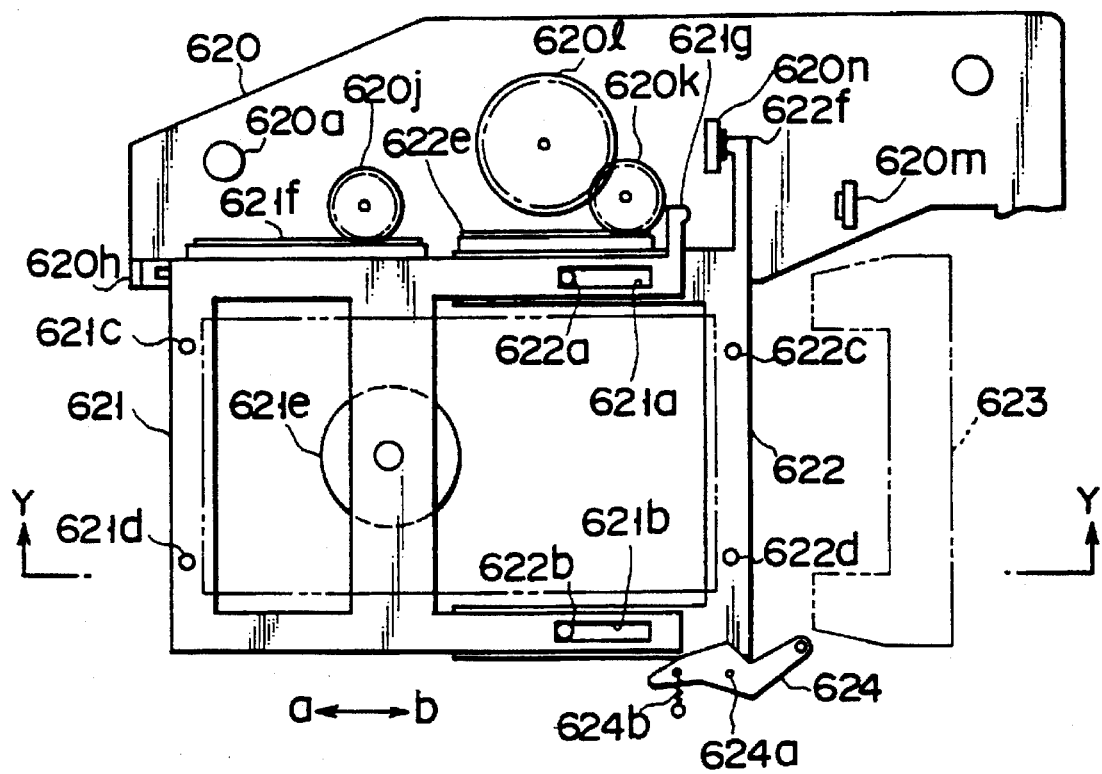
FIG. 72 and FIG. 73 are a top view and a side view for explaining the unloading operation of card tray.
Figure 73:
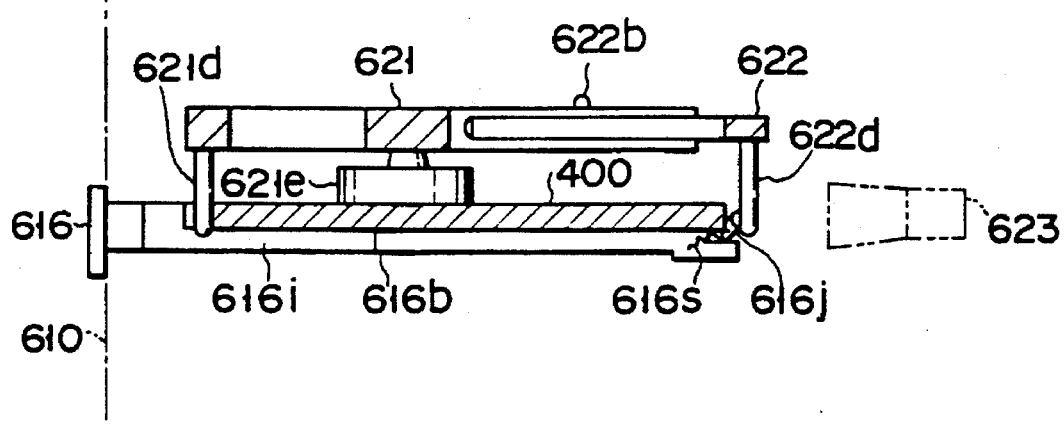

Here, as shown in FIG. 72 and FIG. 73, when the engaging part 622f formed at one end of the unloading member 622 pushes the switch 620n disposed in the sub-chassis 620, the gear 620$^i$ is rotated in the reverse direction, and the unloading member 622 is moved by a specified extent in the direction of arrow b in FIG. 72, thereby returning to the position shown in FIG. 69. Afterwards, the gear 620$^i$ is engaged with the gear 620j, and the loading member 621 is returned to the position shown in FIG. 69, thereby finishing the unloading action.

In this state, when the switch 616a of the card tray 616 is manipulated, the motor is driven in the reverse direction of the above operation. As a result, the sub-chassis 620 is moved in the direction of arrow e in FIG. 65, and the pins 621c, 621d, and 622c, 622d of the loading member 621 and unloading member 622 no longer confront the end of the memory card 400, and the card clamper 621e is separated from the memory card 400, and the card tray 616 moves in the direction of arrow a in FIG. 65 so as to be projected out from the front panel 610 of the editing machine 600.

Signal system of editing machine

Figure 74:
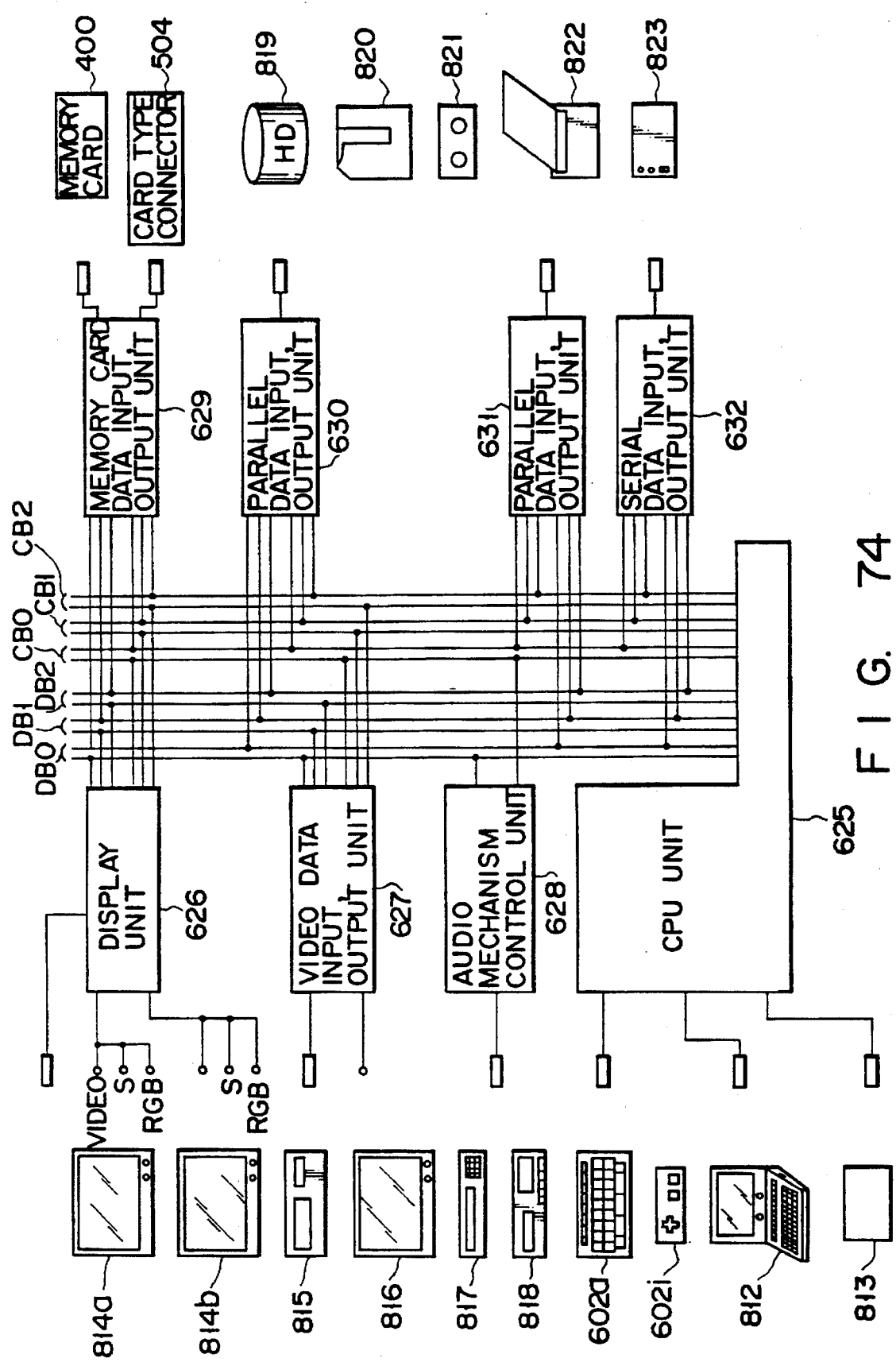
FIG. 74 is a block diagram showing a signal system of an editing machine.

The signal system of the editing machine 600 is described below while referring to FIG. 74. The signal system of this editing machine 600 comprises the central CPU part 625, display part 626, image data input, output part 627, audio device control part 628, memory card data input, output part 629, parallel data input, output parts 630, 631, and serial data input, output part 632, which are connected to the data buses DB0, DB1, DB2, and control buses CB0, CB1, CB2.

More specifically, the CPU part 625 is responsible for the control of the entire system, execution of application, judgement of operation state of the exclusive keyboard 602a and remote control operation part 602i, data exchange with the personal computer or word processor 812, extension of function by extension program cartridge 813, compression and expansion processing of digital image data, and reproduction processing of digital voice data.

The display part 626 is for indicating digital image data in plural monitors 814a, 814b, . . . , or selecting the monitors to be displayed 814a, 814b, . . . . The image data input, output part 627 is to control exchange of image data, for example, between the VTR 815 and television receiver set 816, or video appliance such as character broadcast adapter not shown in the drawing. The audio device control part 628 controls the audio appliances such as CD player 817 and digital audio tape recorder 818 on the basis of the digital image data, and reproduces music or sound in synchronism with the image display.

The memory card data input, output part 629 is for controlling the data transmission and reception between the memory card 400 and the card type connector 504. The parallel data input, output part 630 is to control the transmission and reception of data with large-capacity recording appliances for recording and storing digital video and audio data, such as HD (hard disk) 819, MO (magneto-optical disk) 820, and DDD (digital data streamer) 821. The other parallel data input, output part 631 is to control the transmission and reception of data with digital color printer 822 or the like for printing out the image data or character data. The serial data input, output part 632 is to control the transmission and reception of data with the modem 823, acoustic coupler or the like, for transferring the digital image and voice data through communication circuit.

All of these CPU part 625, display part 626, image data input, output part 627, audio device control part 628, memory card data input, output part 629, parallel data input, output parts 630, 631, and serial data input, output part 632 are connected to data buses DB0, DB1, DB2 for transferring data, add control buses CB0, CB1, CB2 for transferring control data. In this embodiment, start and end of the data transmission are controlled by the CPU in the CPU part 625, without using exclusive data transmission control IC (integrated circuit), and therefore, the data control bus DB0 which is controlled by the CPU, and the control bus CB0 to which the control data generated by the CPU is transmitted [address signal, device access signal for accessing each block (hereinafter called device) 626 to 632, device R/W control signal, etc.] are composed independently.

The other data buses DB1, DB2 are provided in order to execute the data transfer among devices 626 to 632, independently of the data bus DB0 controlled by the CPU. The reason of preparing the data buses DB1, DB2 in two systems is that, considering a case of taking data from a specific device into the CPU part 625, and compressing or expanding, and then transferring to other device, if there is only one system, the CPU 625 cannot take in the next data of specific amount unless the first data of specific amount is once transferred from the specified device to the CPU part 625, and compressed or expanded, and then transferred to the other device from the CPU part 625, and in order to prevent such inefficient data transfer by sequential processing, two systems are provided, and therefore while data is being transferred from a specified device to the CPU part 625 in the data bus DB1, the data transfer from the CPU part 625 to other device is effected in the other data bus DB2, so that parallel processing of data transfer is realized, thereby improving the efficiency of data transfer and enhancing the transfer speed. Furthermore, the other control buses CB1, CB2 are used for transferring the control data generated separately from the CPU, in order to control the timing of data input and output of devices 626 to 632. Meanwhile, if the CPU part 625 incorporates DMA (direct memory access) controller to tell the end of data transfer between devices to the CPU in the hardware, the data bus DB0 controlled by the CPU may be also used in the data transfer between devices.

FIG. 75 shows the details of this CPU part 625. That is, the CPU control part 625a comprises CPU, ROM storing menu screens to be displayed on the display part 602h of the exclusive keyboard 602a when the power is turned on and program module for executing each processing, RAM to be used by the CPU as system work, and address decoder for setting registers necessary for execution of process by the CPU or setting the space for disposing memories. The CPU reads and interprets the content selected by the menu screen or fed from the exclusive keyboard 602a or remote control operation part 602i, and executes necessary processing program (for example, data transfer, data reproduction, data retrieval, data editing, processing).

In this case, the processing program is recorded in the ROM for storing the program as divided routines as shown in (1) to (4) below, which are combined and used depending on the result of interpretation by the CPU.

(1) The routine for reading and judging the information of devices 626 to 632 for executing data transfer, the routine for changing the information of devices 626 to 632, the routine for reading and writing data to data files in the memory card 400, filing device 500, H, MO, DDD, etc., the routine for selecting devices 626 to 632 generating data transfer request and selecting paths of necessary data buses DB0 to DB2, and others.

(2) The routine for selecting mode for executing data writing into the frame memory of display part 626 in order to execute data reproduction, the routine for selecting display devices (monitors 814a, 814b, . . .), the routine for selecting the frame memory of the display part 626, the routine for moving the display position, and others.

(3) The routine for setting and deleting the ID information corresponding to the data file in order to execute data retrieval, the routine for judging and retrieving the ID information, and others.

(4) The routine for deleting, inserting or reshuffling data for execution of data editing or processing, the routine for inserting character information or graphic pattern, the routine for creating image data pattern, and others.

As applications, the simplified data base and simplified image processing are recorded in the program storing ROM by using the routines, and in order to execute applications of higher function, the extension program cartridge 813 is to be connected to the CPU control part 625a. The presence or absence of the extension program is judged by the CPU. In other words, the CPU reads out the beginning address of the address space in which the predetermined extension program is disposed when resetting, and judges that the extension program is present when the predetermined ID informations present, and executes the extension program. The CPU, if the predetermined ID information is not present, judges that the extension program is not present, and displays the initial screen on the display part 602h.

The keyboard I/F part 625b is a block for executing data transmission and reception with the exclusive keyboard 602a or remote control operation part 602i used in the menu selection or character input, and its inside is composed of the P/S converting part for converting parallel data into serial data, and infrared data input, output control part, among others. Incidentally, when a common key is operated in the exclusive keyboard 602a and the remote control operation part 602i, it is designed so that a same code be generated.

The I/F part 625c is a block for transferring the control and management of the editing machine 600 to the externally connected personal computer or word processor 812, and depending on the level of the pin of the connector for I/F, the CPU automatically judges if the personal computer or word processor 812 is connected or not. When the personal computer or word processor 812 is connected to the I/F part 625c, the CPU stops acceptance of processing execution from the operation part 602 or menu screen, or execution of active processing such as execution of application, and interprets the command sent in from the personal computer or word processor 812, and executes the operation. The inside of this I/F part 625c is composed of the buffer part for adjusting the timing of transmission reception of command, status or data, and the control signal generating part for execution of hand-shake.

The sound reproducing part 625d is an expanding and reproducing block used in execution of explanation of the image data by voice. The inside is composed of data memory for storing the compressed digital voice data, decoding circuit, and built-in speaker 625e. By preliminarily transferring the digital voice data to the data memory, when the voice reproduction start is instructed by the CPU after reproducing and displaying the image data, the content in the data memory is automatically read out and reproduced in voice, after a specified time preset by the CPU. Meanwhile, if the necessary voice file name and voice start time are coexistent as the information of image data file, a series of processing may be done automatically by the CPU in the midst of the operation for displaying the image data.

The data transfer control part 625f is a counter for simplifying the judgement of completion of data transfer by the CPU, and upon every data input by the devices 626 to 632 at the data transfer destination, the set value is counted down, and when it becomes zero, the completion of data transfer is noticed to the CPU, for example, by interruption processing. Before start of data transfer, the CPU must judge the number of sets of data delivered from the device at the data transfer destination, and preset.

The data expanding part 625g is a block for expanding the compressed digital image data into data of R, G, B, or Y, R–Y or B–Y. The inside is composed of the expanding circuit, input, output data bus selection circuit, data mode selection circuit, and data input, output control part. When transmitting data by way of the expansion block, the CPU must set necessary items of each circuit beforehand (connection of input, output bus and control signal, selection of output mode, etc.). If such necessary items are preset as image data file information, a series of operations may be done automatically by the CPU.

The data compressing part 625h is a block for compressing the data of R, G, B or Y, R–Y or B–Y. The inside is composed of compressing circuit, input, output data bus selecting circuit, data mode selecting circuit, and data input, output control part. When transmitting data by way of the compression block, the CPU must set necessary items of each circuit beforehand (connection of input, output bus and control signal, selection of output mode, etc.). If such necessary items are preset as image data file information, a series of operations may be done automatically by the CPU.

FIG. 76 shows the detail of the memory card data input, output part 629. It is composed of a card selection control part 629a for selecting either the card type connector 504 or the memory card 400 inserted in the cart insertion parts 614, 615 and card tray 616 of the editing machine 600, a card access signal generating part 629b for generating various timing signals necessary for transmission and reception of data actually between the memory card 400 and card type connector 504, and a card data input, output control part 629c for selecting the internal data bus to be used in data transfer to the memory card 400 or card type connector 504, or controlling the generation request of card access signal. Pre-processing and post-processing necessary for input and output of data with the memory card 400 and card type connector 504 (setting of transfer start address, setting of number of bytes to be transferred, confirmation of end of data transfer, etc.), confirmation of various pieces of information added to the data obtained from the memory card 400 or card type connector 504 [checking of recording capacity, checking of protect state (write disabled state, etc.), confirmation of backup battery 404 of memory card, etc.], and selection of bus to be connected with inside are automatically set or confirmed by the CPU before execution of data transfer or after completion of transfer.

FIG. 77 shows the detail of the parallel data input, output part 630. This parallel data input, output part 630 is mainly intended to connect devices for recording and storing abundant data, and therefore it is presently designed in conformity with the SCSI standard which is the general interface used in large-capacity recording devices such as HDD 819, MO 820, DDD 821. Its inside is composed of SCSI controller 630a composed of commercial IC for SCSI, and SCSI data input, output control part 630b for converting the data access signal to be transferred to the selected control bus into SCSI control signal, and also converting the data access signal transferred from the control bus from the control signal of SCSI. Pre-processing and post-processing necessary for input and output of data through SCSI bus [setting of SCSI controller 630a (execution of selection phase and command phase, confirmation of transfer to data transfer phase, checking of status and message phase, etc.), setting and confirmation of the device to be connected, etc.], and selection of bus to be connected with the inside are automatically set or confirmed by the CPU before execution of data transfer or after completion of transfer.

FIG. 78 shows the detail of the serial data input, output part 632. This serial data input, output part 632 is intended to connect devices for transferring data serially, and therefore it is designed in conformity with the RS-232C standard which is the present general interface. The inside is composed of the RS controller 632a which is the standard IC for executing serial communication, and RS data input, output control part 632b for selecting the internal bus to be connected with the RS-232C bus, converting the data access signal for transferring to the selected control bus into control signal of RS-232C, and converting the data access signal transferred from the control bus from the control signal of RS-232C. Pre-processing and post-processing necessary for input and output of data through RS-232C bus [setting of RS controller 632a (setting of baud rate, start/stop bit, etc.)], setting and confirmation of the devices to be connected (automatic dialing, setting of transfer format, etc.), and selection of bus to be connected with inside are automatically set or confirmed by the CPU before execution of data transfer or after completion of transfer.

FIG. 79 shows the detail of the parallel data input, output part 631. Since this parallel data input, output part 631 is mainly intended to connect the device for printing out the data, it is designed in conformity with the Centronics standard which is the general interface at the present. The inside is composed of Centro controller 631a for transferring the hand-shake data conforming to the Centronics standard by hand-shake, and Centro data input, output control part 631b for selecting the internal bus to be connected with the Centro bus, and converting the data access signal to be transferred to the selected Centro bus into control signal of Centro, and also converting the data access signal transferred from the control bus from the control signal of Centro. Pre-processing and post-processing necessary for input and output of data through the Centro bus [setting of Centro controller 631a, setting and confirmation of devices to be connected (execution of paper feed, confirmation of abnormal state, etc.)], and selection of the bus to be connected with the inside are automatically set or confirmed by the CPU before execution of data transfer or after completion of transfer.

FIG. 80 shows the detail of the audio device control part 628. This audio device control part 628 comprises an EIAJ controller 628a conforming to the EIAJ (digital audio interface) standard generally provided as digital input and output in the digital audio appliance at the present. When displaying the image data, it is much demanded to play background music, and to meet this demand, by preliminarily setting the necessary music source and its start time in the CPU, it is possible to reproduce the music, in synchronism with the displayed screen from the audio appliance, such as CD player 817 and digital audio tape recorder 818.

FIG. 81 shows the detail of the image data input, output part 627. This image data input, output part 627 is intended to transfer image data mutually with various video appliances such as the existing VTR 815 and television receiver set 816. Recently, video appliances are generally equipped with frame memory or field memory for recording the digital image data, and considering this trend, transfer of image data is designed to be executed in both digital system and conventional analog system.

Particularly, the digital data transfer to video appliance is mainly intended to transfer data to the frame memory of the video appliance, and send and receive data of the frame memory in the character broadcasting adapter, and is used in insertion of title picture or storing the specified screen. At the present, the video appliance having the function for executing reading or writing of frame memory is not available yet, but in this embodiment, in relation to the signal wire, there is a serial controller 627a (conforming to RS-232C as I/F) capable of executing data transfer serially.

This serial controller 627a incorporates a function for transferring the data by thinning or interpolating, depending on the data capacity of the video appliance (if the video appliance is provided with field memory, the function for transferring by one line each when transferring data to the video appliance, or transferring twice in every line when the data is transferred from the video appliance, or if the number of sets of vertical and horizontal data is different from the memory mounted on the video appliance, the function for thinning out the vertical or lateral data or filling up with specific data), and the information of the video appliance is confirmed by the CPU before data transfer, and the data is transferred after setting the transfer mode suited to the mode of the video appliance.

The analog data transfer with the video appliance is intended so that the present video appliance may execute input and output of data with the analog image input and output (R, G, B, S, video, etc.), and it is composed of A/D, D/A converting part 627b, and A/D, D/A conversion control part 627c for controlling the timing adjustment of data transmission and reception with the A/D, D/A converting part 627b. This A/D, D/A conversion control part 627c also possesses the function for adjusting the data to be transmitted or received depending on the function of the video appliance, same as in the digital data transfer, and the CPU confirms the mode of video appliance before data transfer, so that the data transfer conforming to the mode is executed.

The image data input, output control part 627d selects the data bus along the route for data transfer, and converts to the signal necessary for the serial controller 627a or A/D, D/A conversion control part 627c, depending on the data transfer access signal of the control bus.

Figure 82:
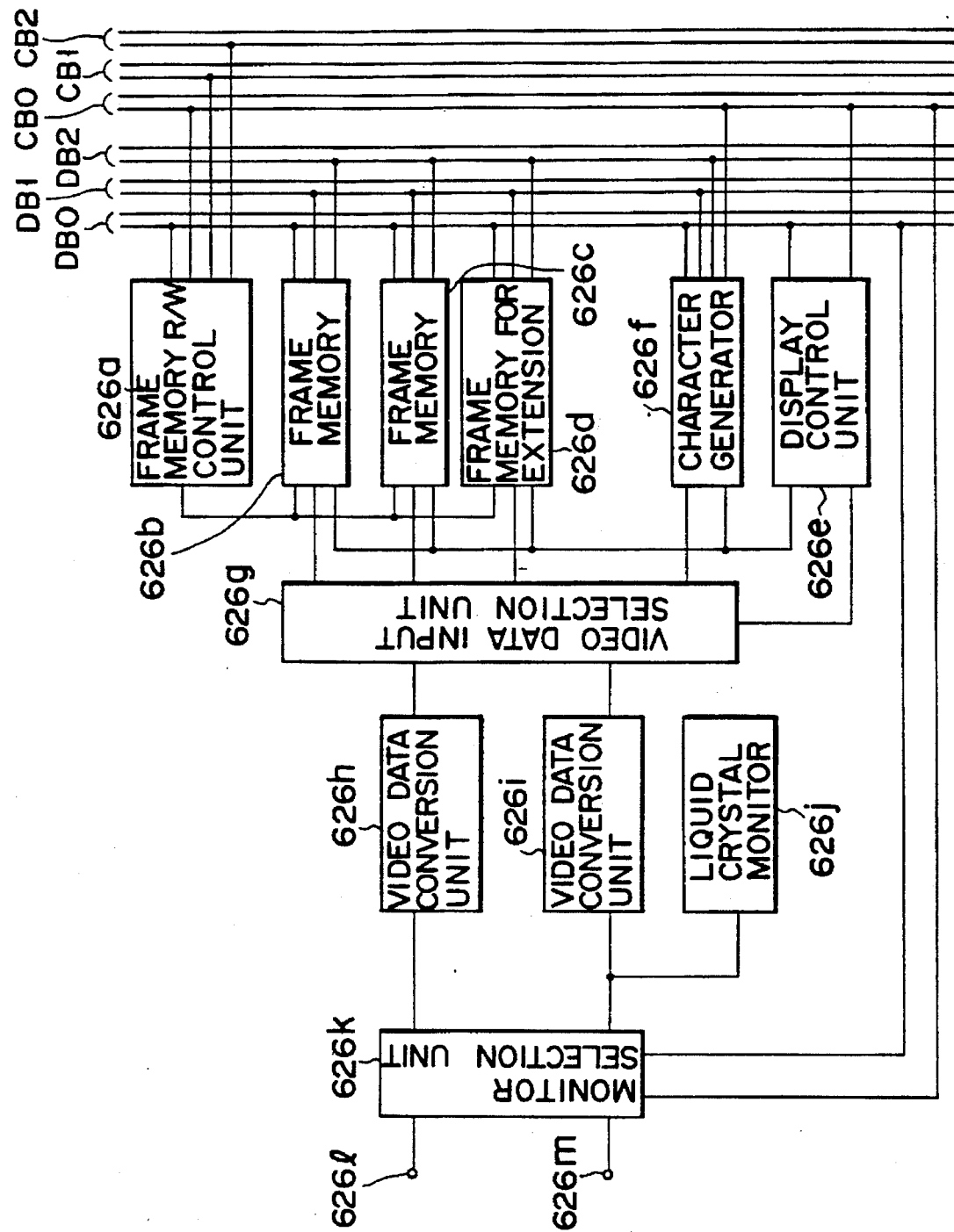
FIG. 82 is a block diagram showing details of a display part.

FIG. 82 shows the detail of the display part 626. In the first place, the frame memory R/W control part 626a is a block for generating a control signal for writing the compression-cleared R, G, B image data transferred from the device for writing into the frame memories 626b, 626c for display, or generating a control signal for reading or writing the data for applying the processing to the display image by the CPU. The transfer of image data from the device is executed continuously as if in the hardware, but prior to starting of data transfer, it is also possible to set various modes by the CPU [setting of transfer destination start address of image data (the composition in which the recording capacity of the frame memories 62b, 62c is greater than the image data quantity), thinning execution of data writing (compression of 1, ¼, ⅑, ¹⁄₁₆ at the ratio by area), selection of write frame memories 626b, 626c, etc.]

The frame memories 626b, 626c are memories for storing image data, using dual port D (dynamic) RAM, and two memories are used because the image data output ends are prepared in two systems as the display part 626. Furthermore, the frame memory for extension 626d is provided for the purpose of preserving the divided screens to solve the problem of taking too much time until completion of display because, when executing divided display of reduced image data many times in retrieval of image data or the like, if there is no extra frame memory, it is necessary to transfer repeatedly the image data for plural sheets divided from the device every time divided picture is displayed, and a connector is prepared so as to be used when extending the frame memory. If only one image device is connected, it is naturally understood that the second frame memory 626b or 626c may used for the same purpose even if there is no extension frame memory 626d.

The display control part 626e generates horizontal and vertical sync signals necessary for display, and also generates signals for transferring the data in the frame memories 626b, 626c to the shift register built in the dual port DRAM in the horizontal synchronizing signal period. As the access to the frame memories 626b, 626c, as mentioned above, data transfer to the shift register by the display control part 626e, writing of image data from the device, or reading or writing of image data by the CPU may be considered, but when plural accesses occur simultaneously, they are processed according to the order of priority.

The highest priority is the data transfer to the shift register by the display control part 626e, and if other process is in the midst of execution when the data transfer request to the shift register occurs, an interrupt request to interrupt the other process is issued, when the other process is free from problem (although being executed as a series of continuous process, but access to the frame memories 626b, 626c is not executed actually) by confirming the interrupt response signal, the data transfer to the shift register is executed, and the interrupt request is cleared after termination of the execution. The second highest priority is the writing of image data from the device, and when executing the process, after making sure interrupt request is not issued from the display control part 626e, the processing is executed by generating an interrupt request to the access by the CPU. If the access by CPU is being executed at the time of start of execution, the process is same as mentioned above.

The character generator 626f is used for displaying the character information together with the image data, and it comprises the font ROM in which font data patterns are stored, character memory for storing character codes, corresponding to the frame memories 626b, 626c, and character data transfer part for Judging the code on the basis of the signal of the display control part 626e, developing into font data pattern, and transferring the developed data into the image data input, output part 627.

The image data input selection part 626g comprises a function selection circuit capable of freely changing, by the setting of CPU, from which one of frame memories 626b, 626c the image data to be transferred to the image data conversion parts 626h, 626i is obtained, whether the whole screen is muted (color specification of mute screen being possible) or black and white display is executed, whether the data delivered from the character generator 626f is mixed or not, and so forth. The image data conversion parts 626h, 626i are the blocks for converting the image data sent out from the image data input selection part 626g into video outputs such as video, S, R, G, B, etc., and specifically the image data converting part 626i is provided with a connector to which the liquid crystal monitor 626j can be connected. When this liquid crystal monitor 626j is connected, the pin level of the connector varies, and image output is not sent to the monitor selection part 626k thereafter. The monitor selection part 626k can be freely set by the CPU, at the switch part for changing over the terminals 626l, 626m for delving the image output from the image data converting parts 626h, 626i.

Data transfer of editing machine

FIG. 83A and FIG. 83B are flow charts showing the operation processing of the CPU in data transfer. When started (step S143) by receiving data transfer request, the CPU judges, in step S144, what are the transfer source and transfer destination devices, and whether the transfer format is through, compression or expansion, and in step S145, pre-processing such as settings necessary for the transfer source and transfer destination device is executed, and the transfer source and transfer destination devices are connected to the data bus and control bus in step S146. Consequently, the CPU judges the transfer data mode in step S147, and judges if the compression or expansion transfer mode is requested in step S148.

If requested (YES), the CPU connects, in step S149, the data compression part 625h or data expansion part 625g to the data bus and control bus, and sets, in step S150, the number of sets of transfer data, and the transfer source device information for selection of the access signal to be used as count signal, to the data transfer control part 625f, on the basis of the number of sets of transfer data obtained from the information possessed by the transfer data at the time of judgement of transfer source device in step S144. If not requested (NO) in step S148, the CPU directly goes to step S150.

In step S151, the CPU generates a transfer start signal, and executes data transfer in step S152. This data transfer executed in step S152 is conducted as if in the hardware between the transfer source and transfer destination devices. Afterwards, the CPU judges if the data transfer is terminated or not in step S153. This judgement is done when the end signal is generated from the data transfer control part 625f, and until the end signal is generated, the CPU executes other process or is in waiting state.

If completed (YES), the CPU cuts off the connected buses in step S154, and performs post-processing of the transfer source and transfer destination devices in step S155, and judges if the transfer source and transfer destination devices are finished normally in step S156, and if normally finished (YES), the data transfer is completed (step S157). If data transfer is not finished normally (NO), the CPU judges abnormal end in step S158, and sets about the corresponding processing routine or instructs issuing of alarm.

As known from the flowchart above, the data transfer is effected in the hardware, in actual data transfer, in order to enhance the transfer speed, but the other processings are to be set and confirmed by the CPU.

Figure 85:
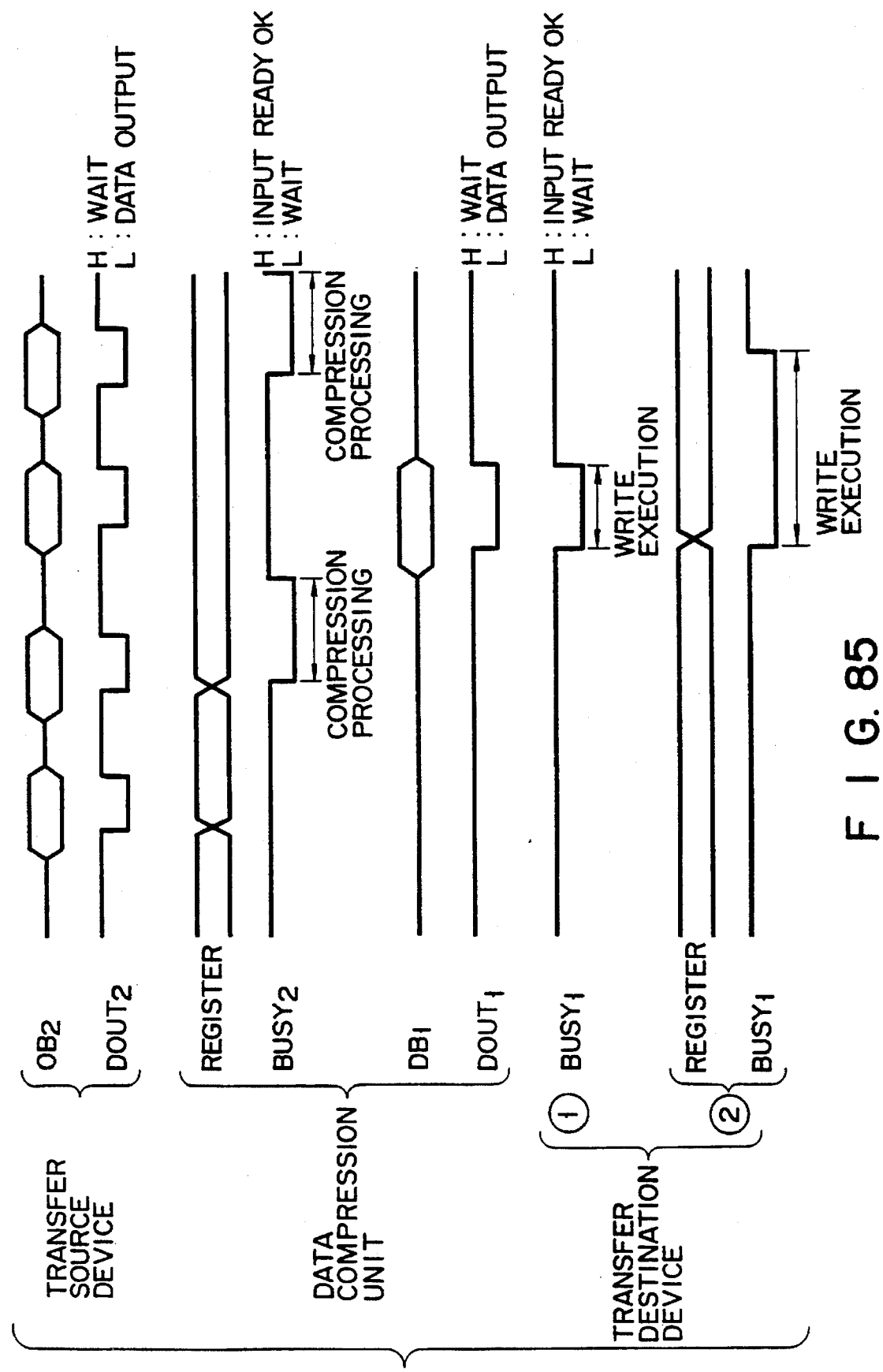
FIG. 85 is a timing chart showing the data transfer in compression mode between devices.

FIG. 84, FIG. 85, and FIG. 86 indicate the timing of data transfer between devices. First, FIG. 84 indicates a case of through data transfer without expansion or compression processing. More specifically, the I/F of the transfer source device takes in the data from the device, using the transfer start signal generated by the CPU as trigger, confirms the BUSY 1 signal (the confirmation signal whether transfer destination device is ready for input or not) generated from the transfer destination device, and delivers the data to the specified data bus (in this case, DB1), and also issues a DOUT 1 signal telling that the data has been output.

On the other hand, the I/F of the transfer destination device confirms the DOUT 1 signal, and sets the BUSY 1 signal in waiting state, and at this time if any data is delivered on the data bus DB1, the data is taken in and written into the device. Meanwhile, in the case of a device taking much time in data writing, the register for temporarily storing the data in the I/F is provided to adjust the timing. In other words, when the I/F of the transfer source device generates DOUT 1 signal, the I/F of the transfer destination device preserves the data in the register, and cancels the BUSY 1 signal from the waiting state, and writes into the device from the register. If the processing time is extremely different between the transfer source device and transfer destination device, and it cannot be adjusted by the register, the I/F of the transfer destination device holds the BUSY 1 signal in waiting state until writing from the register to the device is finished and the register comes to have a vacancy, thereby allowing to wait the data transfer from the transfer source device.

FIG. 85 relates to a case of transfer of data to the transfer destination device by compressing the data delivered from the transfer source device. In the first place, the I/F of the transfer source device takes in the data from the device, using the transfer start signal generated by the CPU as the trigger, and confirms the BUSY 2 signal (a confirmation signal telling if the data compression part 625h is ready for input or not) generated from the data compression part 625h, and delivers the data to the specified data bus (in this case, DB2), and also issues DOUT 2 signal telling that the data has been output.

In the data compression part 625h, confirming DOUT 2 signal, the BUSY 2 signal is set in waiting state, and the data on the data bus DB2 is taken into the register to execute the compression process. Afterwards, in the data compression part 625h, after confirming the BUSY 1 signal generated from the transfer destination device, the compressed data is delivered to the specified data bus DB1, thereby generating DOUT 1 signal telling that the data has been output. As a result, the I/F of the transfer destination device confirms the DOUT 1 signal, sets the BUSY 1 signal in waiting state, and takes in the compression data on the data bus DB1 to write into the device.

Incidentally, at 2 of the transfer destination device shown in FIG. 85, it shows the mode of holding the BUSY 1 signal in waiting state until the register of the I/F of the transfer destination device is vacated.

FIG. 86 refers to a case of transferring data to the transfer destination device by expanding the data delivered from the transfer source device. To begin with, the I/F of the transfer source device takes in the data from the device, using the transfer start signal generated by the CPU as the trigger, and confirms the BUSY 2 signal (a confirmation signal telling whether the data expansion part 625h is ready for input or not) generated from the data expansion part 625h, and delivers the data to the specified data bus (in this case, DB2), and also issues a DOUT 2 signal telling that the data has been output.

At the data expansion part 625g, when the DOUT 2 signal is confirmed, the BUSY 2 signal is set in waiting state, and the data on the data bus DB2 is taken into the register, and expansion process is executed. Later, at the data expansion part 625g, after confirming the BUSY 2 signal generated from the transfer destination device, the compressed data is delivered to the specified data bus DB1, while the DOUT 1 signal telling that the data has been output is generated. As a result, the I/F of the transfer destination device confirms the DOUT 1 signal, and sets the BUSY 1 signal in waiting state, and takes in the compressed data on the data bus DB1 to write into the device.

At 2 of the transfer destination device shown in FIG. 86, too, it shows the mode of holding the BUSY 1 signal in waiting state until the register of I/F of the transfer destination device is vacated.

In the data transfer including data compression or expansion, the basic concept of hand/shake is same as in the data-through transfer mode, but two data buses DB1, DB2 are used between the transfer source device I/F and the data compression or expansion part 625h, 625g, or between the data compression or expansion part 625h, 625g and the transfer destination device I/F, and handshake is executed independently. According, by making use of the time spent for compression or expansion process, it is possible to transfer the data to the transfer destination device, or execute the reading process of the compressed or expanded data from the transfer source device while transferring data to the transfer destination device, so that the data transfer speed may be enhanced.

Function of editing machine

The functions of the editing machine 600 are described below. The editing machine 600 is designed to receive operations of the exclusive keyboard 602a and remote control operation part 602i, display the menu of functions on the display part 602h of the exclusive keyboard 602a, and select a desired function from this menu. Accordingly, although not shown in the drawing, a mouse can be connected to the exclusive keyboard 602a, and the input by this mouse operation is also possible. Therefore, the operation explained hereinafter is to mean the operation by any one of the exclusive keyboard 602a, remote control operation part 602i, and the mouse.

Figure 87B:
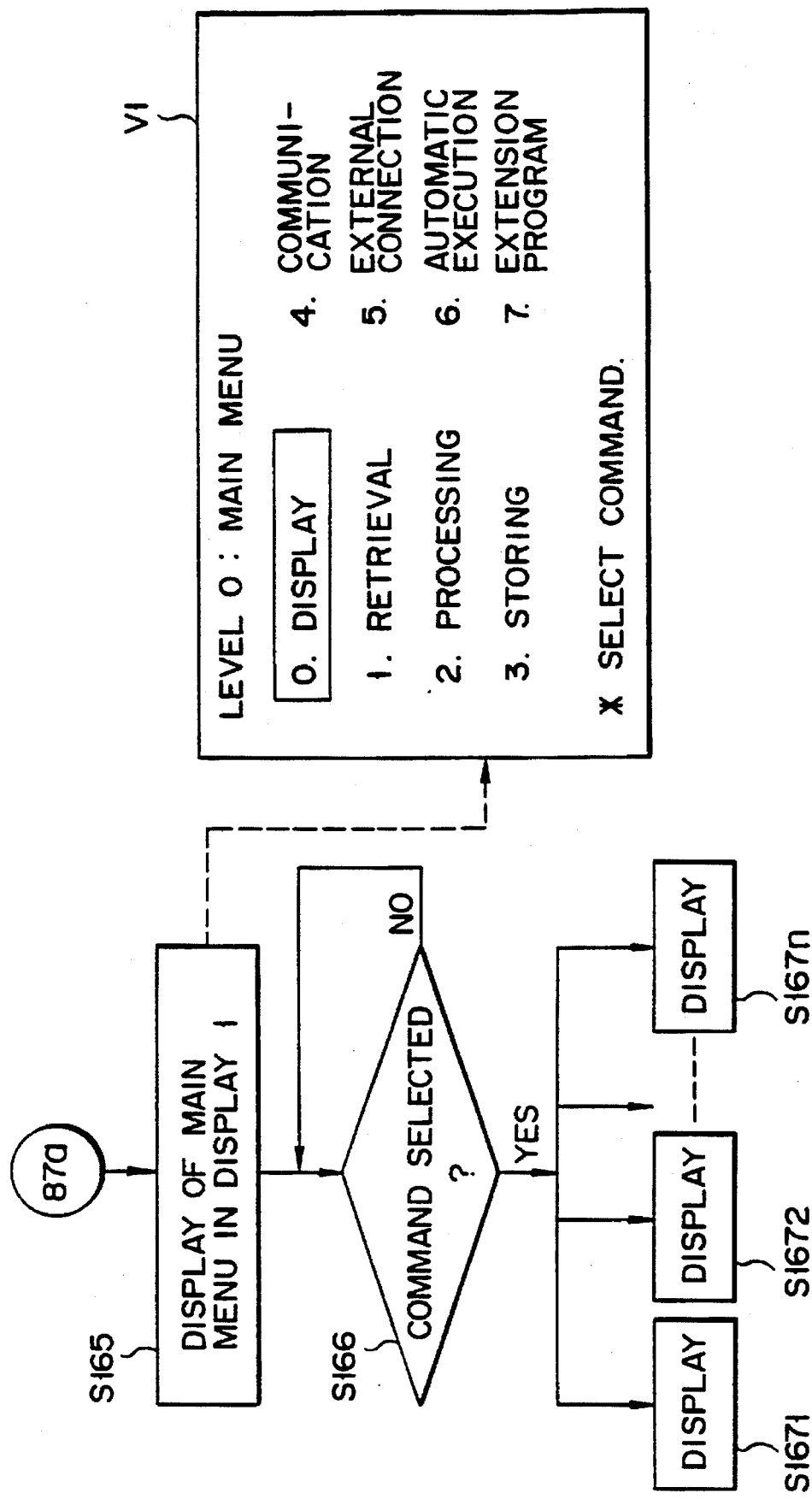

First, in FIG. 87A and FIG. 87B, when started (step S159), and the power switch 611 is manipulated in step S160 to turn on the power source, the CPU part 625 judges the type and quantity of devices connected to the editing machine 600 in step S161, and reduces possible functions on the basis of the result of judgement, and initializes necessary devices. Meanwhile, the result of judgement of connected devices is recorded in the RAM disposed in the CPU control part 625a of the CPU part 625, and is used in selection of menu.

By the judging process of the connected devices, if it is Judged that the personal computer or word processor 812 is connected, the CPU part 625 transfers the control and management of the editing machine 600 to the personal computer or word processor 812, thereby not advancing in the subsequent flowchart. In this explanation, however, it is supposed that the personal computer or word processor 812 is not connected.

In consequence, in step S162, the CPU part 625 sets in the mode of displaying the main menu on the screen of the output of display 1 (the CPU part 625 regards the display part 602h of the exclusive keyboard 602a also as an external device, and the display part 602h is specified as display 1). At this time, the other display outputs are specified to be shown on the screen in the standard image mode only to the connected display device. At this moment, however, the image data shown on the display part 602h is muted, and the screen is not displayed.

The CPU part 625 judges if only display 1 is connected or not in step S163, and if only display 1 is connected (YES), the on-screen in the standard image mode is specified in display 1 in step S164, and the main menu is shown on display 1 in step S165. At step S163, if it is not judged that only display 1 is connected (NO), the operation directly skips to step S165, and the main menu is shown on display 1. This main menu indicates, as shown in V1 in FIG. 87B, the level of menu, mode name of menu, and functions (display, retrieval, processing, storing, communication, external connection, automatic execution, and extension program). Depending, however, on the connected state of external devices, all menus may not be displayed. For example, when the modem is not connected, the function of communication is not displayed.

Consequently, the CPU part 625 is set in waiting state until the command for selecting the function displayed in the menu is entered in step S166, and when the command is entered (YES), the display corresponding to the function selected by the command is shown in steps S1671, 1672, . . . , 167n.

Figure 88:
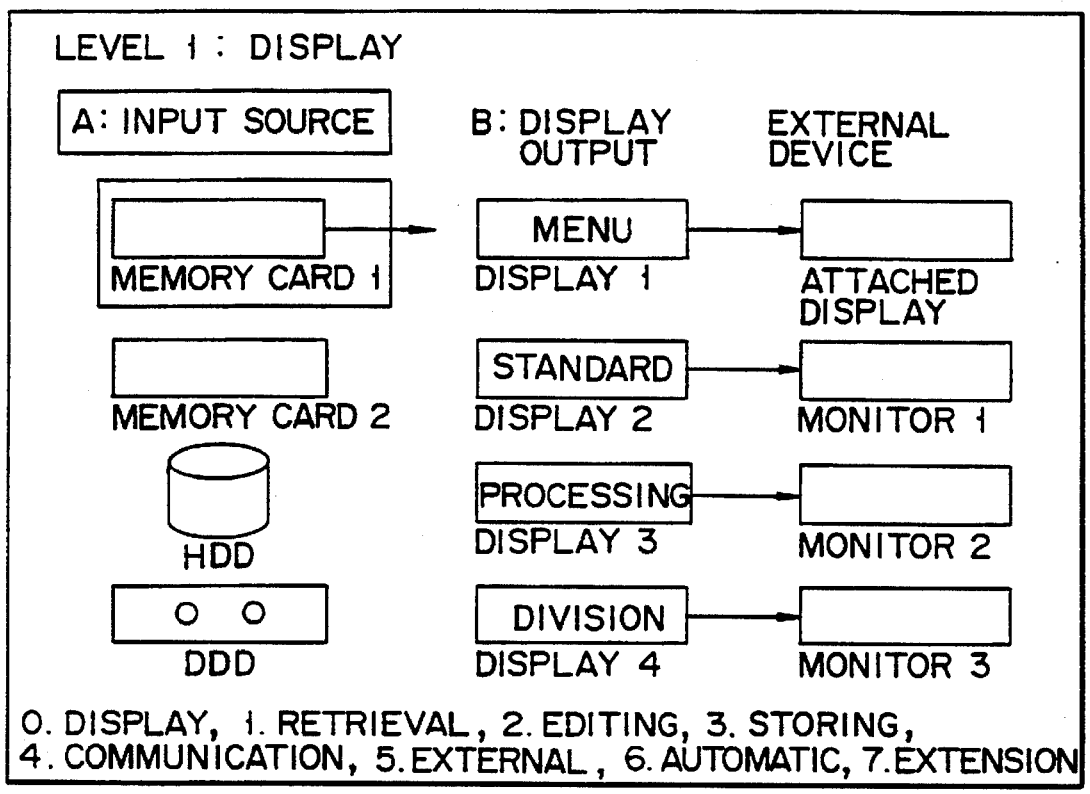
FIG. 88 and FIG. 89 are drawings showing examples of display screen in the operating state when turning on the power source.

In this case, when the display function is selected on the main menu, the screen of display 1 becomes as shown in FIG. 88, that is, the menu level is changed to "1" and the menu mode name to "display," and all input sources connected to the editing machine 600 (memory cards 1, 2, HDD, DDD), external devices for data display (attached display which is display 1, monitors 1, 2, 3), and display outputs (menu, standard, processing, division) are displayed.

Figure 89:
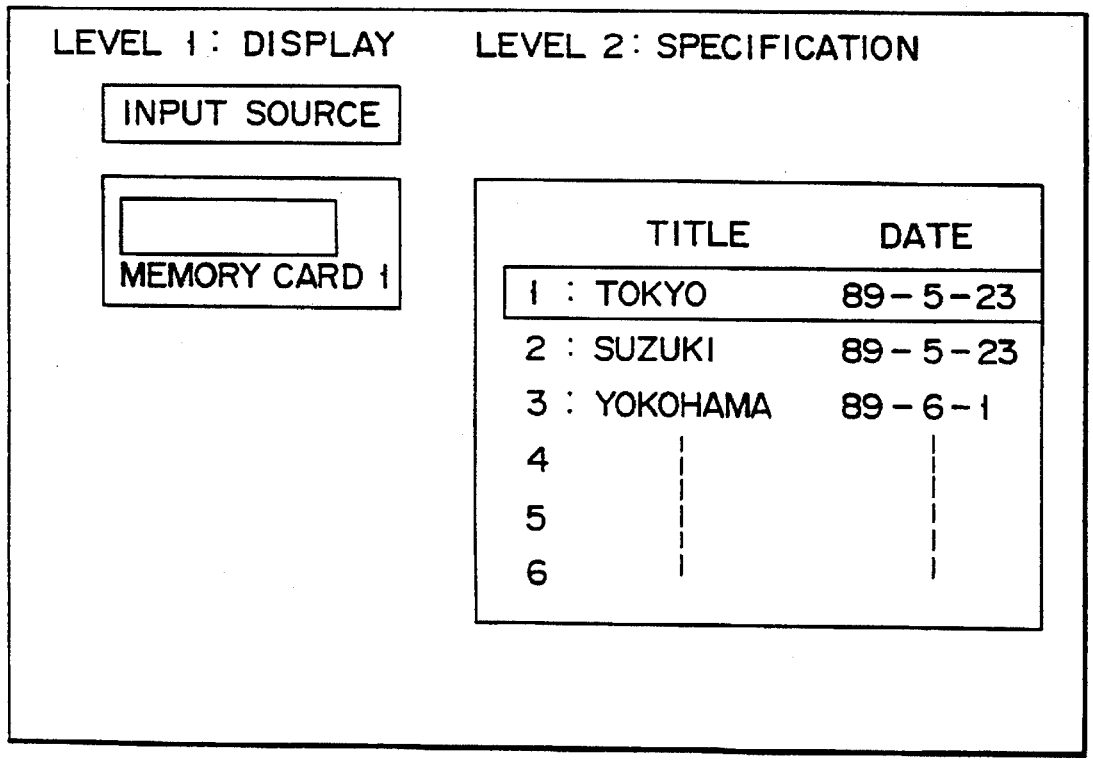

As the input source, in the first place, when the memory card 1 is specified, for example, the screen of display 1 changes to level 2, menu mode name "specification" as shown in FIG. 89, and the titles and dates of all data recorded in the memory card 1 are displayed. In this state, when the desired titles are completely specified, the screen returns to the display of menu level 1 shown in FIG. 88.

Next, in the menu level 1, the display output can be specified. This display output is available in four types, menu, standard, processing, and division, and specifically the menu is the display of operation, and it is to specify whether or not to superimpose the image on the screen after specification. The standard is the full angle display mode of screen. The processing is the mode for displaying the image in the midst of processing, and if no processing is done, it is same as the standard mode. The division is the mode for dividing the screen into 4, 9 or 16 sections, and by specifying the number of divisions, specified different images can be displayed in the divided screens.

Afterwards, when the external device to be displayed on the screen is specified, all sections relating to display are finished. For example, when the memory card 1 is specified as the input source, the standard as the display output and monitor 1 as the external device, the image of the title selected by the memory card 1 can be displayed in the monitor 1 in the standard mode. In the state of menu level 1, as shown in FIG. 88, the function of the main menu is displayed in the lower part of the screen, and the function can be selected without having to return to the menu level 0.

The retrieval function is explained next. In this retrieval, on the recording media including the memory card 400 and filing device 500, desired images are retrieved by using header data or division output (16-division screen). That is, in FIG. 90, when the retrieval is selected (step S168) on the main menu, the CPU part 625 changes the screen of display 1 to V2, the menu level to "1" and the menu mode name to "retrieval" so as to specify the retrieval destination in step S169, and all input sources connected to the editing machine 600 (memory cards 1, 2, HDD, DDD) are displayed.

For example, when DDD is specified, the CPU part 625 changes the screen of display 1 to V3, the menu level to "2" and menu mode name to "retrieval mode" so as to specify the retrieval mode in step S170, that is, to specify to retrieve with which items, and the retrieval mode data are displayed, such as the range, title, date, compression rate, data type, photographic situation, and key words. Specifically, the range is either no input or ALL, which indicates all recording media, and specifies the starting position and end position of image, or the number of images from the start position. The title is specified by either all or part of titles, and for example when "TOKYO*" is specified, all of TOKYO, TOKYO1, TOKYO2, and so forth can be specified. The date is specified by the whole date, and as the compression rate, either the image of the same compression rate can be specified, or plural images with different compression rates can be specified. As the data type, the same data type can be specified, and the photographic situation is set by the weather, location, picture quality or addition of flag data. The key word is in free format and plural words can be specified, including synonyms. For example, "red" means both red and red color, and "read and house" includes red house, "red or blue" is for retrieving both red and blue, and "(red or blue) and house" includes both red house and blue house.

Figure 91:
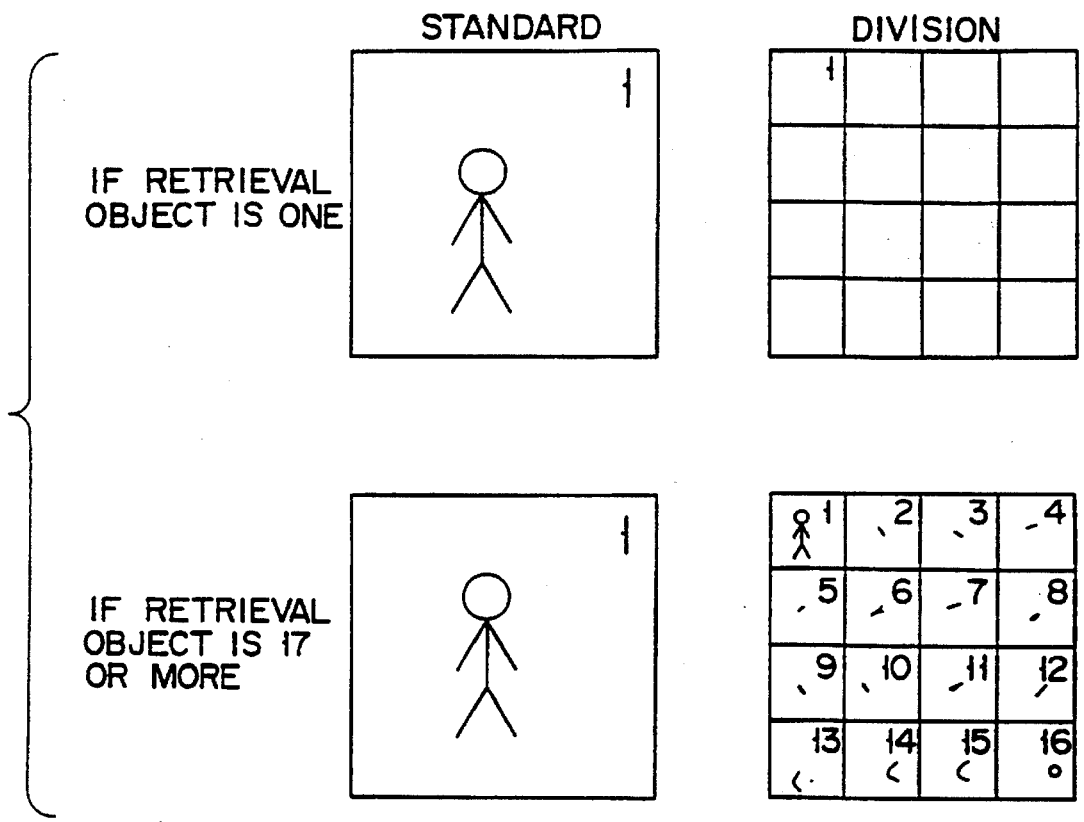

Afterwards, in step S171, the CPU part 625 retrieves according to the head data, and the first retrieval image is displayed in the monitor in the standard mode in step S172. The retrieval screen at this time is as indicated by the standard when the object of retrieval is only one as shown in FIG. 91. If the object of retrieval is plural pieces, the CPU part 625 divides the monitor screen into 16 sections in step S173, and the first retrieval image is displayed in one display region. The retrieval screen at this time is indicated in the division when the retrieval object is one as shown in FIG. 91. Thereafter, the CPU part 625 displays the retrieval image after the second piece, in step S174, by distributing into the display regions divided in 16 sections of the monitor. This display action is effected, in every piece, as indicated in the standard when the object of retrieval is 17 or more pieces in FIG. 91, by once displaying in the standard mode, and dividing into display regions divided in 16 sections as indicated in the division when the retrieval object is 17 or more pieces.

In this way, when all 16 divided display regions of the monitor are filled up, the CPU part 625, in order to display the menu of the content of the retrieval image in step S175, changes the screen of display 1 to V4, the menu level to "3" and the menu mode name to "detail" and display the titles and dates of 1y pictures being retrieved in advance. When any one of the 16 pictures is specified in step S176, the CPU part 625 displays the specified image on the monitor in the standard mode, as indicated by the standard when the retrieval object is 17 or more pieces in FIG. 91.

In next step S177 in FIG. 92, the CPU part 625 judges if the images retrieved in step S171 are 17 or more pieces, and if YES, the CPU part 625 records the retrieval image after the 17th piece in the inside extension memory in step S178. If there are 33 or more images retrieved in step S171, the retrieval images are recorded also in the extension memory. The CPU part 625 judges if there is next screen retrieval request for specifying any one of the subsequent images after the 17th one in step S179, and is present (YES), the screen of display 1 is changed to V5 so as to set to display the titles and dates of the images after the 17th one, and the images after the 17th one recorded in the extension memory in step S180 are divided and delivered on the monitor. This display action is carried out in such a manner as to distribute into 16 divided display regions as indicated by the division of next screen when the retrieval object is 17 or more in FIG. 93.

Figure 93:
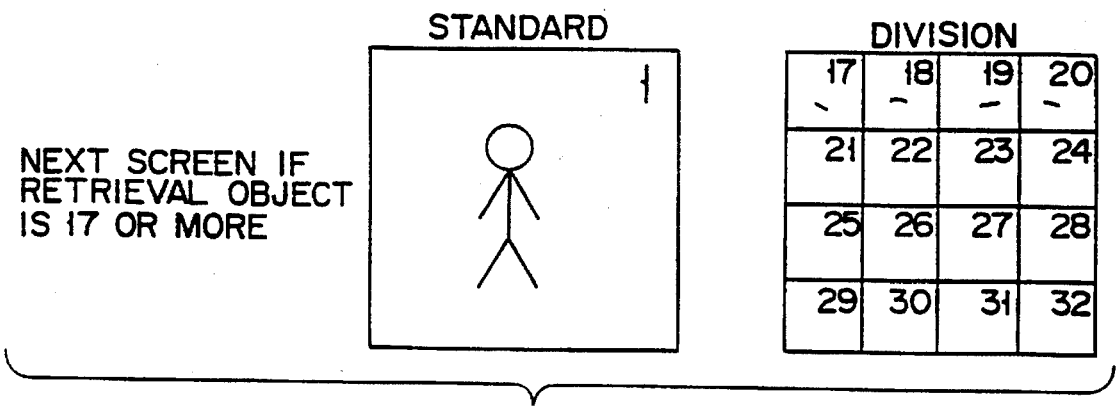

Next, the CPU part 625 changes the screen of display 1 to V5 in step S181, and updates to display the titles and dates of the screens after the 17th one, and when one of the images after the 17th one is specified in step S182, the specified image is displayed on the monitor in the standard mode, as indicated in the standard of the next screen when the retrieval object is 17 or more in FIG. 93, and the operation is terminated (Step S183). In steps S177 and S179, if the results of judgement are both NO, the operation is directly terminated (Step S183).

The processing function is described below. The processing is a step of processing the original image and creating new image data. This is realized by displaying the image of standard mode, for example, on the monitor, and transferring it to the processing screen. In other words, in FIG. 94, when the processing is selected on the main menu (step S184), the CPU part 625 changes the menu level to "1" and the menu mode name to "processing" so as to change the screen of display 1 as shown in V6 in step S185, displays the processing mode (screen enlargement, reduction, screen synthesis, graphic insertion, text insertion, level conversion), and waits until the processing mode is specified. When any processing mode is specified, the processing of CPU part 625 is divided into five modes.

When the compression is specified, the CPU part 625 changes the screen of display 1 to V7, the menu level to "2" and the menu mode name to "screen enlargement, reduction" so as to set the scale in step S186, and displays the scale (¼, ⅓, ½, 2, 4), and requests the specification of the starting position of the original image to be reduced on the screen V7 in step S187. If, for instance, the scale ¼ is specified, and the starting position is specified as indicated by arrow on screen V8 in step S188, the CPU part 625 reduces the original image in step S189, and displays the image, thereby terminating (step S190). In this case, as shown in FIG. 95, the original image of the standard mode and the reduced image can be respectively displayed in two display regions in the four-division screen.

Figure 96A:
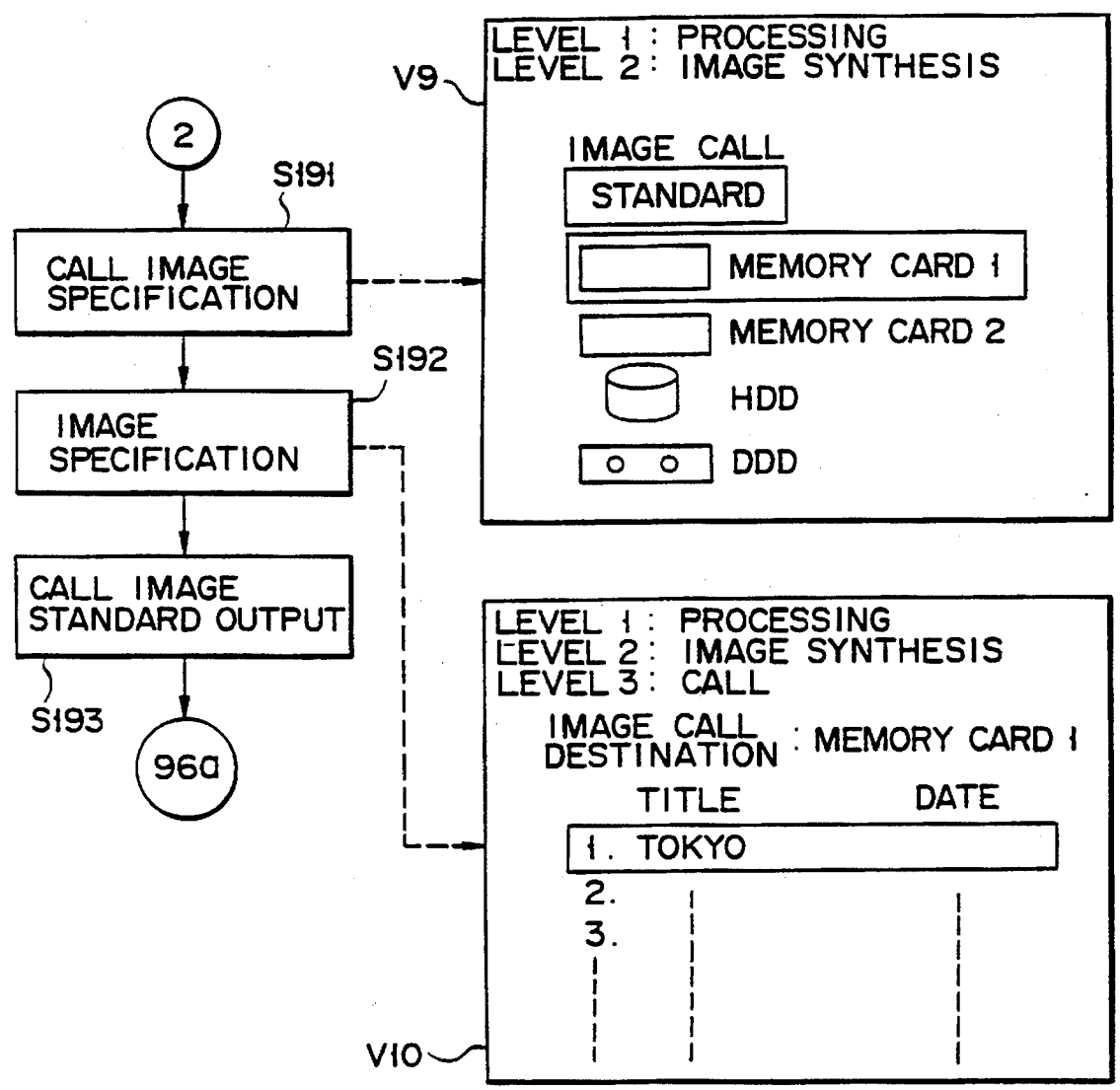

The screen synthesis is to insert other picture into the original image by reducing, and when the screen synthesis is specified, as shown in FIG. 96A and FIG. 96B, the CPU part 625 changes the screen of display 1 to V9, the menu level to "2" and the menu mode name to "screen synthesis" so as to call the input source recorded in the image to be synthesized in step S191, and displays the input source (memory cards 1, 2, HDD, DDD), thereby causing to specify, For instance, when the memory card 1 is specified, the CPU part 625 changes the screen of display 1 to V10, the menu level to "3" and menu mode name to "readout" so as to call the image to be synthesized in step S192, and displays the title, thereby causing to specify.

Afterwards, the CPU part 625 displays the read image in the standard mode in step S193, and changes the screen of display 1 to V11, the menu level to "3" and menu mode name to "scale" in order to set the scale in step S194, and displays the scale (¼, ⅓, ½), thereby causing to specify. When the scale is specified at, for instance, ¼ and the start position is specified by arrow as shown in screen V12 in step S195, the CPU part 625 reduces the image in step S196, and synthesizes with other unreduced image to display the combined image, thereby terminating (Step s197). In this case, as shown in FIG. 97, it is also possible to display the called image and other image in the standard mode individually, display a synthesized image of the reduced image with a standard image, or display the synthesized image of standard image and reduced image in three display regions of four divisions.

The graphic insertion is to insert a registered graphic pattern into an image, and when the graphic insertion is specified, the CPU part 625 changes the screen of display 1 to V13, the menu level to "2" and the menu mode name to "graphic insertion" in order to set the graphic pattern to be inserted in step S198 as shown in FIG. 98, thereby displaying and specifying the graphic pattern (square, rectangle, circle, triangle, . . . , creation). For instance, when the circle is specified, the CPU 625 changes the screen of display 1 to V14, the menu level to "3" and the menu mode name to "position" in step S199, and displays the arrow to specify. When the position is specified, the CPU 625 changes the screen of display 1 to V15, the menu level to "3" and the menu mode name to "color" in step S200, thereby requesting to specify frame, middle blanking or outer blanking, and to specify the color. When specified, in step S201, the graphic pattern is inserted into the other image to finish (step S202). In this case, when the pattern of frame, middle blanking or outer blanking is inserted into other screen of the standard mode, the processing screen becomes as shown in FIG. 99.

Figure 100:
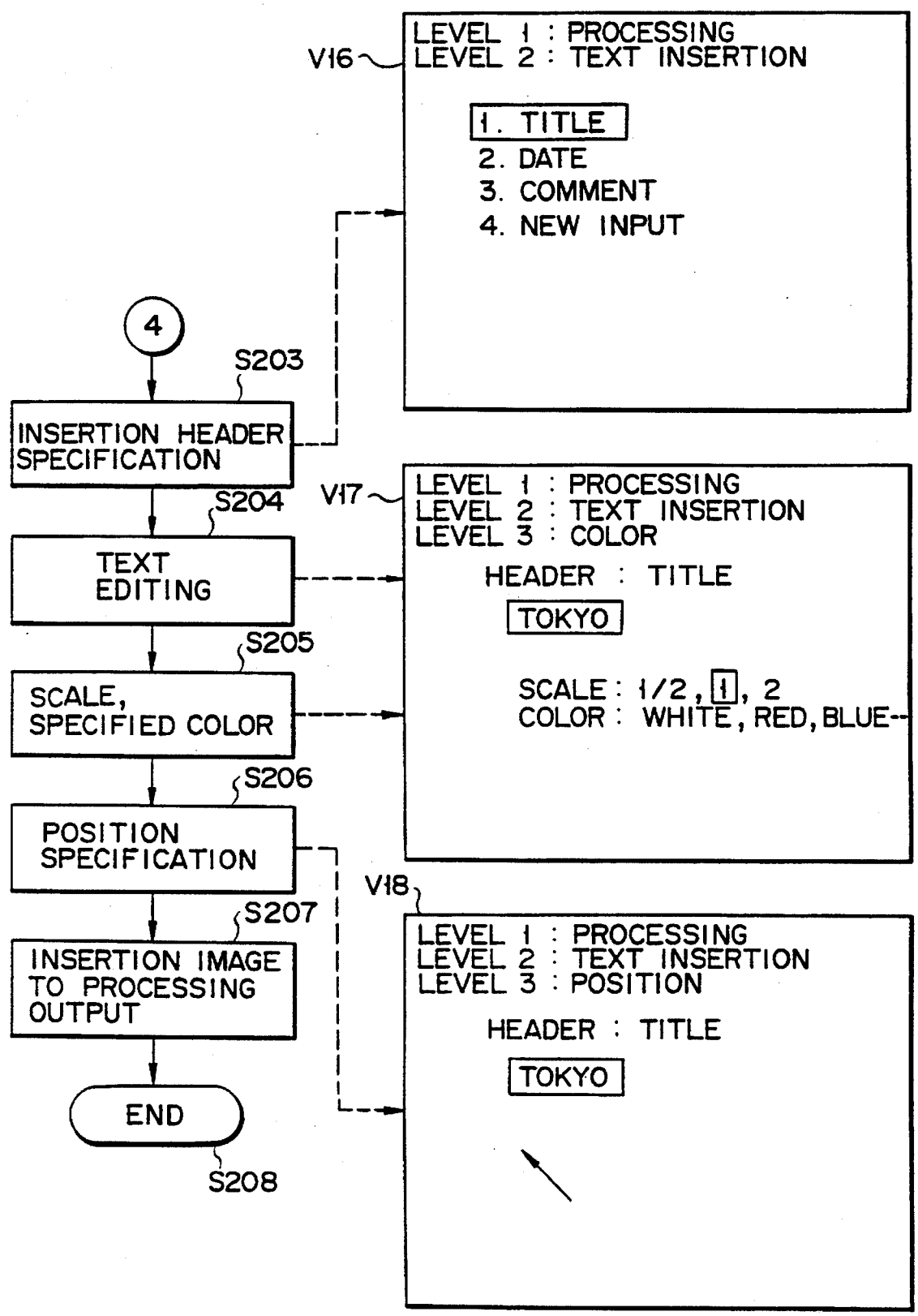
FIG. 100 is a flow chart for explaining the operation of text insertion function.
Figure 101:
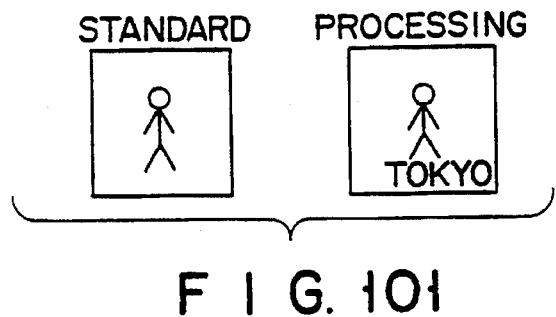
FIG. 101 is a drawing showing an example of a display screen by text insertion function.

The text insertion is to display the header data in image, and when the text insertion is specified, the CPU part 625 changes the screen of display 1 to V16, the menu level to "2" and the menu mode name to "text insertion" in order to set the insertion header in step S203 as shown in FIG. 100, and displays and specifies the header (title, date, comment, new input). For instance, when the title is specified, the CPU part 625 changes the screen of display 1 to V17, the menu level to "3" and the menu mode name to "color" in step S204, and enters the title, and displays and specifies the scale and color in step S205. Here, if the title, scale and color are specified, the CPU part 625 changes the screen of display 1 to V18, the menu level to "3" and the menu mode name to "position" in step S206, and requests specification of insertion position by arrow. When specified, in step S207, this text is inserted into other image, thereby finishing (step S208). In this case, the relation between the standard image and the text insertion image is as shown in FIG. 101.

Figure 103:
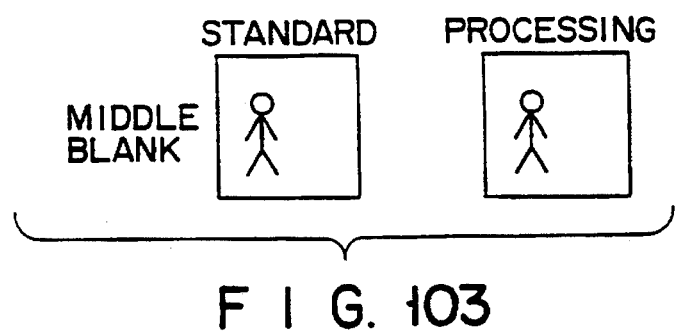
FIG. 103 is a drawing showing an example of a display screen by level conversion function.

The level conversion is to provide the image in a specific range with brightness and color contrast, and when the level conversion is specified, the CPU part 625 changes the screen of display 1 to V13, the menu level to "2" and the menu mode name to "graphic insertion" in order to set the graphic pattern for determining the range of level conversion in step S209 as shown in FIG. 102, and displays and specifies the graphic pattern (square, rectangle, circle, triangle, . . . , creation). For instance, when the circle is specified, the CPU part 625 changes the screen of display 1 to V14, the menu level to "3" and the menu mode name to "position" in step S210, and displays and specifies the arrow. When the position is specified, the CPU part 625 changes the screen of display 1 to V19, the menu level to "3" and the menu mode name to "frame" in step S211, and requests to specify whether middle blanking or outer blanking, and to specify the intensity level in step S212. When specified, in step S213, the image in the range determined by the graphic pattern is converted in level, thereby terminating (step S214). For instance, when the strong level is specified in middle blanking of circle, the standard image is emphasized as shown in FIG. 103.

The preserve function is explained below. This preserve function is used for recording, copying and deleting image data, or rewriting the header data, or add key words. That is, in FIG. 104A and FIG. 104B, when the preserve is selected on the main menu (step S215), the CPU part 625 changes the screen of display 1 to V20, the menu level to "1" and the menu mode name to "preserve" in step S216, displays the record mode (image record, image copy, image dubbing, image deletion, header editing), and waits until the record mode is specified. When any record mode is specified, the processing of the CPU part 625 is divided in five modes.

First, when the image record is specified, the CPU part 625 changes the screen of display 1 to V21, the menu level to "2" and the menu mode name to "image record" so as to set the record source in step S217, and displays the record source (standard, processing, division), and also displays and specifies the recording destination (memory cards 1, 2, HDD, DDD). Next, in step S218, the CPU part 625 judges if the recording destination is memory card or not, and if memory card (YES), in step S219, in order to specify in which part of the memory card the data is to be recorded, the screen of display 1 is changed to V22, the menu level to "3" and the menu mode name to "recording destination," and after specifying in which piece to record, and the picture quality mode is set in step S220. If the destination of recording is not memory card (NO) in step S218, the operation directly goes to step S220, and the picture quality mode is set.

In this picture quality mode setting, in order to set the picture quality of the data to be recorded in the recording medium, the CPU part 625 changes the screen of display 1 to V23, the menu level to "3" and the menu mode name to "picture quality", and displays and specifies the compression mode, image type, etc. Consequently, in step S221, in-order to input the header data or key word of header, the CPU part 625 changes the screen of display 1 to V24, the menu level to "3" and the menu mode name to "header", thereby requesting input of changeover, title, comment, key word, etc. Then, in step S222, the CPU part 625 records the image data and header data into the recording medium, thereby finishing (step S223). At this time of writing, the present date is recorded automatically.

Figure 105A:
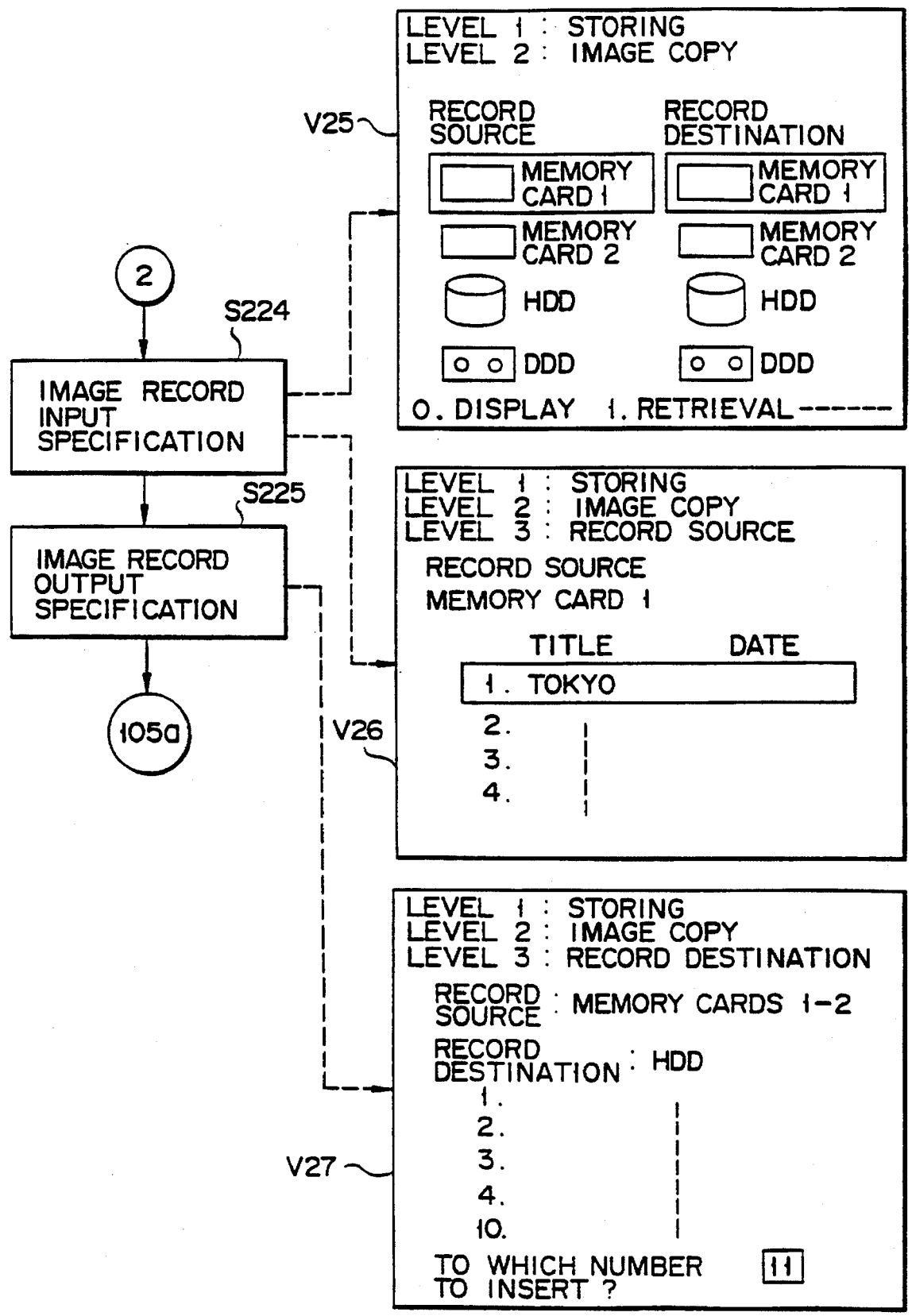

The image copy is to record data from one recording medium into other recording medium (including the same one), and when the image copy is specified, the CPU part 625 changes, as shown in FIG. 105A and FIG. 105B, the screen of display 1 to V24, the menu level to "2" and the menu mode name to "image copy" in step S224, and displays and specifies the recording source and recording destination, and then changes the screen of display 1 to V26, the menu level to "2" and the menu mode name to "recording source" and displays and specifies the title. Consequently, when the memory card 1 is selected as the recording source and the title is specified, and the HDD is specified as the recording destination, the CPU part 625 changes the screen of display 1 to V27, the menu level to "3" and the menu mode name to "recording destination" in order to specify in which part of HDD the data is to be recorded, in step S225, and after specifying in which piece to record, the picture quality mode is set in step S226.

In this picture quality mode setting, in order to set the picture quality of the data to be recorded in the recording medium, the CPU part 625 changes the screen of display 1 to V28, the menu level to "3" and the menu mode name to "picture quality", and displays and specifies the compression mode, image type, etc. In step S227, the CPU part 625 changes, in order to input the header data and key word of header, the screen of display 1 to V29, the menu level to "3" and the menu mode name to "header", thereby requesting input of changeover, title, comment, key word, etc. In step S228, the CPU part 625 records the image data or header data from the memory card into the HDD, and confirms and displays the completion of recording in step S229, thereby finishing (step S230).

Figure 106:
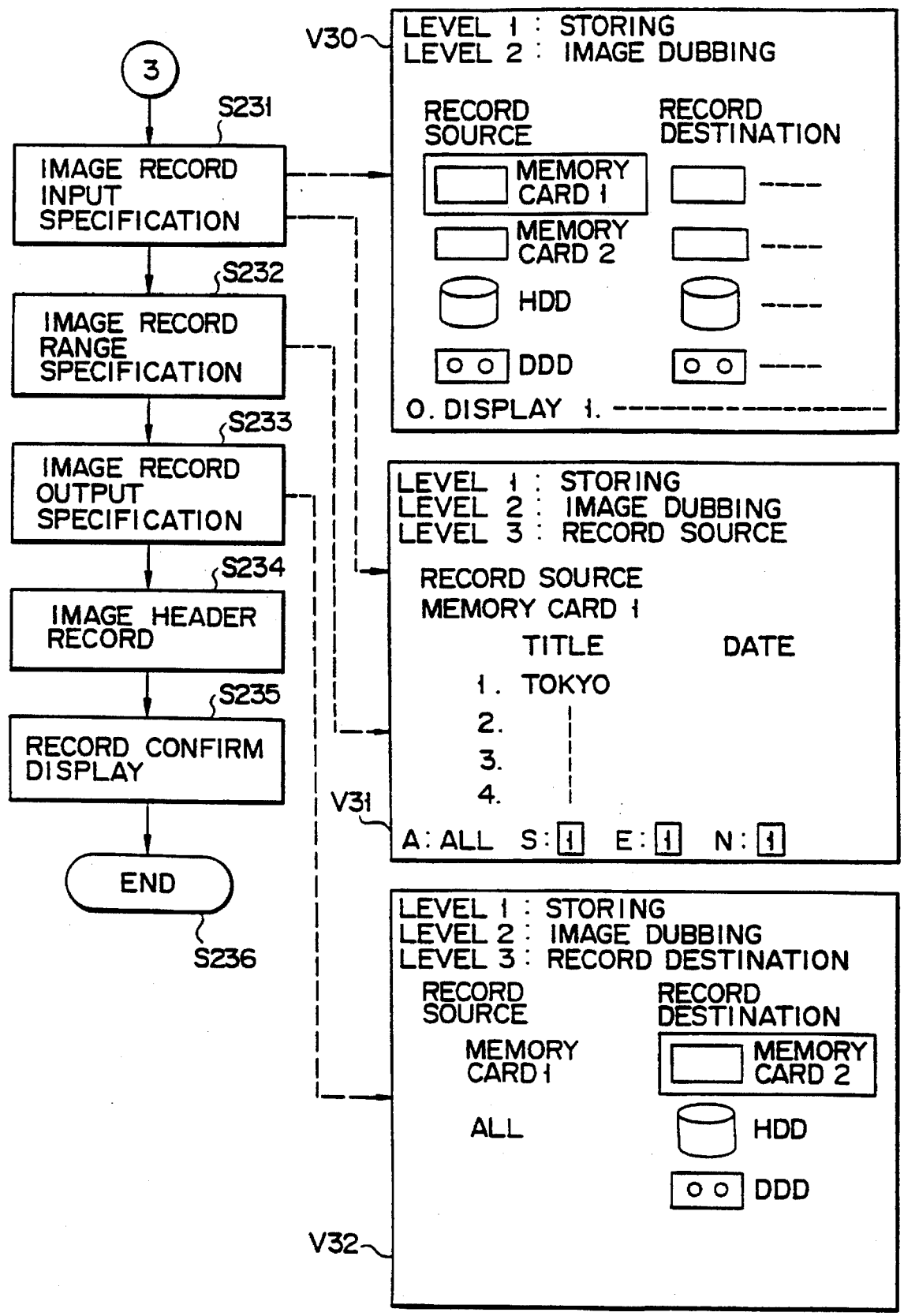

The image dubbing is to record the image data and header data in one recording medium into plural recording media (including the same one), and when the image dubbing is specified, the CPU part 625 changes, as shown in FIG. 106, the screen of display 1 to V30, the menu level to "2" and the menu mode name to "image dubbing" in step S231, and displays and specifies the recording source, and it also changes the screen of display 1 to V31, the menu level to "3" and the menu mode name to "recording source" to display and specify the title. Afterwards, the CPU part 625 displays and selects the recording range on the screen V31 in step S232.

In step S233, the CPU part 625 changes the screen of display to V32, the menu level to "3" and the menu mode name to "recording destination" to display and specify the recording destination. In this way, when the memory card 1 is selected as the recording source, the title is specified, and the memory card 2 is specified as the recording destination, the CPU part 625 records, in step S234, the image data and header data of the memory card 1 so as to add to the end of the recorded data in the memory card 2, and completion of recording is confirms and displayed in step S235, thereby finishing (step S236).

Figure 107:
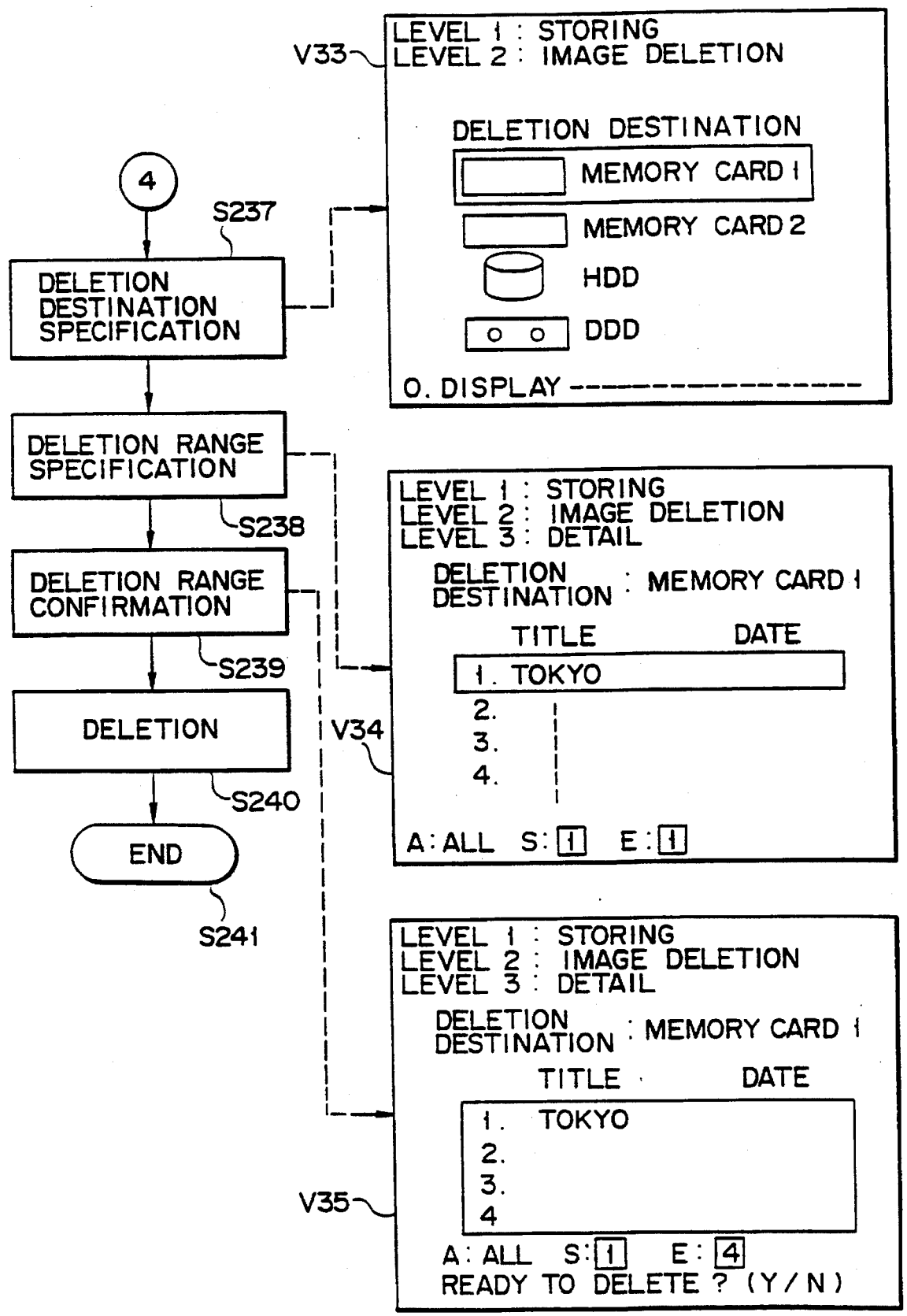
Figure 109A:
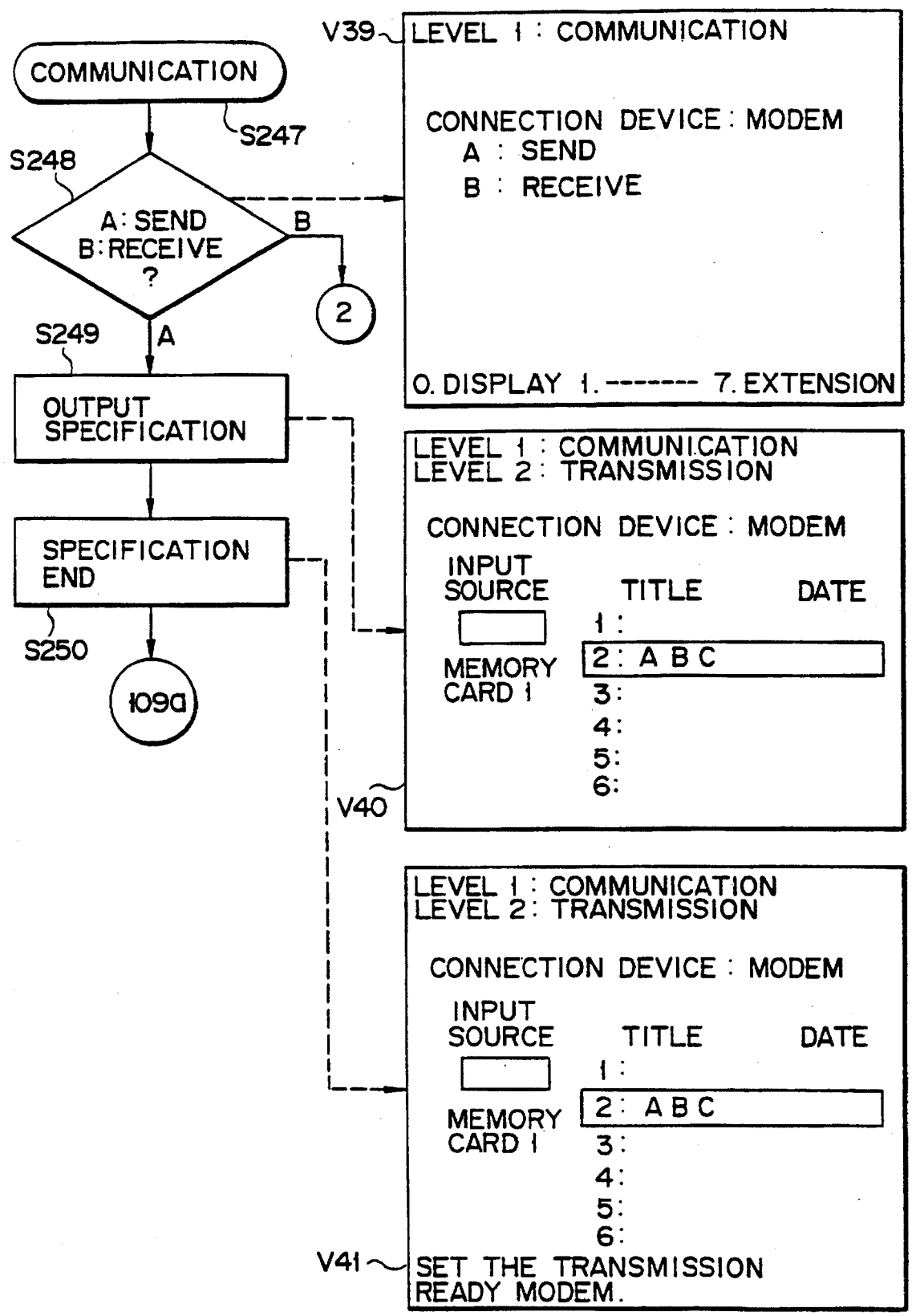
Figure 109B:
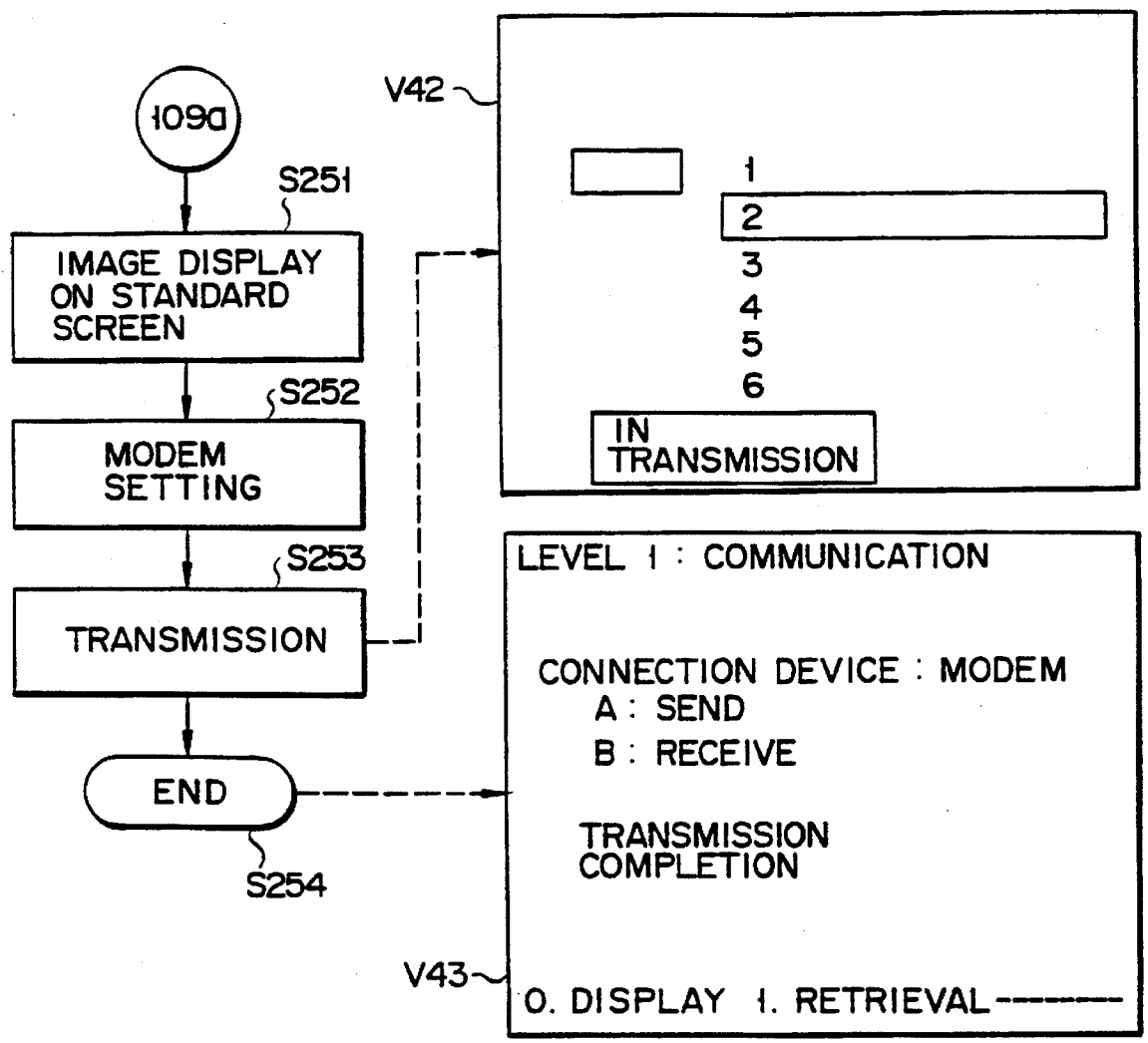

The image deletion is for deleting the recording data is one recording medium for the portion of plural media, and when the image deletion is specified, the CPU part 625 changes the screen of display 1 to V33, the menu level to "2" and the menu mode name to "image deletion" in step S237 as shown in FIG. 107, and in step S238, it changes the screen of display 1 to V34, the menu level to "3" and the menu mode name to "detail" thereby displaying and specifying the range of deletion. In step S239, the CPU part 625 changes the screen of display 1 to V35, while maintaining the menu level at "3", and the menu mode name at "detail" and the specified deletion range is displayed to be confirmed, and the deletion is executed in step S240 to finish (step S241).

The header editing is to rewrite the header data, and when the header editing is specified, the CPU part 625 changes, as shown in FIG. 108, the screen of display 1 to V36, the menu level to "2" and the menu mode name to "header editing" in step S242, and the header editing destination is displayed and specified. When the memory card 1 is specified as the header editing destination, the screen of display 1 is changed to V37, the menu level to "3" and the menu mode name to "detail" in step S243, and the image subjected to header editing is displayed and specified. Afterwards, the CPU part 625 changes the screen of display 1 to V38, while maintaining the menu level at "3", and the menu mode name at "detail" in step S244, and the header to be editing is specified, and the editing is executed in step S245, thereby finishing (step S246).

The communication function is described. This communication function is used in transmission and reception of image data through RS-232C circuit. That is, in FIG. 109A and FIG. 109B, when the communication is selected on the main menu (step S247), the CPU part 625 changes the screen of display 1 to V3R, the menu level to "1" and the menu mode name to "communication" in step S248, and either transmission or reception is displayed and specified when the transmission is selected, for example, the CPU part 625 changes the screen of display 1 to V40, the menu level to "2" and the menu mode name to "transmission" in step S249, and the recording medium to be transmitted and the type of the image are displayed and specified. When the specification is over, the CPU part 625 displays, in step S250, the completion of preparation for transmission, while keeping the menu level at "2" and the menu mode name at "transmission" as shown in the screen V41 of display 1.

Figure 110:
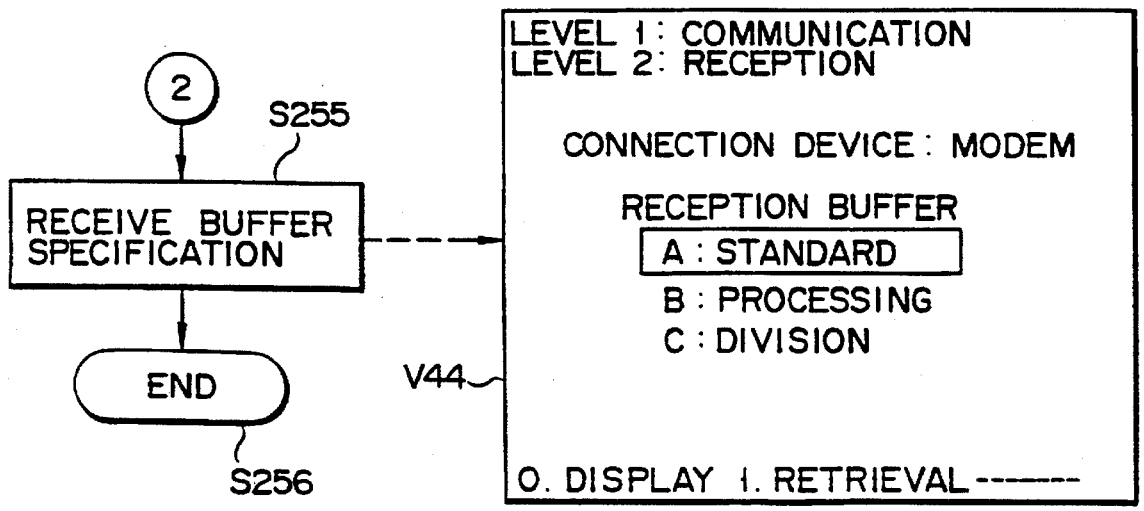

In step S251, the CPU part 625 displays the image to be transmitted in the standard mode, sets the modem in step S242, and executes the transmission in step S253. At this time, the display during transmission is shown in the screen of display 1 as indicated by V42. When the transmission is over (step S254), the completion of transmission is displayed on the screen of display 1 as indicated by V43. When the reception is selected in step S248, on the other hand, the CPU part 625 changes the screen of display 1 to V44, the menu level to "1" and the menu mode name to "reception" as shown in FIG. 110 in step S255, and the reception buffer is displayed and specified, thereby terminating (step S256).

During the reception action, as shown in FIG. 111, when started (step S257), the CPU 625 changes the screen of display 1 to V45, the menu level to "2" and the menu mode name to "specification in step S258, and the message telling the start of reception is displayed, and in step S259, the display to interrupt the present job is shown as indicated by V45 on the screen of display 1. In step S260, the CPU part 625 transfers the reception data to the reception buffer, and displays the message of completion of reception as shown in V49 on the screen of display 1 in step S261, thereby returning to the original job in step S262 and finishing (step S263).

Figure 112:
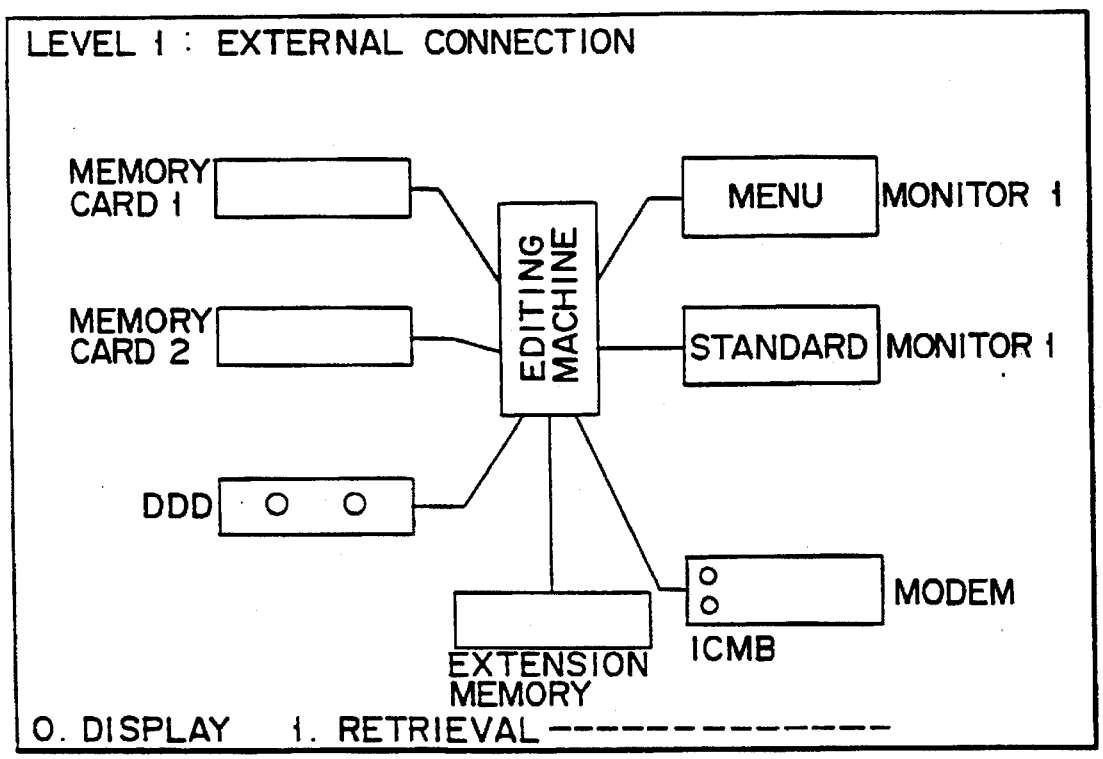
FIG. 112 is a drawing showing an example of a display screen by external connection function.
Figure 104A:
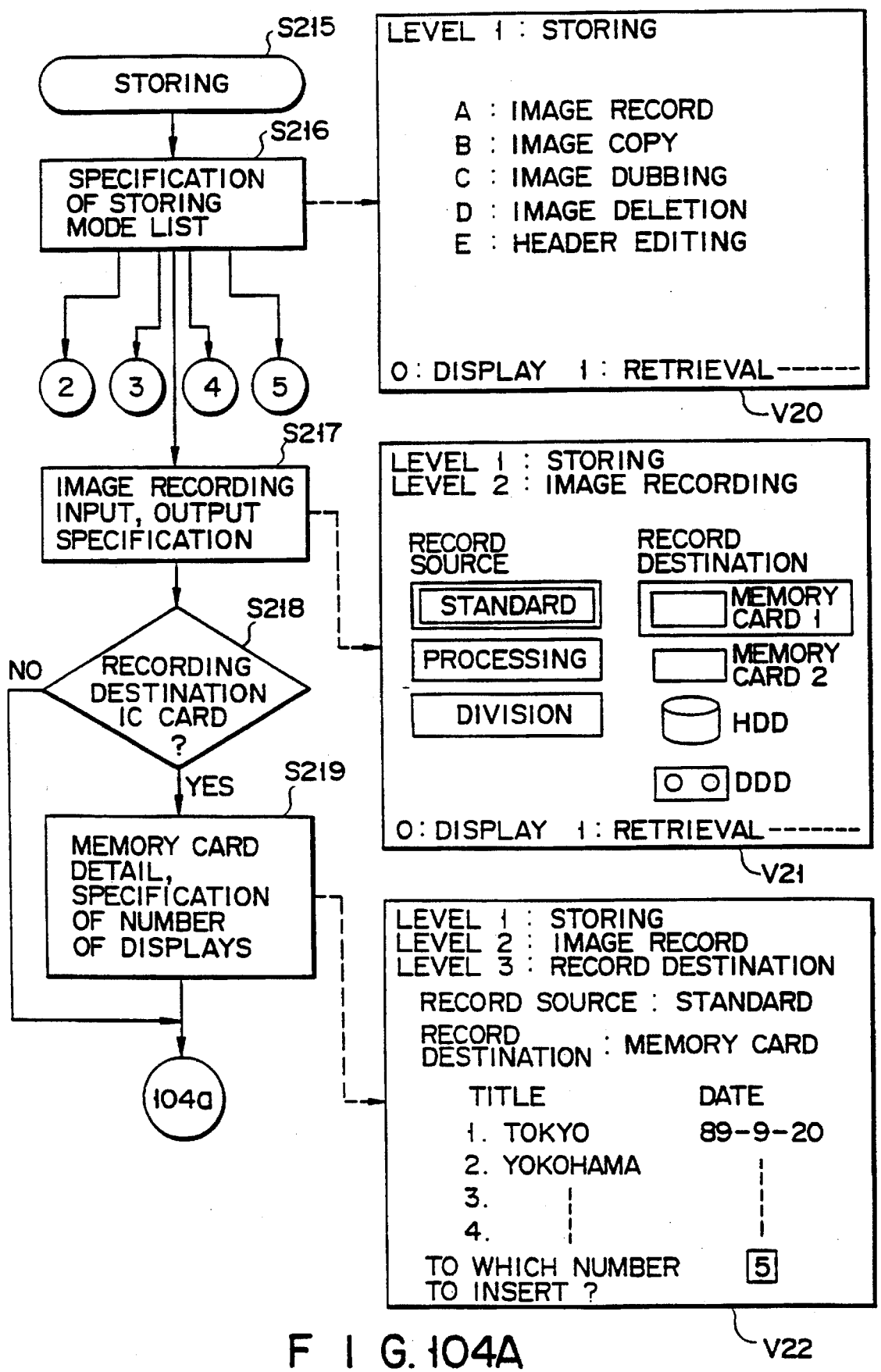
Figure 104B:
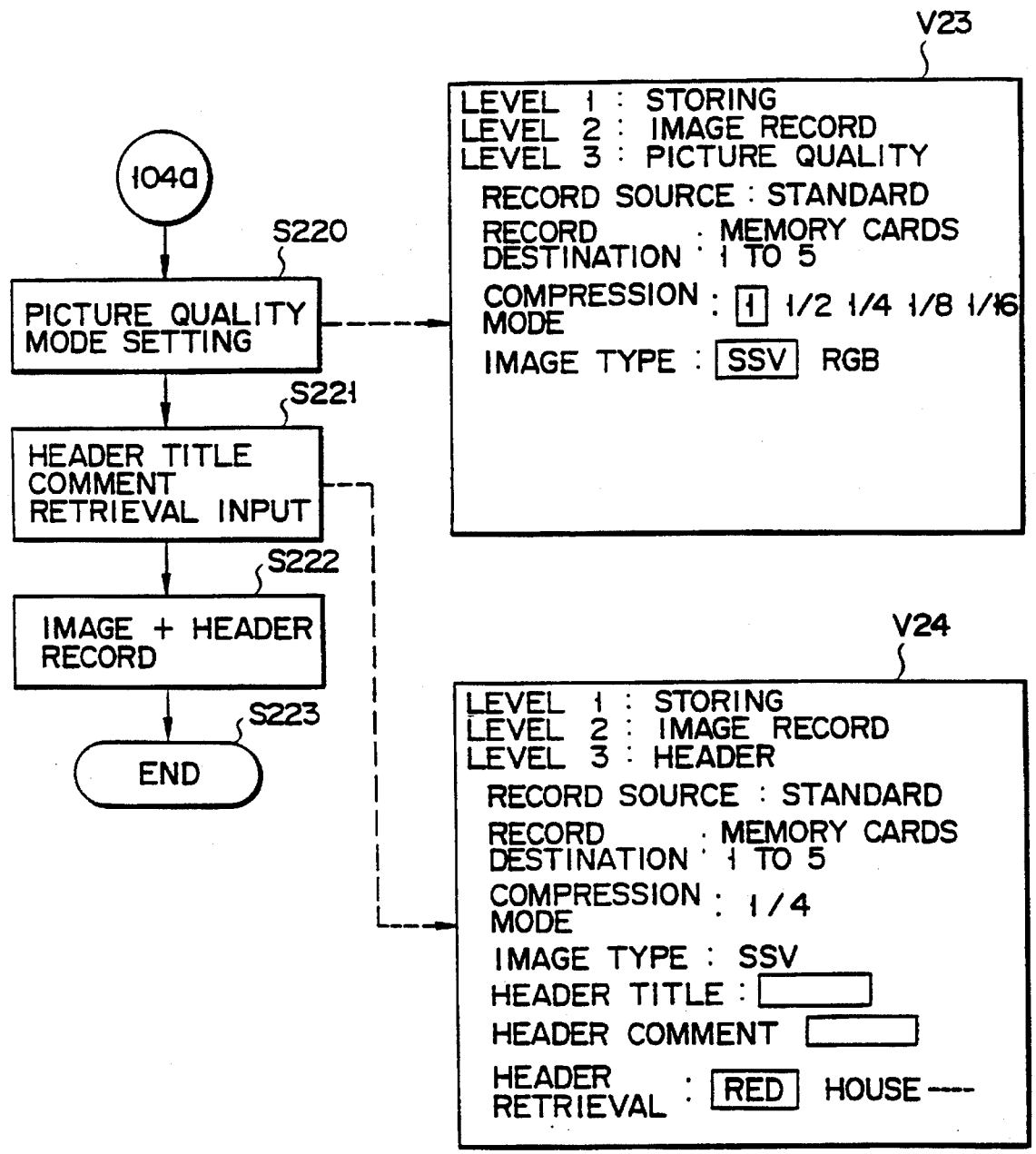

The external connection function is described below. This external connection function is, as shown in FIG. 112, to display all external devices presently connected to the editing machine 600 on display 1, around the editing machine 600, and the presently selected device is distinguished by, for example, reversal display. The external connection function is designed also to display options such as extension memories.

The automatic execution function is as follows. This automatic execution function is to start, edit and preserve the automatic execution program, and this automatic execution program is to instruct the operation for realizing a function when only a specific function is used frequently while a specific external device is connected to the editing machine 600, and in other words, a same function may be realized without repeatedly without having to operate all steps, and the controllability is enhanced. More specifically, in FIG. 113, when the automatic execution is selected on the main menu (step S264), the CPU part 625 changes the screen of display 1 to V47, the menu level to "1" and the menu mode name to "automatic execution" in step S265, and displays start, edit and preserve to be selected.

When the start is specified, the CPU part 625 changes the screen of display 1 to V48, the menu level to "2" and the menu mode name to "start" in step S266, and displays the titles of automatic execution programs recorded in the EEPROM in the CPU part 625 to be specified. Afterwards, the CPU part 625 changes the screen of display 1 to V49, the menu level to "3" and the menu mode name to "detail" in step S267, and displays the detail of the specified automatic execution program, and when the automatic execution is requested, it is executed in step S268 and finished (step S269).

Figure 114A:
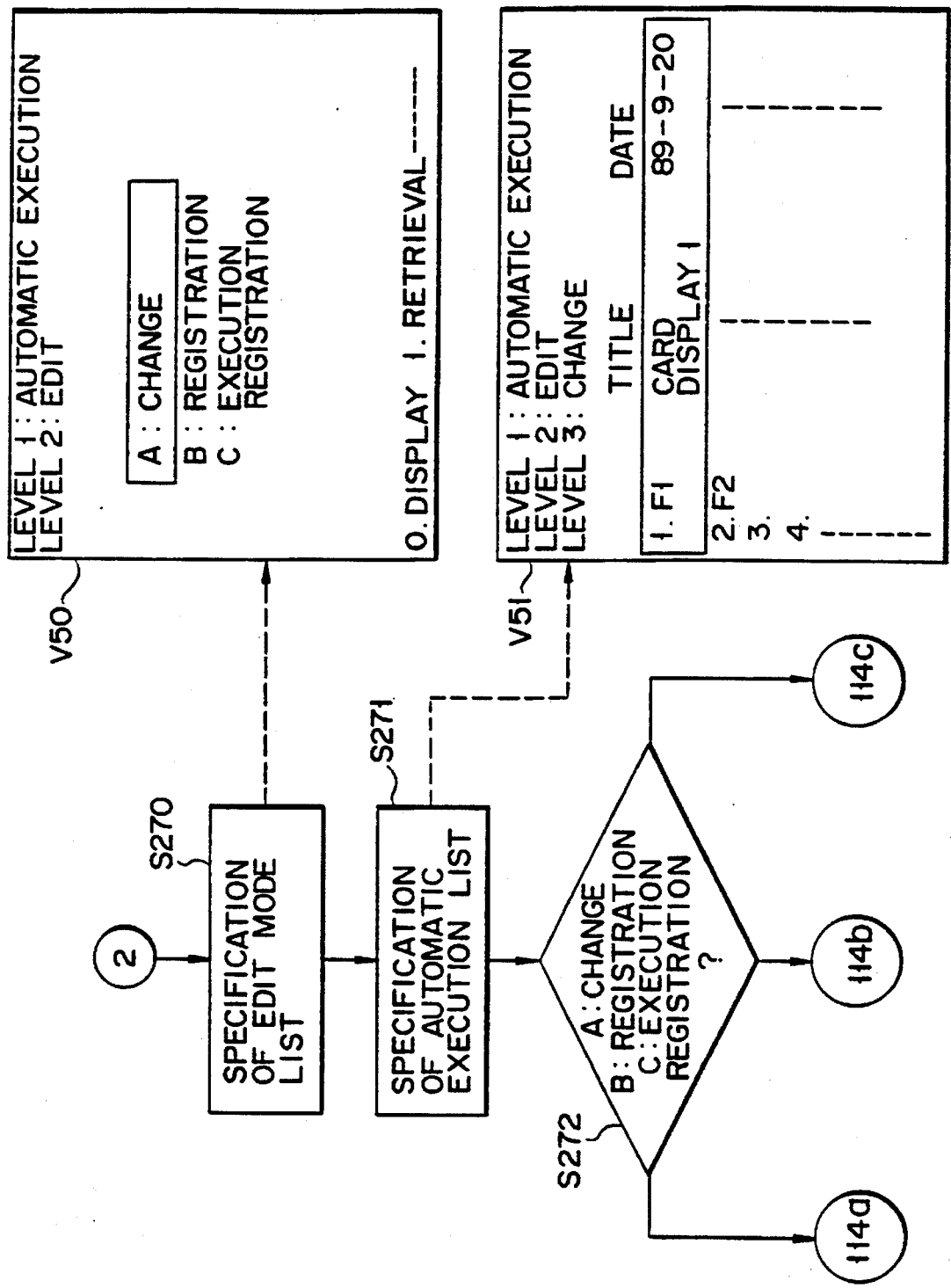
Figure 114B:
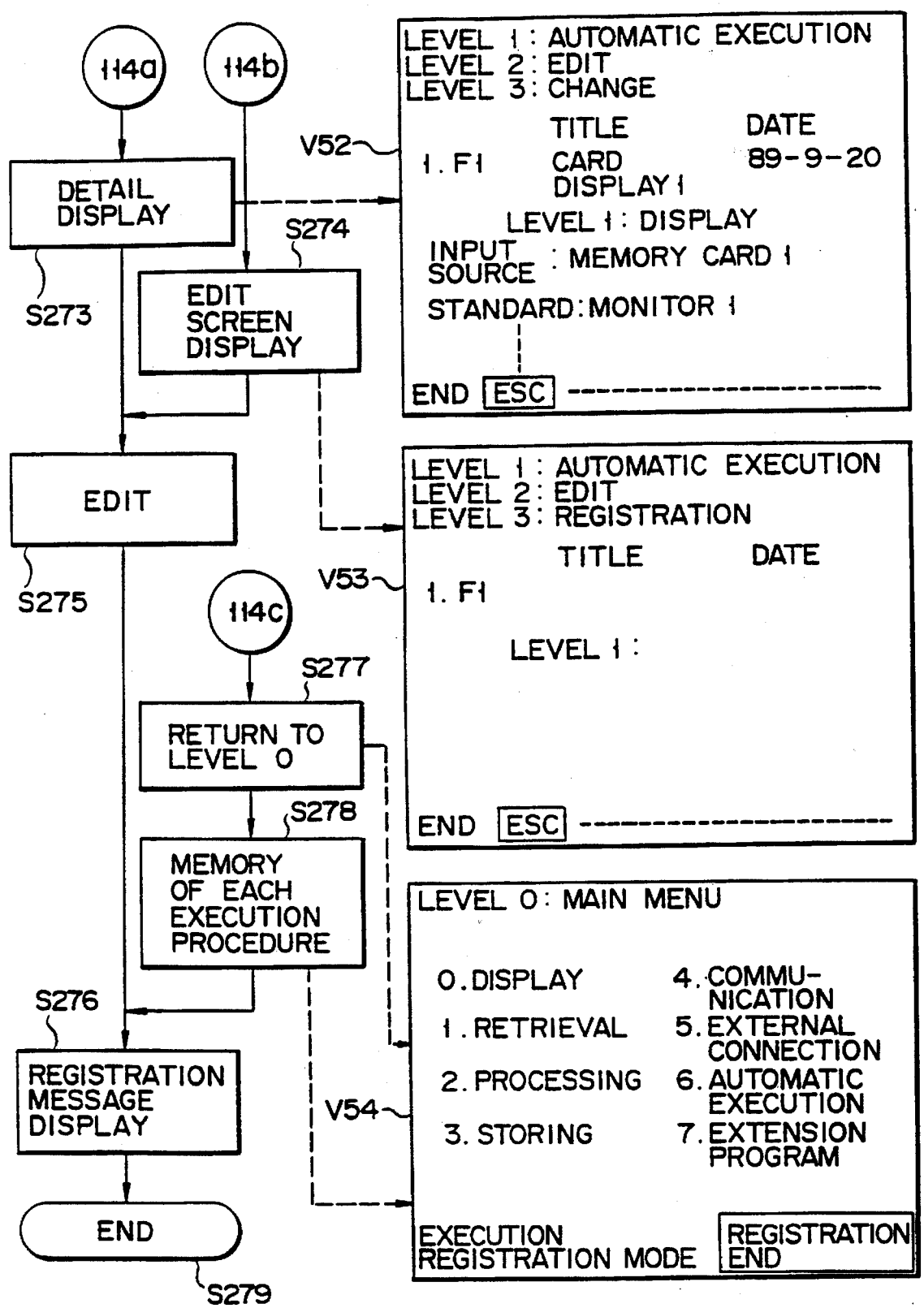

When the editing is specified, the CPU part 625 changes the screen of display 1 to V40, the menu level to "2" and the menu mode name to "start" in step S270 as shown in FIG. 114A and FIG. 114B, thereby displaying the type of editing (change, register, execution registration) to be specified. For instance, when the change is specified, the CPU part 625 changes the screen of display 1 to V51, the menu level to "3" and the menu mode name to "change" in step S271, and displays the titles of automatic execution programs to be specified. In step S272, when the CPU part 625 judges that the change is selected, it displays the detail of the automatic execution program as shown in screen V52 of display 1 in step S273. Or when the CPU 625 Judges that the registration is selected in step S272, it changes the screen of display 1 to V53, the menu level to "3" and menu mode name to "registration" in step S274, thereby displaying the editing screen.

After step S273 or step S274, the CPU part 625 executes the editing in step S275, and displays the registration message of display 1 in step S276, thereby finishing (step S279). Or in step S272, when the CPU 625 judges that the execution registration is selected, in step S277, the screen of display 1 is changed to the main menu as shown in V54, and the execution procedure is recorded in step S278, thereby moving to step S276.

Figure 115:
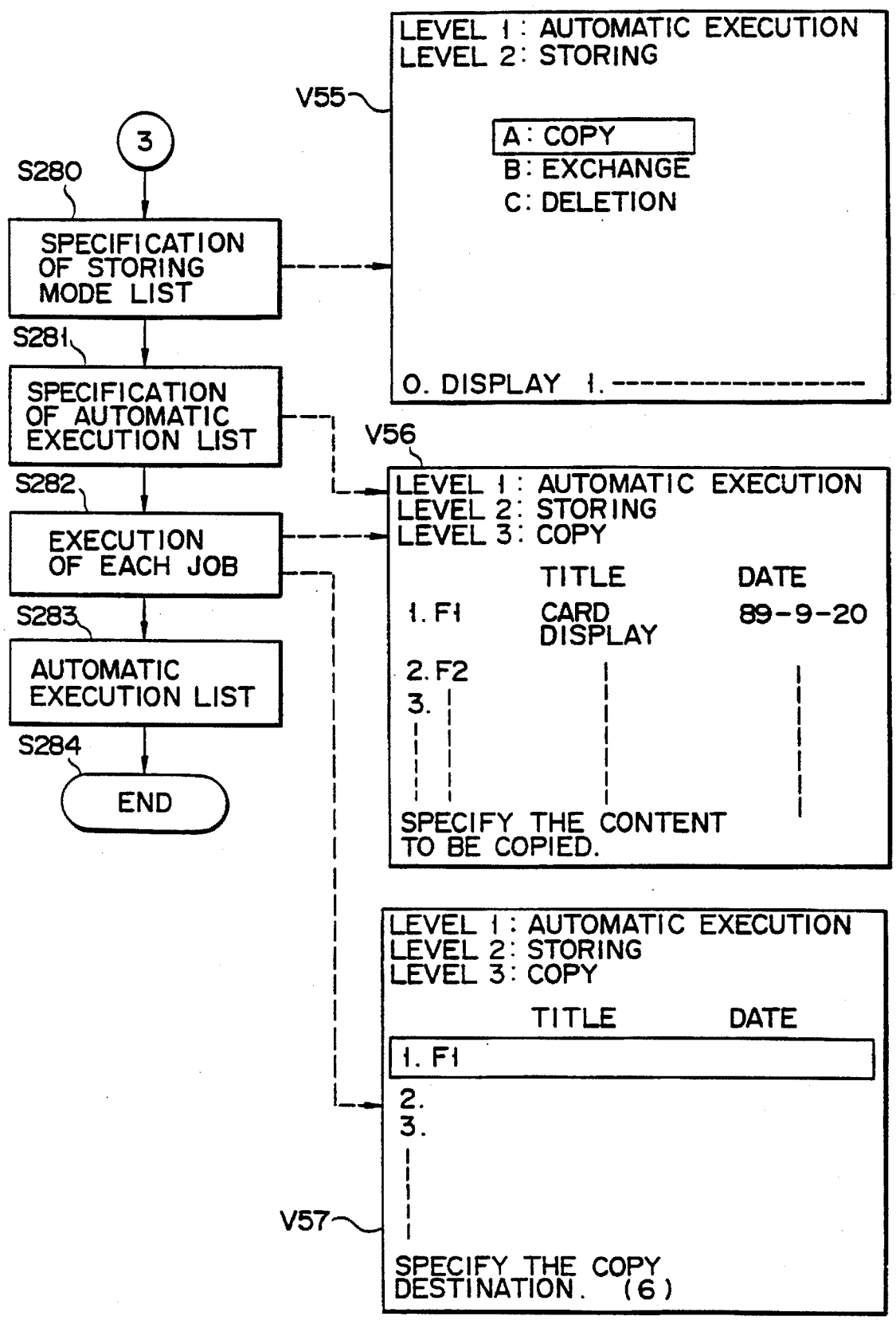
Figure 116B:
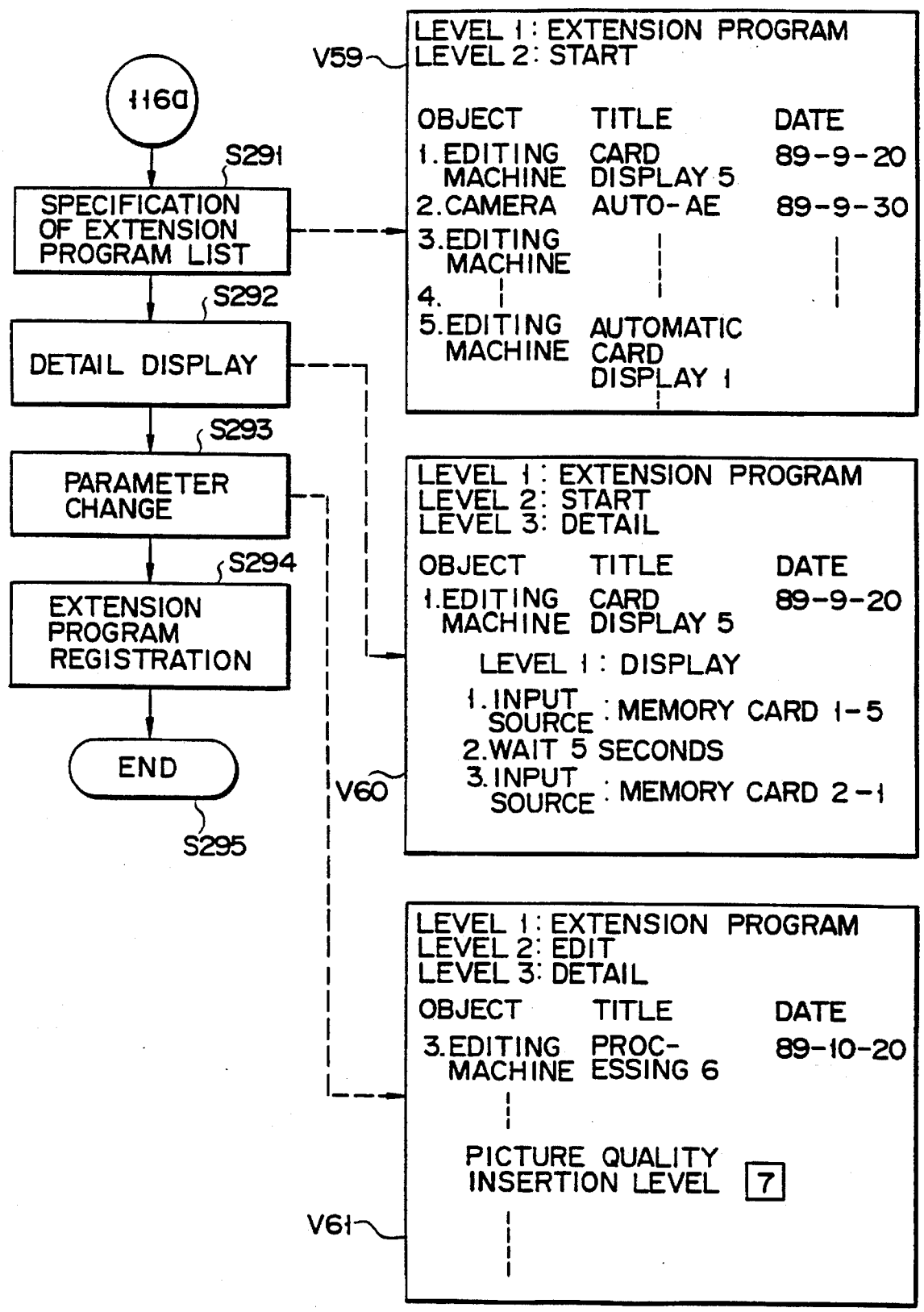

When the preserve is specified, the CPU part 625 changes the screen of display 1 to V55, the menu level to "2" and menu mode name to "preserve" in step S280 in FIG. 115, and displays the types of preserve (copy, exchange, delete) to be specified. For instance, when the copy is selected, the CPU part 625 changes the screen of display 1 to V56, the menu level to "3" and the menu mode name to "copy" in step S281, and displays the titles of automatic execution programs, and the automatic execution program to be copied is specified. Afterwards, in step S282, the CPU part 625 displays the copying destination to be specified as shown in screen V57 of display 1, and executes the copy work, and changes over to display the titles of the automatic execution programs again as shown in screen V56 of display 1 in step S283, thereby finishing (step S284).

Meanwhile, the exchange shown in screen V55 is to exchange the automatic exchange program in the editing machine 600, and the program in the intelligent card 811 which is one of the extension program cartridges 813 connected externally.

Finally, the extension program function is described in detail. This extension program function is to execute, edit and preserve the program registered in the externally connected intelligent card 811. This registration program is not only for controlling the editing machine 600, but an exclusive program for controlling the electronic still camera 11 is available, too, and its program is editing and preserved. That is, in FIG. 116A and FIG. 116B, when the extension program is selected on the main menu (step S285), the CPU part 625 changes the screen of display 1 to V58, the menu level to "1" and the menu mode name to "extension program" in step S286, and displays start, edit and preserve to be selected.

When the start is specified, the CPU part 625 changes the screen of display 1 to V59, the menu level to "2" and menu mode name to "start" in step S287, and displays a list of extension programs in the intelligent card 811 to be specified. In step S288, the CPU part 625 changes the screen of display 1 to V60, the menu level to "3" and the menu mode name to "detail" and displays the detail of the specified extension program. Afterwards, the CPU part 625 executes the extension program in step S289 and terminates (step S290).

When the edit is specified, the CPU part 625 changes the screen of display 1 to V59, the menu level to "2" and the menu mode name to "start" in step S291, and displays a list of extension programs in the intelligent card 1 to be specified. Consequently, the CPU part 625 changes the screen of display 1 to V60, the menu level to "3" and the menu mode name to "de tail" in step S292, and displays the detail of the specified extension program, urging to specify the editing position. In step S293, the CPU part 625 displays the editing position as shown in screen V61 of display 1 to cause to change the parameter, and the edited extension program is registered in the intelligent card 811 in step S294, thereby finishing (step S295).

Figure 117:
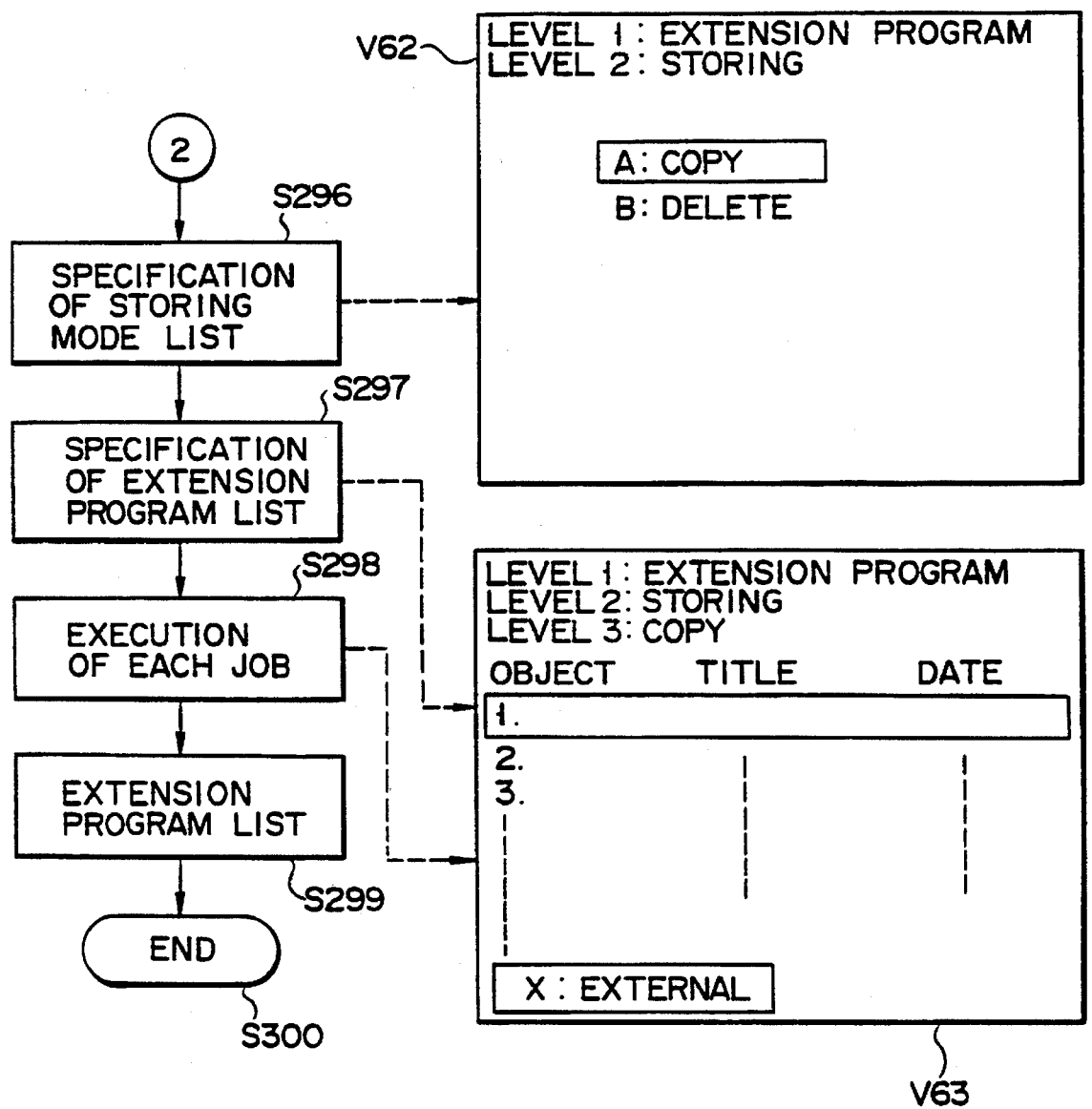

When the preserve is specified, the CPU part 625 changes the screen of display 1 to V62, the menu level to "2" and menu mode name to "preserve" in step S296 as shown in FIG. 117, requesting to specify either copy or delete. When copy is selected, for example, the CPU part 625 changes the screen of display 1 to V63, the menu level to "3" and the menu mode name to "copy" in step S297, and displays a list of extension programs to be specified. In step S298, the CPU part 625 preserves the specified extension program, and a list of extension programs is displayed again in step S299, thereby ending (step S300).

What is claimed is:

1. An image data processing apparatus for converting a taken optical image into digital image data, compressing the digital image data, and recording in a memory, said apparatus comprising:

first means for dividing a screen into a plurality of blocks, calculating an activity by digitizing the complexity of an image data of each block and an activity of the entire screen of the image data, determining a code amount of the entire screen by setting data compression rate based on the activity the entire screen, and determining code amount allotted to each block in proportion to the activity calculated for each block, thereby controlling code amount of each block.

2. The image data processing apparatus according to claim 1, further comprising second means for setting code amount of the entire screen based on manually set data compression rate, and then setting code amount for each of the divided blocks based on the activity calculated for each block, thereby controlling the code amount of each block.

3. The image data processing apparatus according to claim 2, further comprising third means for automatically changing the data compression rate to a compression rate capable of storing code amount of the entire screen into the remaining capacity of the memory and changing the code amount allotted to each of the blocks, thereby controlling code amount for each block, when the code amount of the entire screen determined based on the data compression rate manually set by the second means exceeds the remaining recording capacity of the memory.

4. The image data processing apparatus according to claim 2, further comprising fourth means for automatically calculating data compression rate capable of storing the the code amount of the entire screen in the remaining recording capacity and issuing an alarm if the difference between the calculated data compression rate and the manually set data compression rate is greater than the predetermined amount, when the code amount of the entire screen determined based on the data compression rate manually set by the second means exceeds the remaining recording capacity of the memory.

* * * * *